US012230464B2

(12) United States Patent
Yoo et al.

(10) Patent No.: US 12,230,464 B2
(45) Date of Patent: Feb. 18, 2025

(54) ARC PATH-FORMING PART AND DIRECT CURRENT RELAY COMPRISING SAME

(71) Applicant: LS ELECTRIC CO., LTD., Anyang-si (KR)

(72) Inventors: Jung Woo Yoo, Anyang-si (KR); Han Mi Ru Kim, Anyang-si (KR); Young Ho Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 18/013,487

(22) PCT Filed: Jun. 21, 2021

(86) PCT No.: PCT/KR2021/007736
§ 371 (c)(1),
(2) Date: Dec. 28, 2022

(87) PCT Pub. No.: WO2022/005077
PCT Pub. Date: Jan. 6, 2022

(65) Prior Publication Data

US 2023/0290599 A1 Sep. 14, 2023

(30) Foreign Application Priority Data

Jun. 29, 2020 (KR) ........................ 10-2020-0079601
Jun. 29, 2020 (KR) ........................ 10-2020-0079603

(51) Int. Cl.
*H01H 50/38* (2006.01)
*H01H 50/54* (2006.01)

(52) U.S. Cl.
CPC ............ *H01H 50/38* (2013.01); *H01H 50/54* (2013.01)

(58) Field of Classification Search
CPC ...... H01H 50/38; H01H 50/546; H01H 50/54; H01H 9/443
See application file for complete search history.

(56) References Cited

U.S. PATENT DOCUMENTS 8,482,368 B2 * 7/2013 Sasaki ................ H01H 51/2236 335/201
8,853,585 B2 * 10/2014 Tachikawa ............. H01H 9/443 335/201

(Continued)

FOREIGN PATENT DOCUMENTS

JP 2014086206 A 5/2014
JP 2019036431 A 3/2019

(Continued)

OTHER PUBLICATIONS

International Search Report for related International Application No. PCT/KR2021/007736; action dated Jan. 6, 2022; (7 pages).

(Continued)

*Primary Examiner* — Bernard Rojas
(74) *Attorney, Agent, or Firm* — K&L Gates LLP

(57) ABSTRACT

An arc path-forming part and a DC relay comprising same are disclosed. The arc path-forming part according to various embodiments of the present disclosure comprises a Halbach array and a magnet part that form a magnetic field in a space formed therein. The magnetic field formed by the Halbach array is stronger in the direction toward the space. The magnetic field formed by the Halbach array and the magnet part forms an electromagnetic force together with the current applied to each fixed contactor. Here, the electromagnetic force formed in the vicinity of each fixed contactor is formed in a direction away from the center of the space or in a direction away from each fixed contactor. Accordingly, a generated arc can be quickly extinguished (Continued)

and discharged by being induced by the electromagnetic force.

51 Claims, 93 Drawing Sheets

(56) References Cited

U.S. PATENT DOCUMENTS

| | | | | |
|---|---|---|---|---|
| 9,087,655 | B2 * | 7/2015 | Enomoto | H01H 50/546 |
| 2011/0240603 | A1 * | 10/2011 | Hoffmann | H01H 9/443 218/26 |
| 2012/0175345 | A1 | 7/2012 | Tachikawa et al. | |
| 2012/0181860 | A1 * | 7/2012 | Hsu | H01H 9/443 218/24 |
| 2015/0042424 | A1 | 2/2015 | Maruyama et al. | |

FOREIGN PATENT DOCUMENTS

| | | | |
|---|---|---|---|
| KR | 102009875 | B1 | 8/2019 |
| WO | 2011104902 | A1 | 9/2011 |

OTHER PUBLICATIONS

Written Opinion for related International Application No. PCT/KR2021/007736; action dated Jan. 6, 2022; (7 pages).

Office Action for related Korean Application No. 10-2021-0079601; action dated Jan. 25, 2022; (4 pages).

* cited by examiner (b)

(a)

(b)

(a)

(b)

(b)

(a)

(b)

(b)

(a)

(b)

(a)

(b)

(b)

(a)

(b)

(a)

(b)

(a)

(b)

(a)

(b)

(a)

(b)

(b)

(b)

(a)

(b)

(a)

(b)

(b)

(a)

(b)

(a)

(b)

(a)

(b)

(a)

(b)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

ARC PATH-FORMING PART AND DIRECT CURRENT RELAY COMPRISING SAME

CROSS-REFERENCE TO RELATED APPLICATION

The present application is a National Stage of International Application No. PCT/KR2021/007736 filed on Jun. 21, 2021, which claims priority to and the benefit of Korean Utility Model Application No. 10-2020-0079601, filed on Jun. 29, 2020 and Korean Utility Model Application No. 10-2020-0079603, filed on Jun. 29, 2020, the disclosures of which is incorporated herein by reference in its entirety.

FIELD

The present disclosure relates to an arc path-forming part and a direct current (DC) relay including the same, and more particularly, to an arc path-forming part having a structure capable of effectively inducing a generated arc toward the outside and a DC relay including the same.

BACKGROUND

A direct current (DC) relay is a device that transmits a mechanical driving signal or a current signal using the principle of an electromagnet. The DC relay is also called a magnetic switch and generally classified as an electrical circuit switching device.

The DC relay includes a fixed contact and a movable contact. The fixed contact is electrically connected to an external power supply and a load. The fixed contact and the movable contact may be brought into contact with or separated from each other.

By the contact and separation between the fixed contact and the movable contact, a current flow through the DC relay is allowed or blocked. Such a movement is made by a driving unit that applies a driving force to the movable contact.

When the fixed contact and the movable contact are separated from each other, an arc is generated between the fixed contact and the movable contact. The arc is a flow of high-pressure and high-temperature current. Accordingly, the generated arc must be quickly discharged from the DC relay through a predetermined path.

An arc discharge path is formed by magnets provided in the DC relay. The magnets form magnetic fields in a space in which the fixed contact and the movable contact are in contact with each other. The arc discharge path may be formed by the formed magnetic fields and an electromagnetic force generated by a flow of current.

Referring to FIG. 1, a space in which fixed contacts 1100 and a movable contact 1200 provided in a DC relay 1000 according to the related art are in contact with each other is illustrated. As described above, permanent magnets 1300 are provided in the space.

The permanent magnets 1300 include a first permanent magnet 1310 disposed at an upper side and a second permanent magnet 1320 disposed at a lower side.

The first permanent magnet 1310 is provided in plural, and each surface facing the second permanent magnet 1320 is magnetized to a different polarity. A lower side of the first permanent magnet 1310 located on a left side of FIG. 1 is magnetized to an N pole, and a lower side of the first permanent magnet 1310 located on a right side of FIG. 1 is magnetized to an S pole.

In addition, the second permanent magnet 1320 is also provided in plural, and each surface facing the first permanent magnet 1310 is magnetized to a different polarity. An upper side of the second permanent magnet 1320 located on the left side of FIG. 1 is magnetized to an S pole, and an upper side of the second permanent magnet 1320 located on the right side of FIG. 1 is magnetized to an N pole.

FIG. 1A illustrates a state in which current flows in through the left fixed contact 1100 and flows out through the right fixed contact 1100. According to the Fleming's left-hand rule, an electromagnetic force is formed as indicated with hatched arrows.

Specifically, in the case of the fixed contact 1100 located on the left side, the electromagnetic force is formed toward the outside. Accordingly, the arc generated at the corresponding location can be discharged to the outside.

However, in the case of the fixed contact 1100 located on the right side, the electromagnetic force is formed to the inside, that is, toward a central portion of the movable contact 1200. Accordingly, the arc generated at the corresponding location cannot be immediately discharged to the outside.

In addition, FIG. 1B illustrates a state in which current flows in through the right fixed contact 1100 and flows out through the left fixed contact 1100. According to the Fleming's left-hand rule, an electromagnetic force is formed as indicated with hatched arrows.

Specifically, in the case of the fixed contact 1100 located on the right side, the electromagnetic force is formed toward the outside. Accordingly, the arc generated at the corresponding location can be discharged to the outside.

However, in the case of the fixed contact 1100 located on the left side, the electromagnetic force is formed to the inside, that is, toward the central portion of the movable contact 1200. Accordingly, the arc generated at the corresponding location cannot be immediately discharged to the outside.

Several members for driving the movable contact 1200 to be moved in a vertical direction are provided in a central portion of the DC relay 1000, that is, in a space between the fixed contacts 1100. As an example, a shaft, a spring member inserted through the shaft, and the like are provided at the location.

Accordingly, when the arc generated as illustrated in FIG. 1 is moved toward the central portion, and the arc moved to the central part cannot be immediately moved to the outside, there is a risk that the several members provided at the location may be damaged by energy of the arc.

In addition, as illustrated in FIG. 1, a direction of the electromagnetic force formed inside the DC relay 1000 according to the related art depends on a direction of current flowing through the fixed contacts 1100. That is, the location of the electromagnetic force, which is formed in a direction toward the inside, among the electromagnetic forces generated in each fixed contact 1100 is different depending on the direction of the current.

That is, a user must consider the direction of the current whenever using the DC relay. This may cause inconvenience to the use of the DC relay. In addition, regardless of the user's intention, a situation in which a direction of current applied to the DC relay is changed due to an inexperienced operation or the like cannot be excluded.

In this case, the members provided in the central portion of the DC relay may be damaged by the generated arc. Accordingly, there is a concern of reducing the durable lifetime of the DC relay and also generating safety accidents.

Korean Registration Application No. 10-1696952 discloses a DC relay. Specifically, a DC relay having a structure capable of preventing movement of a movable contact by using a plurality of permanent magnets is disclosed.

However, the DC relay having the above structure can prevent the movement of the movable contact by using the plurality of permanent magnets, but there is a limitation in that any method for controlling a direction of an arc discharge path is not considered.

Korean Registration Application No. 10-1216824 discloses a DC relay. Specifically, a DC relay having a structure capable of preventing arbitrary separation between a movable contact and a fixed contact using a damping magnet is disclosed.

However, the DC relay having the above structure merely proposes a method for maintaining a contact state between the movable contact and the fixed contact. That is, there is a limitation in that a method for forming a discharge path for an arc generated when the movable contact and the fixed contact are separated from each other is not introduced.

(Patent Document 1) Korean Registration Application No. 10-1696952 (Jan. 16, 2017)

(Patent Document 2) Korean Registration Application No. 10-1216824 (Dec. 28, 2012)

SUMMARY

The present disclosure is directed to providing an arc path-forming part having a structure capable of solving the above-described problems and a direct current (DC) relay including the same.

First, the present disclosure is directed to providing an arc path-forming part having a structure capable of quickly extinguishing and discharging an arc generated as flowing current is interrupted, and a DC relay including the same.

In addition, the present disclosure is directed to providing an arc path-forming part having a structure capable of increasing the magnitude of force for inducing a generated arc, and a DC relay including the same.

In addition, the present disclosure is directed to providing an arc path-forming part having a structure capable of preventing damage to a component for electric connection due to a generated arc, and a DC relay including the same.

In addition, the present disclosure is directed to providing an arc path-forming part having a structure capable of allowing arcs generated at a plurality of locations to propagate without meeting each other, and a DC relay including the same.

In addition, the present disclosure is directed to providing an arc path-forming part having a structure capable of achieving the above-described objects without an excessive design change, and a DC relay including the same.

In order to achieve those objects, one embodiment of the present disclosure provides an arc path-forming part including a magnet frame having a space part, in which a fixed contactor and a movable contactor are accommodated, formed therein, a Halbach array located in the space part of the magnet frame and configured to form a magnetic field in the space part, wherein a length of the space part in one direction is formed to be greater than a length thereof in the other direction, the magnet frame includes a first surface and a second surface which extend in the one direction, disposed to face each other, and are configured to surround a portion of the space part, and a third surface and a fourth surface which extend in the other direction, are continuous with the first surface and the second surface, respectively, are disposed to face each other, and are configured to surround a remaining portion of the space part, and the Halbach array includes a plurality of blocks disposed side by side in the other direction and formed of a magnetic material, and is disposed adjacent to one or more surfaces of the third surface and the fourth surface.

In addition, the Halbach array of the arc path-forming part may include a first Halbach array located adjacent to any one surface of the third surface and the fourth surface, and a second Halbach array located adjacent to the other surface of the third surface and the fourth surface, wherein the first and second Halbach arrays may be disposed to face each other with the space part therebetween.

In addition, the first Halbach array of the arc path-forming part may include a first block located to be biased to any one surface of the first surface and the second surface, a third block located to be biased to the other surface of the first surface and the second surface, and a second block located between the first block and the third block, the second Halbach array may include a first block located to be biased to the any one surface of the first surface and the second surface, a third block located to be biased to the other surface of the first surface and the second surface, and a second block located between the first block and the third block, and the first to third blocks of the first Halbach array may face the first to third blocks of the second Halbach array, respectively, with the space part therebetween.

In addition, in the first Halbach array of the arc path-forming part, a surface of the first block facing the second block, a surface of the third block facing the second block, and a surface of the second block facing the second Halbach array may be magnetized to the same polarity, and in the second Halbach array, a surface of the first block facing the second block, a surface of the third block facing the second block, and a surface of the second block facing the first Halbach array may be magnetized to a polarity different from the polarity.

In addition, in the first Halbach array of the arc path-forming part, a surface of the first block facing the second block, a surface of the third block facing the second block, and a surface of the second block facing the second Halbach array may be magnetized to the same polarity, and in the second Halbach array, a surface of the first block facing the second block, a surface of the third block facing the second block, and a surface of the second block facing the first Halbach array may be magnetized to a polarity the same as the polarity.

In addition, the Halbach array of the arc path-forming part may be located adjacent to any one surface of the third surface and the fourth surface, a magnet part configured to form a magnetic field in the space part may be provided separately from the Halbach array to be adjacent to the other surface of the third surface and the fourth surface, and the Halbach array and the magnet part may be disposed to face each other with the space part therebetween.

In addition, the Halbach array of the arc path-forming part may include a first block located to be biased to any one surface of the first surface and the second surface, a third block located to be biased to the other surface of the first surface and the second surface, and a second block located between the first block and the third block, and the magnet part may include a facing surface facing the Halbach array, and an opposing surface opposite to the Halbach array.

In addition, in the Halbach array of the arc path-forming part, a surface of the first block facing the second block, a surface of the third block facing the second block, and a surface of the second block facing the magnet part may be magnetized to the same polarity, and in the magnet part, the facing surface may be magnetized to a polarity different from the polarity.

In addition, in the Halbach array of the arc path-forming part, a surface of the first block facing the second block, a surface of the third block facing the second block, and a surface of the second block facing the magnet part may be magnetized to the same polarity, and in the magnet part, the facing surface may be magnetized to a polarity the same as the polarity.

In addition, the Halbach array of the arc path-forming part may include a first Halbach array located adjacent to any one surface of the third surface and the fourth surface, and located to be biased to any one surface of the first surface and the second surface, and a second Halbach array located adjacent to the other surface of the third surface and the fourth surface, and located to be biased to the other surface of the first surface and the second surface, wherein the first and second Halbach arrays may be disposed to face each other with the space part therebetween.

In addition, the first Halbach array of the arc path-forming part may include a first block located to overlap the second Halbach array in the other direction, and a second block located between the first block and the any one surface of the first surface and the second surface, the second Halbach array may include a first block located to overlap the first Halbach array in the other direction, and a second block located between the first block and the other surface of the first surface and the second surface, and the first block of the first Halbach array and the first block of the second Halbach array may face each other.

In addition, in the first Halbach array of the arc path-forming part, a surface of the first block facing the second Halbach array and a surface of the second block facing the first block may be magnetized to the same polarity, and in the second Halbach array, a surface of the first block facing the first Halbach array and a surface of the second block facing the first block may be magnetized to a polarity different from the polarity.

In addition, in the first Halbach array of the arc path-forming part, a surface of the first block facing the second Halbach array and a surface of the second block facing the first block may be magnetized to the same polarity, and in the second Halbach array, a surface of the first block facing the first Halbach array and a surface of the second block facing the first block may be magnetized to a polarity the same as the polarity.

In addition, the Halbach array of the arc path-forming part may be located adjacent to any one surface of the third surface and the fourth surface, and is located to be biased to any one surface of the first surface and the second surface, a magnet part configured to form a magnetic field in the space part may be provided separately from the Halbach array to be adjacent to the other surface of the third surface and the fourth surface, and the Halbach array and the magnet part may be disposed to face each other with the space part therebetween.

In addition, the Halbach array of the arc path-forming part may include a first block located to be biased to the other surface of the first surface and the second surface, and a second block located to be biased to the any one surface of the first surface and the second surface, and the magnet part may include a facing surface facing the Halbach array, and an opposing surface opposite to the Halbach array.

In addition, in the Halbach array of the arc path-forming part, a surface of the first block facing the magnet part and a surface of the second block facing the first block may be magnetized to the same polarity, and in the magnet part, the facing surface may be magnetized to a polarity different from the polarity.

In addition, in the Halbach array of the arc path-forming part, a surface of the first block facing the magnet part and a surface of the second block facing the first block may be magnetized to the same polarity, and in the magnet part, the facing surface may be magnetized to a polarity the same as the polarity.

In addition, the Halbach array of the arc path-forming part may include a first Halbach array located adjacent to any one surface of the third surface and the fourth surface, and located to be biased to any one surface of the first surface and the second surface, and a second Halbach array located adjacent to the other surface of the third surface and the fourth surface, wherein the first and second Halbach arrays may be disposed to face each other with the space part therebetween.

In addition, the first Halbach array of the arc path-forming part may include a first block disposed to overlap the fixed contactor in the other direction, and a second block located to be biased to the any one surface of the first surface and the second surface, and the second Halbach array may include a first block disposed to face the first block of the first Halbach array with the space part therebetween, a second block located to be biased to the any one surface of the first surface and the second surface, and a third block located to be biased to the other surface of the first surface and the second surface.

In addition, in the first Halbach array of the arc path-forming part, a surface of the first block facing the second Halbach array and a surface of the second block facing the first block may be magnetized to the same polarity, and in the second Halbach array, a surface of the first block facing the first Halbach array, a surface of the second block facing the first block, and a surface of the third block facing the first block may be magnetized to a polarity different from the polarity.

In addition, in the first Halbach array of the arc path-forming part, a surface of the first block facing the second Halbach array and a surface of the second block facing the first block may be magnetized to the same polarity, and in the second Halbach array, a surface of the first block facing the first Halbach array, a surface of the second block facing the first block, and a surface of the third block facing the first block may be magnetized to a polarity the same as the polarity.

In addition, another embodiment of the present disclosure provides a direct current (DC) relay including a plurality of fixed contactors located to be spaced apart from each other in one direction, a movable contactor configured to be brought into contact with or separated from the fixed contactors, a magnet frame having a space part, in which the fixed contactors and the movable contactor are accommodated, formed therein, and a Halbach array located in the space part of the magnet frame and configured to form a magnetic field in the space part, wherein a length of the space part in the one direction is formed to be greater than a length thereof in the other direction, the magnet frame includes a first surface and a second surface which extend in the one direction, are disposed to face each other, and are configured to surround a portion of the space part, and a third surface and a fourth surface which extend in the other direction, are continuous with the first surface and the second surface, respectively, are disposed to face each other, and are configured to surround a remaining portion of the space part, and the Halbach array includes a plurality of blocks disposed side by side in the other direction and formed of a magnetic material, and is disposed adjacent to one or more surfaces of the third surface and the fourth surface.

In addition, the Halbach array of the DC relay may include a first Halbach array located adjacent to any one surface of the third surface and the fourth surface, and a second Halbach array located adjacent to the other surface of the third surface and the fourth surface, wherein the first and second Halbach arrays may be disposed to face each other with the space part therebetween.

In addition, the Halbach array of the DC relay may be located adjacent to any one surface of the third surface and the fourth surface, a magnet part configured to form a magnetic field in the space part may be provided separately from the Halbach array to be adjacent to the other surface of the third surface and the fourth surface, and the Halbach array and the magnet part may be disposed to face each other with the space part therebetween.

In addition, still another embodiment of the present disclosure provides an arc path-forming part including a magnet frame having a space part, in which a fixed contactor and a movable contactor are accommodated, formed therein, and a Halbach array and a magnet part provided separately from the Halbach array, which are located in the space part of the magnet frame and configured to form a magnetic field in the space part, wherein a length of the space part in one direction is formed to be greater than a length thereof in the other direction, the magnet frame includes a first surface and a second surface which extend in the one direction, are disposed to face each other, and are configured to surround a portion of the space part, and a third surface and a fourth surface which extend in the other direction, are continuous with the first surface and the second surface, respectively, are disposed to face each other, and are configured to surround a remaining portion of the space part, the Halbach array includes a plurality of blocks disposed side by side in the other direction and formed of a magnetic material, and is located adjacent to one or more surfaces of the third surface and the fourth surface, and the magnet part is provided in plural, wherein at least one of the plurality of magnet parts is located adjacent to the first surface, and at least another one of the plurality of magnet parts is located adjacent to the second surface.

In addition, the Halbach array of the arc path-forming part may include a first Halbach array located adjacent to any one surface of the third surface and the fourth surface, and a second Halbach array located adjacent to the other surface of the third surface and the fourth surface and disposed to face the first Halbach array with the space part therebetween, and the magnet part may include a first magnet part and a second magnet part located adjacent to any one surface of the first surface and the second surface and disposed side by side in the one direction, and a third magnet part and a fourth magnet part, which are located adjacent to the other surface of the first surface and the second surface, disposed side by side in the one direction, and respectively disposed to face the first magnet part and the second magnet part with the space part therebetween.

In addition, surfaces of the first magnet part and the second magnet part of the arc path-forming part facing each other and surfaces of the third magnet part and the fourth magnet part facing each other may be magnetized to the same polarity, any one surface of surfaces of the first Halbach array and the second Halbach array facing each other may be magnetized to a polarity the same as the polarity, and the other surface of the surfaces of the first Halbach array and the second Halbach array facing each other may be magnetized to a polarity different from the polarity.

In addition, surfaces of the first magnet part and the second magnet part of the arc path-forming part facing each other and surfaces of the third magnet part and the fourth magnet part facing each other may be magnetized to the same polarity, and surfaces of the first Halbach array and the second Halbach array facing each other may be magnetized to a polarity different from the polarity.

In addition, the first Halbach array of the arc path-forming part may include a first block located to be biased to any one surface of the first surface and the second surface, a third block located to be biased to the other surface of the first surface and the second surface, and a second block located between the first block and the third block, and the second Halbach array may include a first block located to be biased to any one surface of the first surface and the second surface, a third block located to be biased to the other surface of the first surface and the second surface, and a second block located between the first block and the third block.

In addition, surfaces of the first magnet part and the second magnet part of the arc path-forming part facing each other and surfaces of the third magnet part and the fourth magnet part facing each other may be magnetized to the same polarity, any one surface of a surface of the second block of the first Halbach array and a surface of the second block of the second Halbach array facing each other may be magnetized to a polarity the same as the polarity, and the other surface of the surface of the second block of the first Halbach array and the surface of the second block of the second Halbach array facing each other may be magnetized to a polarity different from the polarity.

In addition, surfaces of the first magnet part and the second magnet part of the arc path-forming part facing each other and surfaces of the third magnet part and the fourth magnet part facing each other may be magnetized to the same polarity, and a surface of the second block of the first Halbach array and a surface of the second block of the second Halbach array facing each other may be magnetized to a polarity different from the polarity.

In addition, the first Halbach array of the arc path-forming part may include a first block disposed to overlap the fixed contactor in the one direction, and a second block located to be biased to any one surface of the first surface and the second surface, and the second Halbach array may include a first block disposed to overlap the fixed contactor in the one direction, and a second block located to be biased to the other surface of the first surface and the second surface.

In addition, surfaces of the first magnet part and the second magnet part of the arc path-forming part facing each other and surfaces of the third magnet part and the fourth magnet part facing each other may be magnetized to the same polarity, any one surface of a surface of the first block of the first Halbach array and a surface of the first block of the second Halbach array facing each other may be magnetized to a polarity the same as the polarity, and the other surface of the surface of the first block of the first Halbach array and the surface of the first block of the second Halbach array facing each other may be magnetized to a polarity different from the polarity.

In addition, surfaces of the first magnet part and the second magnet part of the arc path-forming part facing each other and surfaces of the third magnet part and the fourth magnet part facing each other may be magnetized to the same polarity, and a surface of the first block of the first Halbach array and a surface of the first block of the second Halbach array facing each other may be magnetized to a polarity different from the polarity.

In addition, the first Halbach array of the arc path-forming part may include a first block disposed to overlap the fixed contactor in the one direction, and a second block located to be biased to any one surface of the first surface and the second surface, and the second Halbach array may include a first block disposed to overlap the fixed contactor in the one direction, a second block located to be biased to the other surface of the first surface and the second surface, and a third block located to be biased to the any one surface the first surface and the second surface.

In addition, surfaces of the first magnet part and the second magnet part of the arc path-forming part facing each other and surfaces of the third magnet part and the fourth magnet part facing each other may be magnetized to the same polarity, any one surface of a surface of the first block of the first Halbach array and a surface of the first block of the second Halbach array facing each other may be magnetized to a polarity the same as the polarity, and the other surface of the surface of the first block of the first Halbach array and the surface of the first block of the second Halbach array facing each other may be magnetized to a polarity different from the polarity.

In addition, surfaces of the first magnet part and the second magnet part of the arc path-forming part facing each other and surfaces of the third magnet part and the fourth magnet part facing each other may be magnetized to the same polarity, and a surface of the first block of the first Halbach array and a surface of the first block of the second Halbach array facing each other may be magnetized to a polarity different from the polarity.

In addition, the Halbach array of the arc path-forming part may be located adjacent to any one surface of the third surface and the fourth surface, and the magnet part may include a first magnet part and a second magnet part located adjacent to any one surface of the first surface and the second surface and disposed side by side in the one direction, a third magnet part and a fourth magnet part, which are located adjacent to the other surface of the first surface and the second surface, disposed side by side in the one direction, and respectively disposed to face the first magnet part and the second magnet part with the space part therebetween, and a fifth magnet part located adjacent to the other surface of the third surface and the fourth surface and disposed to face the Halbach array with the space part therebetween.

In addition, surfaces of the first magnet part and the second magnet part of the arc path-forming part facing each other and surfaces of the third magnet part and the fourth magnet part facing each other may be magnetized to the same polarity, any one surface of surfaces of the Halbach array and the fifth magnet part facing each other may be magnetized to a polarity the same as the polarity, and the other surface of the surfaces of the Halbach array and the fifth magnet part facing each other may be magnetized to a polarity different from the polarity.

In addition, surfaces of the first magnet part and the second magnet part of the arc path-forming part facing each other and surfaces of the third magnet part and the fourth magnet part facing each other may be magnetized to the same polarity, and surfaces of the Halbach array and the fifth magnet part facing each other may be magnetized to a polarity different from the polarity.

In addition, the Halbach array of the arc path-forming part may include a first block located to be biased to any one surface of the first surface and the second surface, a third block located to be biased to the other surface of the first surface and the second surface, and a second block located between the first block and the third block.

In addition, surfaces of the first magnet part and the second magnet part of the arc path-forming part facing each other and surfaces of the third magnet part and the fourth magnet part facing each other may be magnetized to the same polarity, any one surface of a surface of the second block of the Halbach array and a surface of the fifth magnet part facing each other may be magnetized to a polarity the same as the polarity, and the other surface of the surface of the second block of the Halbach array and the surface of the fifth magnet part facing each other may be magnetized to a polarity different from the polarity.

In addition, surfaces of the first magnet part and the second magnet part of the arc path-forming part facing each other and surfaces of the third magnet part and the fourth magnet part facing each other may be magnetized to the same polarity, and a surface of the second block of the Halbach array and a surface of the fifth magnet part facing each other may be magnetized to a polarity different from the polarity.

In addition, the Halbach array of the arc path-forming part may include a first block disposed to overlap the fixed contactor in the one direction, and a second block located to be biased to any one surface of the first surface and the second surface.

In addition, surfaces of the first magnet part and the second magnet part of the arc path-forming part facing each other and surfaces of the third magnet part and the fourth magnet part facing each other may be magnetized to the same polarity, any one surface of a surface of the first block of the Halbach array and a surface of the fifth magnet part facing each other may be magnetized to a polarity the same as the polarity, and the other surface of the surface of the first block of the Halbach array and the surface of the fifth magnet part facing each other may be magnetized to a polarity different from the polarity.

In addition, surfaces of the first magnet part and the second magnet part of the arc path-forming part facing each other and surfaces of the third magnet part and the fourth magnet part facing each other may be magnetized to the same polarity, and a surface of the first block of the Halbach array and a surface of the fifth magnet part facing each other may be magnetized to a polarity different from the polarity.

In addition, yet another embodiment of the present disclosure provides a direct current (DC) relay including a plurality of fixed contactors located to be spaced apart from each other in one direction, a movable contactor configured to be brought into contact with or separated from the fixed contactors, a magnet frame having a space part, in which the fixed contactors and the movable contactor may be accommodated, formed therein, and a Halbach array and a magnet part, which are located in the space part of the magnet frame and configured to form a magnetic field in the space part, the magnet part being provided separately from the Halbach array, wherein a length of the space part in the one direction is formed to be greater than a length thereof in the other direction, the magnet frame includes a first surface and a second surface which extend in the one direction, are disposed to face each other, and are configured to surround a portion of the space part, and a third surface and a fourth surface which extend in the other direction, are continuous with the first surface and the second surface, respectively, are disposed to face each other, and are configured to surround a remaining portion of the space part, the Halbach array includes a plurality of blocks disposed side by side in the other direction and formed of a magnetic material, and is located adjacent to one or more surfaces of the third surface and the fourth surface, and the magnet part is provided in plural, wherein at least one of the plurality of magnet parts is located adjacent to the first surface, and at least another one of the plurality of magnet parts is located adjacent to the second surface.

In addition, the Halbach array of the DC relay may include a first Halbach array located adjacent to any one surface of the third surface and the fourth surface, and a second Halbach array located adjacent to the other surface of the third surface and the fourth surface and disposed to face the first Halbach array with the space part therebetween, and the magnet part may include a first magnet part and a second magnet part located adjacent to any one surface of the first surface and the second surface and disposed side by side in the one direction, and a third magnet part and a fourth magnet part, which are located adjacent to the other surface of the first surface and the second surface, disposed side by side in the one direction, and respectively disposed to face the first magnet part and the second magnet part with the space part therebetween, wherein surfaces of the first magnet part and the second magnet part facing each other and surfaces of the third magnet part and the fourth magnet part facing each other may be magnetized to the same polarity, any one surface of surfaces of the first Halbach array and the second Halbach array facing each other may be magnetized to a polarity the same as the polarity, and the other surface of the surfaces of the first Halbach array and the second Halbach array facing each other may be magnetized to a polarity different from the polarity.

In addition, the Halbach array of the DC relay may include a first Halbach array located adjacent to any one surface of the third surface and the fourth surface, and a second Halbach array located adjacent to the other surface of the third surface and the fourth surface and disposed to face the first Halbach array with the space part therebetween, and the magnet part may include a first magnet part and a second magnet part located adjacent to any one surface of the first surface and the second surface and disposed side by side in the one direction, and a third magnet part and a fourth magnet part, which are located adjacent to the other surface of the first surface and the second surface, disposed side by side in the one direction, and respectively disposed to face the first magnet part and the second magnet part with the space part therebetween, wherein surfaces of the first magnet part and the second magnet part facing each other and surfaces of the third magnet part and the fourth magnet part facing each other may be magnetized to the same polarity, and surfaces of the first Halbach array and the second Halbach array facing each other may be magnetized to a polarity different from the polarity.

In addition, the Halbach array of the DC relay may be located adjacent to any one surface of the third surface and the fourth surface, and the magnet part may include a first magnet part and a second magnet part located adjacent to any one surface of the first surface and the second surface and disposed side by side in the one direction, a third magnet part and a fourth magnet part, which are located adjacent to the other surface of the first surface and the second surface, disposed side by side in the one direction, and respectively disposed to face the first magnet part and the second magnet part with the space part therebetween, and a fifth magnet part located adjacent to the other surface of the third surface and the fourth surface and disposed to face the Halbach array with the space part therebetween, wherein surfaces of the first magnet part and the second magnet part facing each other and surfaces of the third magnet part and the fourth magnet part facing each other may be magnetized to the same polarity, any one surface of surfaces of the Halbach array and the fifth magnet part facing each other may be magnetized to a polarity the same as the polarity, and the other surface of the surfaces of the Halbach array and the fifth magnet part facing each other may be magnetized to a polarity different from the polarity.

In addition, the Halbach array of the DC relay may be located adjacent to any one surface of the third surface and the fourth surface, and the magnet part may include a first magnet part and a second magnet part located adjacent to any one surface of the first surface and the second surface and disposed side by side in the one direction, a third magnet part and a fourth magnet part, which are located adjacent to the other surface of the first surface and the second surface, disposed side by side in the one direction, and respectively disposed to face the first magnet part and the second magnet part with the space part therebetween, and a fifth magnet part located adjacent to the other surface of the third surface and the fourth surface and disposed to face the Halbach array with the space part therebetween, wherein surfaces of the first magnet part and the second magnet part facing each other and surfaces of the third magnet part and the fourth magnet part facing each other may be magnetized to the same polarity, and surfaces of the Halbach array and the fifth magnet part facing each other may be magnetized to a polarity different from the polarity.

According to embodiments of the present disclosure, the following effects can be achieved.

First, an arc path-forming part includes a Halbach array and a magnet part. Each of the Halbach array and the magnet part forms a magnetic field inside the arc path-forming part. The formed magnetic field forms an electromagnetic force together with current flowing through a fixed contactor and a movable contactor that are accommodated in the arc path-forming part.

At this point, a generated arc is formed in a direction away from each fixed contactor. An arc generated as the fixed contactor and the movable contactor are separated from each other can be induced by the electromagnetic force.

Accordingly, the generated arc can be quickly extinguished and discharged to the outside of the arc path-forming part and a direct current (DC) relay.

In addition, the arc path-forming part includes a Halbach array. The Halbach array includes a plurality of magnetic materials disposed side by side in one direction. Each of the plurality of magnetic materials can enhance the strength of a magnetic field on any one side of both sides thereof in the other direction different from the one direction.

At this point, the Halbach array is disposed such that the any one side, that is, the side in the direction in which the strength of the magnetic field is enhanced, faces the space part of the arc path-forming part. That is, due to the Halbach array, the strength of the magnetic field formed in the space part can be enhanced.

Accordingly, the strength of the electromagnetic force, which depends on the strength of the magnetic field, can also be enhanced. As a result, the strength of the electromagnetic force that induces the generated arc can be enhanced so that the generated arc can be effectively extinguished and discharged.

Further, directions of the magnetic fields formed by the Halbach array and the magnet part and a direction of the electromagnetic force formed by the current flowing through the fixed contactor and the movable contactor are formed to be away from the central part.

Furthermore, as described above, since the strength of each of the magnetic field and the electromagnetic force is enhanced by the Halbach array and the magnet part, the generated arc can be extinguished and moved quickly in a direction away from the central part.

Accordingly, it is possible to prevent damage to various components provided in the vicinity of the central part for the operation of the DC relay.

Further, in various embodiments, a plurality of fixed contactors can be provided. The Halbach array or the magnet parts provided in the arc path-forming part form magnetic fields in different directions in the vicinity of each fixed contactor. Thus, paths of the arc generated in the vicinity of each fixed contactor proceed in different directions.

Accordingly, the arcs generated in the vicinity of each fixed contactor do not meet each other. Thus, a malfunction or a safety accident that may occur due to a collision of arcs generated at different locations can be prevented.

In addition, in order to achieve the above-described objects and effects, the arc path-forming part includes a Halbach array and a magnet part provided in a space part. Each of the Halbach array and the magnet part is located on an inner side of each surface of the magnet frame surrounding the space part. That is, a separate design change for arranging the Halbach array and the magnet part outside the space part is not required.

Accordingly, without an excessive design change, the arc path-forming part according to various embodiments of the present disclosure can be provided in the DC relay. Accordingly, time and costs for applying the arc path-forming part according to various embodiments of the present disclosure can be reduced.

DETAILED DESCRIPTION

Figure 1:
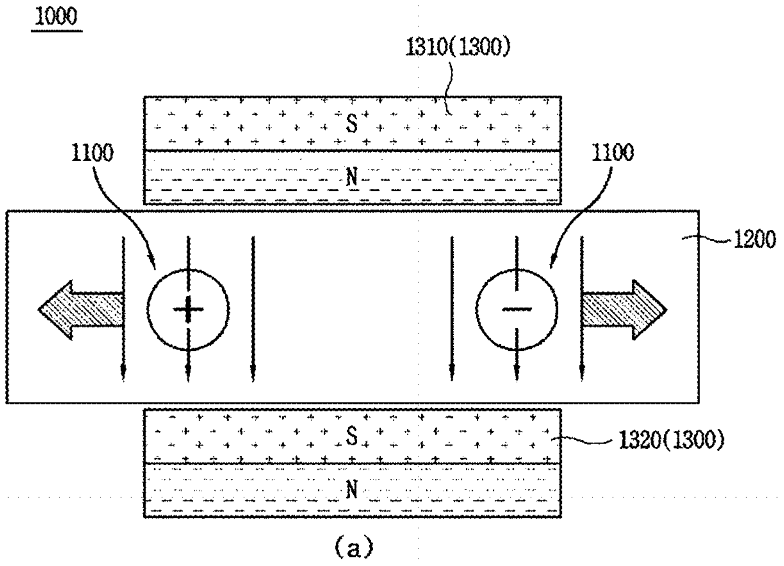
FIG. 1 (PRIOR ART)
FIG. 1 is a conceptual view illustrating a direct current (DC) relay according to the related art.
Figure 1:
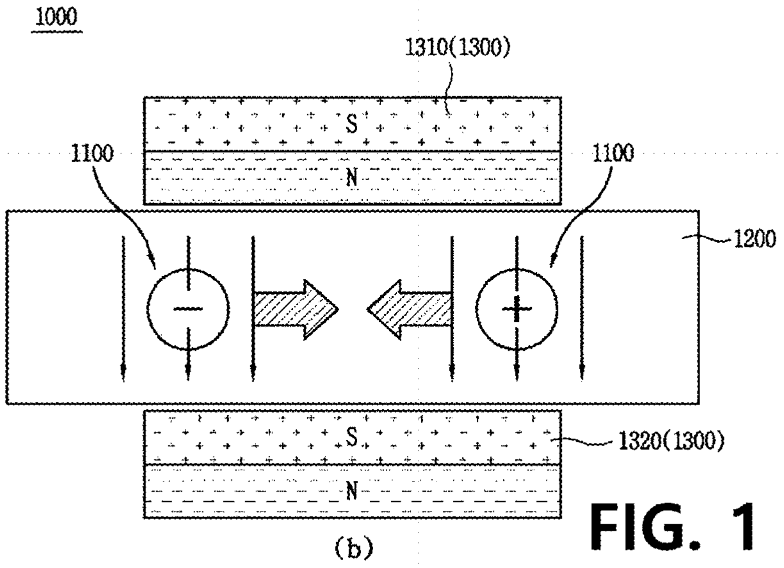
FIG. 1 (PRIOR ART)

Hereinafter, an arc path-forming part 100, 200, 300, 400, or 500 and a direct current (DC) relay 1 including the same according to an embodiment of the present disclosure will be described in detail with reference to the accompanying drawings.

In the following description, descriptions of some components may be omitted to clarify the features of the present disclosure.

1. Definition of Terms

It will be understood that when a component is referred to as being "connected" or "coupled" to another component, it can be directly connected or coupled to the another component or intervening components may be present.

In contrast, when a component is referred to as being "directly connected" or "directly coupled" to another component, there are no intervening components present.

A singular representation used herein includes a plural representation unless it represents a definitely different meaning from the context.

The term "magnetize" used in the following description means a phenomenon in which an object exhibits magnetism in a magnetic field.

The term "polarities" used in the following description means different properties belonging to an anode and a cathode. In one embodiment, the polarities may be classified into an N pole or an S pole.

The term "electric connection" used in the following description means a state in which two or more members are electrically connected.

The term "arc path A.P" used in the following description means a path through which a generated arc is moved or extinguished.

The symbol "⊙" shown in the following drawings means that current flows in a direction from a movable contactor 43 toward a fixed contactor 22 (i.e., in an upward direction), that is, in a direction in which the current flows from the ground.

The symbol "ⓧ" shown in the following drawings means that current flows in a direction from the fixed contactor 22 toward the movable contactor 43 (i.e., in a downward direction), that is, a direction in which the current flows into the ground.

The term "Halbach array" used in the following description means an assembly of a plurality of magnetic materials that are disposed side by side to form columns or rows.

The plurality of magnetic materials constituting the Halbach array may be disposed according to a predetermined rule. A magnetic field may be formed by the magnetic material itself, or magnetic fields may also be formed by between the plurality of magnetic materials.

The Halbach array includes two relatively long surfaces and two relatively short surfaces. Among the magnetic fields formed by the magnetic materials constituting the Halbach array, the magnetic field on an outer side of any one surface of the two long surfaces may be formed with a higher strength.

In the following description, description will be made on the assumption that, among the magnetic fields formed by the Halbach array, the magnetic field in a direction toward a space part 115, 215, 315, 415, or 515 is formed with a higher strength.

The term "magnet part" used in the following description means any type of object that is formed of a magnetic material and capable of forming a magnetic field. In one embodiment, the magnet part may be provided as a permanent magnet, an electromagnet, or the like. It will be understood that the magnet part is different from the magnetic material forming the Halbach array, that is, a magnetic material provided separately from the Halbach array.

The magnet part may form a magnetic field by itself or together with another magnetic material.

The magnet part may extend in one direction. Both end portions of the magnet part in the one direction may be magnetized to different polarities (i.e., the magnet part has different polarities in a longitudinal direction). In addition, both side surfaces of the magnet part in the other direction different from the one direction may be magnetized to different polarities (i.e., the magnet part has different polarities in a width direction).

The magnetic field formed by each of the arc path-forming parts 100, 200, 300, 400, and 500 according to the embodiments of the present disclosure is illustrated as a one-dot chain line in each drawing.

Figure 2:
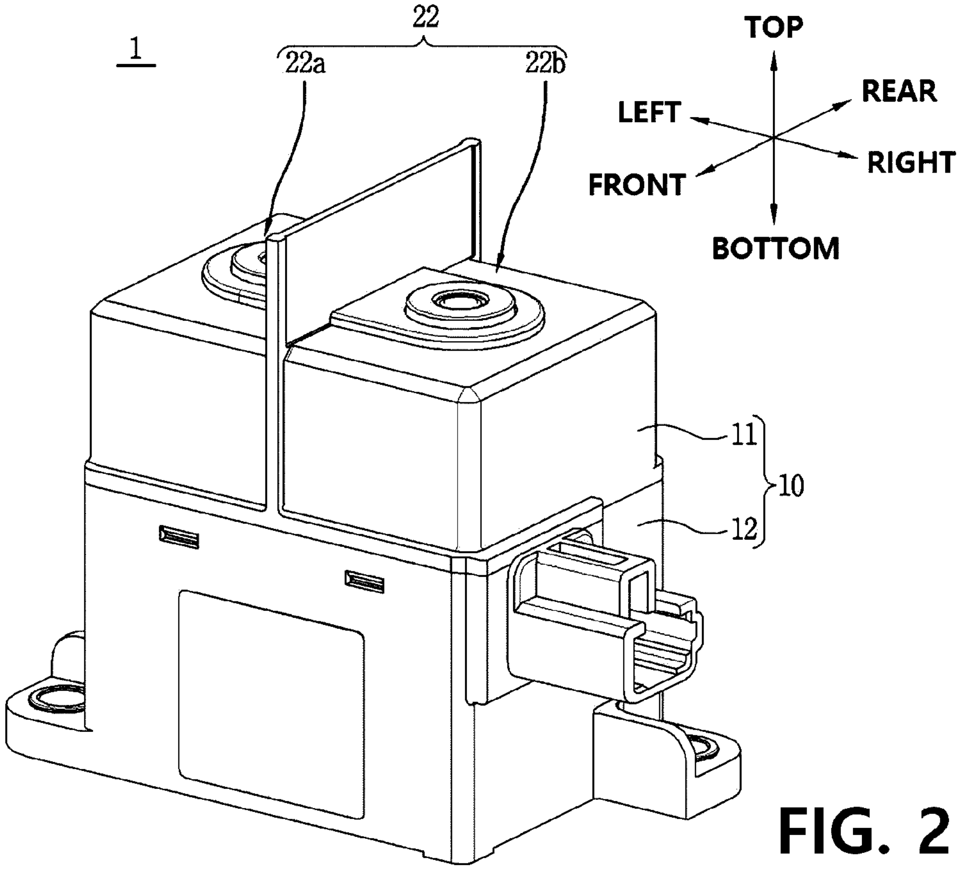
FIG. 2 is a perspective view illustrating a DC relay according to an embodiment of the present disclosure.

The terms "left side," "right side," "upper side," "lower side," "front side," and "rear side" used in the following description will be understood based on a coordinate system illustrated in FIG. 2.

Figure 3:
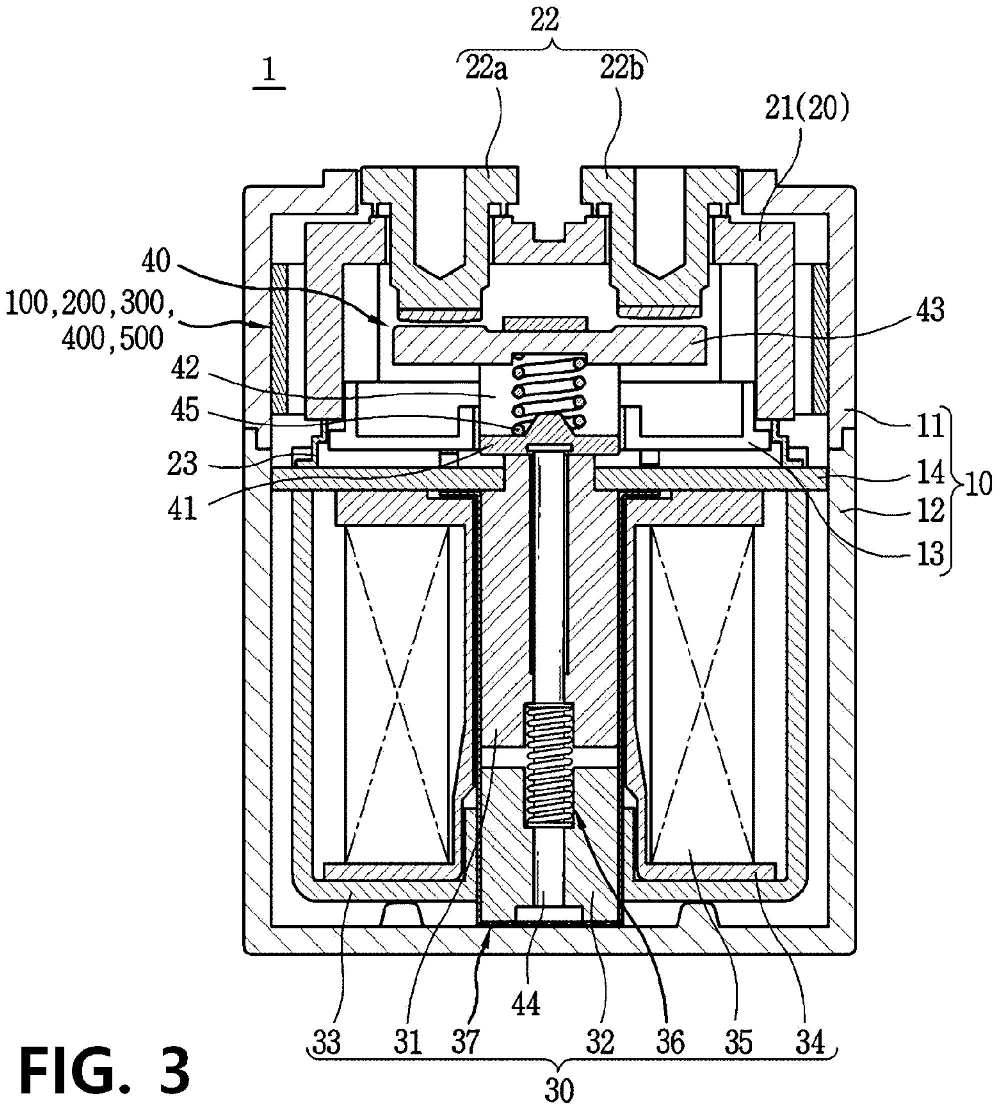
FIG. 3 is a cross-sectional view illustrating the DC relay of FIG. 2.

2. Description of Configuration of DC Relay 1 According to Embodiment of Present Disclosure Referring to FIGS. 2 and 3, a DC relay 1 according to the embodiment of the present disclosure includes a frame part 10, an opening/closing part 20, a core part 30, and a movable contactor part 40.

Figure 4:
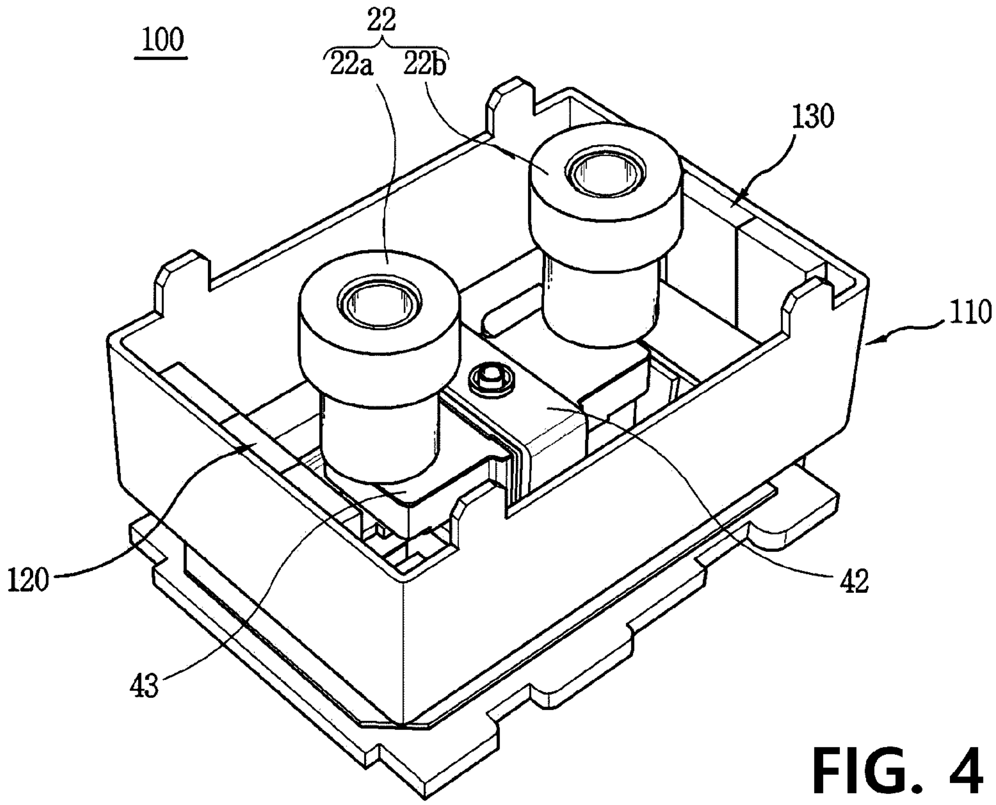
FIG. 4 is an opened perspective view illustrating a first embodiment of an arc path-forming part provided in the DC relay of FIG. 2.
Figure 93:
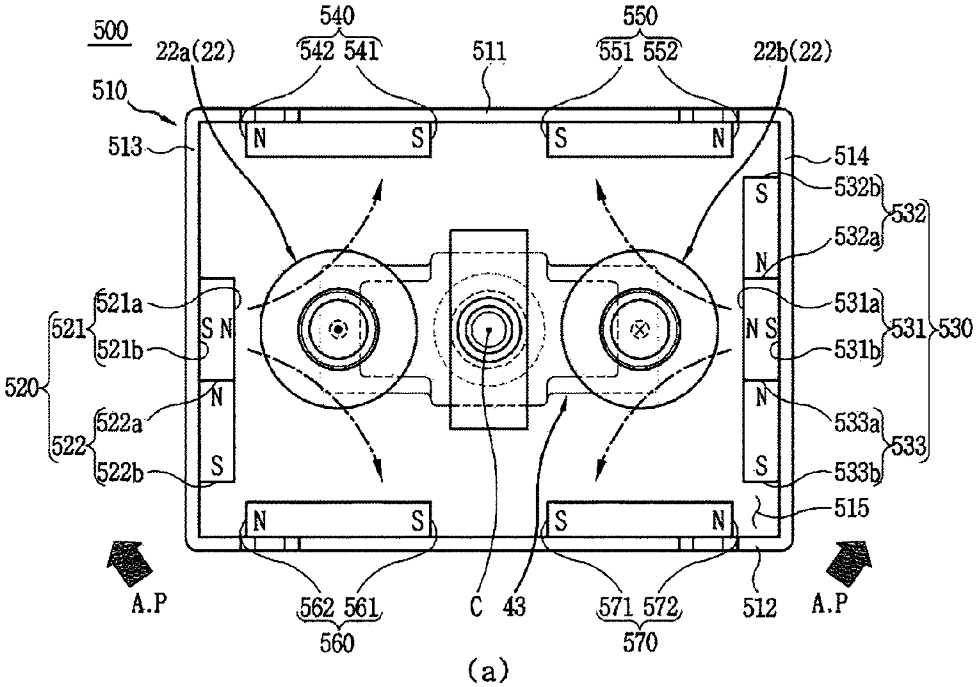
Figure 93:
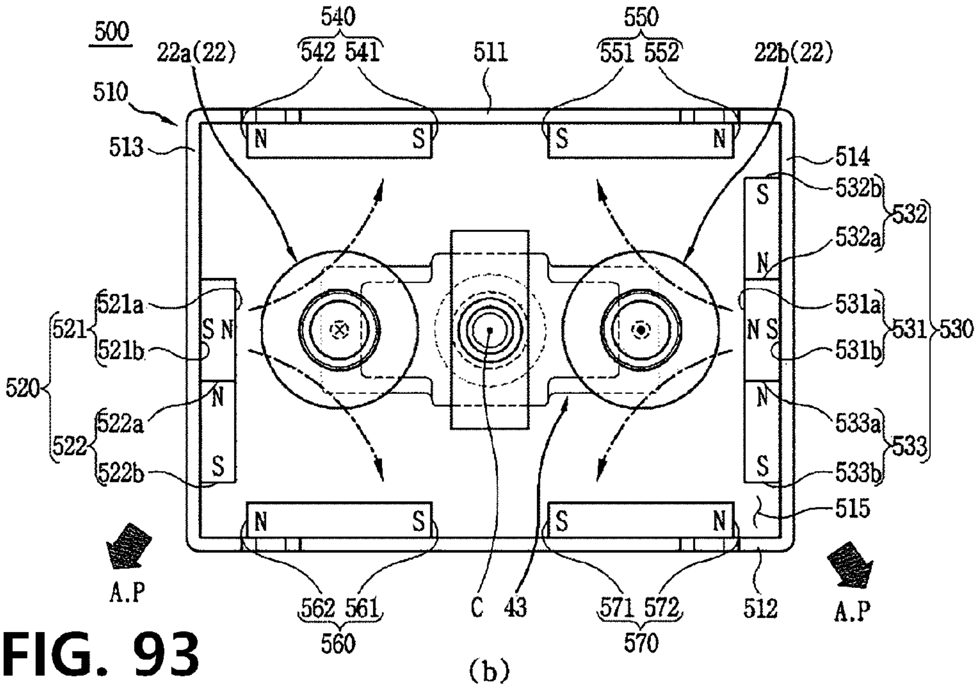

In addition, referring to FIGS. 4 to 93, the DC relay 1 according to the embodiment of the present disclosure includes an arc path-forming part 100, 200, 300, 400, or 500.

Each of the arc path-forming parts 100, 200, 300, 400, and 500 may form a discharge path of a generated arc.

Hereinafter, each configuration of the DC relay 1 according to the embodiment of the present disclosure will be described with reference to the accompanying drawings, and the arc path-forming parts 100, 200, 300, 400, and 500 will be described as separate clauses.

The description will be made on the assumption that the arc path-forming parts 100, 200, 300, 400, and 500 according to various embodiments described below are each provided in the DC relay 1.

However, it will be understood that the arc path-forming parts 100, 200, 300, 400, and 500 are applicable to a device in a form that can be electrically connected to and disconnected from the outside by the contact and separation between a fixed contact and a movable contact, such as a magnetic contactor, a magnetic switch, or the like.

(1) Description of Frame Part 10

The frame part 10 forms an outer side of the DC relay 1. A predetermined space is formed in the frame part 10. Various devices for the DC relay 1 to perform functions for applying or cutting off current transmitted from the outside may be accommodated in the space.

That is, the frame part 10 serves as a kind of housing.

The frame part 10 may be formed of an insulating material such as synthetic resin. This is for preventing an arbitrary electrical connection between the inside and outside of the frame part 10.

The frame part 10 includes an upper frame 11, a lower frame 12, an insulating plate 13, and a supporting plate 14.

The upper frame 11 forms an upper side of the frame part 10. A predetermined space is formed inside the upper frame 11.

The opening/closing part 20 and the movable contactor part 40 may be accommodated in an inner space of the upper frame 11. The arc path-forming parts 100, 200, 300, 400, and 500 may also be accommodated in the inner space of the upper frame 11.

The upper frame 11 may be coupled to the lower frame 12. The insulating plate 13 and the supporting plate 14 may be provided in a space between the upper frame 11 and the lower frame 12.

The fixed contactor 22 of the opening/closing part 20 is located on one side of the upper frame 11, e.g., on an upper side of the upper frame 11 in the illustrated embodiment. The fixed contactor 22 may be partially exposed to the upper side of the upper frame 11 to be electrically connected to an external power supply or a load.

To this end, a through hole through which the fixed contactor 22 is coupled may be formed at the upper side of the upper frame 11.

The lower frame 12 forms a lower side of the frame part 10. A predetermined space is formed inside the lower frame 12. The core part 30 may be accommodated in the inner space of the lower frame 12.

The lower frame 12 may be coupled to the upper frame 11. The insulating plate 13 and the supporting plate 14 may be provided in the space between the lower frame 12 and the upper frame 11.

The insulating plate 13 and the supporting plate 14 electrically and physically isolate the inner space of the upper frame 11 and the inner space of the lower frame 12 from each other.

The insulating plate 13 is located between the upper frame 11 and the lower frame 12. The insulating plate 13 allows the upper frame 11 and the lower frame 12 to be electrically separated from each other. To this end, the insulating plate 13 may be formed of an insulating material such as synthetic resin.

Arbitrary electrical connection between the opening/closing part 20, the movable contactor part 40, and the arc path-forming part 100, 200, 300, 400, or 500 that are accommodated in the upper frame 11 and the core part 30 accommodated in the lower frame 12 can be prevented by the insulating plate 13.

A through hole (not shown) is formed in a central part of the insulating plate 13. A shaft 44 of the movable contactor part 40 is coupled through the through hole (not shown) to be movable in a vertical direction.

The supporting plate 14 is located on a lower side of the insulating plate 13. The insulating plate 13 may be supported by the supporting plate 14.

The supporting plate 14 is located between the upper frame 11 and the lower frame 12.

The supporting plate 14 allows the upper frame 11 and the lower frame 12 to be physically separated from each other. In addition, the supporting plate 14 supports the insulating plate 13.

The supporting plate 14 may be formed of a magnetic material. Accordingly, the supporting plate 14 may form a magnetic circuit together with a yoke 330 of the core part 30. A driving force allowing a movable core 32 of the core part 30 to move toward a fixed core 31 may be formed by the magnetic circuit.

A through hole (not shown) is formed in a central part of the supporting plate 14. The shaft 44 is coupled through the through hole (not shown) to be movable in the vertical direction.

Accordingly, when the movable core 32 is moved in a direction toward or away from the fixed core 31, the shaft 44 and the movable contactor 43 connected to the shaft 44 may also be moved in the same direction.

(2) Description of Opening/Closing Part 20

The opening/closing part 20 allows or blocks the flow of current according to an operation of the core part 30. Specifically, the opening/closing part 20 may allow or block the flow of current as the fixed contactor 22 and the movable contactor 43 are brought into contact with or separated from each other.

The opening/closing part 20 is accommodated in the inner space of the upper frame 11. The opening/closing part 20 may be electrically and physically separated from the core part 30 by the insulating plate 13 and the supporting plate 14.

The opening/closing part 20 includes an arc chamber 21, the fixed contactor 22, and a sealing member 23.

In addition, the arc path-forming part 100, 200, 300, 400, or 500 may be provided outside the arc chamber 21. The arc path-forming part 100, 200, 300, 400, or 500 may form a magnetic field for forming an arc path A.P of an arc generated inside the arc chamber 21. A detailed description thereof will be given below.

The arc chamber 21 extinguishes the arc at an inner space thereof, wherein the arc is generated as the fixed contactor 22 and the movable contactor 43 are separated from each other. Accordingly, the arc chamber 21 may also be referred to as an "arc extinguishing part."

The arc chamber 21 sealingly accommodates the fixed contactor 22 and the movable contactor 43. That is, the fixed contactor 22 and the movable contactor 43 are accommodated in the arc chamber 21. Accordingly, the arc generated as the fixed contactor 22 and the movable contactor 43 are separated from each other does not arbitrarily leak to the outside.

An extinguishing gas may be filled in the arc chamber 21. The extinguishing gas may extinguish the generated arc and the extinguished arc may be discharged to the outside of the DC relay 1 through a predetermined path. To this end, a communication hole (not shown) may be formed through a wall surrounding the inner space of the arc chamber 21.

The arc chamber 21 may be formed of an insulating material. In addition, the arc chamber 21 may be formed of a material having high pressure resistance and high heat resistance. This is because the generated arc is a flow of high-temperature and high-pressure electrons. In one embodiment, the arc chamber 21 may be formed of a ceramic material.

A plurality of through holes may be formed in an upper side of the arc chamber 21. The fixed contactor 22 is coupled through each of the through holes.

In the illustrated embodiment, two fixed contactors 22 including a first fixed contactor 22*a* and a second fixed contactor 22*b* are provided. Accordingly, two through hole formed in the upper side of the arc chamber 21 may also be provided.

When the fixed contactors 22 are coupled through the through holes, the through holes are sealed. That is, the fixed contactor 22 is sealingly coupled to the through hole. Accordingly, the generated arc cannot be discharged to the outside through the through hole.

A lower side of the arc chamber 21 may be open. The lower side of the arc chamber 21 is in contact with the insulating plate 13 and the sealing member 23. That is, the lower side of the arc chamber 21 is sealed by the insulating plate 13 and the sealing member 23.

Accordingly, the arc chamber 21 can be electrically and physically separated from an outer space of the upper frame 11.

The arc extinguished in the arc chamber 21 is discharged to the outside of the DC relay 1 through the predetermined path. In one embodiment, the extinguished arc may be discharged to the outside of the arc chamber 21 through the communication hole (not shown).

The fixed contactor 22 may be brought into contact with or separated from the movable contactor 43, so that the inside and outside of the DC relay 1 are electrically connected or disconnected.

Specifically, when the fixed contactor 22 is brought into contact with the movable contactor 43, the inside and outside of the DC relay 1 may be electrically connected. On the other hand, when the fixed contactor 22 is separated from the movable contactor 43, the inside and outside of the DC relay 1 may be electrically disconnected.

As the name implies, the fixed contactor 22 does not move. That is, the fixed contactor 22 is fixedly coupled to the upper frame 11 and the arc chamber 21. Accordingly, the contact and separation between the fixed contactor 22 and the movable contactor 43 can be achieved by the movement of the movable contactor 43.

One end portion of the fixed contactor 22, i.e., an upper end portion of the fixed contactor 22 in the illustrated embodiment, is exposed to the outside of the upper frame 11. A power supply and a load may each be electrically connected to the one end portion.

The fixed contactor 22 may be provided in plural. In the illustrated embodiment, a total of two fixed contactors 22 are provided, including the first fixed contactor 22*a* on a left side and the second fixed contactor 22*b* on a right side.

The first fixed contactor 22*a* is located to be biased to one side from a center of the movable contactor 43 in the longitudinal direction, i.e., to a left side in the illustrated embodiment. In addition, the second fixed contactor 22*b* is located to be biased to another side from the center of the movable contactor 43 in the longitudinal direction, i.e., to a right side in the illustrated embodiment.

The power supply may be electrically connected to any one of the first fixed contactor 22*a* and the second fixed contactor 22*b*. In addition, the load may be electrically connected to the other one of the first fixed contactor 22*a* and the second fixed contactor 22*b*.

The DC relay 1 according to the embodiment of the present disclosure may form the arc path A.P regardless of a direction of the power supply or load connected to the fixed contactor 22. This can be achieved by the arc path-forming parts 100, 200, 300, 400, and 500, and a detailed description thereof will be described below.

The other end portion of the fixed contactor 22, i.e., a lower end portion of the fixed contactor 22 in the illustrated embodiment extends toward the movable contactor 43.

When the movable contactor 43 is moved in a direction toward the fixed contactor 22, i.e., upward in the illustrated embodiment, the lower end portion of the fixed contactor 22 is brought into contact with the movable contactor 43. Accordingly, the outside and inside of the DC relay 1 can be electrically connected.

The lower end portion of the fixed contactor 22 may be located inside the arc chamber 21.

When control power is cut off, the movable contactor 43 is separated from the fixed contactor 22 by an elastic force of a return spring 36.

At this point, as the fixed contactor 22 and the movable contactor 43 are separated from each other, an arc is generated between the fixed contactor 22 and the movable contactor 43. The generated arc may be extinguished by the extinguishing gas inside the arc chamber 21, and may be discharged to the outside along a path formed by the arc path-forming part 100, 200, 300, 400, or 500.

The sealing member 23 may block the inner space of the arc chamber 21 from arbitrarily communicating with the inner space of the upper frame 11. The sealing member 23 seals the lower side of the arc chamber 21 together with the insulating plate 13 and the supporting plate 14.

Specifically, an upper side of the sealing member 23 is coupled to the lower side of the arc chamber 21. In addition, a radially inner side of the sealing member 23 is coupled to an outer circumference of the insulating plate 13, and a lower side of the sealing member 23 is coupled to the supporting plate 14.

Accordingly, the arc generated in the arc chamber 21 and the arc extinguished by the extinguishing gas do not arbitrarily flow out to the inner space of the upper frame 11.

In addition, the sealing member 23 may be configured to block an inner space of a cylinder 37 from arbitrarily communicating with an inner space of the frame part 10.

(3) Description of Core Part 30

The core part 30 moves the movable contactor part 40 upward as the control power is applied. In addition, when the application of the control power is released, the core part 30 moves the movable contactor part 40 downward again.

The core part 30 may be electrically connected to an external control power supply (not shown) to receive the control power.

The core part 30 is located below the opening/closing part 20. In addition, the core part 30 is accommodated in the lower frame 12. The core part 30 and the opening/closing part 20 may be electrically and physically separated from each other by the insulating plate 13 and the supporting plate 14.

The movable contactor part 40 is located between the core part 30 and the opening/closing part 20. The movable contactor part 40 may be moved by the driving force applied by the core part 30. Accordingly, the movable contactor 43 and the fixed contactor 22 can be brought into contact with each other so that current can flow through the DC relay 1.

The core part 30 includes the fixed core 31, the movable core 32, the yoke 330, a bobbin 34, coils 35, the return spring 36, and the cylinder 37.

The fixed core 31 is magnetized by a magnetic field generated in the coils 35 to generate an electromagnetic attractive force. The movable core 32 is moved toward the fixed core 31 (in an upward direction in FIG. 3) by the electromagnetic attractive force.

The fixed core 31 is not moved. That is, the fixed core 31 is fixedly coupled to the supporting plate 14 and the cylinder 37.

The fixed core 31 may be provided in any form capable of being magnetized by the magnetic field so as to generate an electromagnetic force. In one embodiment, the fixed core 31 may be provided as a permanent magnet, an electromagnet, or the like.

The fixed core 31 is partially accommodated in an upper space inside the cylinder 37. In addition, an outer circumference of the fixed core 31 may be in contact with an inner circumference of the cylinder 37.

The fixed core 31 is located between the supporting plate 14 and the movable core 32.

A through hole (not shown) is formed in a central part of the fixed core 31. The shaft 44 is coupled through the through hole (not shown) to be movable up and down.

The fixed core 31 is located to be spaced apart from the movable core 32 by a predetermined distance. Accordingly, a distance by which the movable core 32 can move toward the fixed core 31 may be limited to the predetermined distance. Accordingly, the predetermined distance may be defined as a "moving distance of the movable core 32."

One end portion of the return spring 36, i.e., an upper end portion of the return spring 36 in the illustrated embodiment, may be brought into contact with a lower side of the fixed core 31. When the movable core 32 is moved upward as the fixed core 31 is magnetized, the return spring 36 is compressed and stores a restoring force.

Accordingly, when the application of the control power is released and the magnetization of the fixed core 31 is terminated, the movable core 32 may be returned to the lower side by the restoring force.

When the control power is applied, the movable core 32 is moved toward the fixed core 31 by the electromagnetic attractive force generated by the fixed core 31.

As the movable core 32 is moved, the shaft 44 coupled to the movable core 32 is moved in a direction toward the fixed core 31, i.e., upward in the illustrated embodiment. In addition, as the shaft 44 is moved, the movable contactor part 40 coupled to the shaft 44 is moved upward.

Accordingly, the fixed contactor 22 and the movable contactor 43 may be brought into contact with each other so that the DC relay 1 can be electrically connected to the external power supply or the load.

The movable core 32 may be provided in any from capable of receiving an attractive force by electromagnetic force. In one embodiment, the movable core 32 may be formed of a magnetic material or provided as a permanent magnet, an electromagnet, or the like.

The movable core 32 is accommodated in the cylinder 37. In addition, the movable core 32 may be moved in the cylinder 37 in the longitudinal direction of the cylinder 37, i.e., in the vertical direction in the illustrated embodiment.

Specifically, the movable core 32 may be moved in a direction toward the fixed core 31 and away from the fixed core 31.

The movable core 32 is coupled to the shaft 44. The movable core 32 may be moved integrally with the shaft 44. When the movable core 32 is moved upward or downward, the shaft 44 is also moved upward or downward. Accordingly, the movable contactor 43 is also moved upward or downward.

The movable core 32 is located below the fixed core 31. The movable core 32 is spaced apart from the fixed core 31 by a predetermined distance. As described above, the predetermined distance is a distance by which the movable core 32 can be moved in the vertical direction.

The movable core 32 is formed to extend in the longitudinal direction. A hollow portion extending in the longitudinal direction is formed to be recessed in the movable core 32 by a predetermined distance. The return spring 36 and a lower side of the shaft 44 coupled through the return spring 36 are partially accommodated in the hollow portion.

A through hole may be formed through a lower side of the hollow portion in the longitudinal direction. The hollow portion and the through hole communicate with each other. A lower end portion of the shaft 44 inserted into the hollow portion may proceed toward the through hole.

A space part is formed to be recessed in a lower end portion of the movable core 32 by a predetermined distance. The space part communicates with the through hole. A lower head part of the shaft 44 is located in the space part.

The yoke 330 forms a magnetic circuit as the control power is applied. The magnetic circuit formed by the yoke 330 may be configured to control a direction of a magnetic field formed by the coils 35.

Accordingly, when the control power is applied, the coils 35 may form a magnetic field in a direction in which the movable core 32 is moved toward the fixed core 31. The yoke 330 may be formed of a conductive material capable of allowing electrical connection.

The yoke 330 is accommodated in the lower frame 12. The yoke 330 surrounds the coils 35. The coils 35 may be accommodated in the yoke 330 so as to be spaced apart from an inner circumferential surface of the yoke 330 by a predetermined distance.

The bobbin 34 is accommodated in the yoke 330. That is, the yoke 330, the coils 35, and the bobbin 34 on which the coils 35 are wound may be sequentially disposed in a direction from an outer circumference of the lower frame 12 toward a radially inner side of the lower frame 12.

An upper side of the yoke 330 comes into contact with the supporting plate 14. In addition, an outer circumference of the yoke 330 may come into contact with an inner circumference of the lower frame 12 or may be located to be spaced apart from the inner circumference of the lower frame 12 by a predetermined distance.

The coils 35 are wound around the bobbin 34. The bobbin 34 is accommodated in the yoke 330.

The bobbin 34 may include upper and lower portions each formed in a flat plate shape, and a cylindrical column portion formed to extend in the longitudinal direction to connect the upper and lower portions. That is, the bobbin 34 has a bobbin shape.

The upper portion of the bobbin 34 comes into contact with a lower side of the supporting plate 14. The coils 35 are wound around the column portion of the bobbin 34. A wound thickness of the coils 35 may be configured to be equal to or smaller than a diameter of each of the upper and lower portions of the bobbin 34.

A hollow portion is formed through the column portion of the bobbin 34 extending in the longitudinal direction. The cylinder 37 may be accommodated in the hollow portion. The column portion of the bobbin 34 may be disposed to have the same central axis as the fixed core 31, the movable core 32, and the shaft 44.

The coils 35 generate a magnetic field due to the applied control power. The fixed core 31 may be magnetized by the magnetic field generated by the coils 35 and thus an electromagnetic attractive force may be applied to the movable core 32.

The coils 35 are wound around the bobbin 34. Specifically, the coils 35 are wound around the column portion of the bobbin 34 and stacked on a radial outer side of the column portion. The coils 35 are accommodated in the yoke 330.

When the control power is applied, the coils 35 generate a magnetic field. At this point, a strength or direction of the magnetic field generated by the coils 35 may be controlled by the yoke 330. The fixed core 31 is magnetized by the magnetic field generated by the coils 35.

When the fixed core 31 is magnetized, the movable core 32 receives an electromagnetic force, i.e., an attractive force in a direction toward the fixed core 31. Accordingly, the movable core 32 is moved in a direction toward the fixed core 31, i.e., upward in the illustrated embodiment.

The return spring 36 provides a restoring force for the movable core 32 to return to its original location when the application of the control power is released after the movable core 32 is moved toward the fixed core 31.

As the movable core 32 is moved toward the fixed core 31, the return spring 36 stores the restoring force while being compressed. At this point, the stored restoring force may preferably be smaller than the electromagnetic attractive force, which is exerted on the movable core 32 as the fixed core 31 is magnetized. This is to prevent the movable core 32 from being arbitrarily returned to its original location by the return spring 36 while the control power is applied.

When the application of the control power is released, the movable core 32 receives only the restoring force by the return spring 36. Of course, gravity due to an empty weight of the movable core 32 may also be applied to the movable core 32. Accordingly, the movable core 32 can be moved in a direction away from the fixed core 31 to be returned to the original location.

The return spring 36 may be provided in any form that is deformed to store the restoring force and returned to its original state to transmit the restoring force to the outside. In one embodiment, the return spring 36 may be provided as a coil spring.

The shaft 44 is coupled through the return spring 36. The shaft 44 may move in the vertical direction regardless of the deformation of the return spring 36 in the coupled state with the return spring 36.

The return spring 36 is accommodated in the hollow portion formed to be recessed in an upper side of the movable core 32. In addition, one end portion of the return spring 36 facing the fixed core 31, i.e., an upper end portion of the return spring 36 in the illustrated embodiment is accommodated in a hollow portion formed to be recessed in the lower side of the fixed core 31.

The cylinder 37 accommodates the fixed core 31, the movable core 32, the return spring 36, and the shaft 44. The movable core 32 and the shaft 44 may be moved in the upward and downward directions in the cylinder 37.

The cylinder 37 is located in the hollow portion formed in the column portion of the bobbin 34. An upper end portion of the cylinder 37 comes into contact with a lower side surface of the supporting plate 14.

A side surface of the cylinder 37 comes into contact with an inner circumferential surface of the column portion of the bobbin 34. An upper opening of the cylinder 37 may be sealed by the fixed core 31. A lower side surface of the cylinder 37 may come into contact with an inner surface of the lower frame 12.

(4) Description of Movable Contactor Part 40

The movable contactor part 40 includes the movable contactor 43 and components for moving the movable contactor 43. The DC relay 1 may be electrically connected to an external power supply or a load by the movable contactor part 40.

The movable contactor part 40 is accommodated in the inner space of the upper frame 11. In addition, the movable contactor part 40 is accommodated in the arc chamber 21 to be movable up and down.

The fixed contactor 22 is located above the movable contactor part 40. The movable contactor part 40 is accommodated in the arc chamber 21 to be movable in a direction toward the fixed contactor 22 and a direction away from the fixed contactor 22.

The core part 30 is located below the movable contactor part 40. The movement of the movable contactor part 40 can be achieved by the movement of the movable core 32.

The movable contactor part 40 includes a housing 41, a cover 42, the movable contactor 43, the shaft 44, and an elastic part 45.

The housing 41 accommodates the movable contactor 43 and the elastic part 45 elastically supporting the movable contactor 43.

In the illustrated embodiment, the housing 41 is formed such that one side and another side opposite to the one side are open. The movable contactor 43 may be inserted through the open portions.

Unopened side surfaces of the housing 41 may be configured to surround the accommodated movable contactor 43.

The cover 42 is provided on an upper side of the housing 41. The cover 42 covers an upper side surface of the movable contactor 43 accommodated in the housing 41.

The housing 41 and the cover 42 may preferably be formed of an insulating material to prevent unexpected electrical connection. In one embodiment, the housing 41 and the cover 42 may be formed of a synthetic resin or the like.

A lower side of the housing 41 is connected to the shaft 44. When the movable core 32 connected to the shaft 44 is moved upward or downward, the housing 41 and the movable contactor 43 accommodated in the housing 41 may also be moved upward or downward.

The housing 41 and the cover 42 may be coupled by arbitrary members. In one embodiment, the housing 41 and the cover 42 may be coupled by coupling members (not shown) such as a bolt and a nut.

The movable contactor 43 comes into contact with the fixed contactor 22 as the control power is applied, so that the DC relay 1 can be electrically connected to an external power supply and a load. In addition, when the application of the control power is released, the movable contactor 43 is separated from the fixed contactor 22, and thus the DC relay 1 is electrically disconnected from the external power supply and the load.

The movable contactor 43 is located adjacent to the fixed contactor 22.

An upper side of the movable contactor 43 is partially covered by the cover 42. In one embodiment, a portion of the upper side surface of the movable contactor 43 may be brought into contact with a lower side surface of the cover 42.

A lower side of the movable contactor 43 is elastically supported by the elastic part 45. In order to prevent the movable contactor 43 from being arbitrarily moved downward, the elastic part 45 may elastically support the movable contactor 43 in a compressed state by a predetermined distance.

The movable contactor 43 is formed to extend in the longitudinal direction, i.e., in a left-right direction in the illustrated embodiment. That is, a length of the movable contactor 43 is formed to be longer than a width thereof. Accordingly, both end portions of the movable contactor 43 in the longitudinal direction, which are accommodated in the housing 41, are exposed to the outside of the housing 41.

Contact protrusions may be formed to protrude upward from the both end portions by predetermined distances. The fixed contactor 22 is in contact with the contact protrusions.

The contact protrusions may be formed at locations corresponding to the fixed contactors 22*a* and 22*b*, respectively. Accordingly, the moving distance of the movable contactor 43 can be reduced and contact reliability between the fixed contactor 22 and the movable contactor 43 can be improved.

The width of the movable contactor 43 may be the same as a spaced distance between the side surfaces of the housing 41. That is, when the movable contactor 43 is accommodated in the housing 41, both side surfaces of the movable contactor 43 in a width direction may be brought into contact with inner surfaces of the side surfaces of the housing 41.

Accordingly, the state in which the movable contactor 43 is accommodated in the housing 41 can be stably maintained.

The shaft 44 transmits a driving force, which is generated in response to the operation of the core part 30, to the movable contactor part 40. Specifically, the shaft 44 is connected to the movable core 32 and the movable contactor 43. When the movable core 32 is moved upward or downward, the movable contactor 43 may also be moved upward or downward by the shaft 44.

The shaft 44 is formed to extend in the longitudinal direction, i.e., in the vertical direction in the illustrated embodiment.

The lower end portion of the shaft 44 is inserted into and coupled to the movable core 32. When the movable core 32 is moved in the vertical direction, the shaft 44 may also be moved in the vertical direction together with the movable core 32.

A body portion of the shaft 44 is coupled through the fixed core 31 to be movable up and down. The return spring 36 is coupled through the body portion of the shaft 44.

An upper end portion of the shaft 44 is coupled to the housing 41. When the movable core 32 is moved, the shaft 44 and the housing 41 may also be moved together with the movable core 32.

The upper and lower end portions of the shaft 44 may be formed to have a larger diameter than the body portion of the shaft. Accordingly, the coupled state of the shaft 44 to the housing 41 and the movable core 32 can be stably maintained.

The elastic part 45 elastically supports the movable contactor 43. When the movable contactor 43 is brought into contact with the fixed contactor 22, the movable contactor 43 may tend to be separated from the fixed contactor 22 due to an electromagnetic repulsive force.

At this point, the elastic part 45 elastically supports the movable contactor 43 to prevent the movable contactor 43 from being arbitrarily separated from the fixed contactor 22.

The elastic part 45 may be provided in any form capable of storing a restoring force by being deformed and providing the stored restoring force to another member. In one embodiment, the elastic part 45 may be provided as a coil spring.

One end portion of the elastic part 45 facing the movable contactor 43 comes into contact with the lower side of the movable contactor 43. In addition, the other end portion opposite to the one end portion comes into contact with the upper side of the housing 41.

The elastic part 45 may elastically support the movable contactor 43 in a state of storing the restoring force by being compressed by a predetermined distance. Accordingly, even when the electromagnetic repulsive force is generated between the movable contactor 43 and the fixed contactor 22, the movable contactor 43 is not arbitrarily moved.

A protrusion (not shown) inserted into the elastic part 45 may be formed to protrude from the lower side of the movable contactor 43 to enable stable coupling of the elastic part 45. Similarly, a protrusion (not shown) inserted into the elastic part 45 may also be formed to protrude from the upper side of the housing 41.

Figure 56:
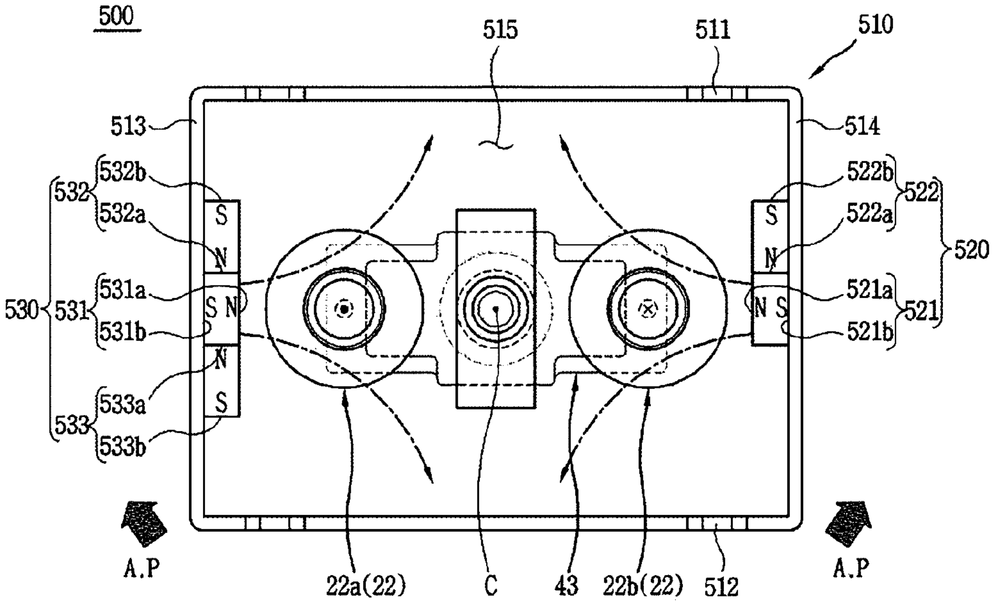
Figure 56:
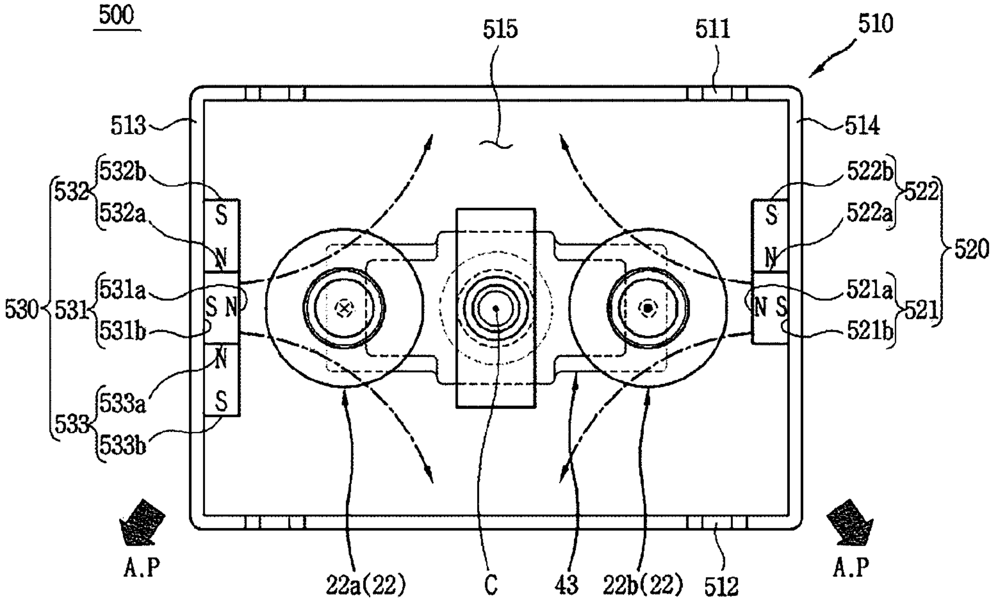
Figure 57:
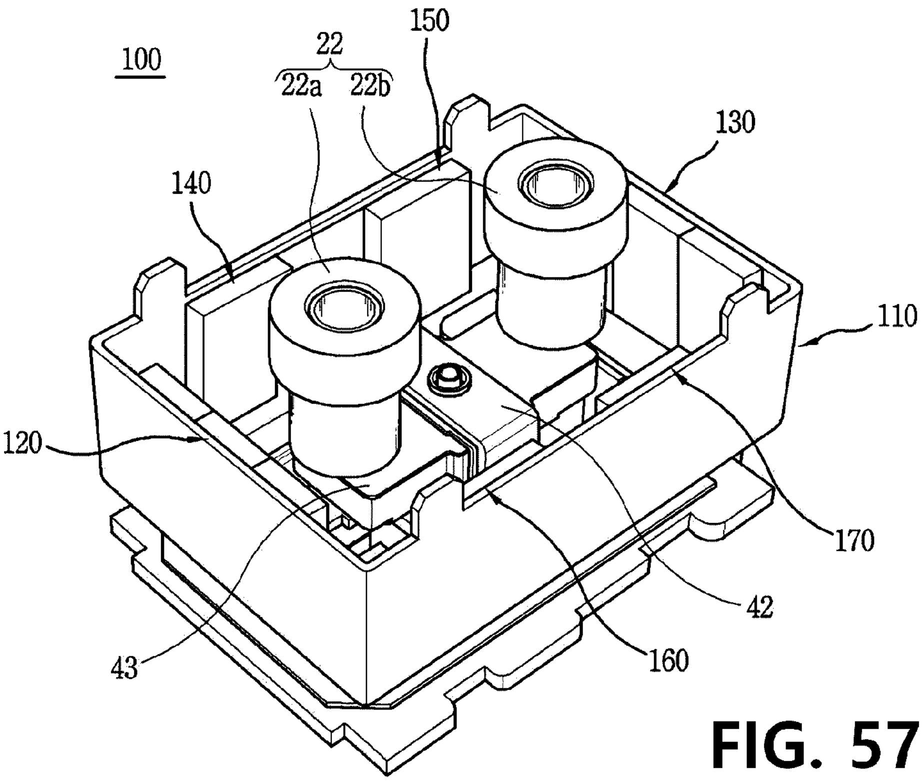
FIG. 57 is an opened perspective view illustrating a second embodiment of an arc path-forming part provided in the DC relay of FIG. 2.

3. Description of Arc Path-Forming Part According to First Embodiment of Present Disclosure Referring to FIGS. 5 to 56, the arc path-forming parts 100, 200, 300, 400, and 500 according to various embodiments of the present disclosure are illustrated. Each of the arc path-forming parts 100, 200, 300, 400, and 500 forms magnetic fields inside the arc chamber 21. Due to current flowing through the DC relay 1 and the formed magnetic fields, electromagnetic forces are formed in the arc chamber 21.

An arc generated as the fixed contactor 22 and the movable contactor 43 are separated from each other is moved to the outside of the arc chamber 21 by the formed electromagnetic forces. Specifically, the generated arc is moved in a direction of the formed electromagnetic force. Accordingly, it can be said that each of the arc path-forming parts 100, 200, 300, 400, and 500 forms an arc path A.P, which is a path through which the generated arc flows.

Each of the arc path-forming parts 100, 200, 300, 400, and 500 is located in a space formed in the upper frame 11. The arc path-forming part 100, 200, 300, 400, or 500 is disposed to surround the arc chamber 21. In other words, the arc chamber 21 is located inside the arc path-forming part 100, 200, 300, 400, or 500.

The fixed contactor 22 and the movable contactor 43 are located inside the arc path-forming part 100, 200, 300, 400, or 500. The arc generated as the fixed contactor 22 and the movable contactor 43 are separated from each other may be induced by the electromagnetic force formed by the arc path-forming part 100, 200, 300, 400, or 500.

Each of the arc path-forming parts 100, 200, 300, 400, and 500 according to various embodiments of the present disclosure includes Halbach arrays or magnet parts. The Halbach arrays or the magnet parts form magnetic fields inside the arc path-forming part 100 in which the fixed contactor 22 and the movable contactor 43 are accommodated. At this point, the magnetic field may be formed by the magnet part or the Halbach array itself, or the magnetic fields may also be formed by between the Halbach arrays or magnet parts.

The magnetic field formed by the Halbach array and the magnet part forms an electromagnetic force together with the current flowing through the fixed contactor 22 and the movable contactor 43. The formed electromagnetic force induces the arc that is generated when the fixed contactor 22 and the movable contactor 43 are separated from each other.

At this point, each of the arc path-forming part 100, 200, 300, 400, or 500 forms the electromagnetic force in a direction away from a central part C of each of space parts 115, 215, 315, 415, and 515. Accordingly, the arc path A.P is also formed in the direction away from the central part C of the space part.

As a result, each component provided in the DC relay 1 is not damaged by the generated arc. Furthermore, the generated arc can be quickly discharged to the outside of the arc chamber 21.

Hereinafter, the configuration of each of the arc path-forming parts 100, 200, 300, 400, and 500 and the arc path A.P formed by each of the arc path-forming parts 100, 200, 300, 400, and 500 will be described in detail with reference to the accompanying drawings.

Each of the arc path-forming parts 100, 200, 300, 400, and 500 according to various embodiments described below may include the Halbach array located on one or more of left and right sides of each of the arc path-forming parts 100, 200, 300, 400, and 500.

As will be described below, a rear side may be defined as a direction adjacent to a first surface 111, 211, 311, 411, or 511, and a front side may be defined as a direction adjacent to a second surface 112, 212, 312, 412, or 512.

In addition, a left side may be defined as a direction adjacent to a third surface 113, 213, 313, 413, or 513, and a right side may be defined as a direction adjacent to a fourth surface 114, 214, 314, 414, or 514.

(1) Description of Arc Path-Forming Part 100 According to One Embodiment of Present Disclosure Hereinafter, an arc path-forming part 100 according to one embodiment of the present disclosure will be described in detail with reference to FIGS. 5 to 8.

Figure 5:
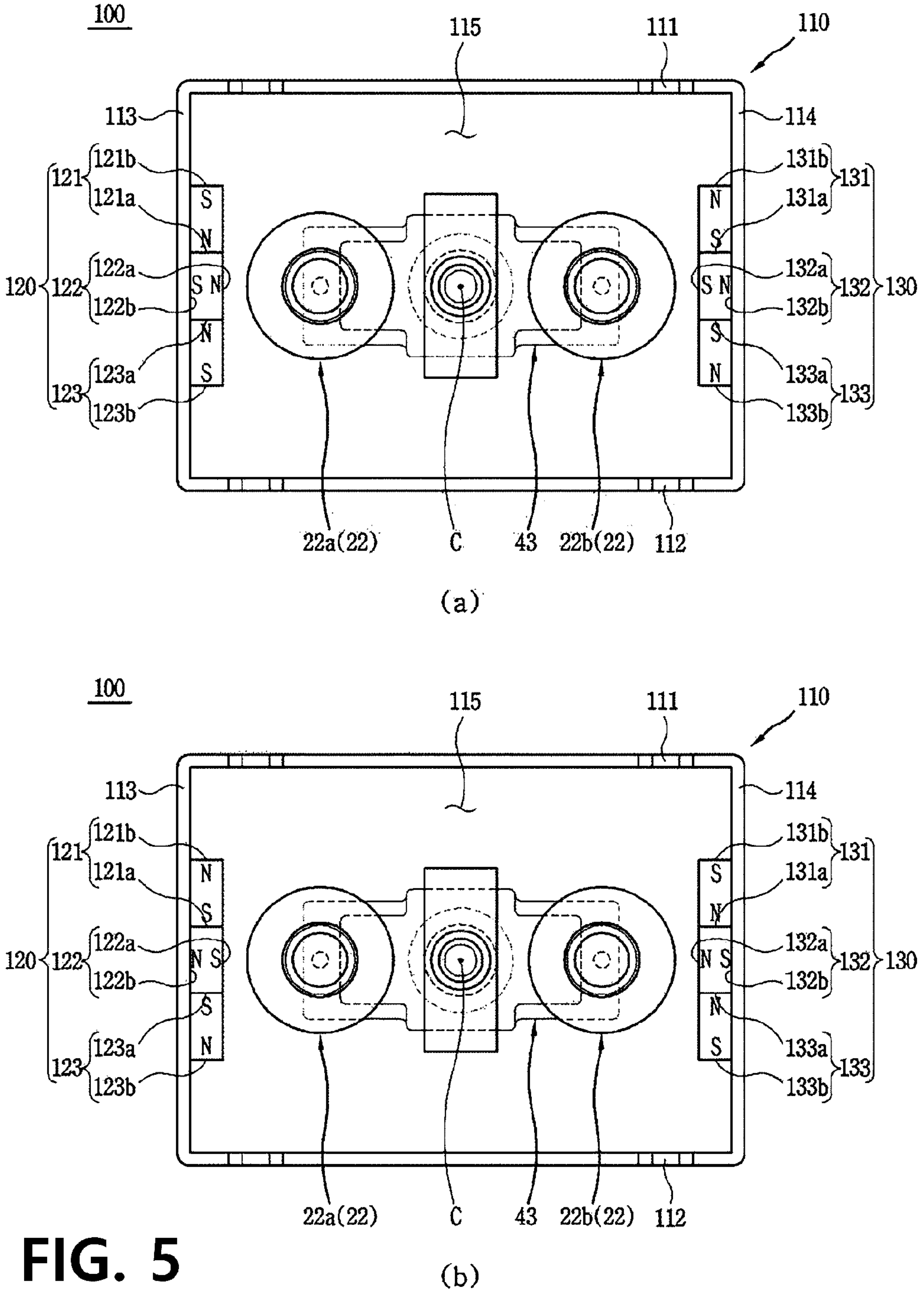
FIGS. 5 and 6 are conceptual views illustrating an arc path-forming part according to one embodiment of the present disclosure.
Figure 6:
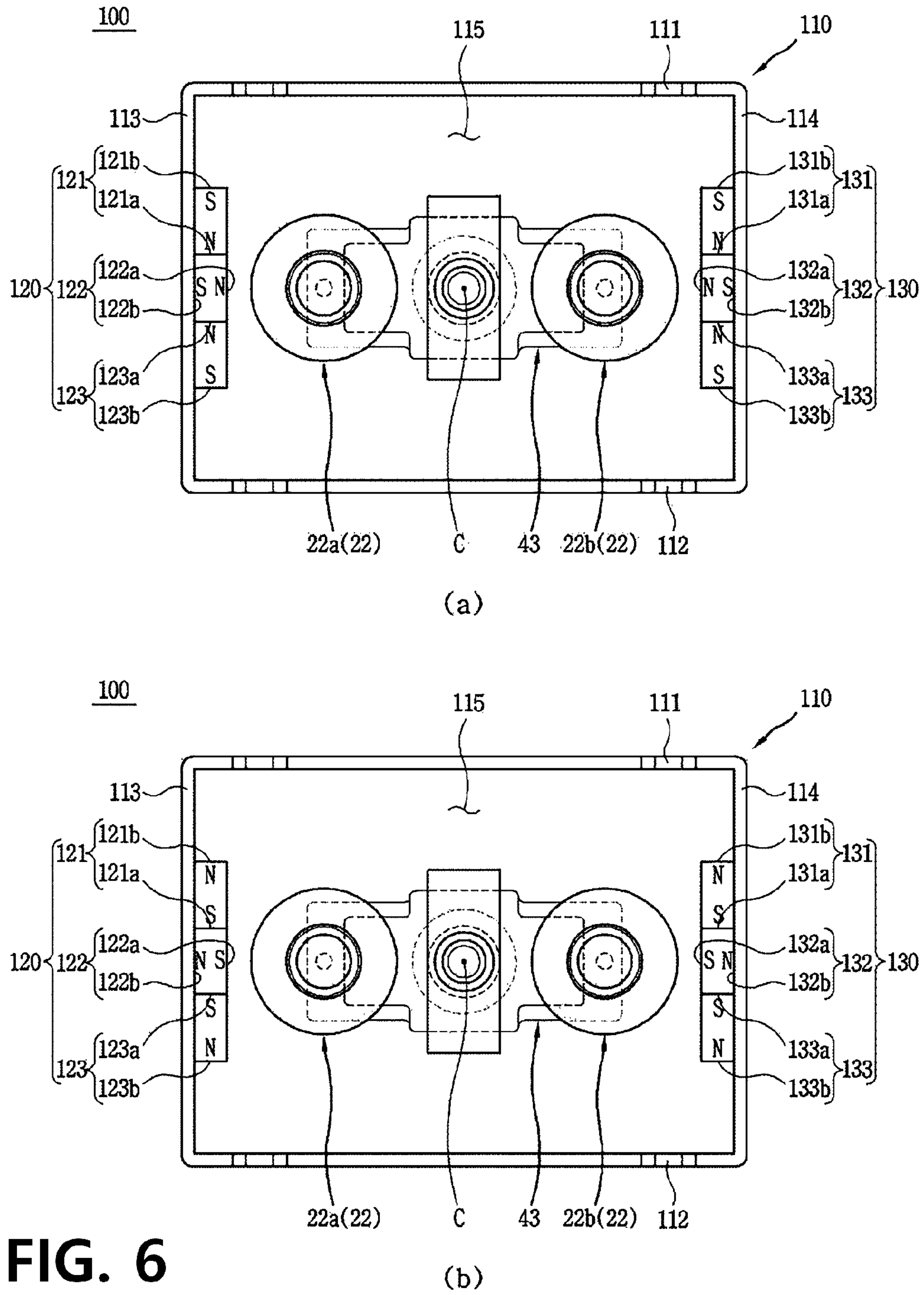

Referring to FIGS. 5 and 6, the arc path-forming part 100 according to the illustrated embodiment includes a magnet frame 110, a first Halbach array 120, and a second Halbach array 130.

The magnet frame 110 forms a frame of the arc path-forming part 100. The first and second Halbach arrays 120 and 130 are disposed in the magnet frame 110. In one embodiment, the first and second Halbach arrays 120 and 130 may be coupled to the magnet frame 110.

The magnet frame 110 has a rectangular cross-section formed to extend in the longitudinal direction, i.e., in the left-right direction in the illustrated embodiment. The shape of the magnet frame 110 may be changed depending on shapes of the upper frame 11 and the arc chamber 21.

The magnet frame 110 includes a first surface 111, a second surface 112, a third surface 113, a fourth surface 114, and a space part 115.

The first surface 111, the second surface 112, the third surface 113, and the fourth surface 114 form an outer circumferential surface of the magnet frame 110. That is, the first surface 111, the second surface 112, the third surface 113, and the fourth surface 114 may serve as walls of the magnet frame 110.

An outer side of each of the first surface 111, the second surface 112, the third surface 113, and the fourth surface 114 may be in contact with or fixedly coupled to an inner surface of the upper frame 11.

In the illustrated embodiment, the first surface 111 forms a rear side surface. The second surface 112 forms a front side surface and faces the first surface 111. In addition, the third surface 113 forms a left side surface. The fourth surface 114 forms a right side surface and faces the third surface 113.

That is, the first surface 111 and the second surface 112 face each other with the space part 115 therebetween. In addition, the third surface 113 and the fourth surface 114 face each other with the space part 115 therebetween.

The first surface 111 is continuous with the third surface 113 and the fourth surface 114. The first surface 111 may be coupled to the third surface 113 and the fourth surface 114 at predetermined angles. In one embodiment, the predetermined angle may be a right angle.

The second surface 112 is continuous with the third surface 113 and the fourth surface 114. The second surface 112 may be coupled to the third surface 113 and the fourth surface 114 at predetermined angles. In one embodiment, the predetermined angle may be a right angle.

Each of corners at which the first to fourth surfaces 111 to 114 are connected to each other may be chamfered.

Coupling members (not shown) may be provided to couple the first and second Halbach arrays 120 and 130 to the respective surfaces 111, 112, 113, and 114.

Although not illustrated in the drawings, an arc discharge hole (not shown) may be formed through one or more of the first surface 111, the second surface 112, the third surface 113, and the fourth surface 114. The arc discharge hole (not shown) may serve as a path through which an arc generated in the space part 115 is discharged.

A space surrounded by the first to fourth surfaces 111 to 114 may be defined as the space part 115.

The fixed contactor 22 and the movable contactor 43 are accommodated in the space part 115. In addition, the arc chamber 21 is accommodated in the space part 115.

In the space part 115, the movable contactor 43 may be moved in a direction toward the fixed contactor 22 (i.e., the downward direction) or a direction away from the fixed contactor 22 (i.e., the upward direction).

In addition, an arc path A.P of an arc generated in the arc chamber 21 is formed in the space part 115. This is achieved by a magnetic field formed by the first and second Halbach arrays 120 and 130.

A central portion of the space part 115 may be defined as a central part C. A straight line distance from each of corners at which the first to fourth surfaces 111 to 114 are connected to each other to the central part C may be formed to be equal to each other.

The central part C is located between the first fixed contactor 22*a* and the second fixed contactor 22*b*. In addition, a central portion of the movable contactor part 40 is located vertically below the central part C. That is, a central portion of each of the housing 41, the cover 42, the movable contactor 43, the shaft 44, the elastic part 45, and the like is located vertically below the central part C.

Accordingly, when the generated arc is moved toward the central part C, the above components may be damaged. In order to prevent this, the arc path-forming part 100 according to the present embodiment includes the first and second Halbach arrays 120 and 130.

In the illustrated embodiment, a plurality of magnetic materials constituting the first Halbach array 120 are continuously arranged side by side from the front side to the rear side. That is, the first Halbach array 120 formed to extend in a front-rear direction.

The first Halbach array 120 may form a magnetic field together with another magnetic material. In the illustrated embodiment, the first Halbach array 120 may form a magnetic field together with the second Halbach array 130.

The first Halbach array 120 may be located adjacent to any one surface of the third and fourth surfaces 113 and 114. In one embodiment, the first Halbach array 120 may be coupled to an inner side (i.e., the side in a direction toward the space part 115) of the any one surface.

In the illustrated embodiment, the first Halbach array 120 is disposed on an inner side of the third surface 113, and disposed adjacent to the third surface 113. Although not illustrated in the drawing, the first Halbach array 120 may be disposed on an inner side of the fourth surface 114, and disposed adjacent to the fourth surface 114.

The first Halbach array 120 is disposed to face the second Halbach array 130. In the illustrated embodiment, the first Halbach array 120 is disposed to face the second Halbach array 130 located on the inner side of the fourth surface 114.

The space part 115, and the fixed contactor 22 and the movable contactor 43 accommodated in the space part 115 are located between the first Halbach array 120 and the second Halbach array 130.

The first Halbach array 120 may enhance the strength of the magnetic field formed by itself and the magnetic field formed together with the second Halbach array 130. Since the process of enhancing the direction and magnetic field of the magnetic field formed by the first Halbach array 120 is a well-known technique, a detailed description thereof will be omitted.

In the illustrated embodiment, the first Halbach array 120 includes a first block 121, a second block 122, and a third block 123. It will be understood that the plurality of magnetic materials constituting the first Halbach array 120 are named as the blocks 121, 122, and 123, respectively.

The first to third blocks 121, 122, and 123 may each be formed of a magnetic material. In one embodiment, the first to third blocks 121, 122, and 123 may each be provided as a permanent magnet, an electromagnet, or the like.

The first to third blocks 121, 122, and 123 may be disposed side by side in one direction. In the illustrated embodiment, the first to third blocks 121, 122, and 123 are disposed side by side in a direction in which the third surface 113 extends, that is, in the front-rear direction.

Among the first to third blocks 121, 122, and 123, the first block 121 is disposed at the most rear side, and the third block 123 is disposed at the most front side. In addition, the second block 122 is located between the first block 121 and the third block 123.

In one embodiment, the second block 122 may be in contact with each of the first and third blocks 121 and 123.

The second block 122 may be disposed to overlap each of the fixed contactors 22*a* and 22*b* in a direction toward the fourth surface 114, i.e., in the left-right direction in the illustrated embodiment. In addition, the second block 122 may be disposed to overlap a second block 132 of the second Halbach array 130 in the left-right direction.

Each of the blocks 121, 122, and 123 includes a plurality of surfaces.

Specifically, the first block 121 includes a first inner surface 121*a* facing the second block 122 and a first outer surface 121*b* opposite to the second block 122.

The second block 122 includes a second inner surface 122*a* facing the space part 115 or the second Halbach array 130 and a second outer surface 122*b* opposite to the space part 115 or the second Halbach array 130.

In addition, the third block 123 includes a third inner surface 123*a* facing the second block 122 and a third outer surface 123*b* opposite to the second block 122.

The plurality of surfaces of each of the blocks 121, 122, and 123 may be magnetized according to a predetermined rule to configure a Halbach array.

In the embodiment illustrated in FIG. 5, the first to third inner surfaces 121*a*, 122*a*, and 123*a* are magnetized to the same polarity. At this point, the first to third inner surfaces 121*a*, 122*a*, and 123*a* may be magnetized to the same polarity as each of outer surfaces 131*b*, 132*b*, and 133*b* of the second Halbach array 130.

In addition, the first to third outer surfaces 121*b*, 122*b*, and 123*b* are magnetized to a polarity different from the polarity of the first to third inner surfaces 121*a*, 122*a*, and 123*a*. At this point, the first to third outer surfaces 121*b*, 122*b*, and 123*b* may be magnetized to the same polarity as each of inner surfaces 131*a*, 132*a*, and 133*a* of the second Halbach array 130.

In the embodiment illustrated in FIG. 6, the first to third inner surfaces 121*a*, 122*a*, and 123*a* are magnetized to the same polarity. At this point, the first to third inner surfaces 121*a*, 122*a*, and 123*a* may be magnetized to the same polarity as each of the inner surfaces 131*a*, 132*a*, and 133*a* of the second Halbach array 130.

In addition, the first to third outer surfaces 121*b*, 122*b*, and 123*b* are magnetized to a polarity different from the polarity of the first to third inner surfaces 121*a*, 122*a*, and 123*a*. At this point, the first to third outer surfaces 121*b*, 122*b*, and 123*b* may be magnetized to the same polarity as each of the outer surfaces 131*b*, 132*b*, and 133*b* of the second Halbach array 130.

In the illustrated embodiment, a plurality of magnetic materials constituting the second Halbach array 130 are continuously arranged side by side from the front side to the rear side. That is, the second Halbach array 130 is formed to extend in the front-rear direction.

The second Halbach array 130 may form a magnetic field together with another magnetic material. In the illustrated embodiment, the second Halbach array 130 may form a magnetic field together with the first Halbach array 120.

The second Halbach array 130 may be located adjacent to the other surface of the third and fourth surfaces 113 and 114. In one embodiment, the second Halbach array 130 may be coupled to an inner side (i.e., the side in a direction toward the space part 115) of the other surface.

In the illustrated embodiment, the second Halbach array 130 is disposed on the inner side of the fourth surface 114, and disposed adjacent to the fourth surface 114. Although not illustrated in the drawing, the second Halbach array 130 may be disposed on the inner side of the third surface 113, and disposed adjacent to the third surface 113.

The second Halbach array 130 is disposed to face the first Halbach array 120. In the illustrated embodiment, the second Halbach array 130 is disposed to face the first Halbach array 120 located on the inner side of the third surface 113.

The space part 115, and the fixed contactor 22 and the movable contactor 43 accommodated in the space part 115 are located between the second Halbach array 130 and the first Halbach array 120.

The second Halbach array 130 may enhance the strength of the magnetic field formed by itself and the strength of the magnetic field formed together with the first Halbach array 120. Since the process of enhancing the direction and magnetic field of the magnetic field formed by the second Halbach array 130 is a well-known technique, a detailed description thereof will be omitted.

In the illustrated embodiment, the second Halbach array 130 includes a first block 131, the second block 132, and a third block 133. It will be understood that the plurality of magnetic materials constituting the second Halbach array 130 are named as the blocks 131, 132, and 133, respectively.

The first to third blocks 131, 132, and 133 may each be formed of a magnetic material. In one embodiment, the first to third blocks 131, 132, and 133 may each be provided as a permanent magnet, an electromagnet, or the like.

The first to third blocks 131, 132, and 133 may be disposed side by side in one direction. In the illustrated embodiment, the first to third blocks 131, 132, and 133 are disposed side by side in a direction in which the fourth surface 114 extends, that is, in the front-rear direction.

Among the first to third blocks 131, 132, and 133, the first block 131 is disposed at the most rear side, and the third block 133 is disposed at the most front side. In addition, the second block 132 is located between the first block 131 and the third block 133.

In one embodiment, the second block 132 may be in contact with each of the first and third blocks 131 and 133.

The second block 132 may be disposed to overlap each of the fixed contactors 22*a* and 22*b* in a direction toward the third surface 113, i.e., in the left-right direction in the illustrated embodiment. In addition, the second block 132 may be disposed to overlap the second block 122 of the first Halbach array 120 in the left-right direction.

Each of the blocks 131, 132, and 133 includes a plurality of surfaces.

Specifically, the first block 131 includes a first inner surface 131*a* facing the second block 132 and a first outer surface 131*b* opposite to the second block 132.

The second block 132 includes a second inner surface 132*a* facing the space part 115 or the first Halbach array 120, and a second outer surface 132*b* opposite to the space part 115 or the first Halbach array 120.

In addition, the third block 133 includes a third inner surface 133*a* facing the second block 132 and a third outer surface 133*b* opposite to the second block 132.

The plurality of surfaces of each of the blocks 131, 132, and 133 may be magnetized according to a predetermined rule to configure a Halbach array.

In the embodiment illustrated in FIG. 5, the first to third inner surfaces 131*a*, 132*a*, and 133*a* are magnetized to the same polarity. At this point, the first to third inner surfaces 131*a*, 132*a*, and 133*a* may be magnetized to the same polarity as each of the outer surfaces 121*b*, 122*b*, and 123*b* of the first Halbach array 120.

In addition, the first to third outer surfaces 131*b*, 132*b*, and 133*b* are magnetized to a polarity different from the polarity of the first to third inner surfaces 131*a*, 132*a*, and 133*a*. At this point, the first to third outer surfaces 131*b*, 132*b*, and 133*b* may be magnetized to the same polarity as each of the inner surfaces 121*a*, 122*a*, and 123*a* of the first Halbach array 120.

In the embodiment illustrated in FIG. 6, the first to third inner surfaces 131*a*, 132*a*, and 133*a* are magnetized to the same polarity. At this point, the first to third inner surfaces 131*a*, 132*a*, and 133*a* may be magnetized to the same polarity as each of the inner surfaces 121*a*, 122*a*, and 123*a* of the first Halbach array 120.

In addition, the first to third outer surfaces 131*b*, 132*b*, and 133*b* are magnetized to a polarity different from the polarity of the first to third inner surfaces 131*a*, 132*a*, and 133*a*. At this point, the first to third outer surfaces 131*b*, 132*b*, and 133*b* may be magnetized to the same polarity as each of the outer surfaces 121*b*, 122*b*, and 123*b* of the first Halbach array 120.

Hereinafter, an arc path A.P formed by the arc path-forming part 100 according to the present embodiment will be described in detail with reference to FIGS. 7 and 8.

Figure 7:
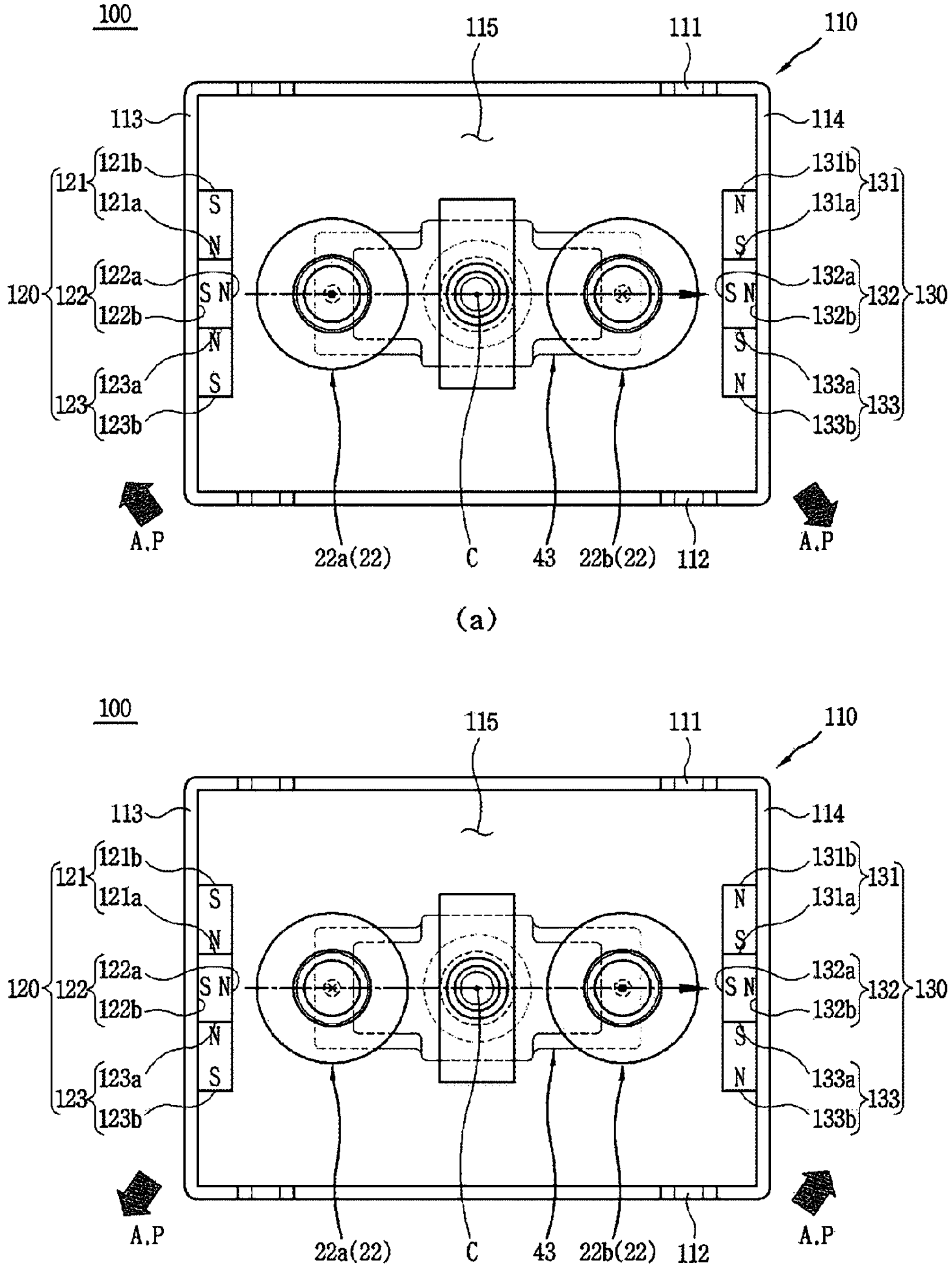
FIGS. 7 and 8 are conceptual views illustrating magnetic fields and arc paths formed by the arc path-forming part according to the embodiment of FIGS. 5 and 6.

Referring to FIG. 7, the inner surfaces 121*a*, 122*a*, and 123*a* of the first Halbach array 120 and the inner surfaces 131*a*, 132*a*, and 133*a* of the second Halbach array 130 are magnetized to different polarities.

That is, the inner surfaces 121*a*, 122*a*, and 123*a* of the first Halbach array 120 are magnetized to N poles, and the inner surfaces 131*a*, 132*a*, and 133*a* of the second Halbach array 130 are magnetized to S poles.

Accordingly, a magnetic field in a direction from the second inner surface 122*a* to the second inner surface 132*a* is formed between the second block 122 of the first Halbach array 120 and the second block 132 of the second Halbach array 130.

Figure 8:
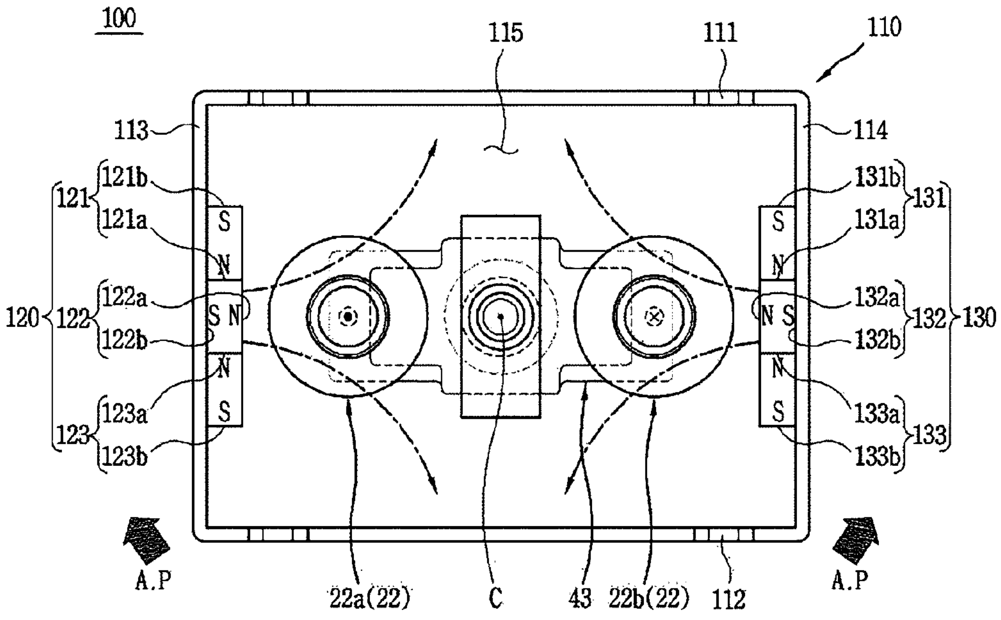
Figure 8:
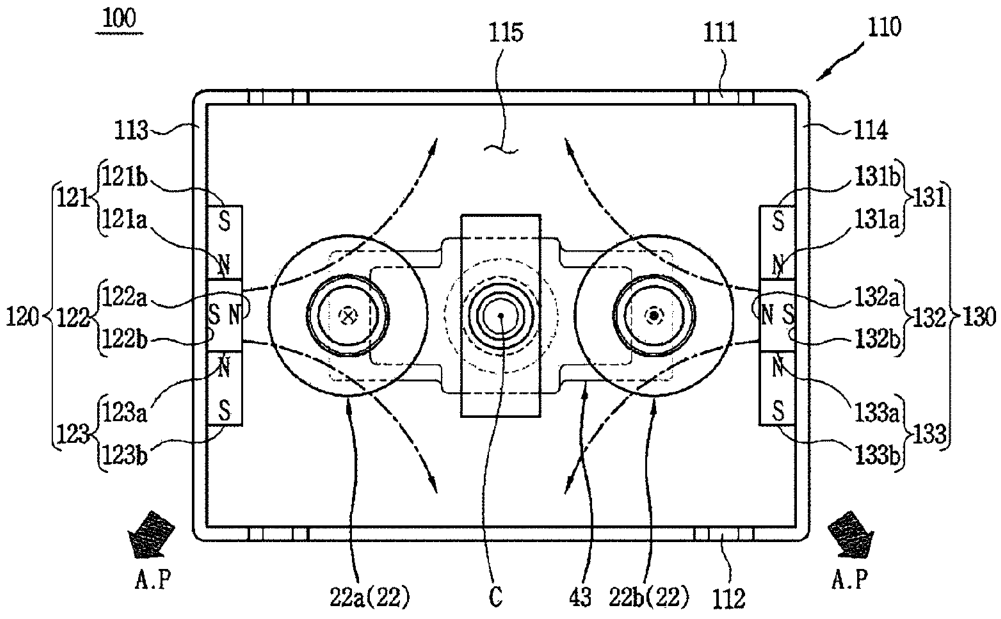

Referring to FIG. 8, the inner surfaces 121*a*, 122*a*, and 123*a* of the first Halbach array 120 and the inner surfaces 131*a*, 132*a*, and 133*a* of the second Halbach array 130 are magnetized to the same polarity.

That is, the inner surfaces 121*a*, 122*a*, and 123*a* of the first Halbach array 120 and the inner surfaces 131*a*, 132*a*, and 133*a* of the second Halbach array 130 are all magnetized to N poles.

Accordingly, magnetic fields that repel each other are formed between the second block 122 of the first Halbach array 120 and the second block 132 of the second Halbach array 130.

At this point, the strength of the magnetic field formed between the first Halbach array 120 and the second Halbach array 130 may be enhanced by the magnetic fields formed by the first and third blocks 121 and 131 and 123 and 133.

In the embodiment illustrated in FIG. 7A, a direction of current is a direction from the second fixed contactor 22*b* to the first fixed contactor 22*a* via the movable contactor 43.

When the Fleming's left-hand rule is applied to the first fixed contactor 22*a*, an electromagnetic force generated in the vicinity of the first fixed contactor 22*a* is formed toward a rear left side. Accordingly, an arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward a front right side. Accordingly, an arc path A.P in the vicinity of the second fixed contactor 22*b* is also formed toward the front right side.

In the embodiment illustrated in FIG. 8A, a direction of current is a direction from the second fixed contactor 22*b* to the first fixed contactor 22*a* via the movable contactor 43.

When the Fleming's left-hand rule is applied to the first fixed contactor 22*a*, an electromagnetic force generated in the vicinity of the first fixed contactor 22*a* is formed toward the rear left side. Accordingly, the arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward a rear right side. Accordingly, the arc path A.P in the vicinity of the second fixed contactor 22*b* is also formed toward the rear right side.

In the embodiment illustrated in FIG. 7B, a direction of current is a direction from the first fixed contactor 22*a* to the second fixed contactor 22*b* via the movable contactor 43.

When the Fleming's left-hand rule is applied to the first fixed contactor 22*a*, an electromagnetic force generated in the vicinity of the first fixed contactor 22*a* is formed toward a front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIG. 8B, a direction of current is a direction from the first fixed contactor 22*a* to the second fixed contactor 22*b* via the movable contactor 43.

When the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the front right side. Accordingly, the arc path A.P in the vicinity of the second fixed contactor 22*b* is also formed toward the front right side.

Although not illustrated in the drawing, when the polarity of each surface of the first and second Halbach arrays 120 and 130 is changed, the directions of the magnetic fields formed in the first and second Halbach arrays 120 and 130 are reversed. Accordingly, the generated electromagnetic force and the arc path A.P are also formed such that the front-rear direction thereof is reversed.

That is, in the electric connection situation shown in FIG. 7A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the rear right side.

In addition, in the electric connection situation shown in FIG. 8A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the front right side.

Similarly, in the electric connection situation shown in FIG. 7B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the front right side.

In addition, in the electric connection situation shown in FIG. 8B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the rear right side.

Accordingly, in the arc path-forming part 100 according to the present embodiment, the electromagnetic force and the arc path A.P may be formed in a direction away from the central part C regardless of the polarity of each of the first and second Halbach arrays 120 and 130 or the direction of the current flowing through the DC relay 1.

Accordingly, damage to each component of the DC relay 1 disposed adjacent to the central part C can be prevented. Furthermore, since the generated arc can be quickly discharged to the outside, operational reliability of the DC relay 1 can be improved.

(2) Description of Arc Path-Forming Part 200 According to Another Embodiment of Present Disclosure Hereinafter, an arc path-forming part 200 according to another embodiment of the present disclosure will be described in detail with reference to FIGS. 9 to 16.

Referring to FIGS. 9 to 12, the arc path-forming part 200 according to the illustrated embodiment includes a magnet frame 210, a Halbach array 220, and a magnet part 230.

The magnet frame 210 according to the present embodiment has the same structure and function as the magnet frame 110 according to the above-described embodiment. However, there is a difference in the arrangement method of the Halbach array 220 and the magnet part 230 disposed in the magnet frame 210 according to the present embodiment.

Accordingly, a description of the magnet frame 210 will be replaced with the description of the magnet frame 110 according to the above-described embodiment.

In the illustrated embodiment, a plurality of magnetic materials constituting the Halbach array 220 are continuously arranged side by side from the rear side to the front side. That is, the Halbach array 220 is formed to extend in the front-rear direction.

The Halbach array 220 may form a magnetic field together with another magnetic material. In the illustrated embodiment, the Halbach array 220 may form a magnetic field together with the magnet part 230.

The Halbach array 220 may be located adjacent to any one surface of third and fourth surfaces 213 and 214. The Halbach array 220 may be coupled to an inner side (i.e., the side in a direction toward a space part 215) of the any one surface.

Figure 9:
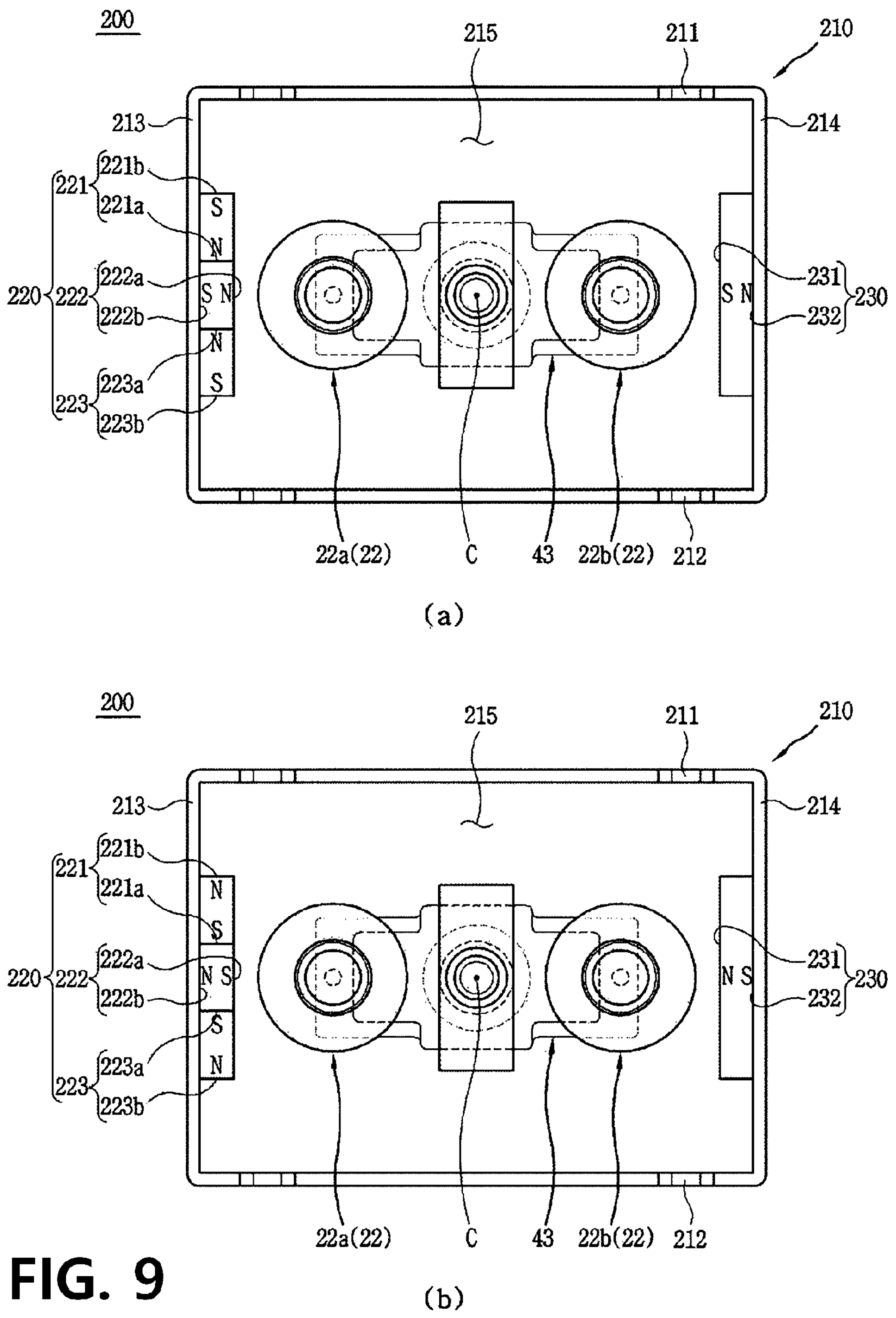
FIGS. 9 to 12 are conceptual views illustrating an arc path-forming part according to another embodiment of the present disclosure.
Figure 11:
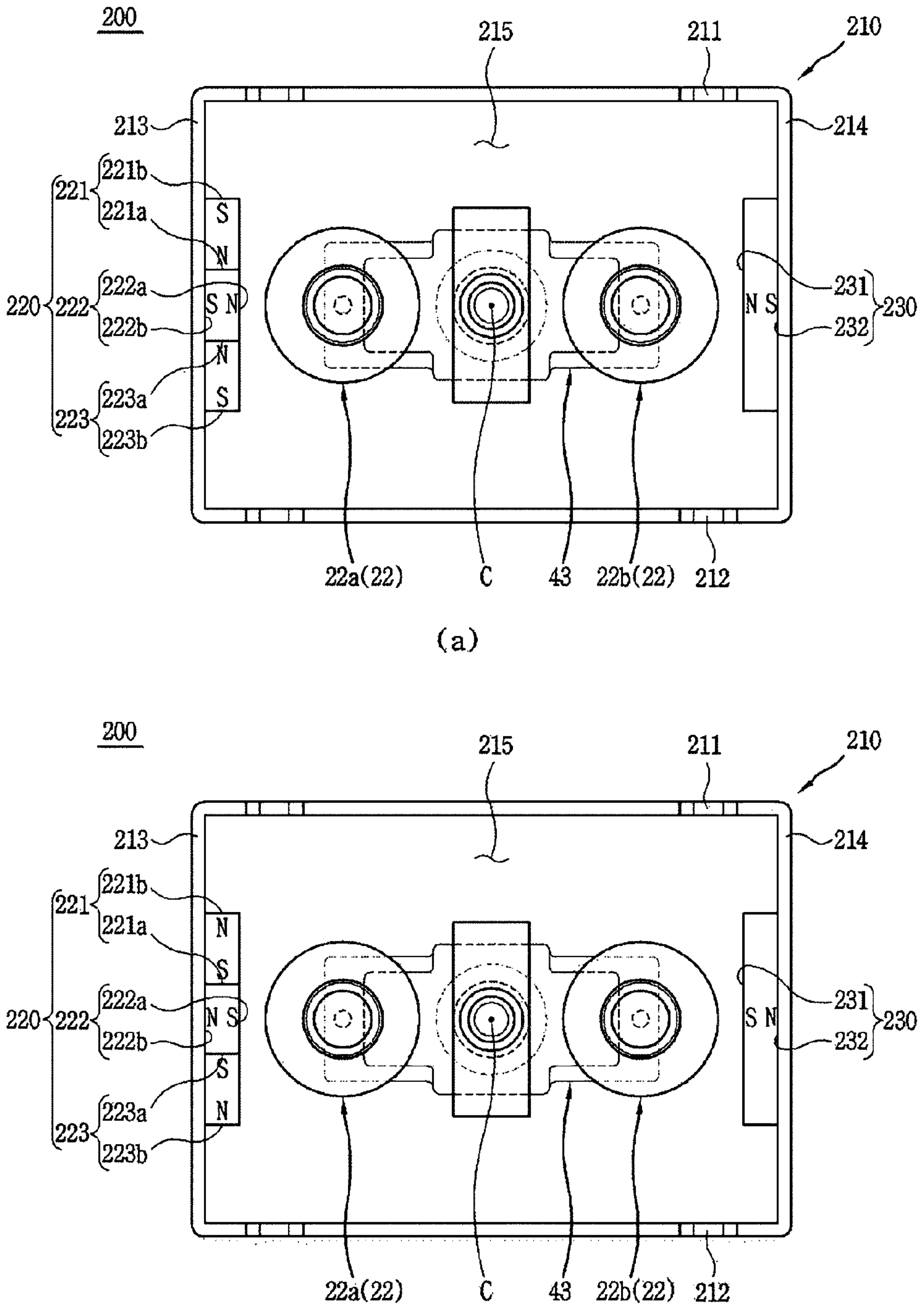

In the embodiment illustrated in FIGS. 9 and 11, the Halbach array 220 is disposed on an inner side of the third surface 213, and disposed adjacent to the third surface 213.

Figure 10:
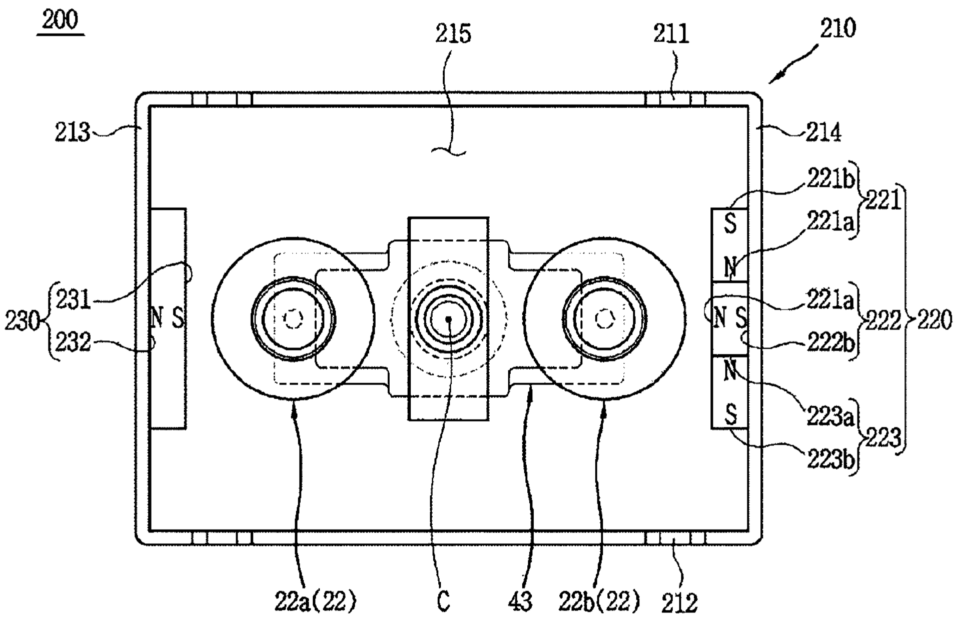
Figure 10:
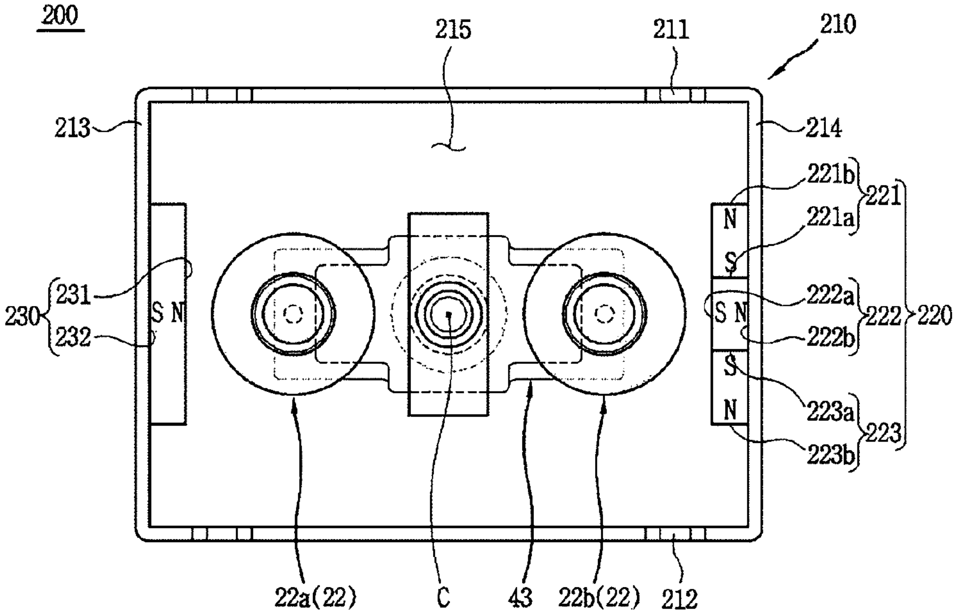
Figure 12:
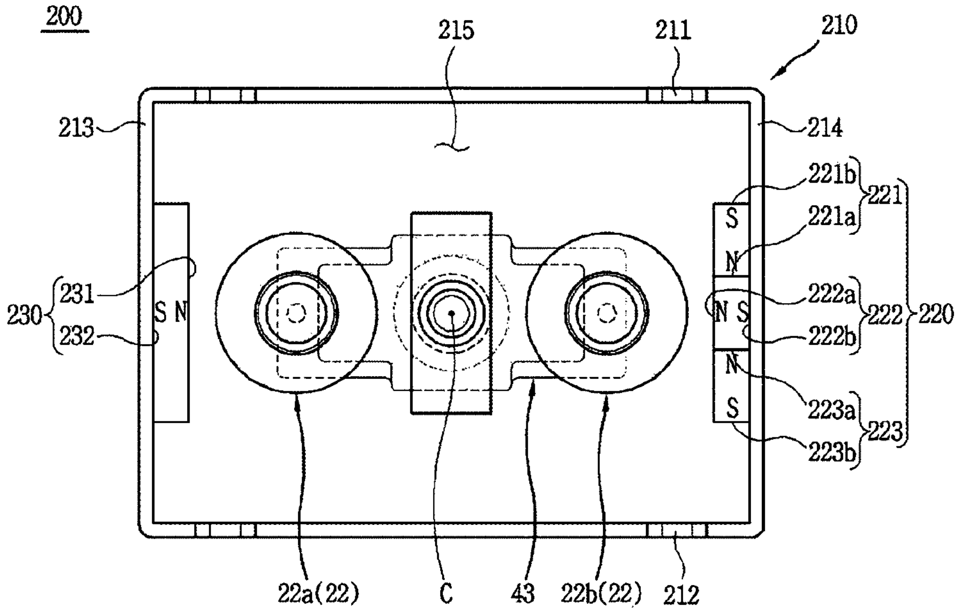
Figure 12:
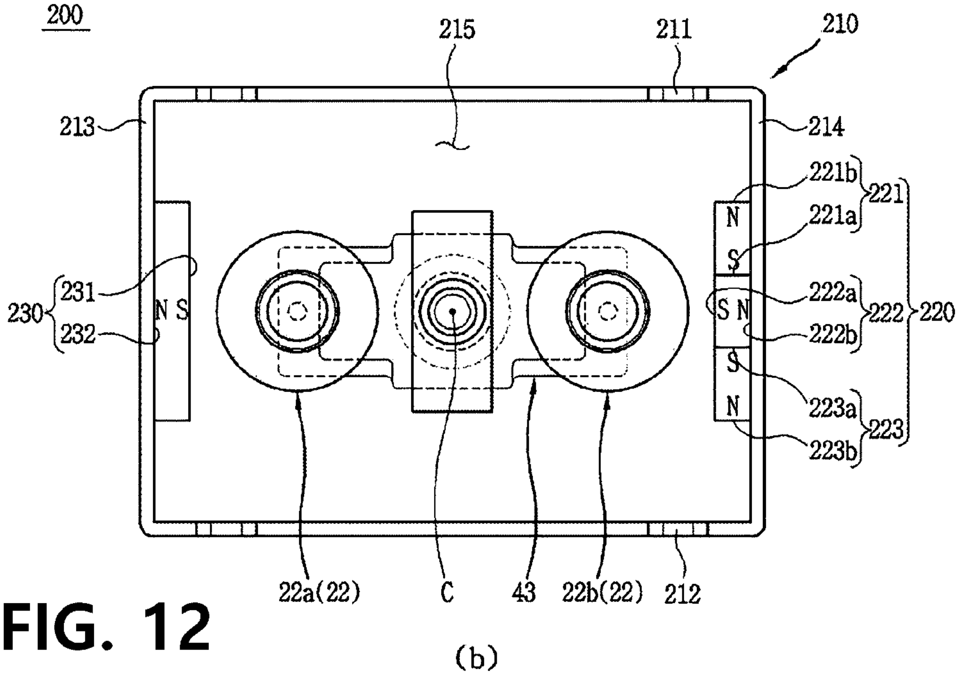

In the embodiment illustrated in FIGS. 10 and 12, the Halbach array 220 is disposed on an inner side of the fourth surface 214, and disposed adjacent to the fourth surface 214.

The Halbach array 220 is disposed to face the magnet part 230. In the embodiment illustrated in FIGS. 9 and 11, the Halbach array 220 is disposed to face the magnet part 230 located on the inner side of the fourth surface 214.

In addition, in the embodiment illustrated in FIGS. 10 and 12, the Halbach array 220 is disposed to face the magnet part 230 located on the inner side of the third surface 213.

The space part 215, and the fixed contactor 22 and the movable contactor 43 accommodated in the space part 215 are located between the Halbach array 220 and the magnet part 230.

The Halbach array 220 may enhance the strength of the magnetic field formed by itself and the magnetic field formed together with the magnet part 230. Since the process of enhancing the direction and magnetic field of the magnetic field formed by the Halbach array 220 is well known in the art, a detailed description thereof will be omitted.

In the illustrated embodiment, the Halbach array 220 includes a first block 221, a second block 222, and a third block 223. It will be understood that the plurality of magnetic materials constituting the Halbach array 220 are named as the blocks 221, 222, and 223, respectively.

The first to third blocks 221, 222, and 223 may each be formed of a magnetic material. In one embodiment, the first to third blocks 221, 222, and 223 may each be provided as a permanent magnet, an electromagnet, or the like.

The first to third blocks 221, 222, and 223 may be disposed side by side in one direction. In the illustrated embodiment, the first to third blocks 221, 222, and 223 are disposed side by side in a direction in which the third surface 213 extends, that is, in the front-rear direction.

Among the first to third blocks 221, 222, and 223, the first block 221 is disposed at the most rear side, and the third block 223 is disposed at the most front side. In addition, the second block 222 is located between the first block 221 and the third block 223.

In one embodiment, the second block 222 may be in contact with each of the first and third blocks 221 and 223.

The second block 222 may be disposed to overlap each of the fixed contactors 22*a* and 22*b* in a direction toward the magnet part 230, i.e., in the left-right direction in the illustrated embodiment. In addition, the second block 222 may be disposed to overlap the magnet part 230 in the left-right direction.

Each of the blocks 221, 222, and 223 includes a plurality of surfaces.

Specifically, the first block 221 includes a first inner surface 221*a* facing the second block 222 and a first outer surface 221*b* opposite to the second block 222.

The second block 222 includes a second inner surface 222*a* facing the space part 215 or the magnet part 230 and a second outer surface 222*b* opposite to the space part 215 or the magnet part 230.

In addition, the third block 223 includes a third inner surface 223*a* facing the second block 222 and a third outer surface 223*b* opposite to the second block 222.

The plurality of surfaces of each of the blocks 221, 222, and 223 may be magnetized according to a predetermined rule to configure a Halbach array.

In the embodiment illustrated in FIGS. 9 and 10, the first to third inner surfaces 221*a*, 222*a*, and 223*a* are magnetized to the same polarity. At this point, the first to third inner surfaces 221*a*, 222*a*, and 223*a* may be magnetized to the same polarity as of an opposing surface 232 of the magnet part 230.

In addition, the first to third outer surfaces 221*b*, 222*b*, and 223*b* are magnetized to a polarity different from the polarity of the first to third inner surfaces 221*a*, 222*a*, and 223*a*. At this point, the first to third outer surfaces 221*b*, 222*b*, and 223*b* may be magnetized to the same polarity as a facing surface 231 of the magnet part 230.

In the embodiment illustrated in FIGS. 11 and 12, the first to third inner surfaces 221*a*, 222*a*, and 223*a* are magnetized to the same polarity. At this point, the first to third inner surfaces 221*a*, 222*a*, and 223*a* may be magnetized to the same polarity as the facing surface 231 of the magnet part 230.

In addition, the first to third outer surfaces 221*b*, 222*b*, and 223*b* are magnetized to a polarity different from the polarity of the first to third inner surfaces 221*a*, 222*a*, and 223*a*. At this point, the first to third outer surfaces 221*b*, 222*b*, and 223*b* may be magnetized to the same polarity as the opposing surface 232 of the magnet part 230.

The magnet part 230 forms a magnetic field by itself or together with the Halbach array 220. An arc path A.P may be formed inside the arc chamber 21 by the magnetic field formed by the magnet part 230.

The magnet part 230 may be located adjacent to one of the other surfaces of the first to fourth surfaces 211, 212, 213, and 214 except for the any one surface.

In the embodiment illustrated in FIGS. 9 and 11, the magnet part 230 is disposed on the inner side of the fourth surface 214, and disposed adjacent to the fourth surface 214.

In the embodiment illustrated in FIGS. 10 and 12, the magnet part 230 is disposed on the inner side of the third surface 213, and disposed adjacent to the third surface 213.

The magnet part 230 is disposed to face the Halbach array 220. In the embodiment illustrated in FIGS. 9 and 11, the magnet part 230 is disposed to face the Halbach array 220 located on the inner side of the third surface 213.

In addition, in the embodiment illustrated in FIGS. 10 and 12, the magnet part 230 is disposed to face the Halbach array 220 located on the inner side of the fourth surface 214.

The space part 215, and the fixed contactor 22 and the movable contactor 43 accommodated in the space part 215 are located between the magnet part 230 and the Halbach array 220.

The magnet part 230 is formed to extend in one direction. In the illustrated embodiment, the magnet part 230 is formed to extend in the front-rear direction.

The magnet part 230 includes a plurality of surfaces.

Specifically, the magnet part 230 includes the facing surface 231 facing the space part 215 or the Halbach array 220 and the opposing surface 232 opposite to the space part 215 or the Halbach array 220.

Each surface of the magnet part 230 may be magnetized according to a predetermined rule.

In the embodiment illustrated in FIGS. 9 and 10, the facing surface 231 of the magnet part 230 is magnetized to a polarity different from that of the first to third inner surfaces 221*a*, 222*a*, and 223*a* of the Halbach array 220. That is, the facing surface 231 of the magnet part 230 is magnetized to the same polarity as the first to third outer surfaces 221*b*, 222*b*, and 223*b* of the Halbach array 220.

In the embodiment illustrated in FIGS. 11 and 12, the facing surface 231 of the magnet part 230 is magnetized to a polarity different from that of the first to third outer surfaces 221*b*, 222*b*, and 223*b* of the Halbach array 220. That is, the facing surface 231 of the magnet part 230 is magnetized to the same polarity as the first to third inner surfaces 221*a*, 222*a*, and 223*a* of the Halbach array 220.

Hereinafter, an arc path A.P formed by the arc path-forming part 200 according to the present embodiment will be described in detail with reference to FIGS. 13 to 16.

Figure 13:
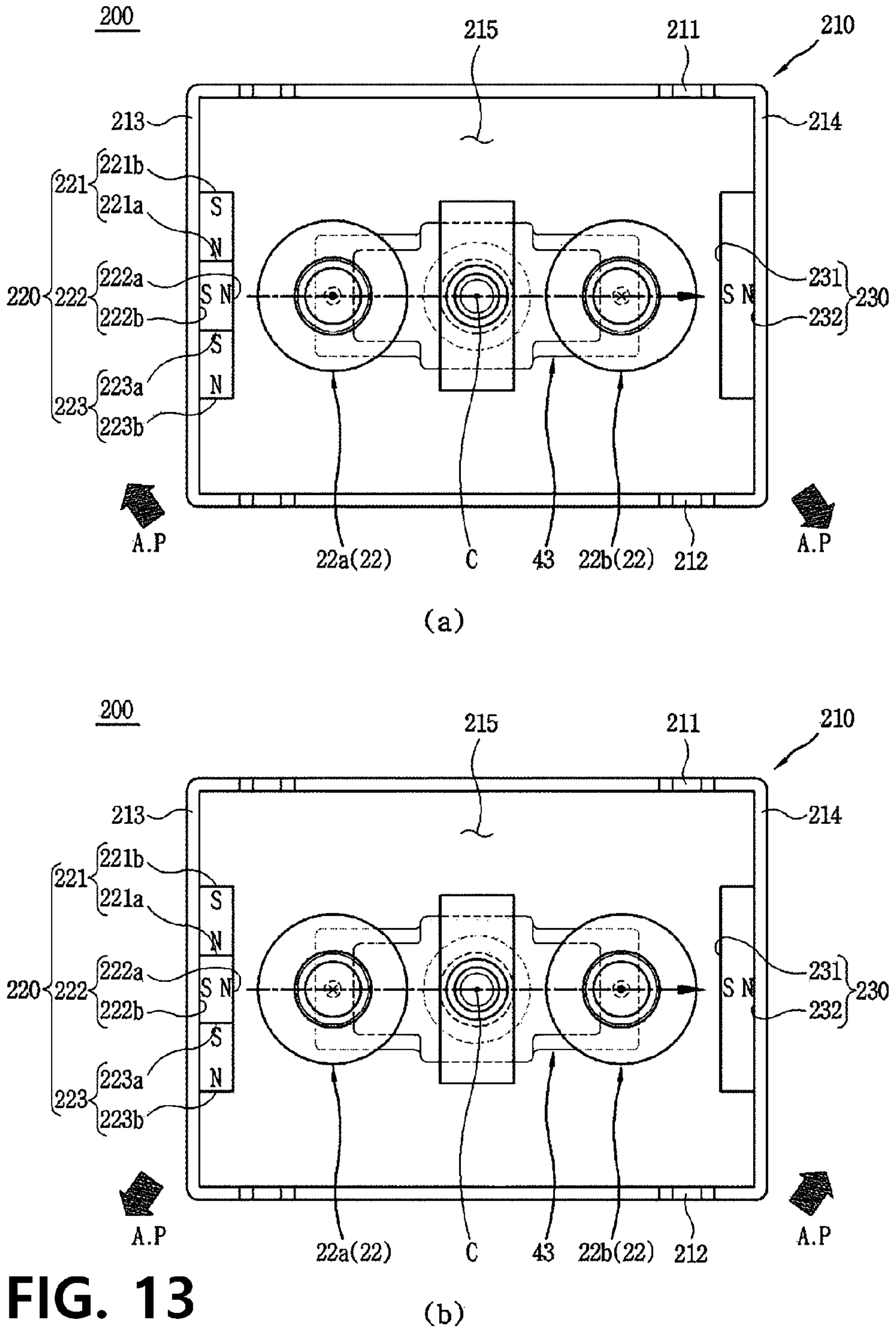
FIGS. 13 to 16 are conceptual views illustrating magnetic fields and arc paths formed by the arc path-forming part of FIGS. 9 to 12.
Figure 14:
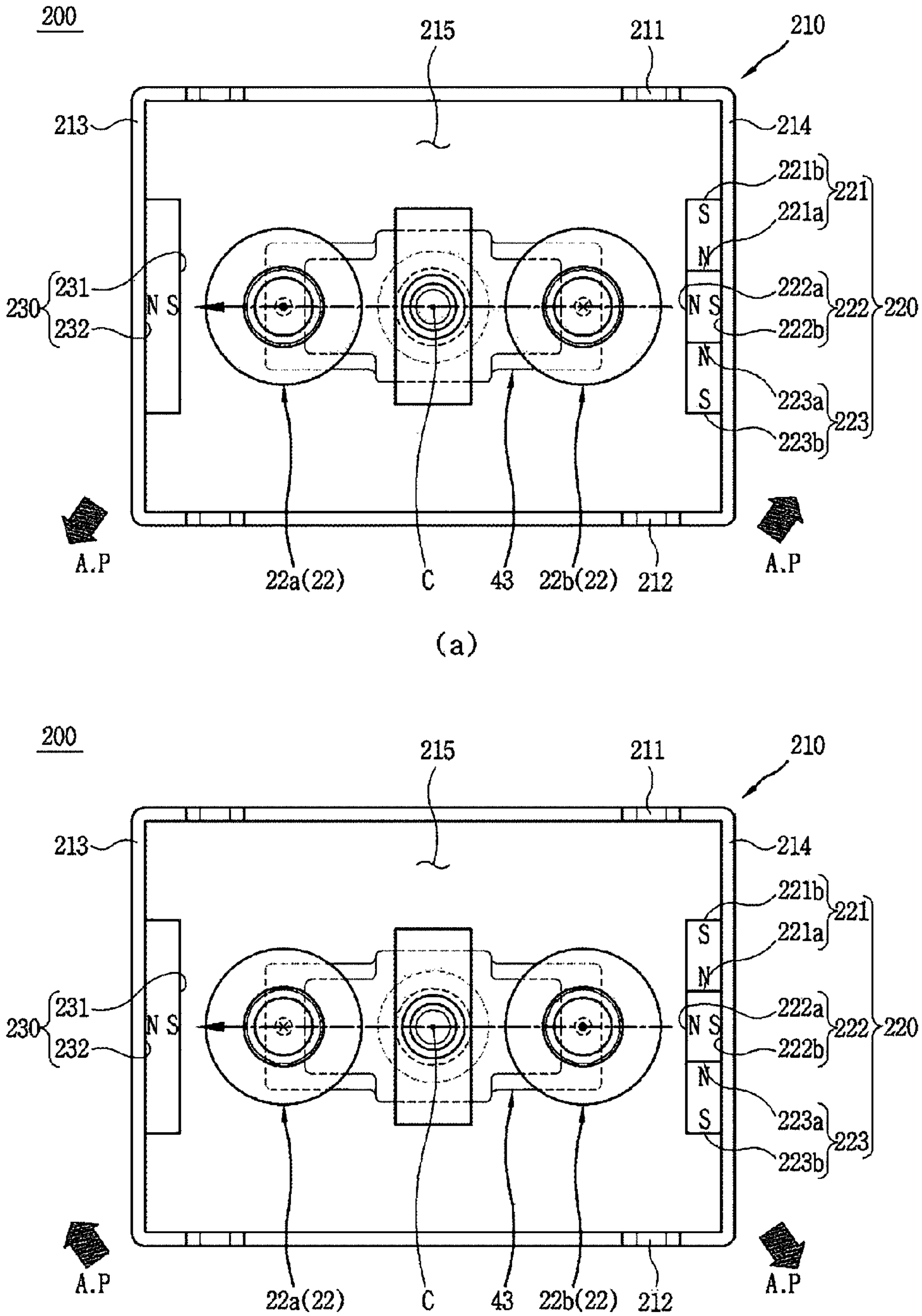

Referring to FIGS. 13 and 14, the first to third inner surfaces 221*a*, 222*a*, and 223*a* of the Halbach array 220 are magnetized to N poles. In addition, the facing surface 231 of the magnet part 230 is magnetized to an S pole.

Accordingly, a magnetic field in a direction from the second inner surface 222*a* toward the facing surface 231 is formed between the Halbach array 220 and the magnet part 230.

At this point, it will be understood that, as the locations of the Halbach array 220 and the magnet part 230 are changed in FIGS. 13 and 14, the direction of the magnetic field is also changed.

Figure 15:
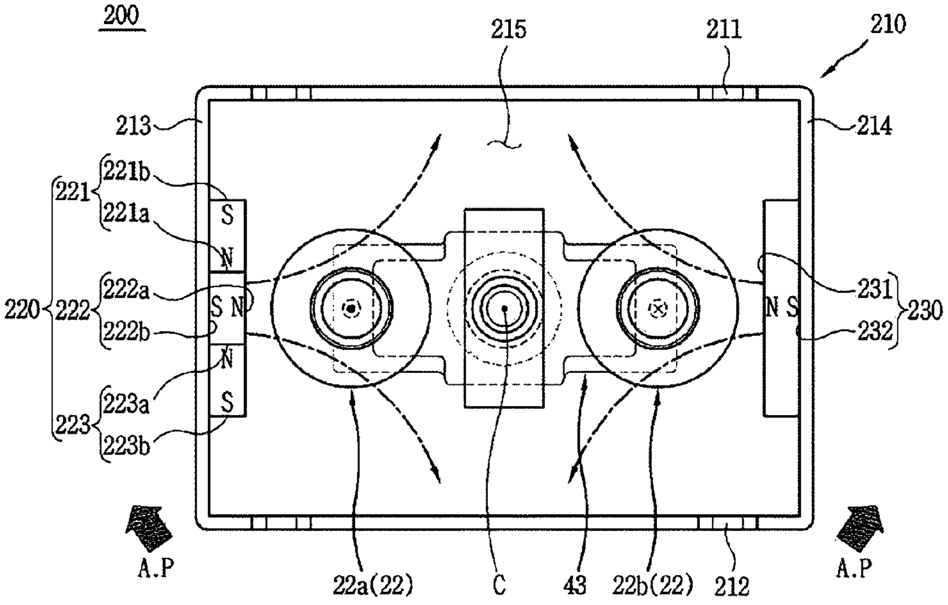
Figure 15:
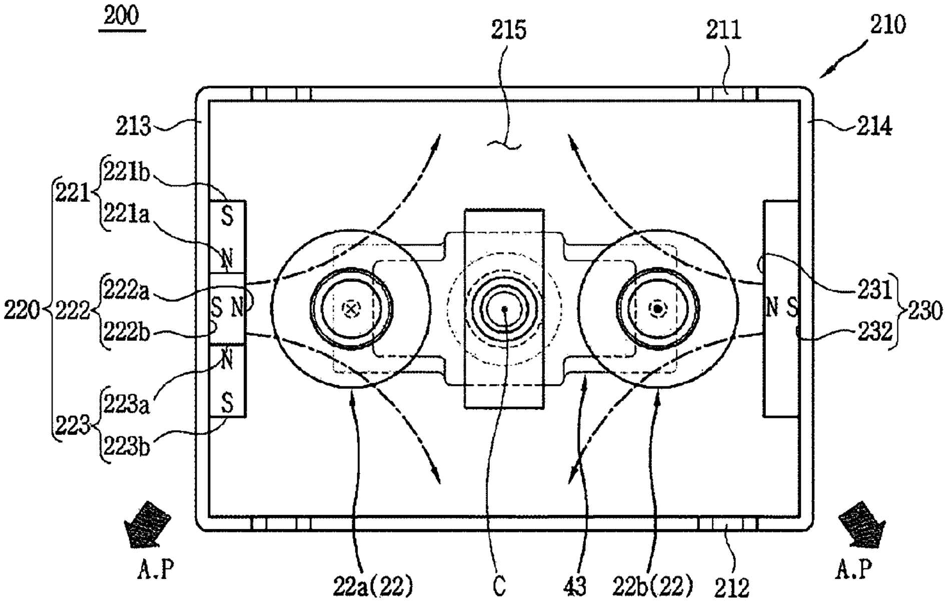
Figure 16:
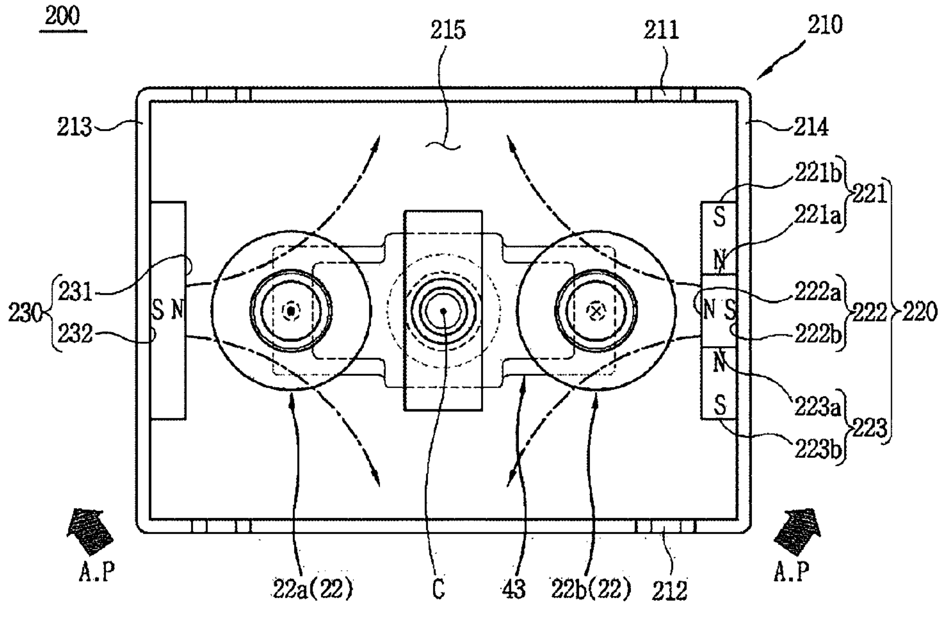
Figure 16:
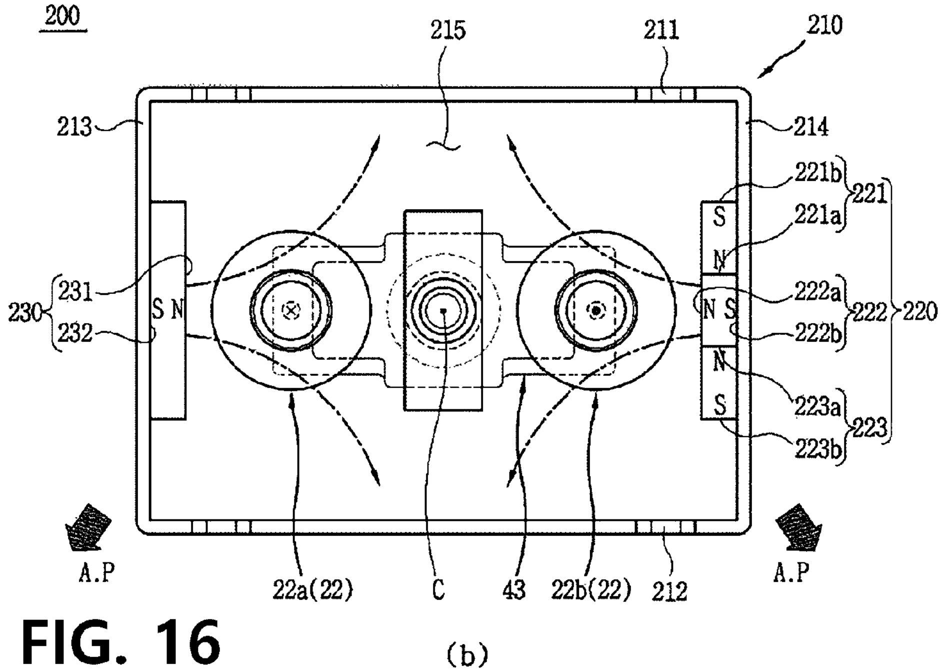

Referring to FIGS. 15 and 16, the first to third inner surfaces 221*a*, 222*a*, and 223*a* of the Halbach array 220 and the facing surface 231 of the magnet part 230 are all magnetized to N poles.

Accordingly, magnetic fields that repel each other are formed between the Halbach array 220 and the magnet part 230.

At this point, the strength of the magnetic field formed between the Halbach array 220 and the magnet part 230 may be enhanced by the magnetic field formed by the first and third blocks 221 and 223.

In the embodiment illustrated in FIGS. 13A, 14A, 15A, and 16A, a direction of current is a direction from the second fixed contactor 22*b* to the first fixed contactor 22*a* via the movable contactor 43.

In the embodiment illustrated in FIG. 13A, when the Fleming's left-hand rule is applied to the first fixed contactor 22*a*, an electromagnetic force generated in the vicinity of the first fixed contactor 22*a* is formed toward the rear left side. Accordingly, an arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side. Accordingly, an arc path A.P in the vicinity of the second fixed contactor 22*b* is also formed toward the front right side.

In the embodiment illustrated in FIG. 14A, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIGS. 15A and 16A, when the Fleming's left-hand rule is applied to the first fixed contactor 22*a*, an electromagnetic force generated in the vicinity of the first fixed contactor 22*a* is formed toward the rear left side. Accordingly, the arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIGS. 13B, 14B, 15B, and 16B, a direction of current is a direction from the first fixed contactor 22*a* to the second fixed contactor 22*b* via the movable contactor 43.

In the embodiment illustrated in FIG. 13B, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIG. 14B, when the Fleming's left-hand rule is applied to the first fixed contactor 22*a*, an electromagnetic force generated in the vicinity of the first fixed contactor 22*a* is formed toward the rear left side. Accordingly, the arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side. Accordingly, the arc path A.P in the vicinity of the second fixed contactor 22*b* is also formed toward the front right side.

In the embodiment illustrated in FIGS. 15B and 16B, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the front right side. Accordingly, the arc path A.P in the vicinity of the second fixed contactor 22*b* is also formed toward the front right side.

Although not illustrated in the drawing, when the polarity of each surface of the Halbach array 220 and the magnet part 230 is changed, the direction of the magnetic field formed in the Halbach array 220 and the magnet part 230 is reversed. Accordingly, the generated electromagnetic force and the arc path A.P are also formed so that the front-rear direction thereof is reversed.

That is, in the electric connection situation shown in FIG. 13A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the rear right side.

In addition, in the electric connection situation shown in FIG. 14A, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the front right side.

In the electric connection situation shown in FIGS. 15A and 16A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the front right side.

Similarly, in the electric connection situation shown in FIG. 13B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the front right side.

In addition, in the electric connection situation shown in FIG. 14B, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the rear right side.

In the electric connection situation shown in FIGS. 15B and 16B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the rear right side.

Accordingly, in the arc path-forming part 200 according to the present embodiment, the electromagnetic force and the arc path A.P may be formed in a direction away from the central part C regardless of the polarity of each of the Halbach array 220 and the magnet part 230 or the direction of the current flowing through the DC relay 1.

Accordingly, damage to each component of the DC relay 1 disposed adjacent to the central part C can be prevented. Furthermore, since the generated arc can be quickly discharged to the outside, operational reliability of the DC relay 1 can be improved.

(3) Description of Arc Path-Forming Part 300 According Still Another Embodiment of Present Disclosure Hereinafter, an arc path-forming part 300 according to still another embodiment of the present disclosure will be described in detail with reference to FIGS. 17 to 24.

Referring to FIGS. 17 to 20, the arc path-forming part 300 according to the illustrated embodiment includes a magnet frame 310, a first Halbach array 320, and a second Halbach array 330.

The magnet frame 310 according to the present embodiment has the same structure and function as the magnet frame 110 according to the above-described embodiment. However, there is a difference in the arrangement method of the first Halbach array 320 and the second Halbach array 330 disposed in the magnet frame 310 according to the present embodiment.

Accordingly, a description of the magnet frame 310 will be replaced with the description of the magnet frame 110 according to the above-described embodiment.

In the illustrated embodiment, a plurality of magnetic materials constituting the first Halbach array 320 are continuously arranged side by side from the rear side to the front side. That is, the first Halbach array 320 is formed to extend in the front-rear direction.

The first Halbach array 320 may form a magnetic field together with another magnetic material. In the illustrated embodiment, the first Halbach array 320 may form a magnetic field together with the second Halbach array 330.

The first Halbach array 320 may be located adjacent to any one surface of third and fourth surfaces 313 and 314. The first Halbach array 320 may be coupled to an inner side (i.e., the side in a direction toward a space part 315) of the any one surface. In the illustrated embodiment, the first Halbach array 320 is disposed on an inner side of the third surface 313, and disposed adjacent to the third surface 313.

The first Halbach array 320 is disposed to face the second Halbach array 330. In the illustrated embodiment, the first Halbach array 320 is disposed to face the second Halbach array 330 located on an inner side of the fourth surface 314.

The space part 315, and the fixed contactor 22 and the movable contactor 43 accommodated in the space part 315 are located between the first Halbach array 320 and the second Halbach array 330.

The first Halbach array 320 is located to be biased to any one surface of a first surface 311 and a second surface 312. In the embodiment illustrated in FIGS. 17 and 19, the first Halbach array 320 is located to be biased to the second surface 312. In the embodiment illustrated in FIGS. 18 and 20, the first Halbach array 320 is located to be biased to the first surface 311.

The first Halbach array 320 may enhance the strength of the magnetic field formed by itself and the magnetic field formed together with the second Halbach array 330. Since the process of enhancing the direction and magnetic field of the magnetic field formed by the first Halbach array 320 is a well-known technique, a detailed description thereof will be omitted.

In the illustrated embodiment, the first Halbach array 320 includes a first block 321 and a second block 322. It will be understood that the plurality of magnetic materials constituting the first Halbach array 320 are named as the blocks 321 and 322, respectively.

The first and second blocks 321 and 322 may each be formed of a magnetic material. In one embodiment, the first and second blocks 321 and 322 may each be provided as a permanent magnet, an electromagnet, or the like.

The first and second blocks 321 and 322 may be disposed side by side in one direction. In the illustrated embodiment, the first and second blocks 321 and 322 are disposed side by side in a direction in which the third surface 313 extends, that is, in the front-rear direction.

Figure 17:
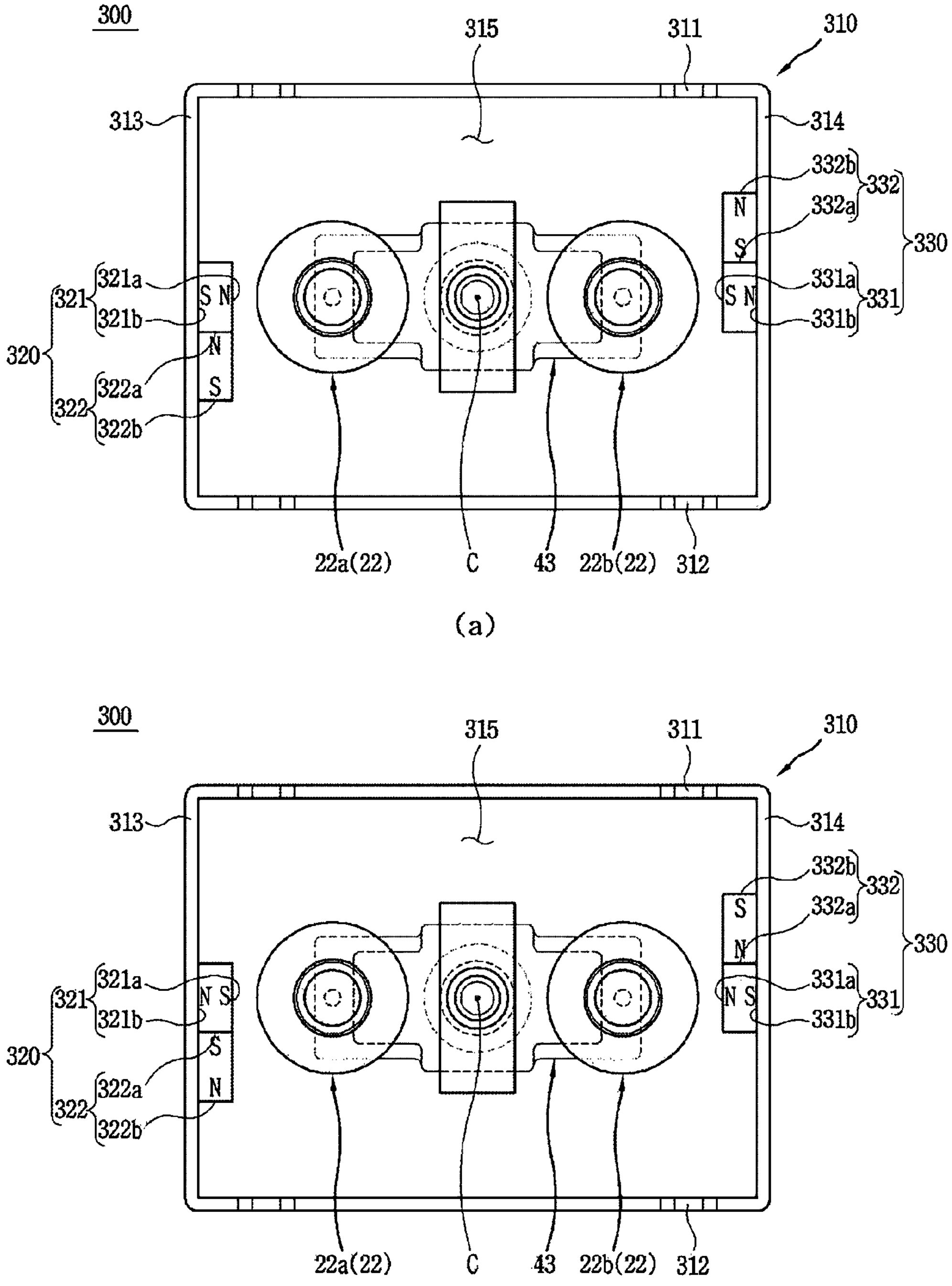
FIGS. 17 to 20 are conceptual views illustrating an arc path-forming part according to still another embodiment of the present disclosure.
Figure 19:
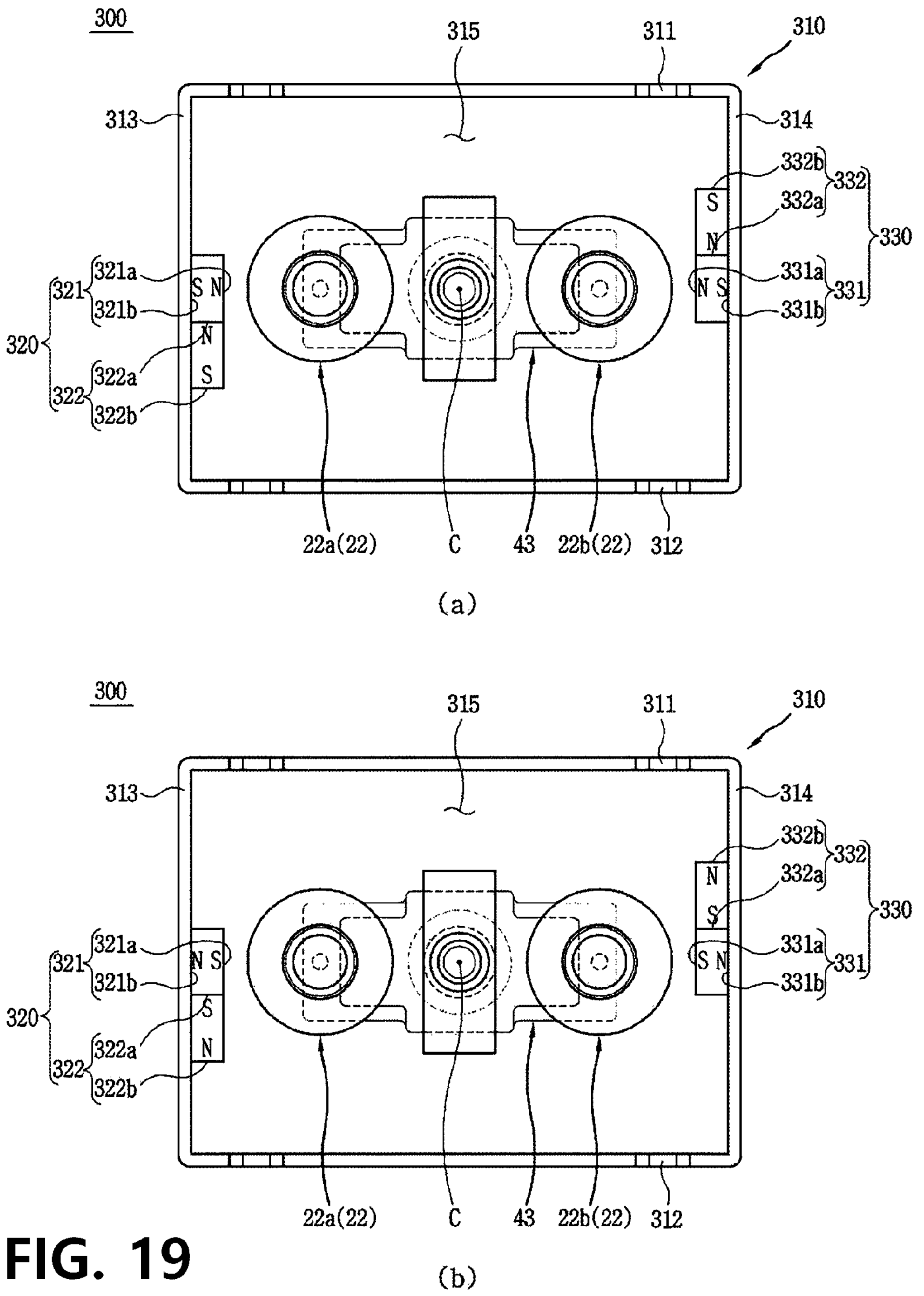

In the embodiment illustrated in FIGS. 17 and 19, of the first and second blocks 321 and 322, the first block 321 is disposed at the rear side, and the second block 322 is disposed at the front side.

Figure 18:
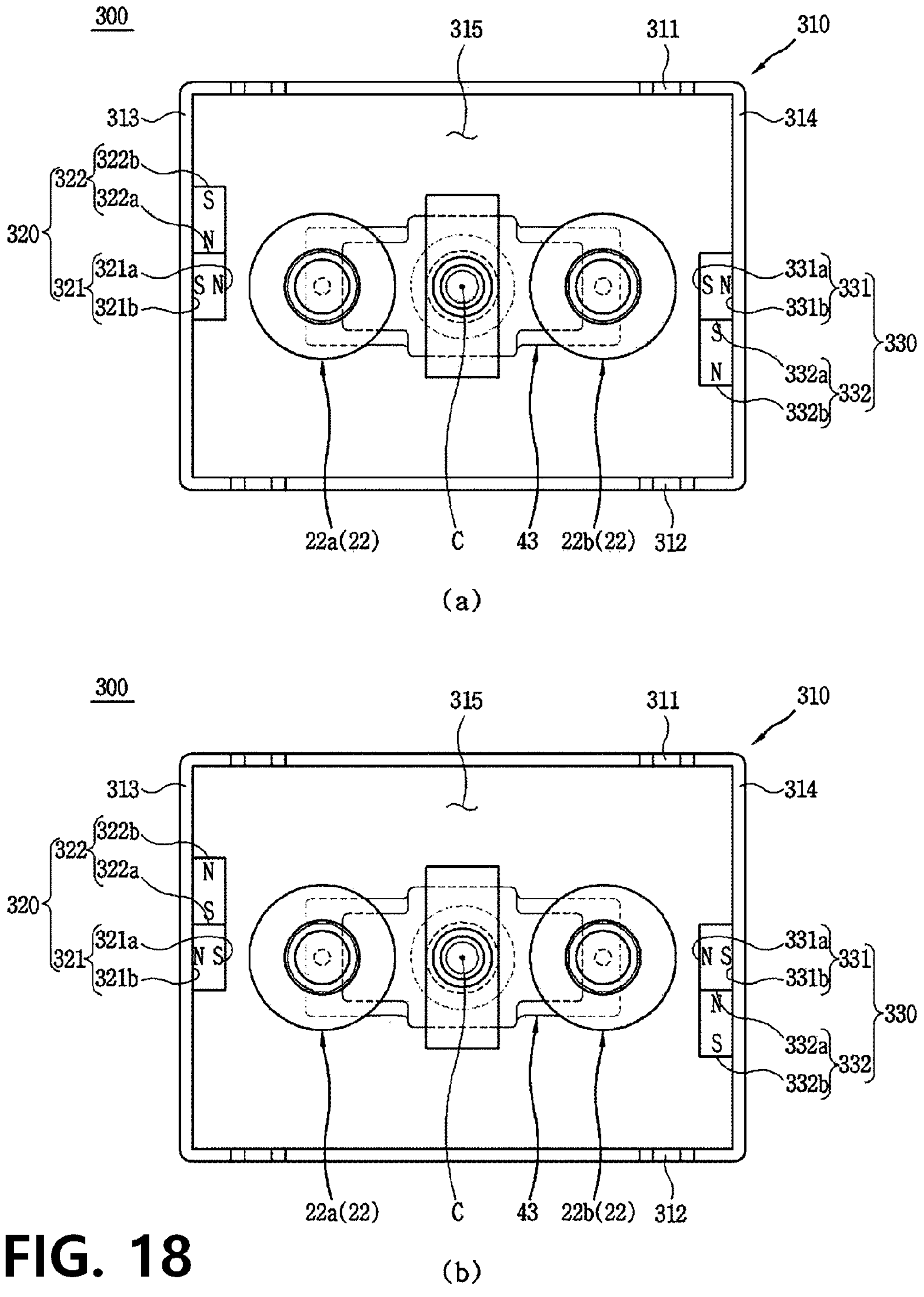
Figure 20:
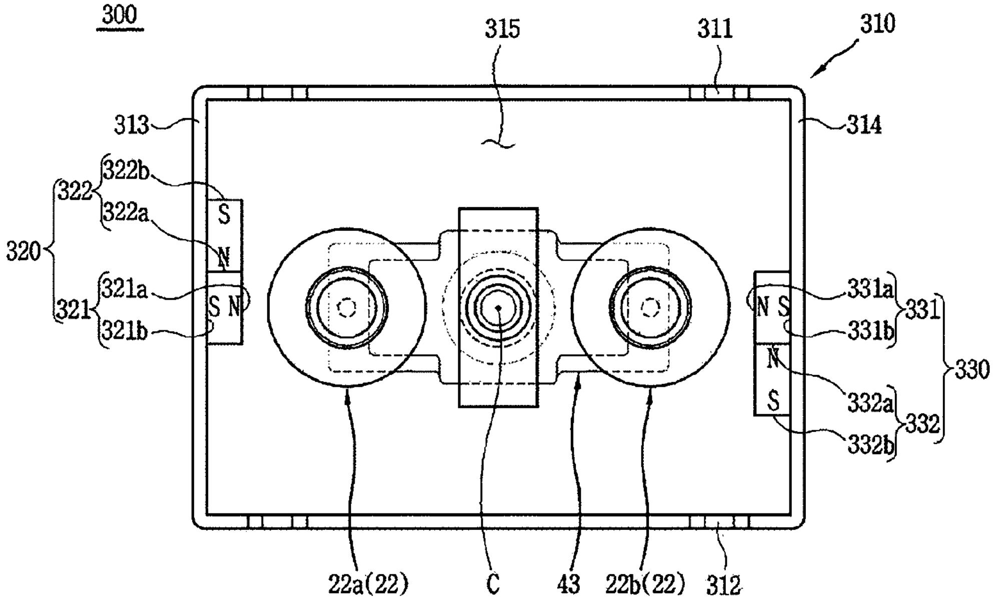
Figure 20:
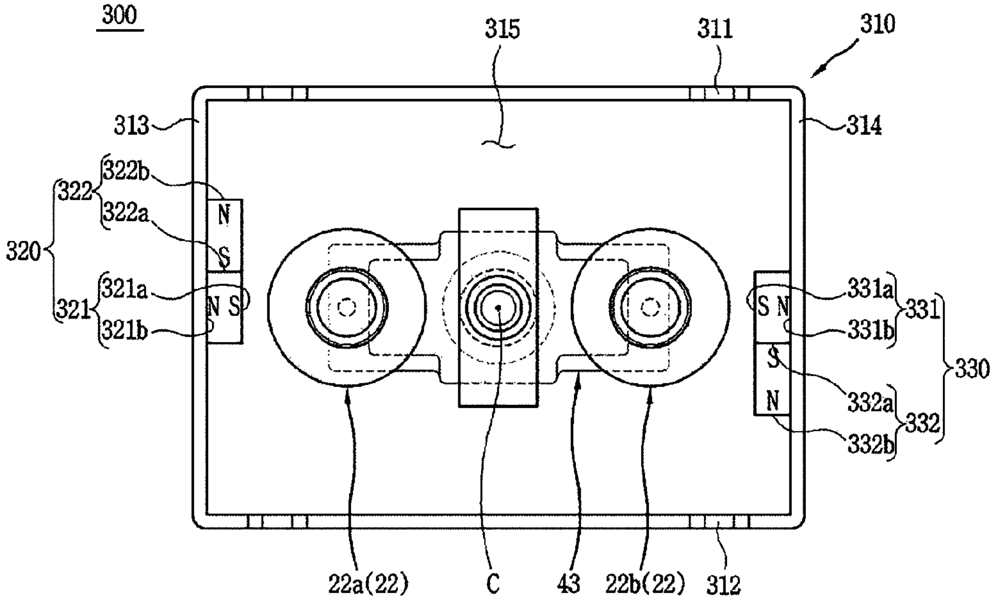

In addition, in the embodiment illustrated in FIGS. 18 and 20, of the first and second blocks 321 and 322, the first block 321 is disposed at the front side, and the second block 322 is disposed at the rear side.

The first block 321 may be disposed to overlap each of the fixed contactors 22*a* and 22*b* in a direction toward the space part 315 or the second Halbach array 330, i.e., in the left-right direction in the illustrated embodiment. In addition, the first block 321 may be disposed to overlap a first block 331 of the second Halbach array 330 in the left-right direction.

In one embodiment, the first and second blocks 321 and 322 may be in contact with each other.

Each of the blocks 321 and 322 includes a plurality of surfaces.

Specifically, the first block 321 includes a first inner surface 321*a* facing the space part 315 or the second Halbach array 330 and a first outer surface 321*b* opposite to the space part 315 or the second Halbach array 330.

The second block 322 includes a second inner surface 322*a* facing the first block 321 and a second outer surface 322*b* opposite to the first block 321.

The plurality of surfaces of each of the blocks 321 and 322 may be magnetized according to a predetermined rule to configure a Halbach array.

In the embodiment illustrated in FIGS. 17 and 18, the first and second inner surfaces 321*a* and 322*a* are magnetized to the same polarity. At this point, the first and second inner surfaces 321*a* and 322*a* may be magnetized to the same polarity as first and second outer surfaces 331*b* and 332*b* of the second Halbach array 330.

In addition, the first and second outer surfaces 321*b* and 322*b* are magnetized to the same polarity. At this point, the first and second outer surfaces 321*b* and 322*b* may be magnetized to the same polarity as first and second inner surfaces 331*a* and 332*a* of the second Halbach array 330.

In the embodiment illustrated in FIGS. 19 and 20, the first and second inner surfaces 321*a* and 322*a* are magnetized to the same polarity. At this point, the first and second inner surfaces 321*a* and 322*a* may be magnetized to the same polarity as the first and second inner surfaces 331*a* and 332*a* of the second Halbach array 330.

In addition, the first and second outer surfaces 321*b* and 322*b* are magnetized to the same polarity. At this point, the first and second outer surfaces 321*b* and 322*b* may be magnetized to the same polarity as the first and second outer surfaces 331*b* and 332*b* of the second Halbach array 330.

In the illustrated embodiment, a plurality of magnetic materials constituting the second Halbach array 330 are continuously arranged side by side from the rear side to the front side. That is, the second Halbach array 330 is formed to extend in the front-rear direction.

The second Halbach array 330 may form a magnetic field together with another magnetic material. In the illustrated embodiment, the second Halbach array 330 may form a magnetic field together with the first Halbach array 320.

The second Halbach array 330 may be located adjacent to the other surface of the third and fourth surfaces 313 and 314. The second Halbach array 330 may be coupled to an inner side (i.e., the side in a direction toward the space part 315) of the other surface. In the illustrated embodiment, the second Halbach array 330 is disposed on the inner side of the fourth surface 314, and disposed adjacent to the fourth surface 314.

The second Halbach array 330 is disposed to face the first Halbach array 320. In the illustrated embodiment, the second Halbach array 330 is disposed to face the first Halbach array 320 located on the inner side of the third surface 313.

The space part 315, and the fixed contactor 22 and the movable contactor 43 accommodated in the space part 315 are located between the second Halbach array 330 and the first Halbach array 320.

The second Halbach array 330 is located to be biased to the other surface of the first surface 311 and the second surface 312. In the embodiment illustrated in FIGS. 17 and 19, the second Halbach array 330 is located to be biased to the first surface 311. In the embodiment illustrated in FIGS. 18 and 20, the second Halbach array 330 is located to be biased to the second surface 312.

The second Halbach array 330 may enhance the strength of the magnetic field formed by itself and the strength of the magnetic field formed together with the first Halbach array 320. Since the process of enhancing the direction and magnetic field of the magnetic field formed by the second Halbach array 330 is a well-known technique, a detailed description thereof will be omitted.

In the illustrated embodiment, the second Halbach array 330 includes the first block 331 and a second block 332. It will be understood that the plurality of magnetic materials constituting the second Halbach array 330 are named as the blocks 331 and 332, respectively.

The first and second blocks 331 and 332 may each be formed of a magnetic material. In one embodiment, the first and second blocks 331 and 332 may each be provided as a permanent magnet, an electromagnet, or the like.

The first and second blocks 331 and 332 may be disposed side by side in one direction. In the illustrated embodiment, the first and second blocks 331 and 332 are disposed side by side in a direction in which the fourth surface 314 extends, that is, in the front-rear direction.

In the embodiment illustrated in FIGS. 17 and 19, of the first and second blocks 331 and 332, the first block 331 is disposed at the front side, and the second block 332 is disposed at the rear side.

In the embodiment illustrated in FIGS. 18 and 20, of the first and second blocks 331 and 332, the first block 331 is disposed at the rear side, and the second block 332 is disposed at the front side.

The first block 331 may be disposed to overlap each of the fixed contactors 22*a* and 22*b* in a direction toward the space part 315 or the first Halbach array 320, i.e., in the left-right direction in the illustrated embodiment. In addition, the first block 331 may be disposed to overlap the first block 321 of the first Halbach array 320 in the left-right direction.

In one embodiment, the first and second blocks 331 and 332 may be in contact with each other.

Each of the blocks 331 and 332 includes a plurality of surfaces.

Specifically, the first block 331 includes a first inner surface 331*a* facing the space part 315 or the first Halbach array 320 and a first outer surface 331*b* opposite to the space part 315 or the first Halbach array 320.

The second block 332 includes a second inner surface 332*a* facing the first block 331 and a second outer surface 332*b* opposite to the first block 331.

The plurality of surfaces of each of the blocks 331 and 332 may be magnetized according to a predetermined rule to configure a Halbach array.

In the embodiment illustrated in FIGS. 17 and 18, the first and second inner surfaces 331*a* and 332*a* are magnetized to the same polarity. At this point, the first and second inner surfaces 331*a* and 332*a* may be magnetized to the same polarity as the first and second outer surfaces 321*b* and 322*b* of the first Halbach array 320.

In addition, the first and second outer surfaces 331*b* and 332*b* are magnetized to the same polarity. At this point, the first and second outer surfaces 331*b* and 332*b* may be magnetized to the same polarity as the first and second inner surfaces 321*a* and 322*a* of the first Halbach array 320.

In the embodiment illustrated in FIGS. 19 and 20, the first and second inner surfaces 331*a* and 332*a* are magnetized to the same polarity. At this point, the first and second inner surfaces 331*a* and 332*a* may be magnetized to the same polarity as the first and second inner surfaces 321*a* and 322*a* of the first Halbach array 320.

In addition, the first and second outer surfaces 331*b* and 332*b* are magnetized to the same polarity. At this point, the first and second outer surfaces 331*b* and 332*b* may be magnetized to the same polarity as the first and second outer surfaces 321*b* and 322*b* of the first Halbach array 320.

Hereinafter, an arc path A.P formed by the arc path-forming part 300 according to the present embodiment will be described in detail with reference to FIGS. 21 to 24.

Figure 21:
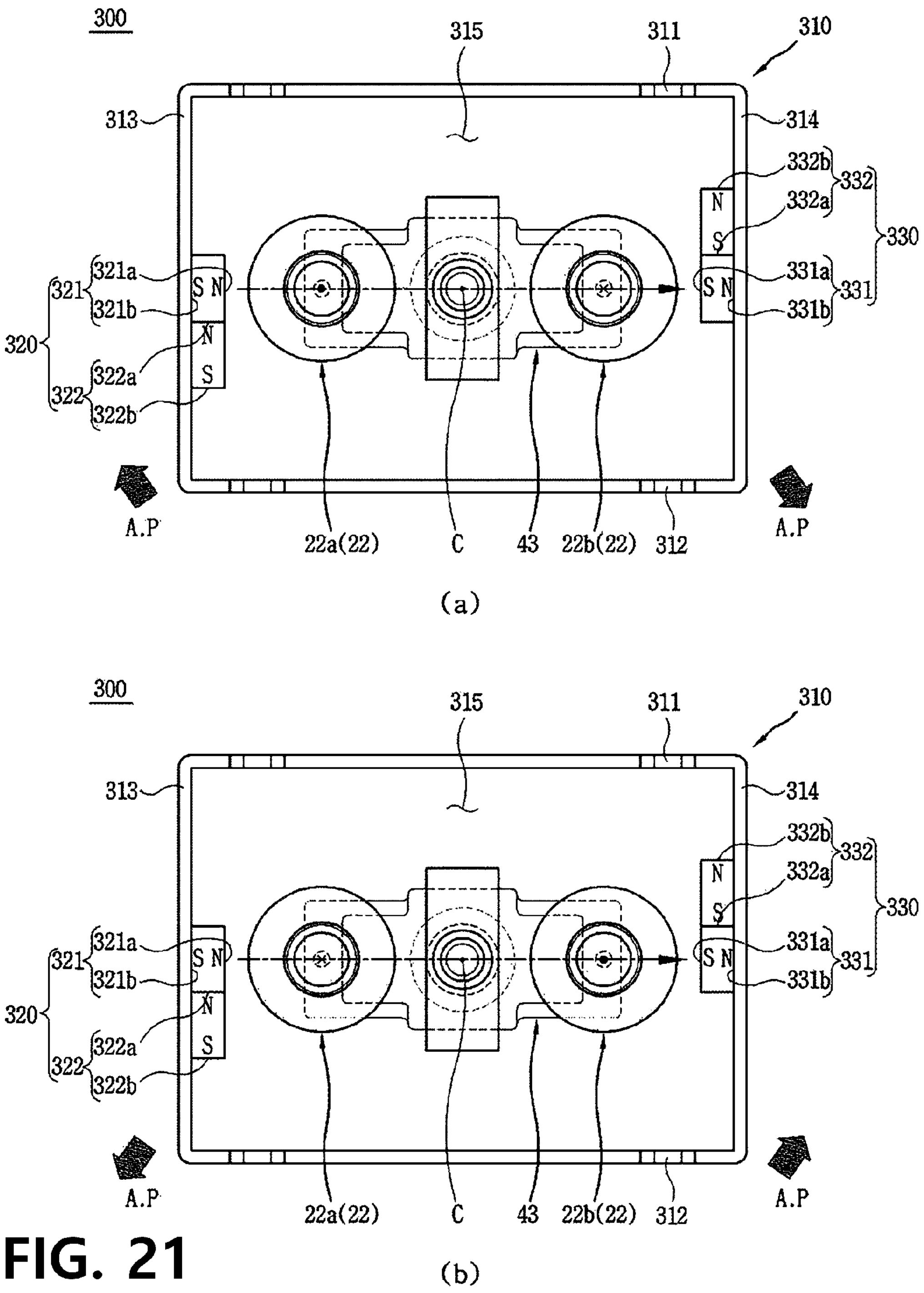
FIGS. 21 to 24 are conceptual views illustrating magnetic fields and arc paths formed by the arc path-forming part of FIGS. 17 to 20.
Figure 22:
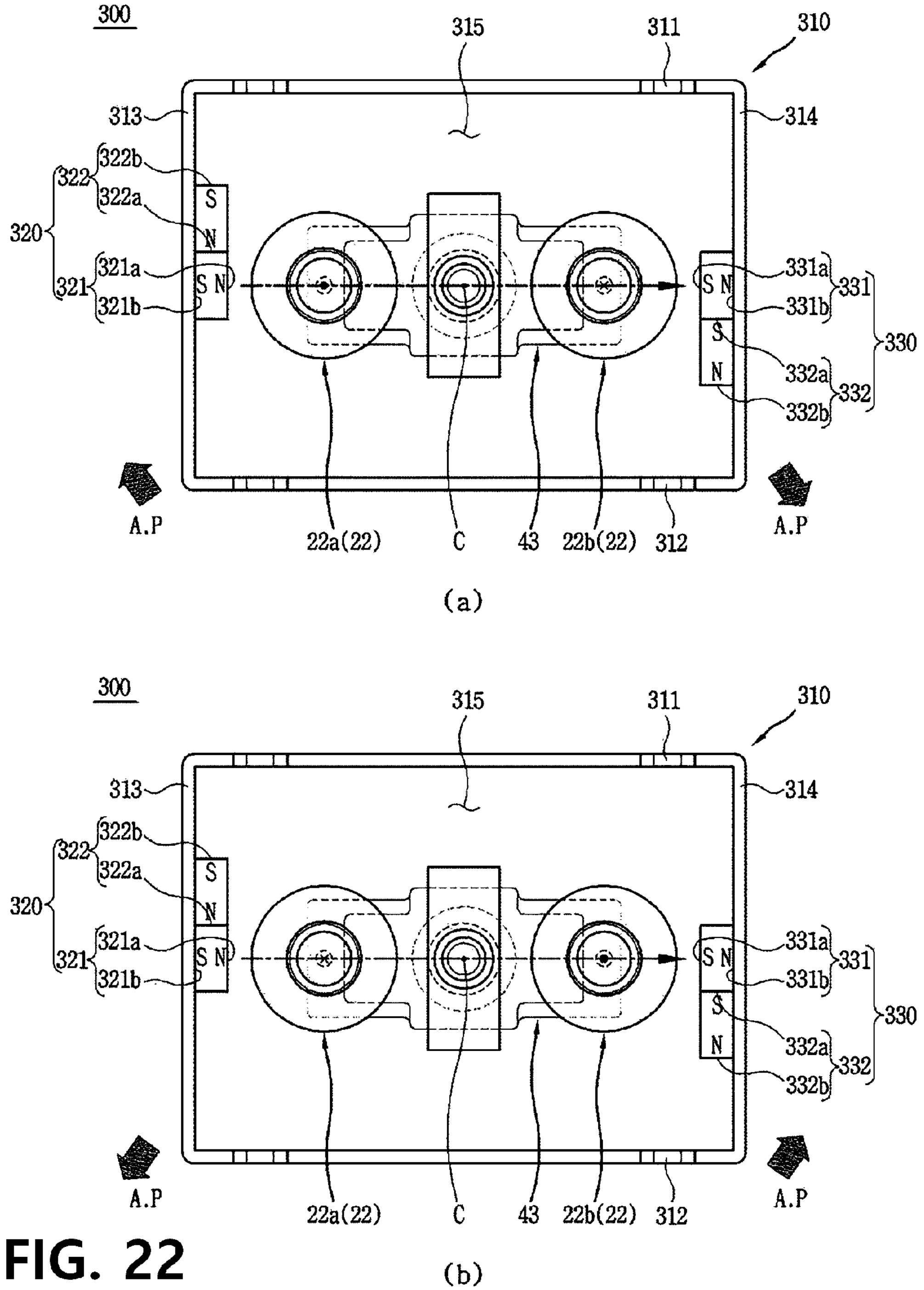

Referring to FIGS. 21 and 22, the first and second inner surfaces 321*a* and 322*a* of the first Halbach array 320 are magnetized to N poles. In addition, the first and second inner surfaces 331*a* and 332*a* of the second Halbach array 330 are magnetized to S poles.

Accordingly, a magnetic field in a direction from the first inner surface 321*a* toward the first inner surface 331*a* is formed between the first Halbach array 320 and the second Halbach array 330.

Figure 23:
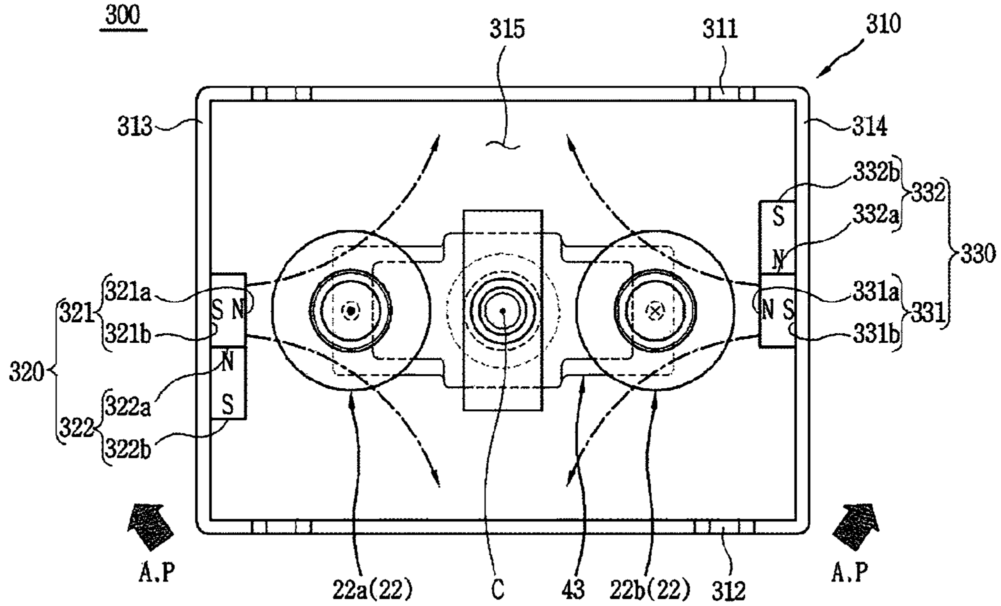
Figure 23:
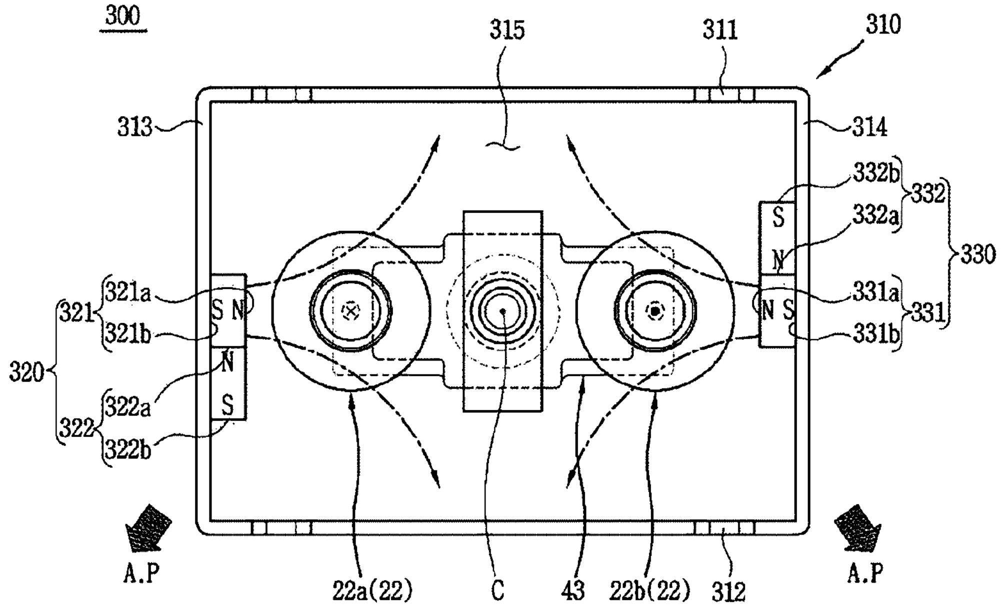
Figure 24:
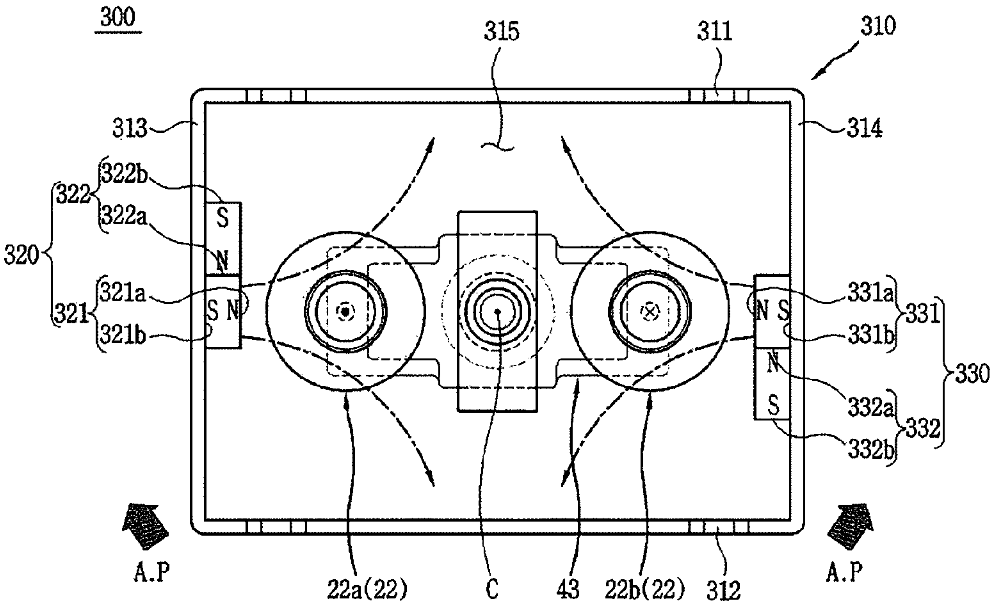
Figure 24:
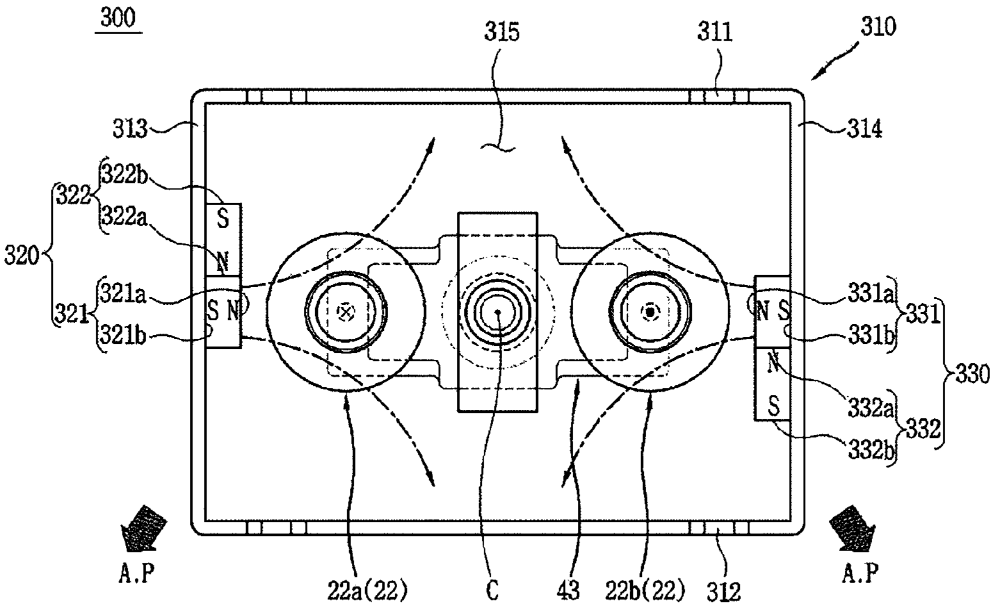
Figure 25:
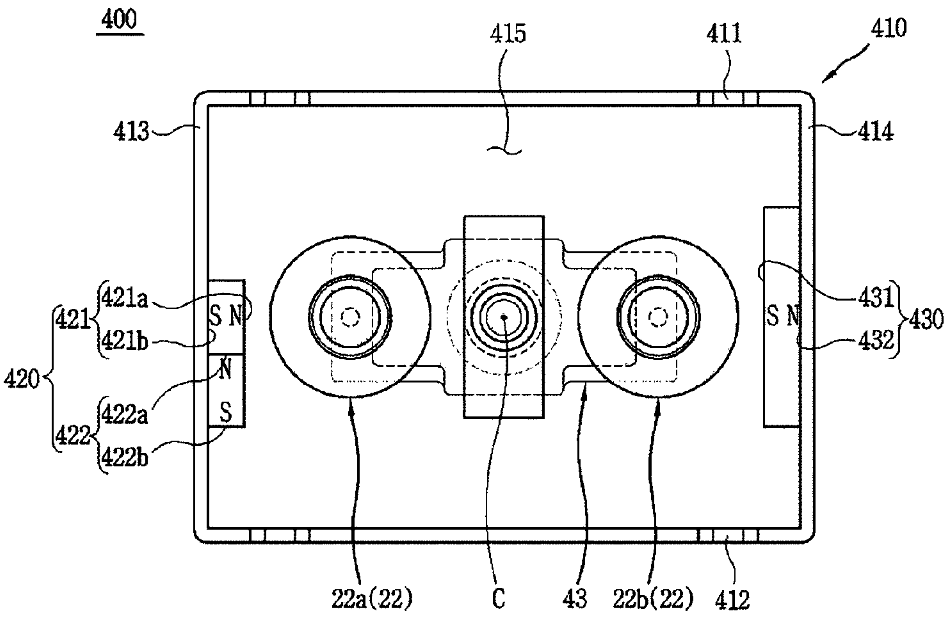
FIGS. 25 to 32 are conceptual views illustrating an arc path-forming part according to yet another embodiment of the present disclosure.
Figure 25:
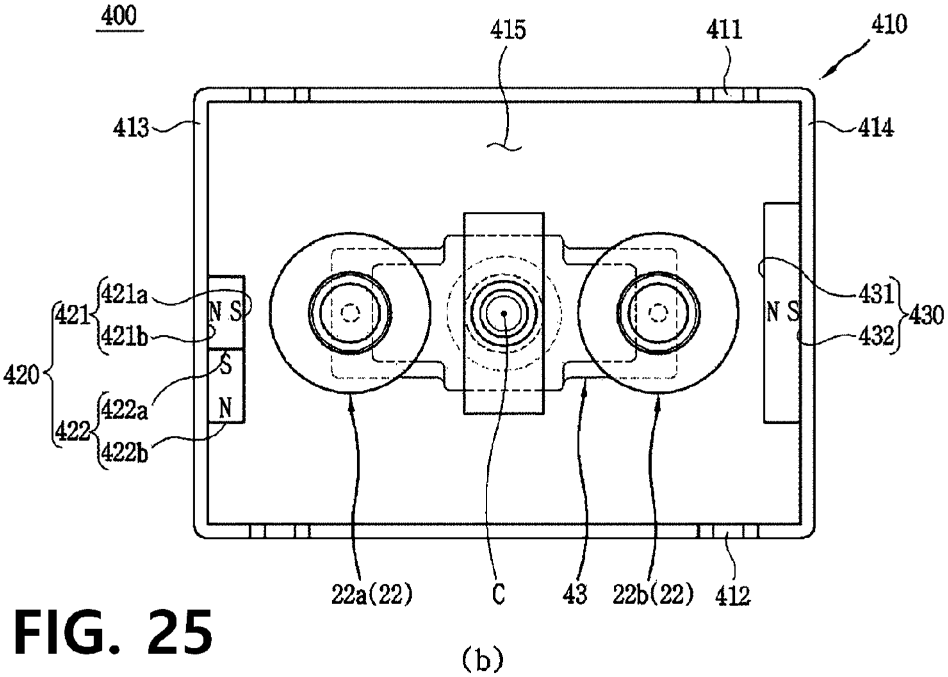
Figure 26:
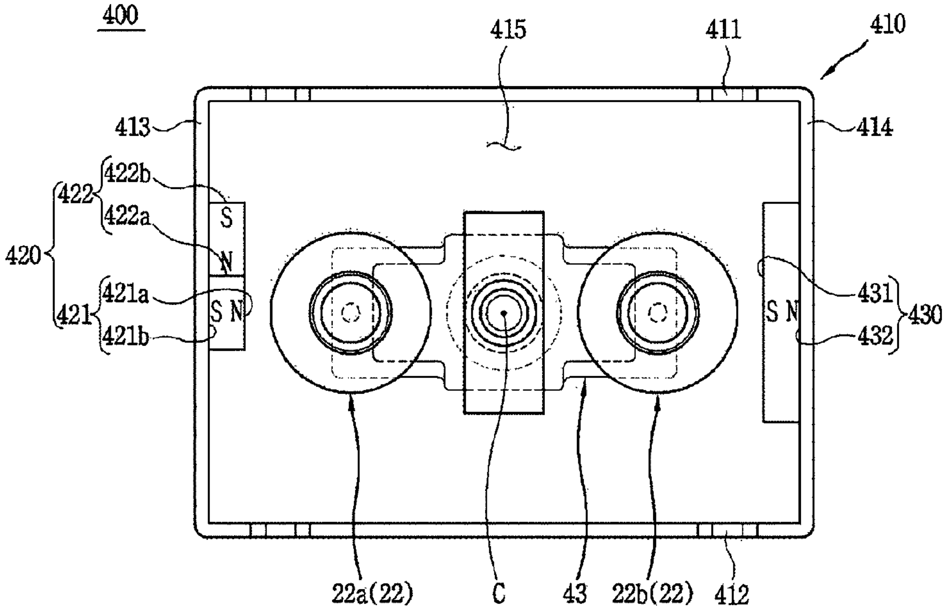
Figure 26:
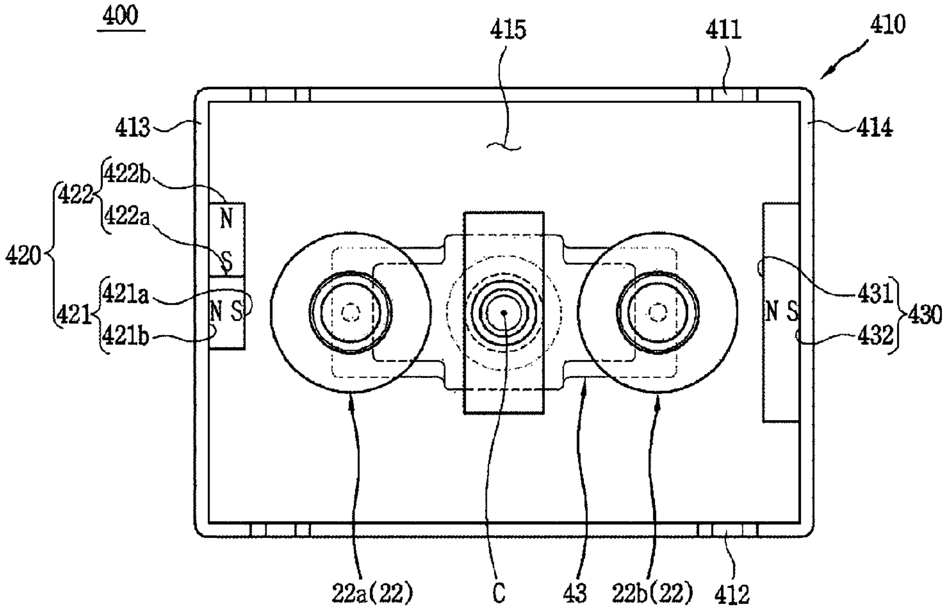
Figure 27:
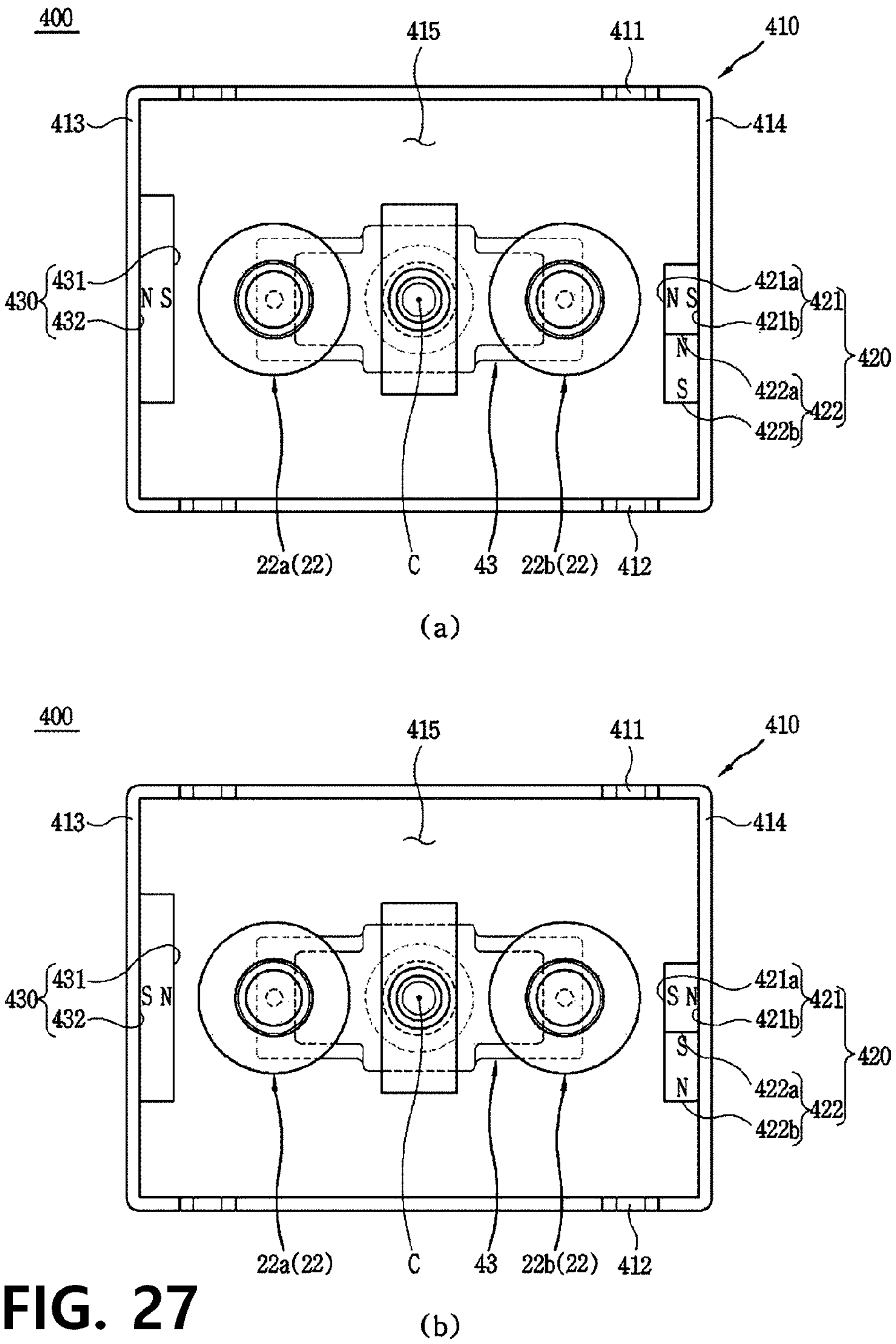
Figure 28:
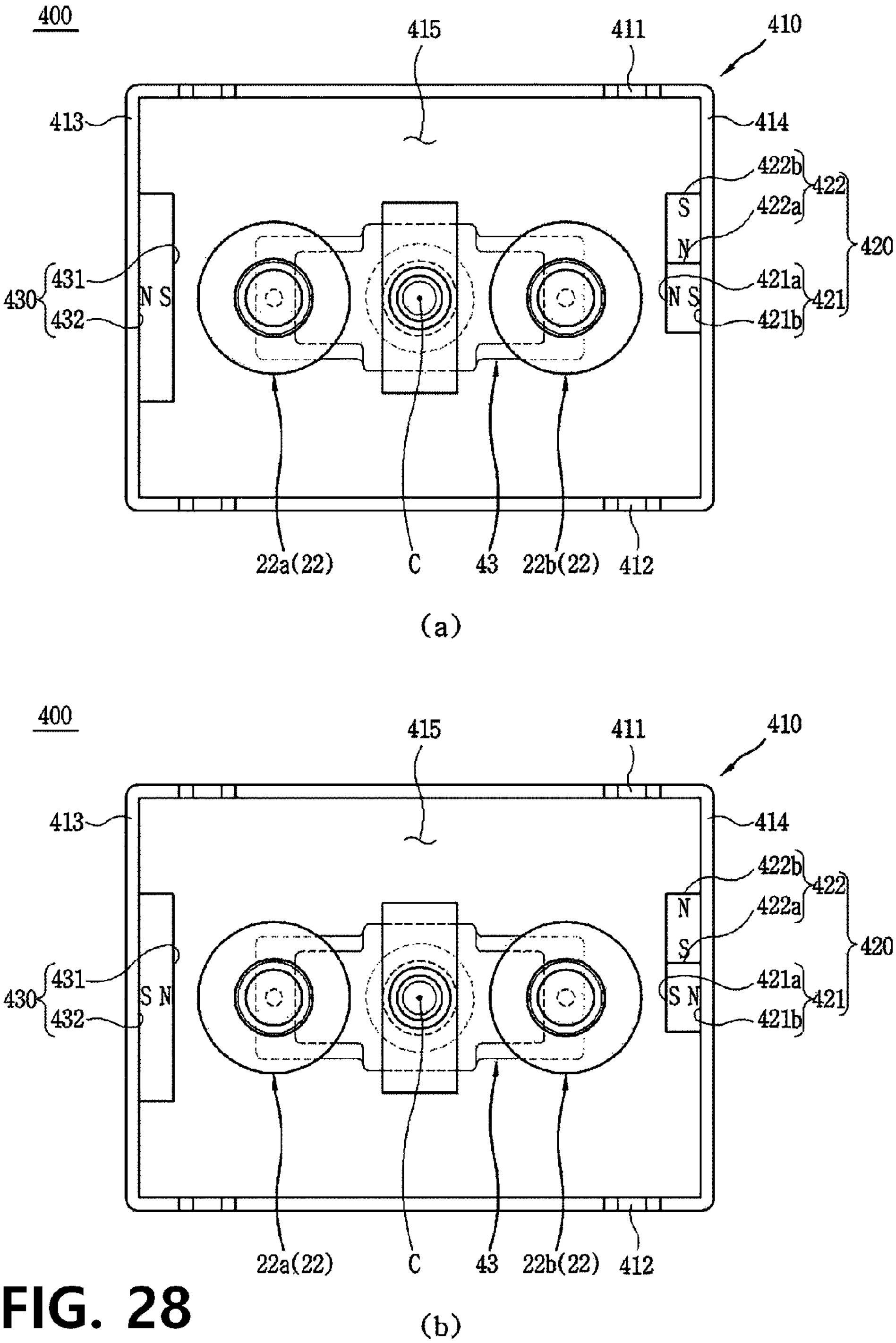
Figure 29:
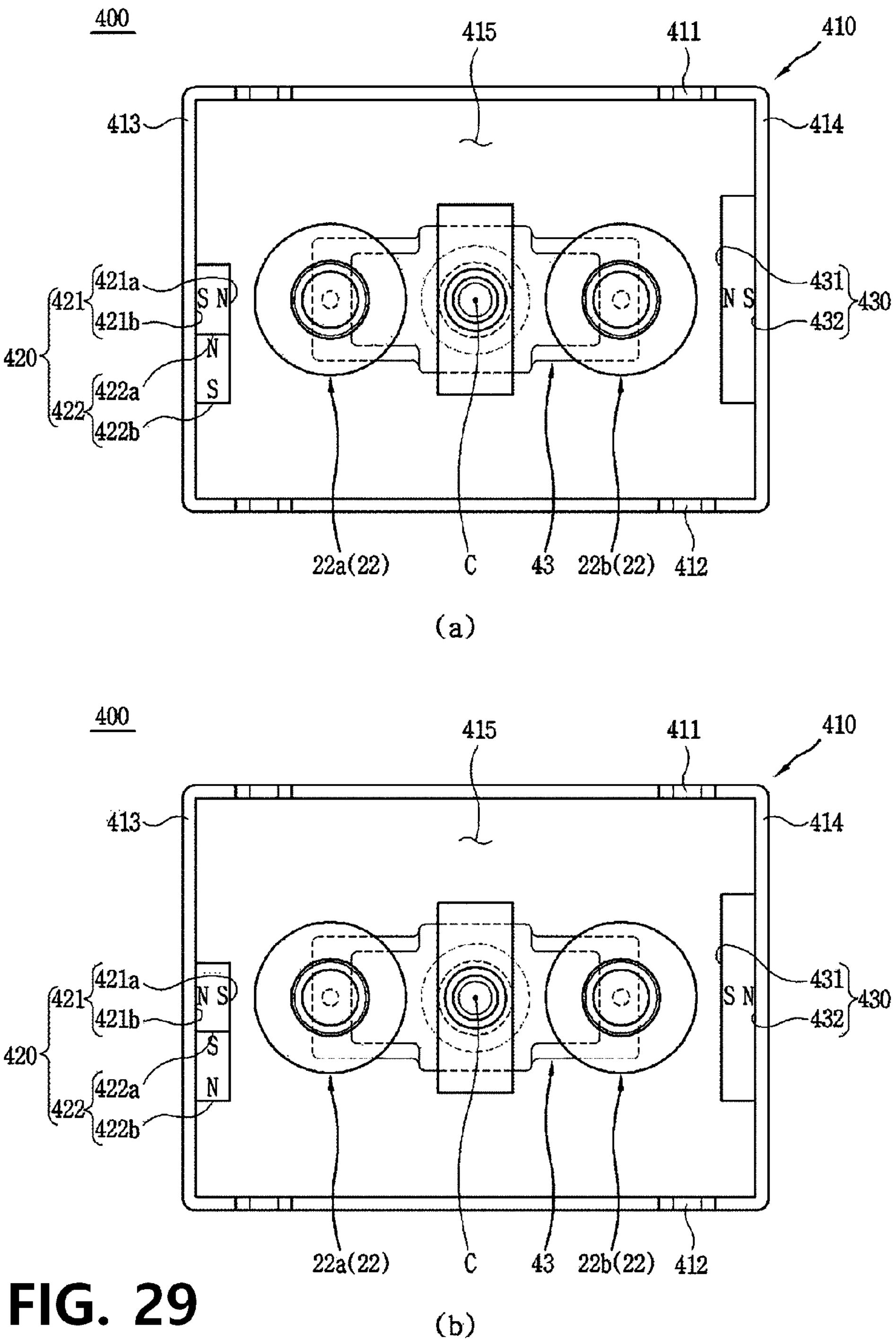
Figure 30:
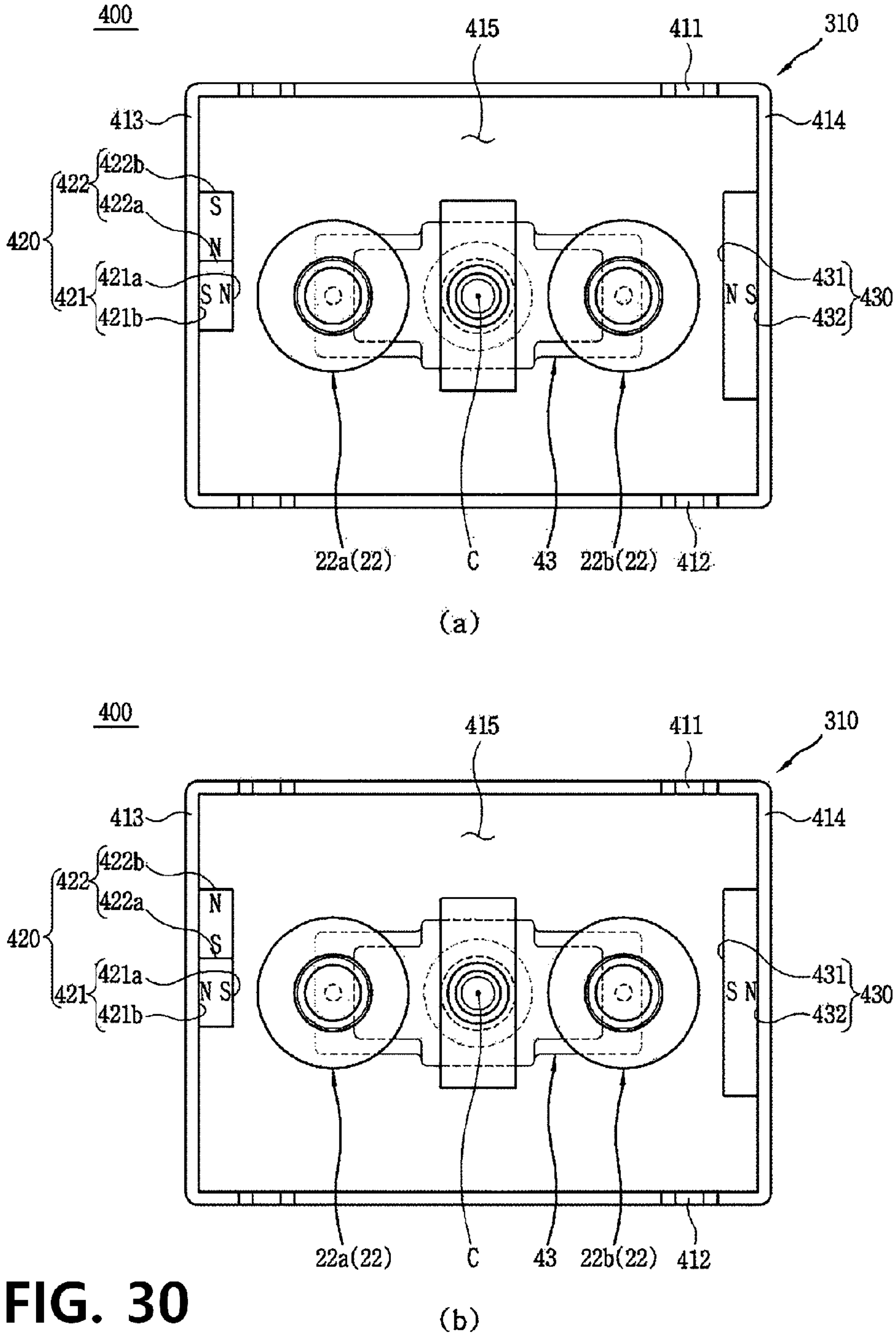
Figure 31:
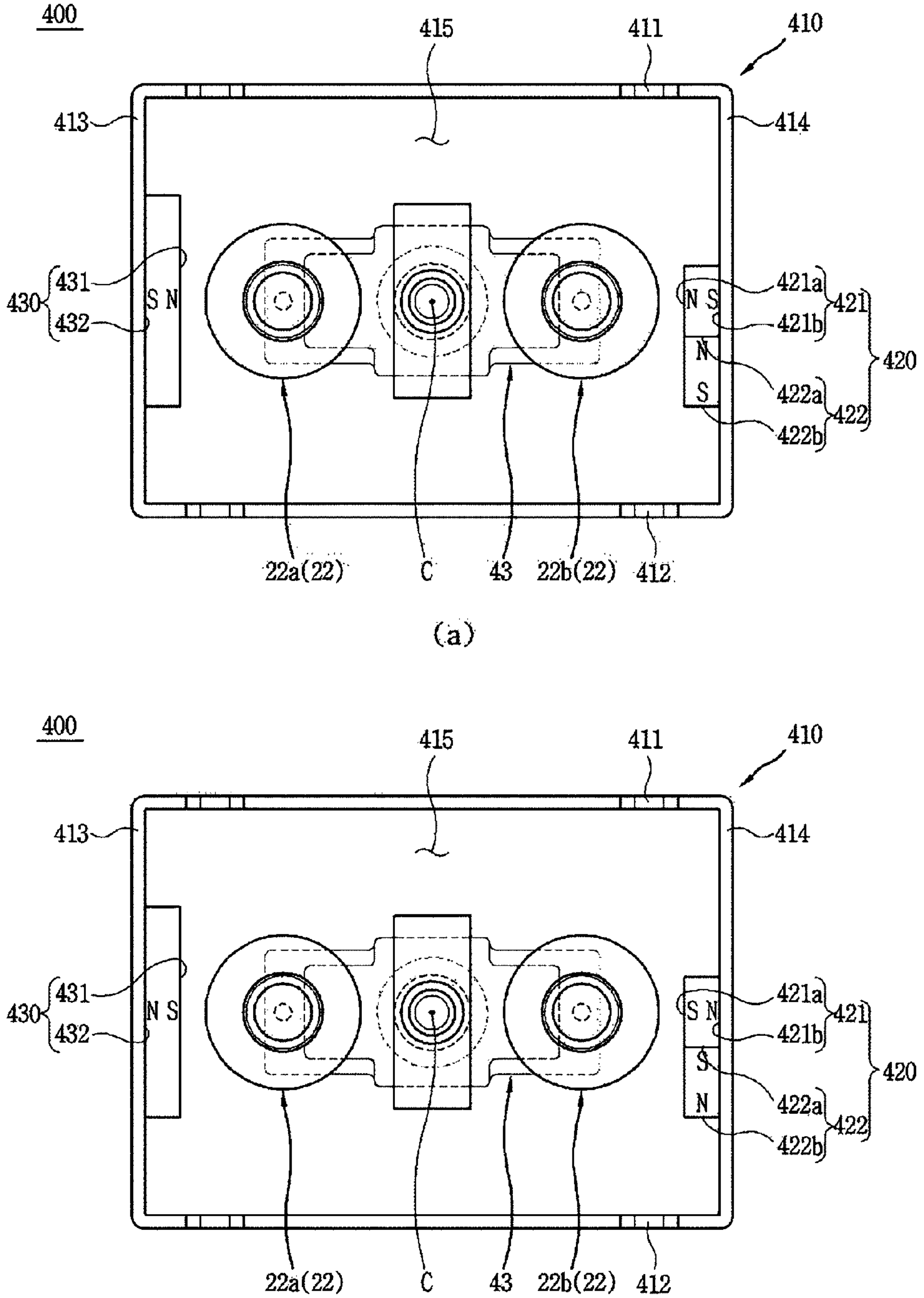
Figure 32:
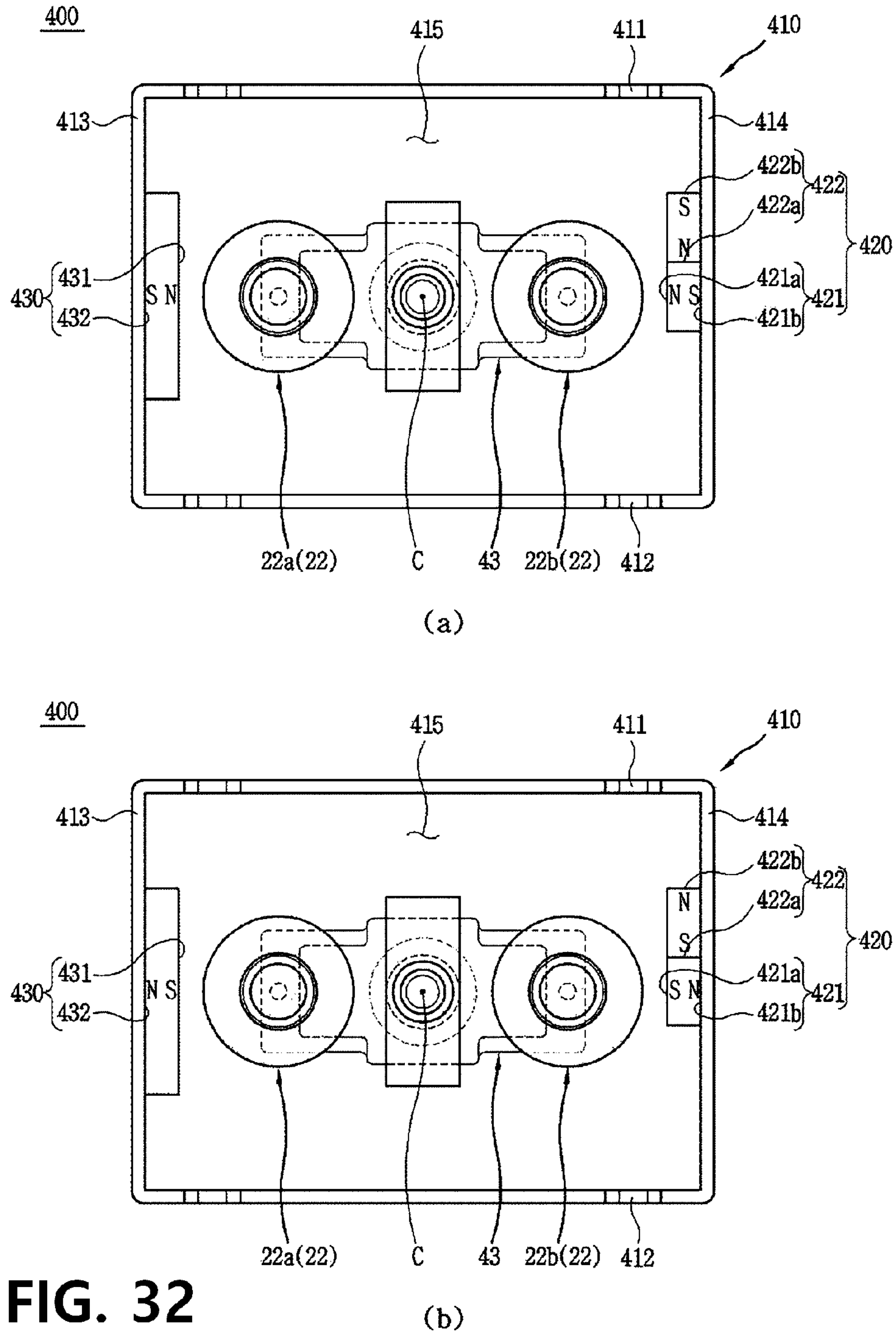
Figure 33:
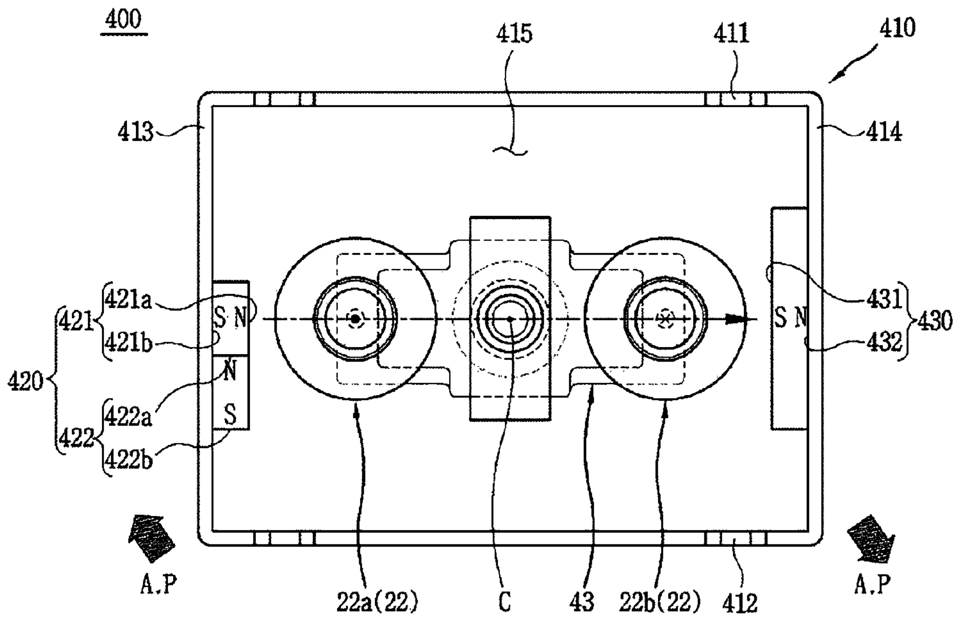
FIGS. 33 to 40 are conceptual views illustrating magnetic fields and arc paths formed by the arc path-forming part of FIGS. 25 to 32.
Figure 33:
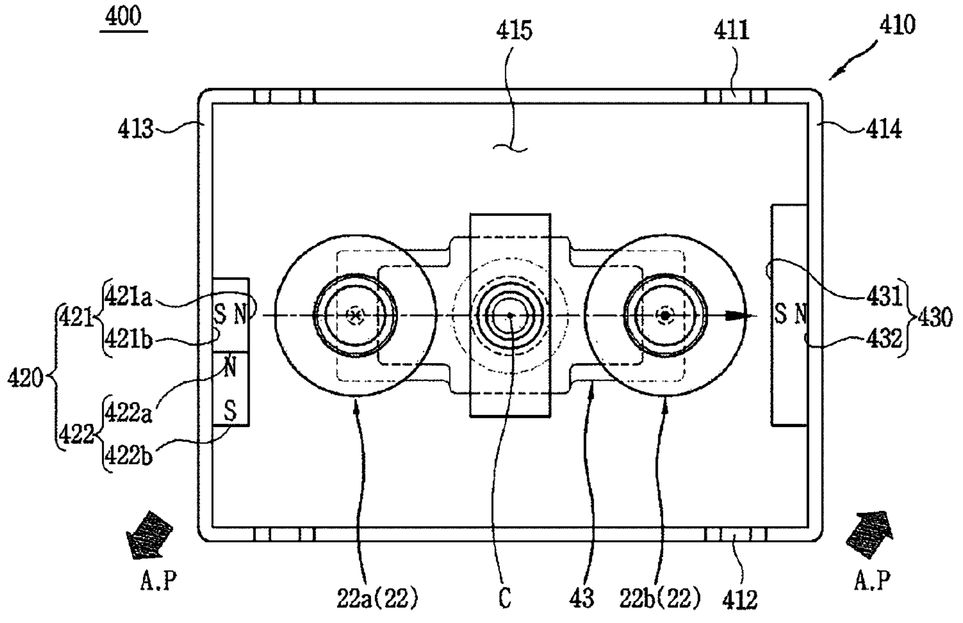
Figure 34:
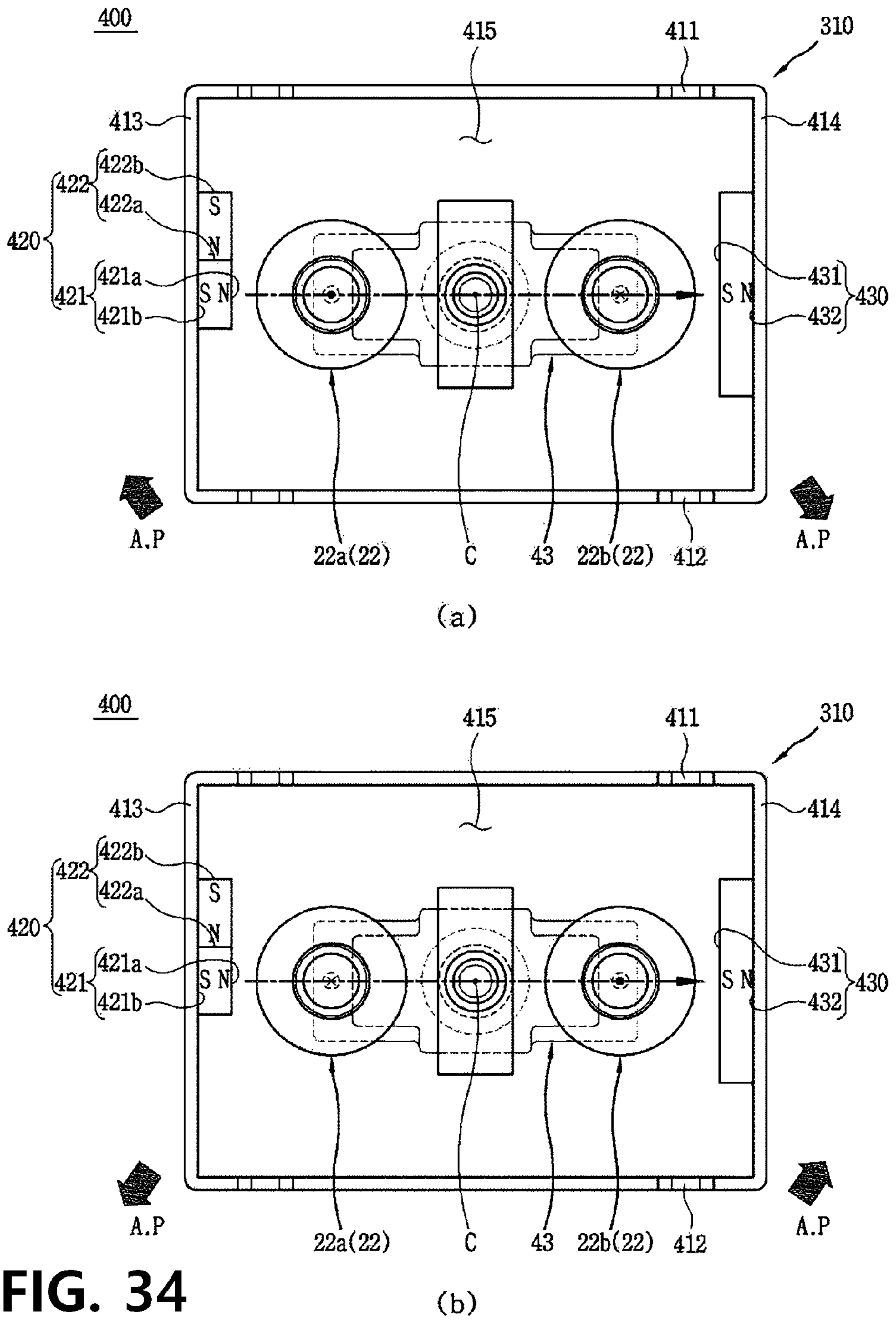
Figure 35:
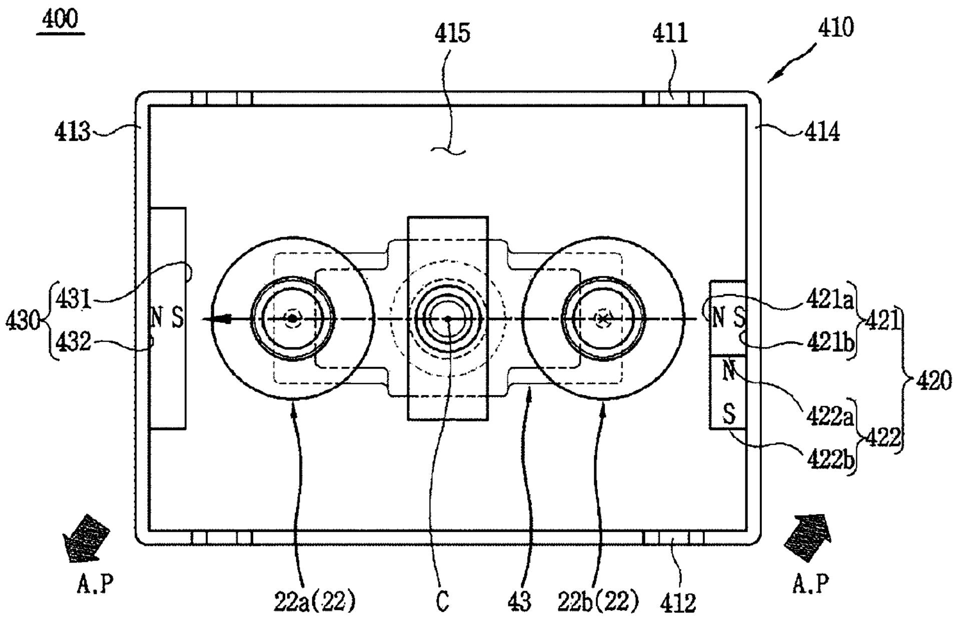
Figure 35:
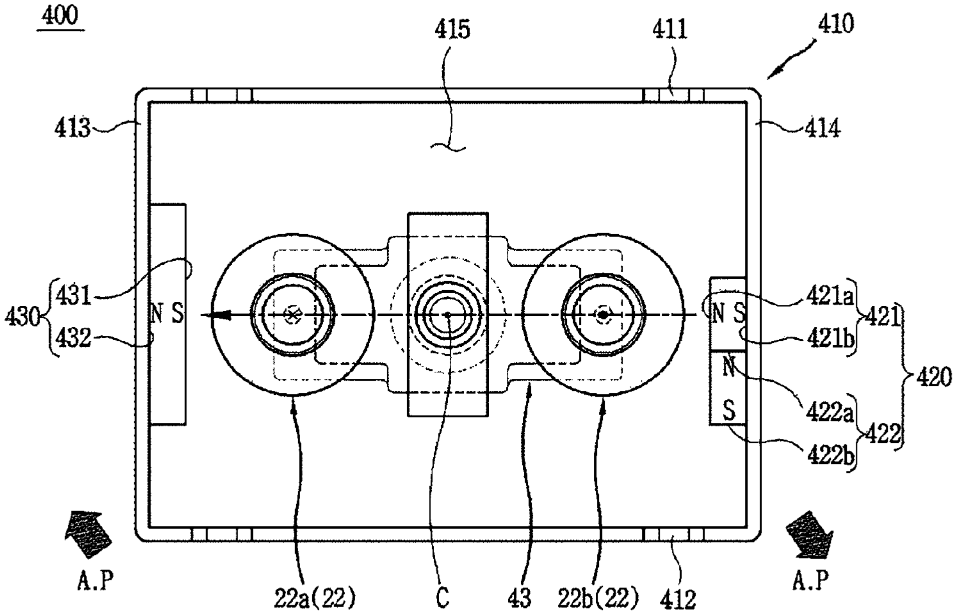
Figure 36:
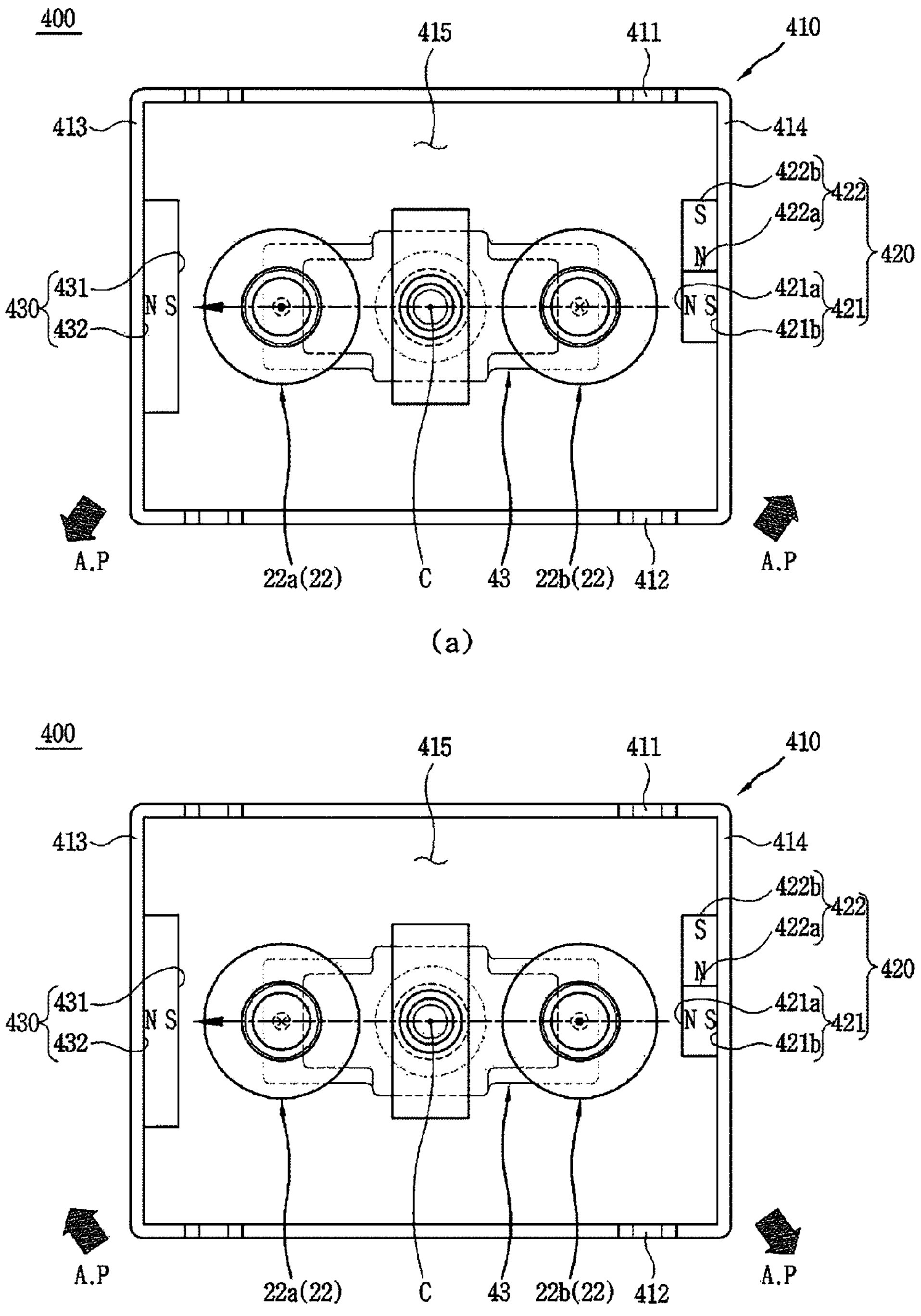
Figure 37:
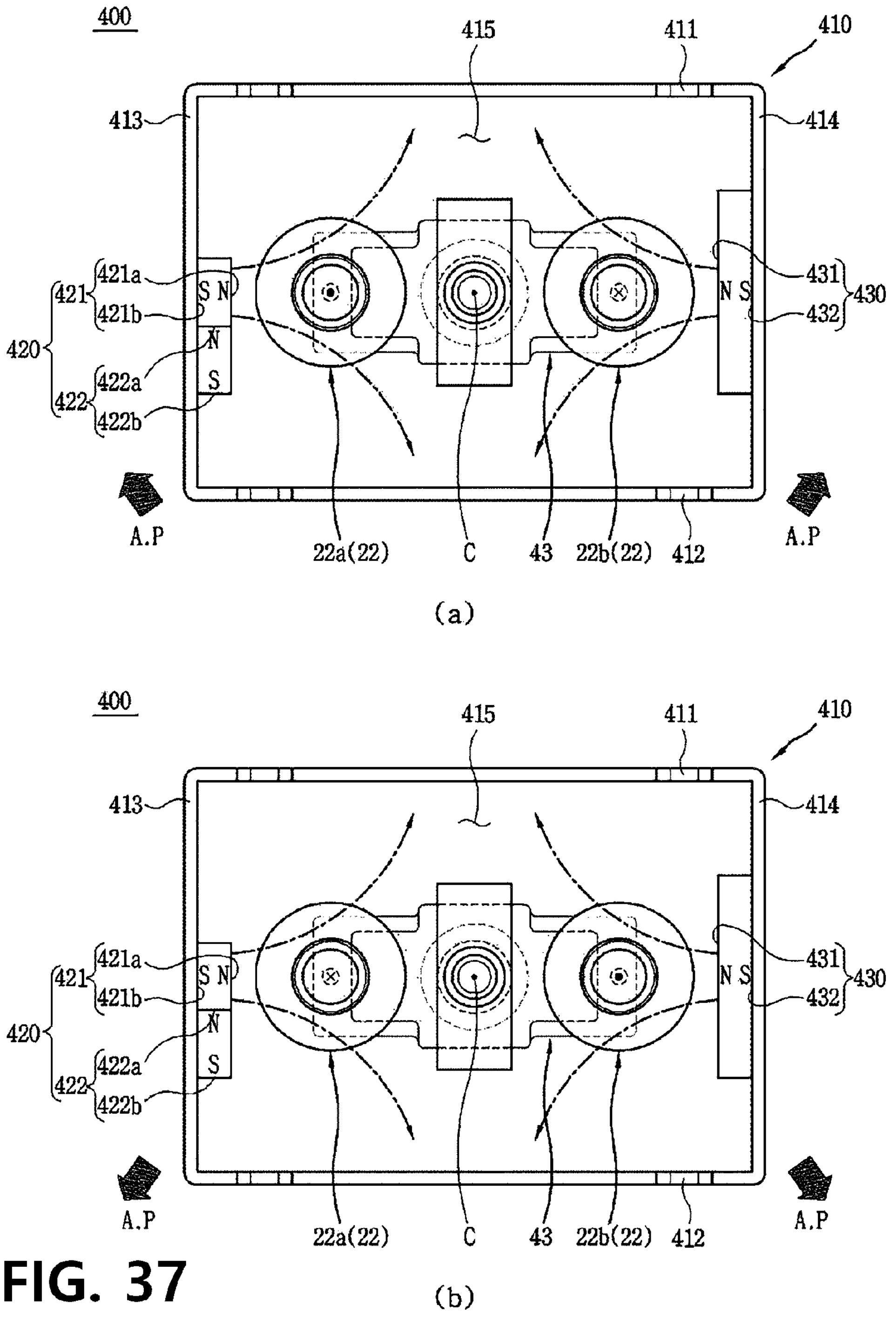
Figure 38:
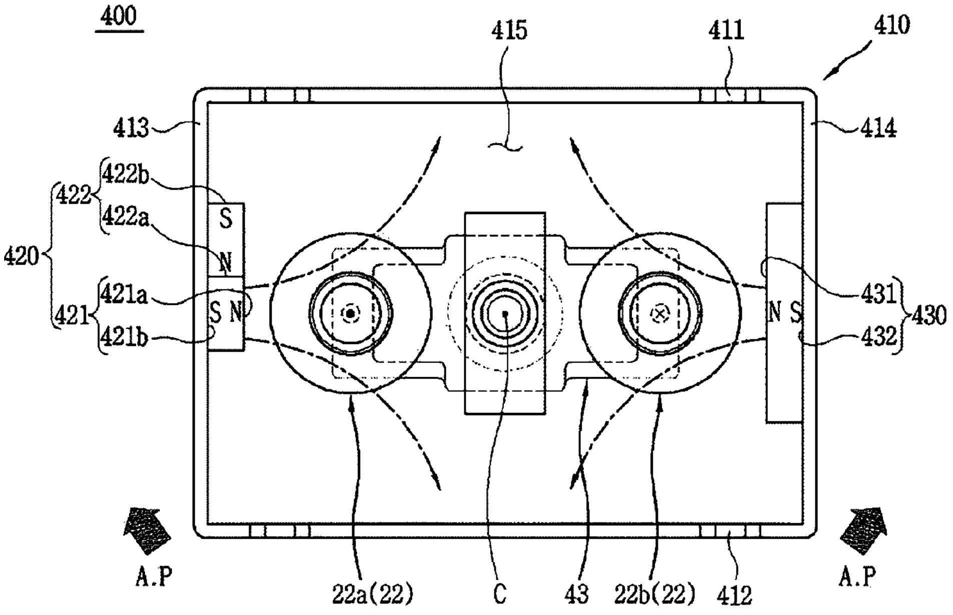
Figure 38:
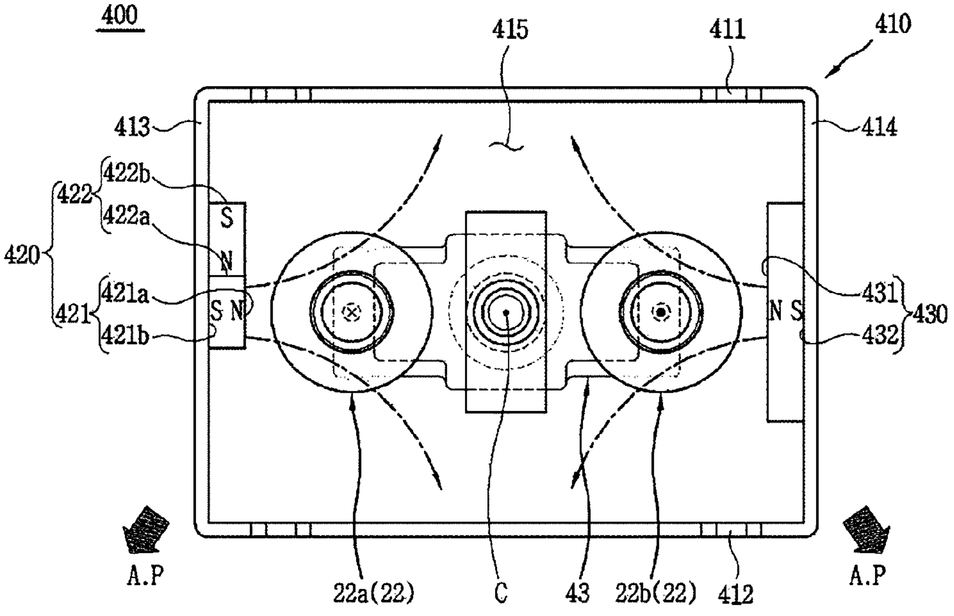
Figure 39:
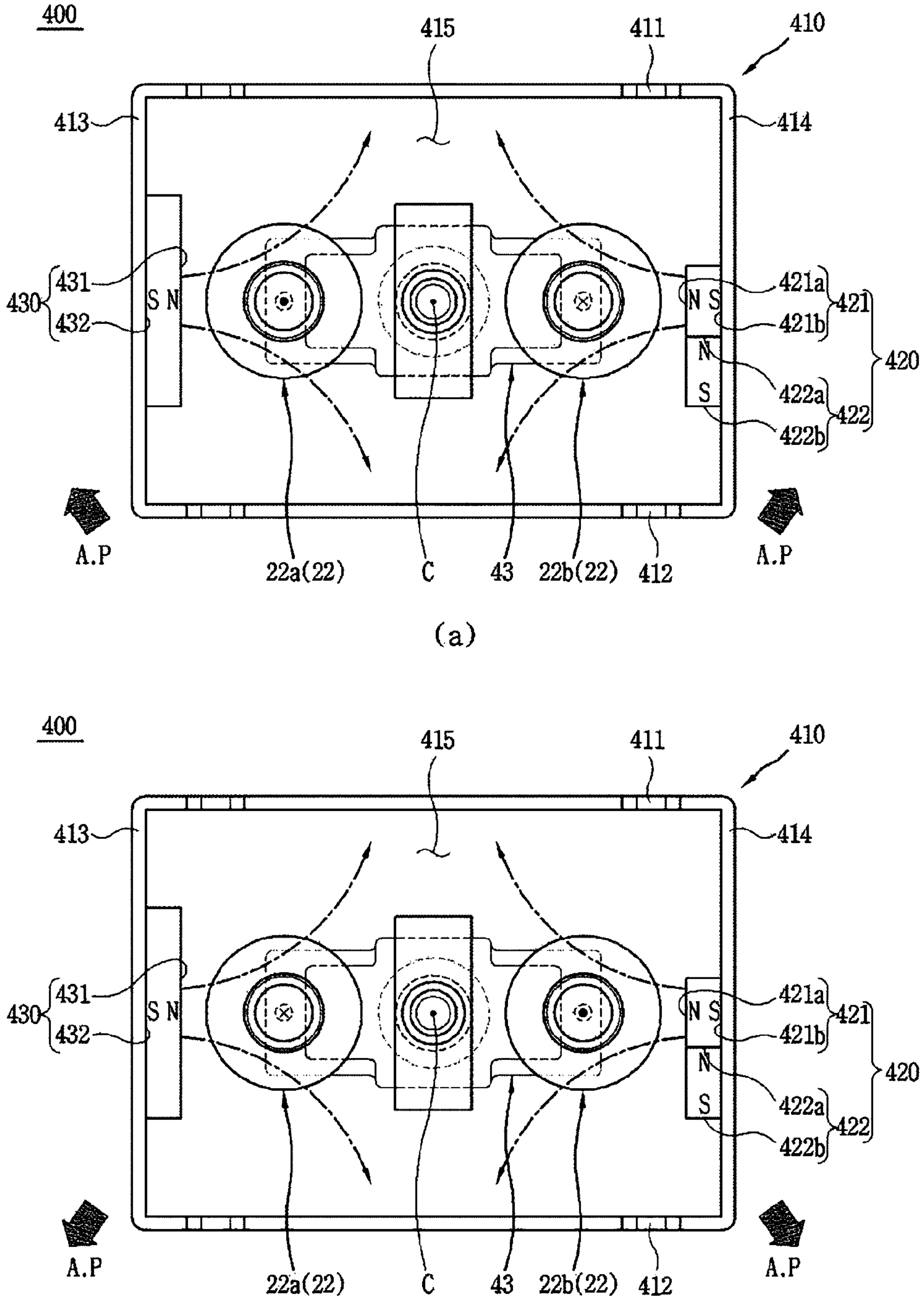
Figure 40:
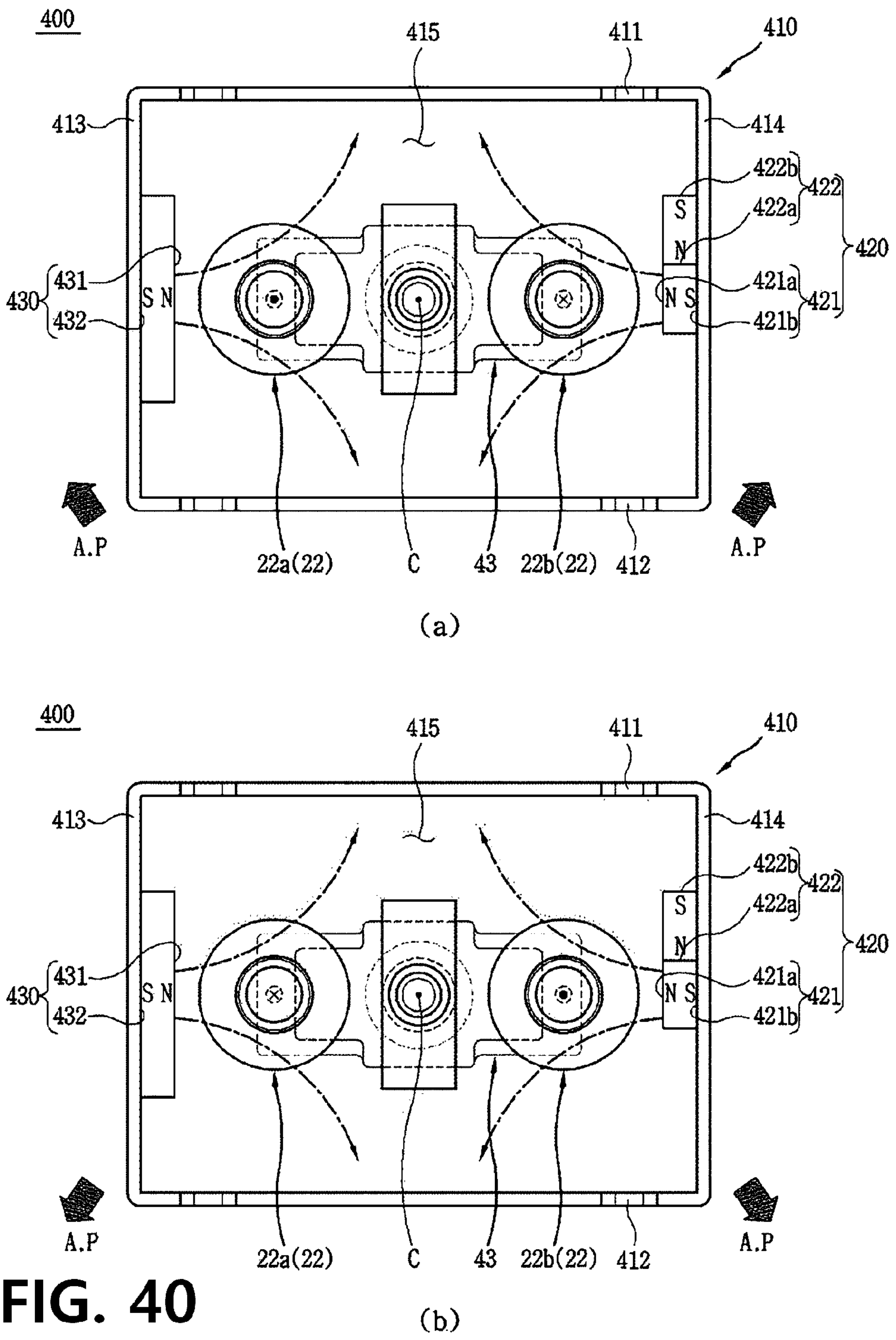
Figure 41:
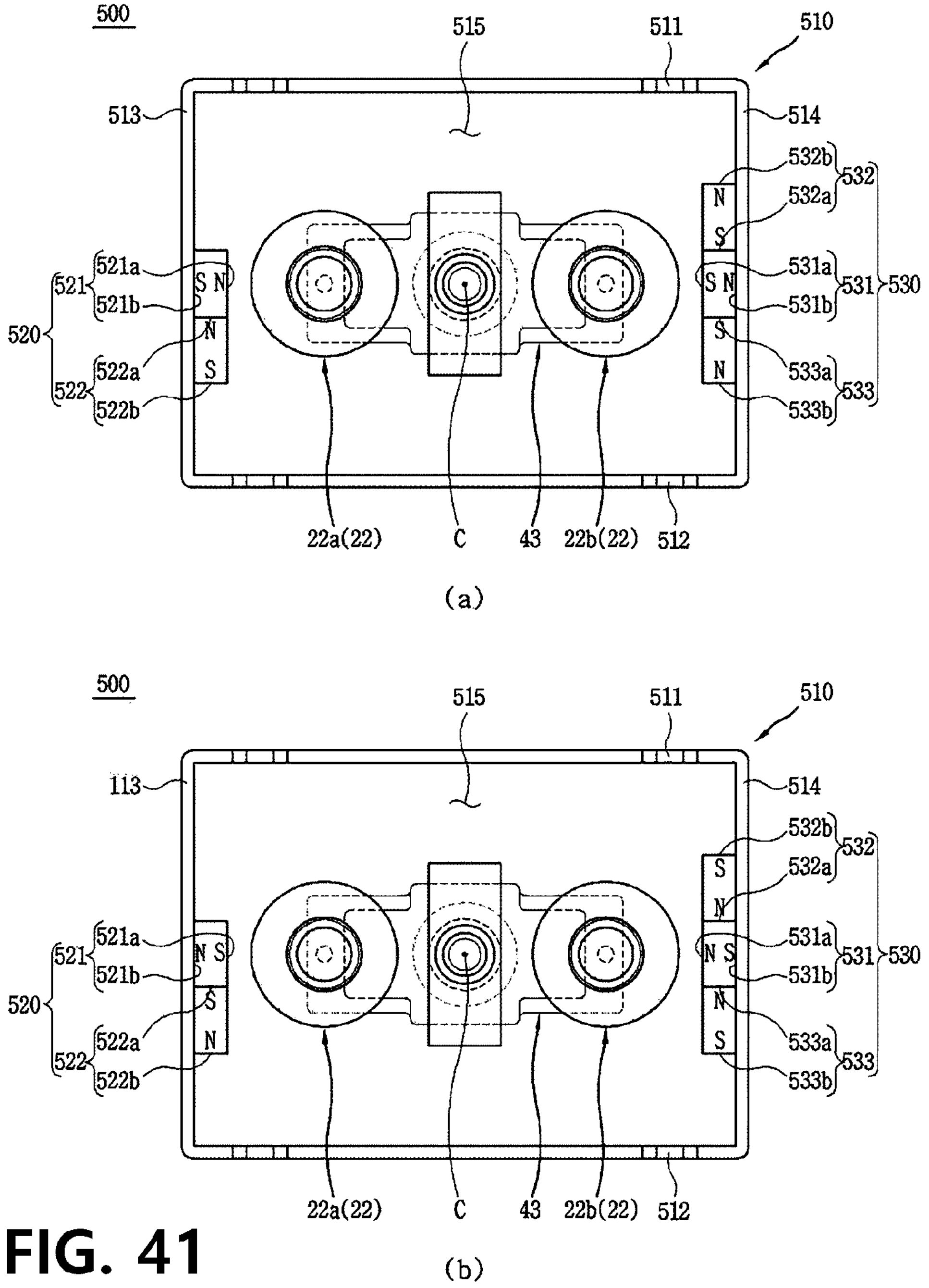
FIGS. 41 to 48 are conceptual views illustrating an arc path-forming part according to yet another embodiment of the present disclosure.
Figure 42:
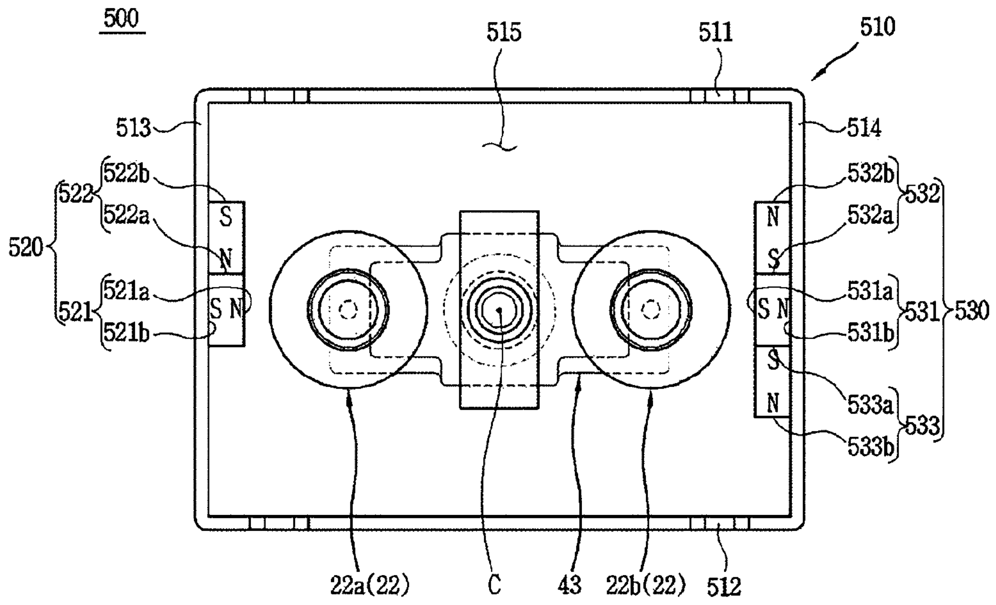
Figure 42:
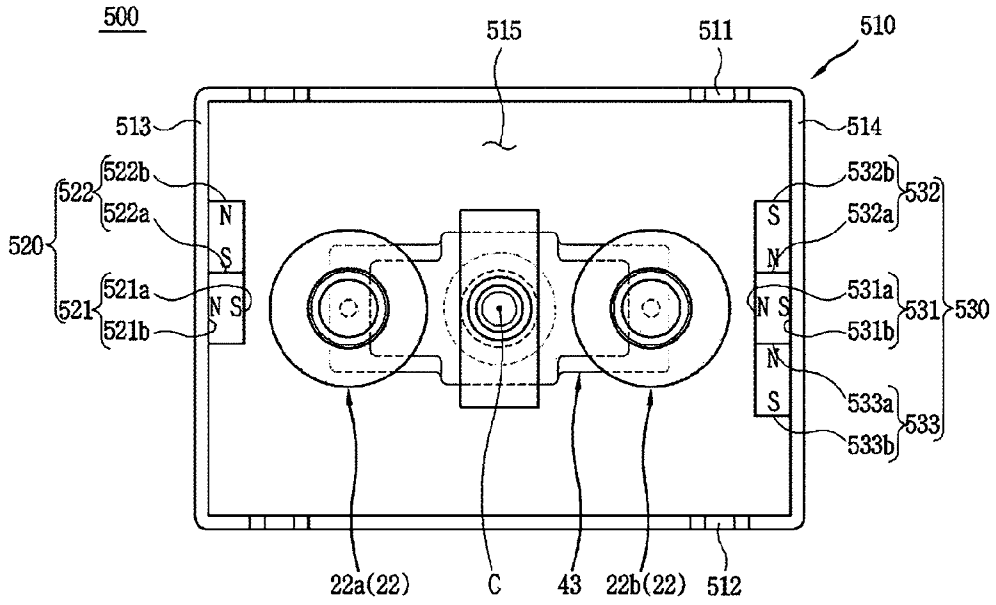
Figure 43:
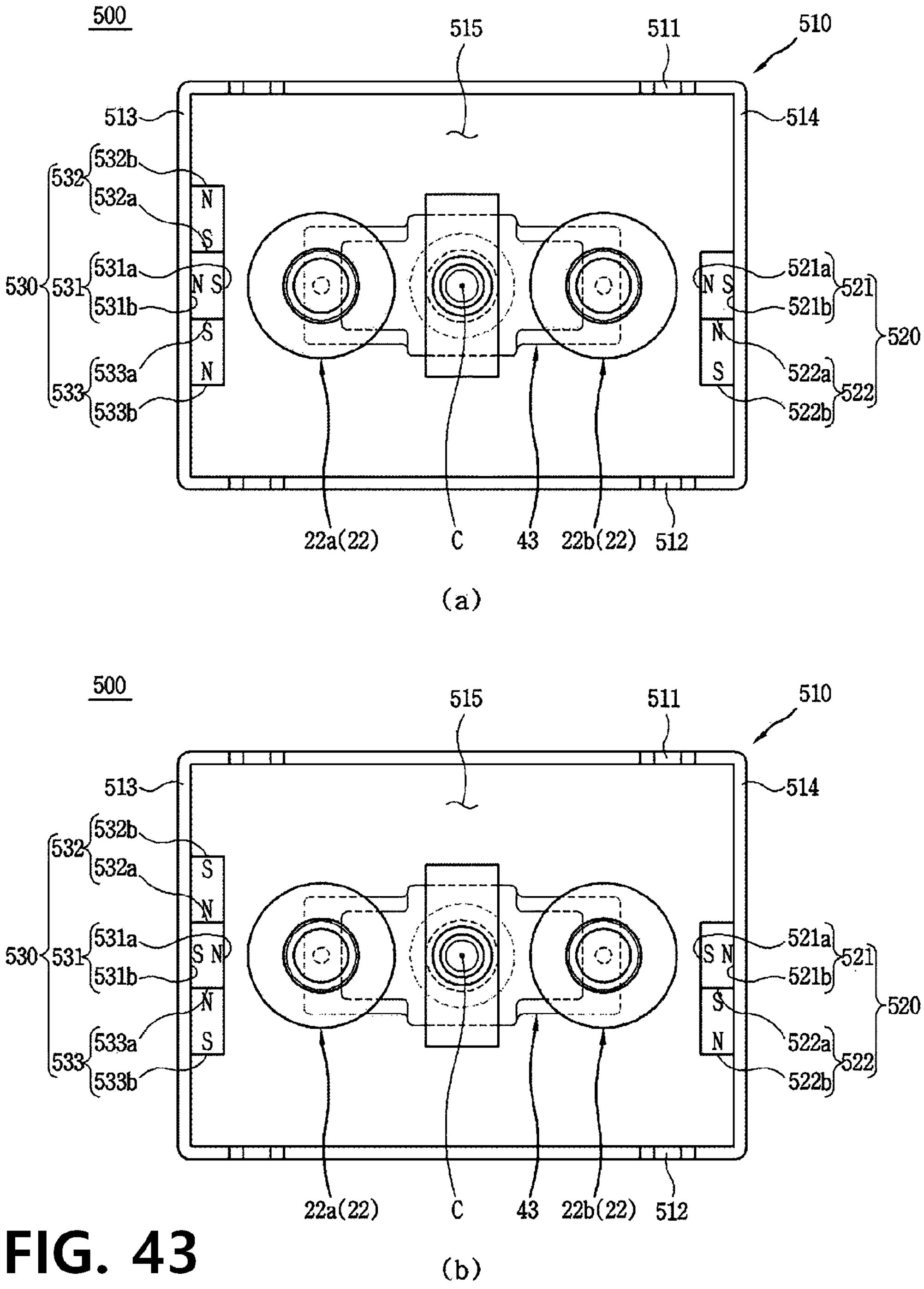
Figure 44:
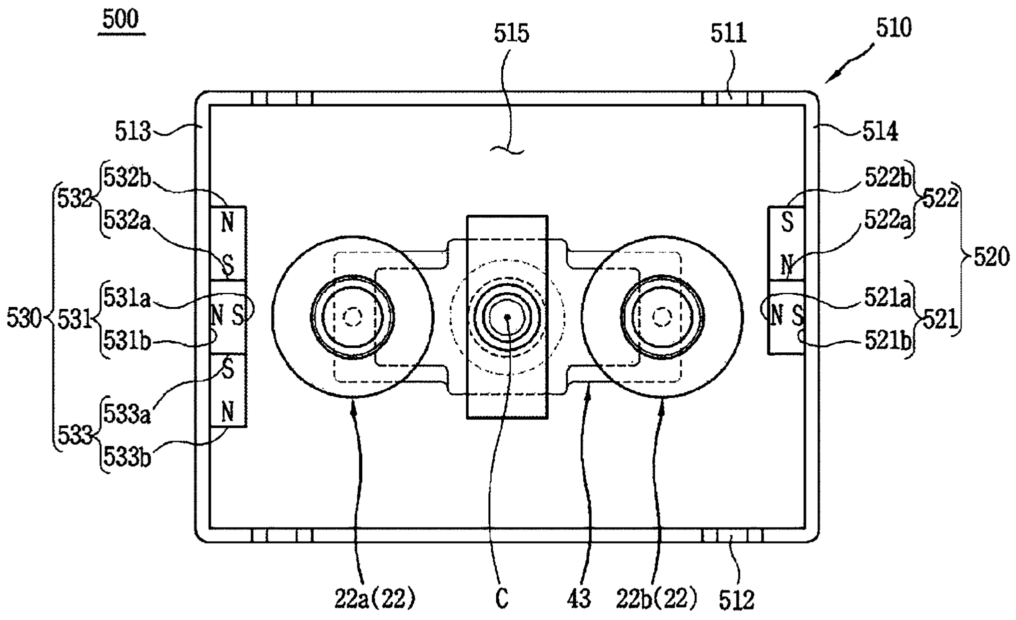
Figure 44:
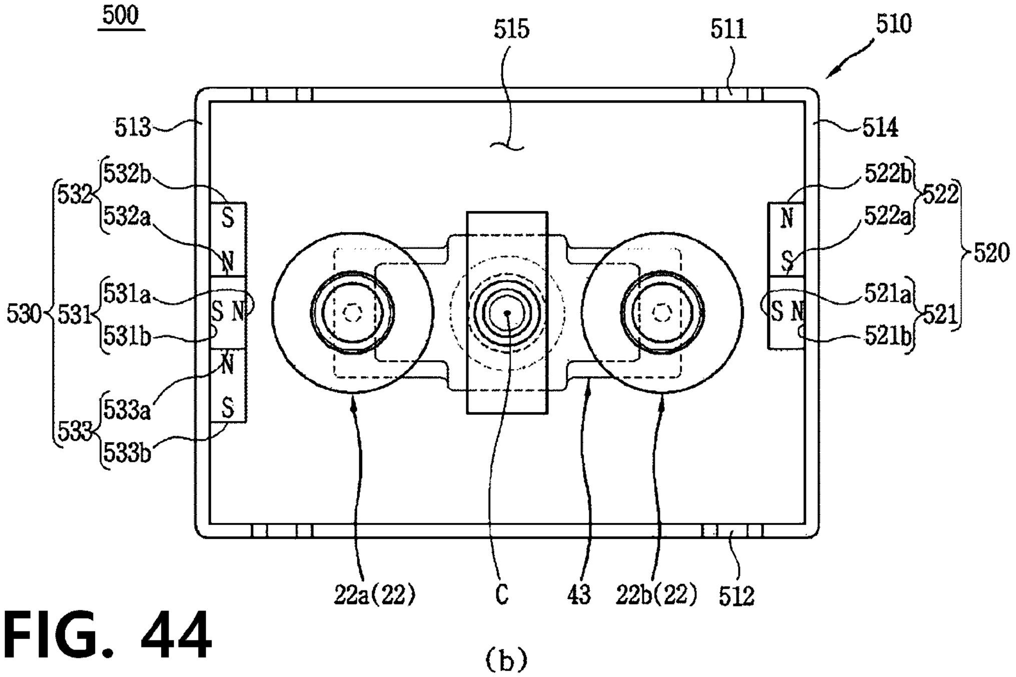
Figure 45:
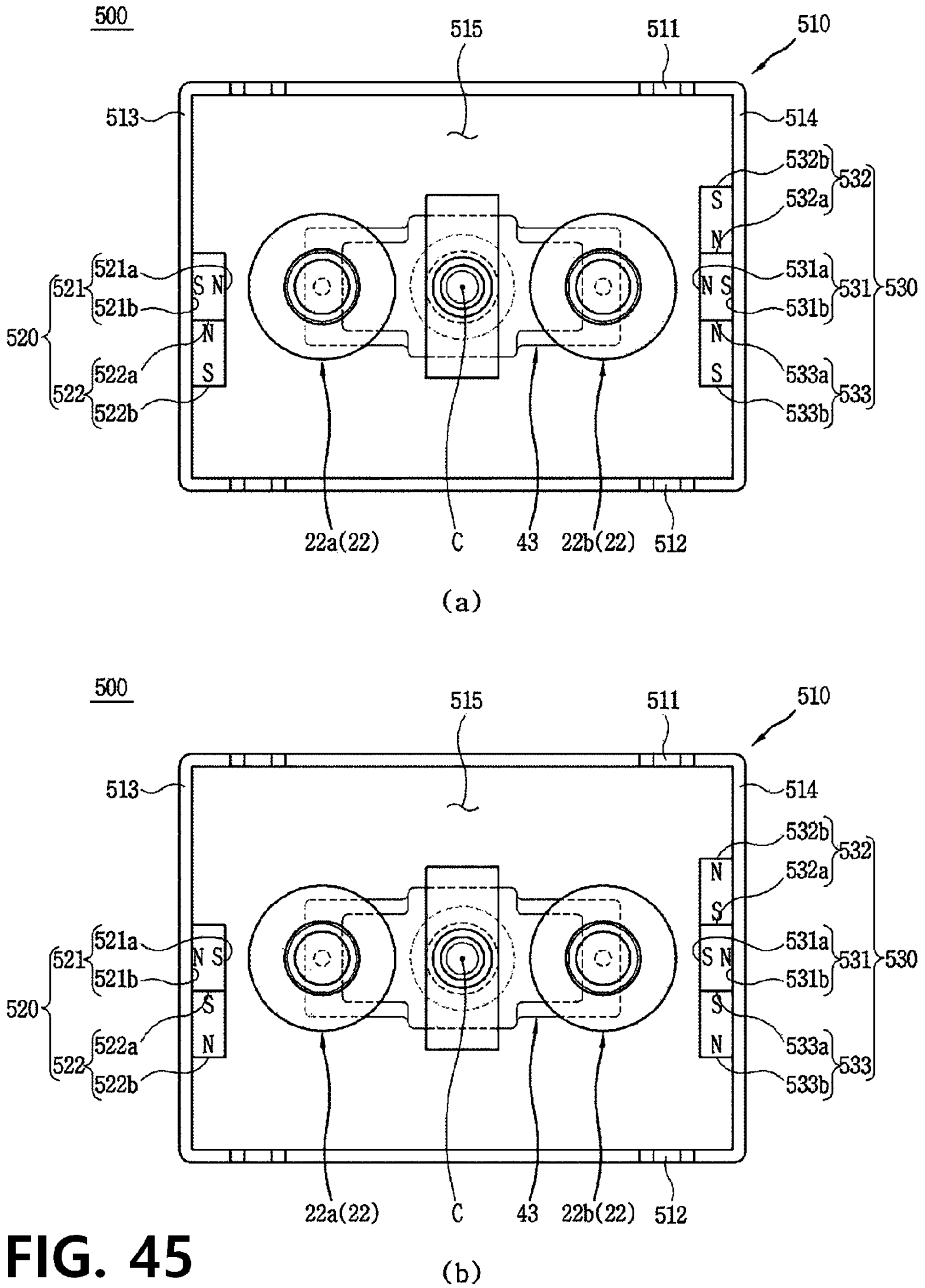
Figure 46:
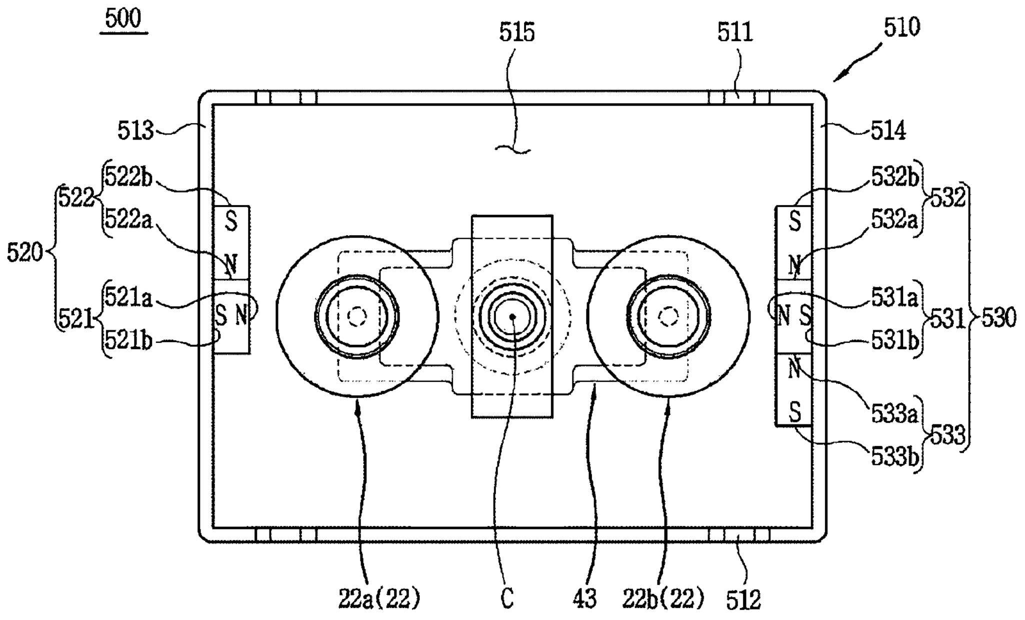
Figure 46:
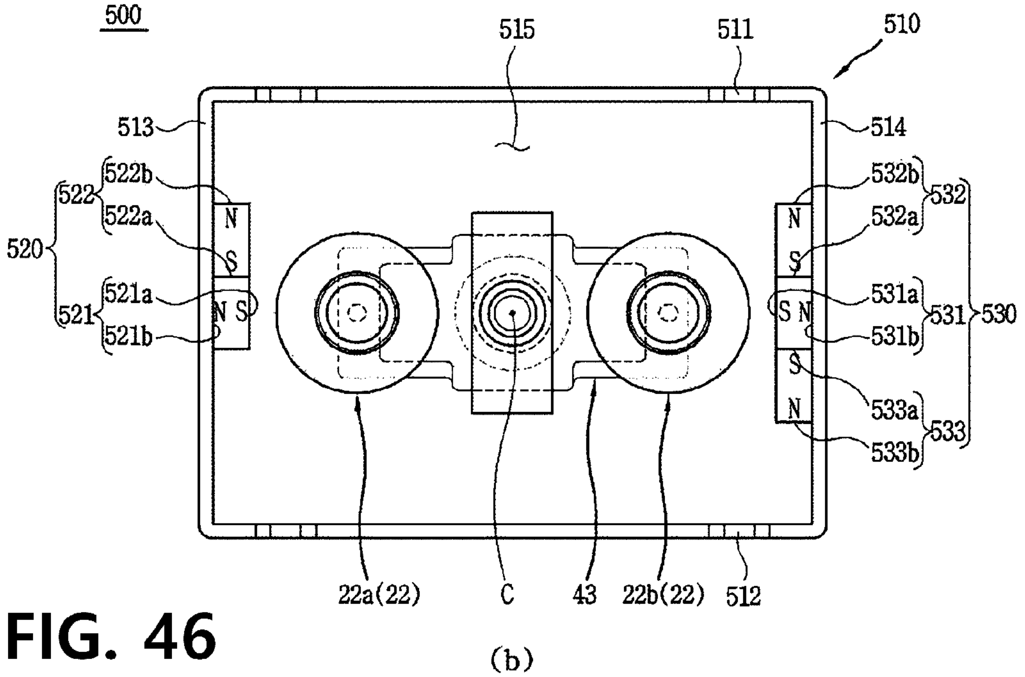
Figure 47:
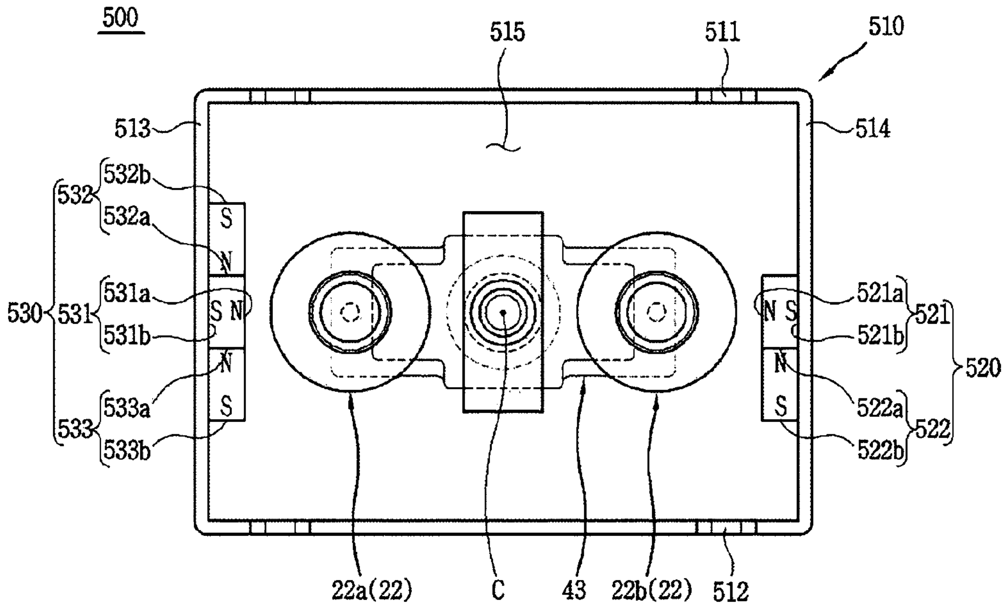
Figure 47:
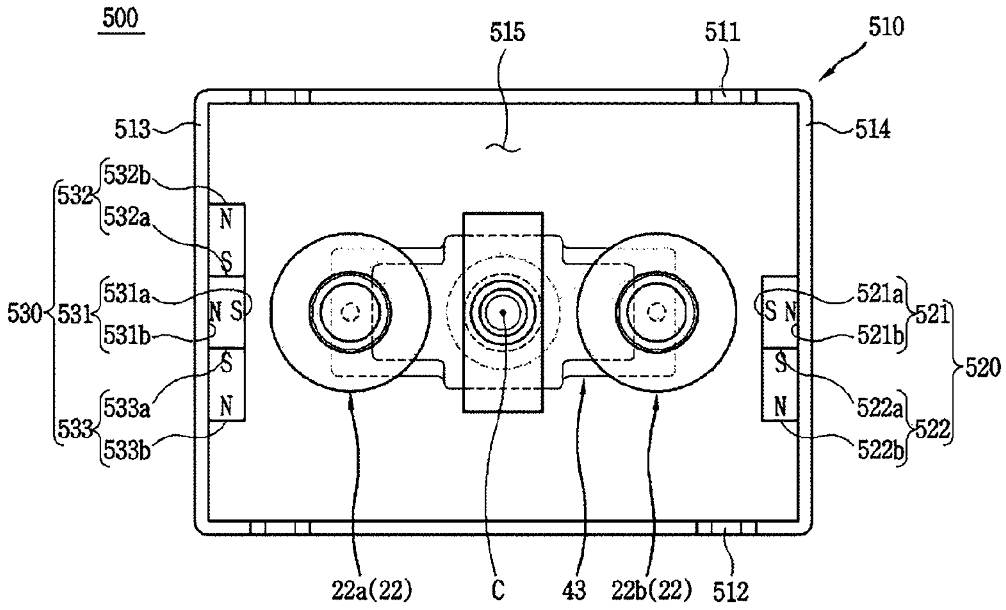
Figure 48:
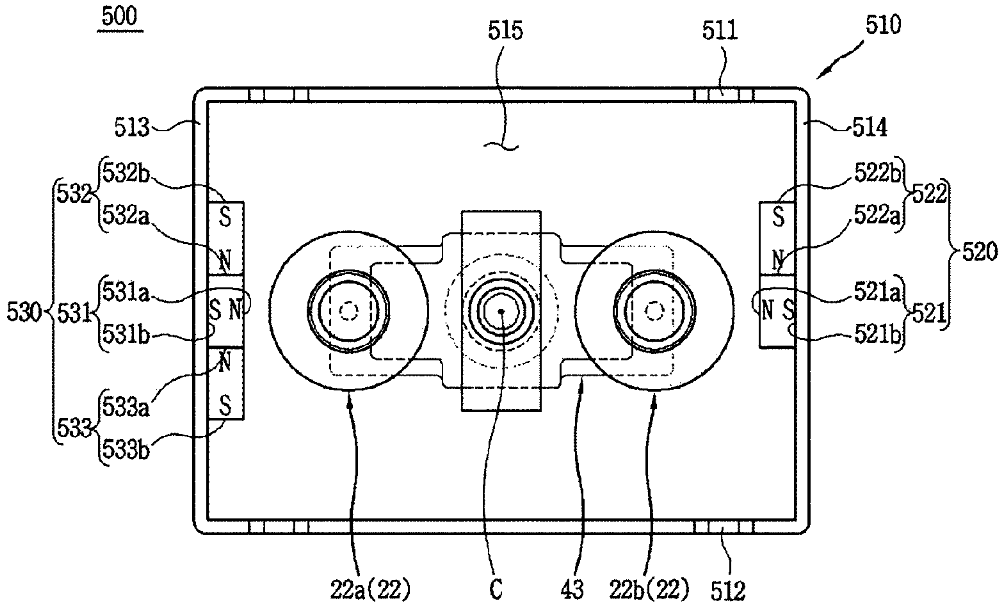
Figure 48:
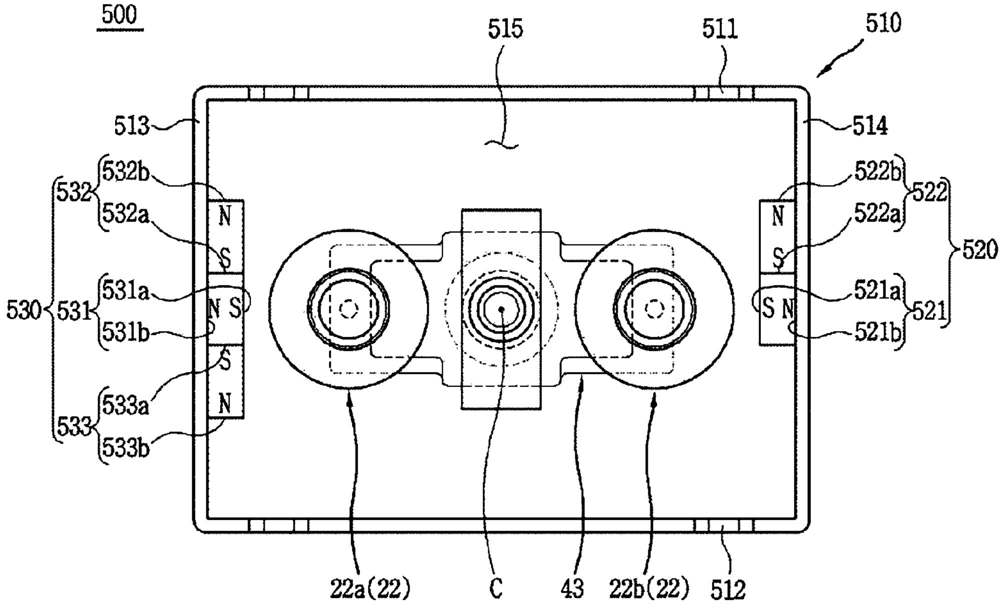
Figure 49:
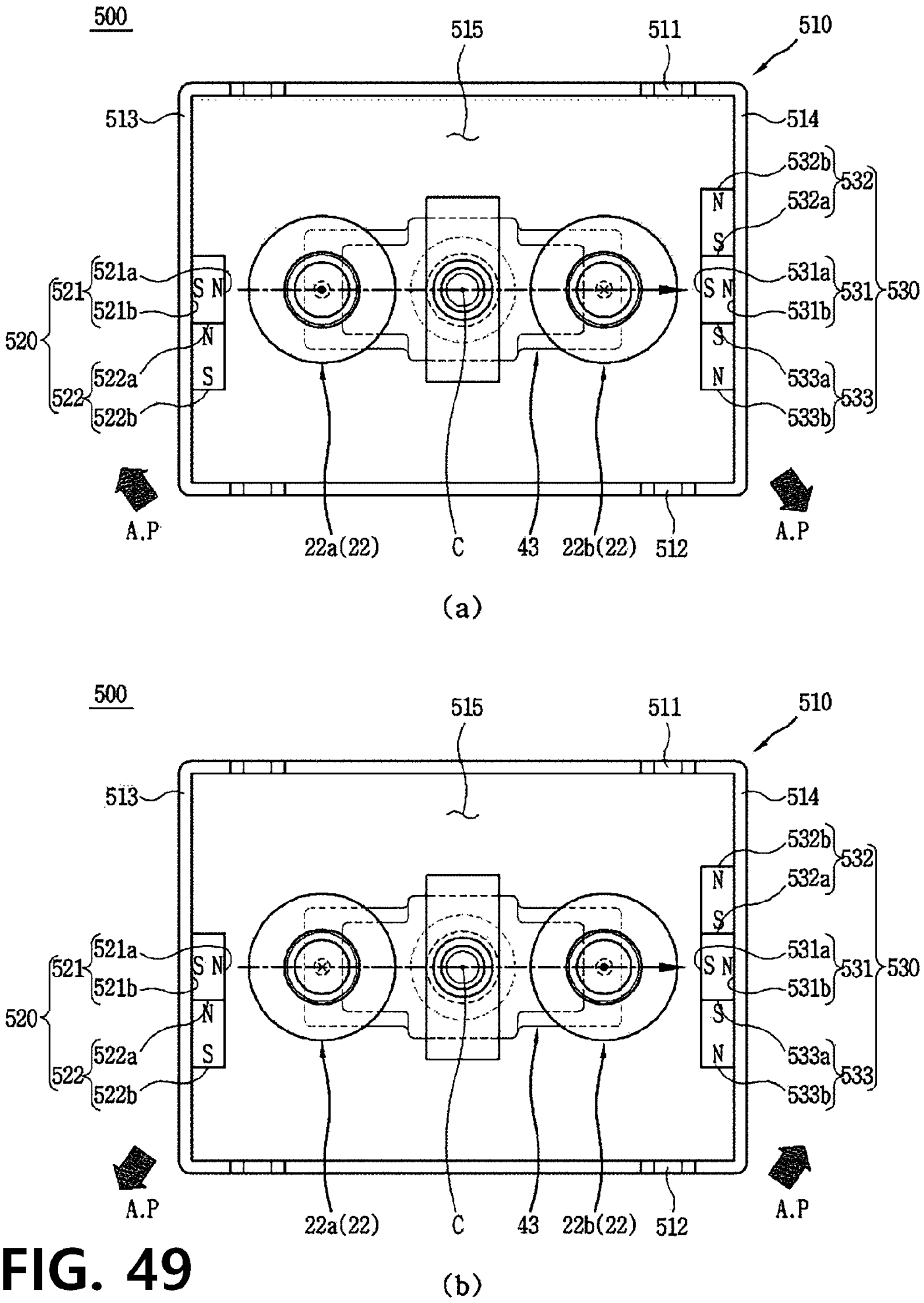
FIGS. 49 to 56 are conceptual views illustrating magnetic fields and arc paths formed by the arc path-forming part of FIGS. 41 to 48.
Figure 50:
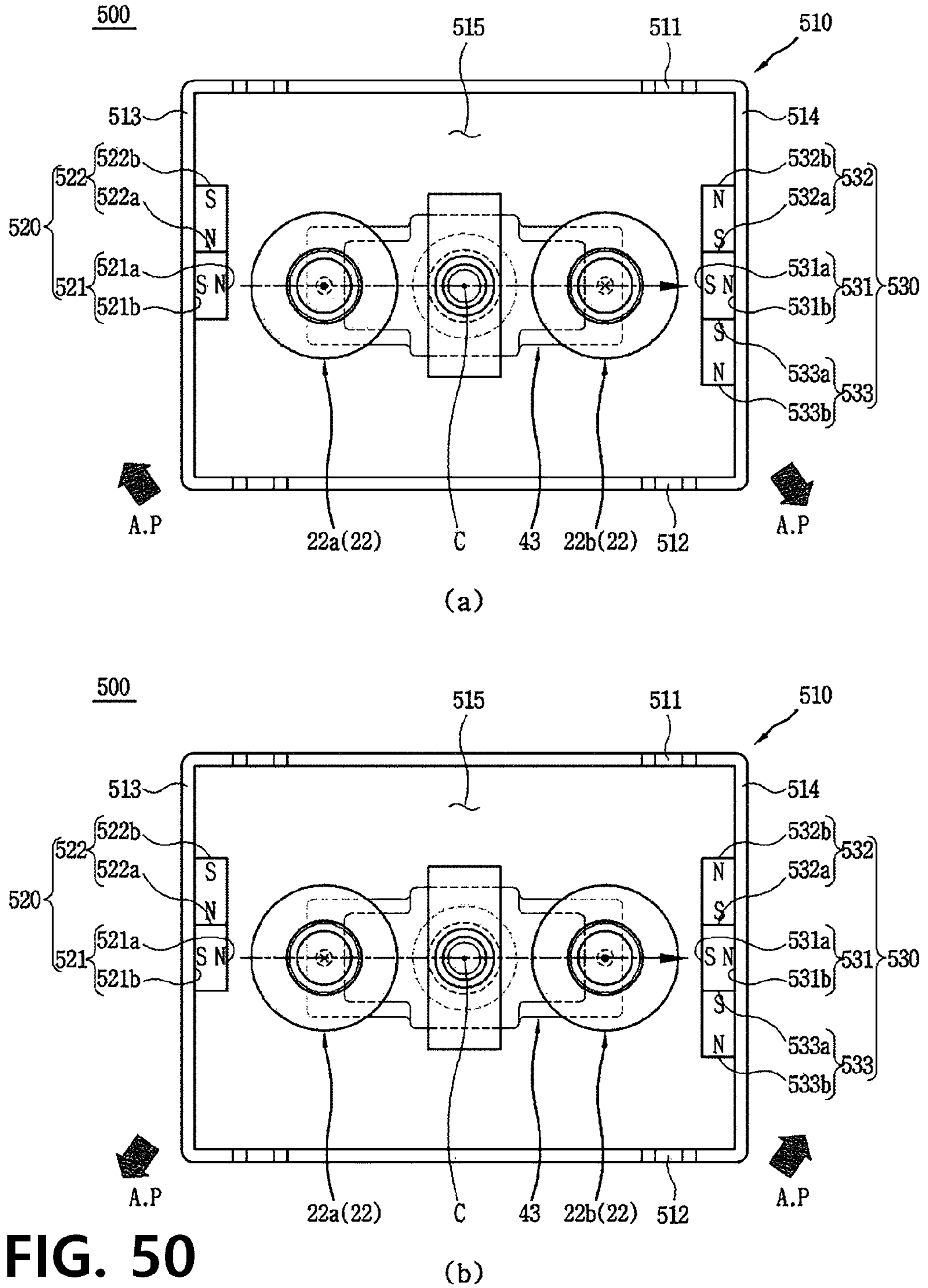
Figure 51:
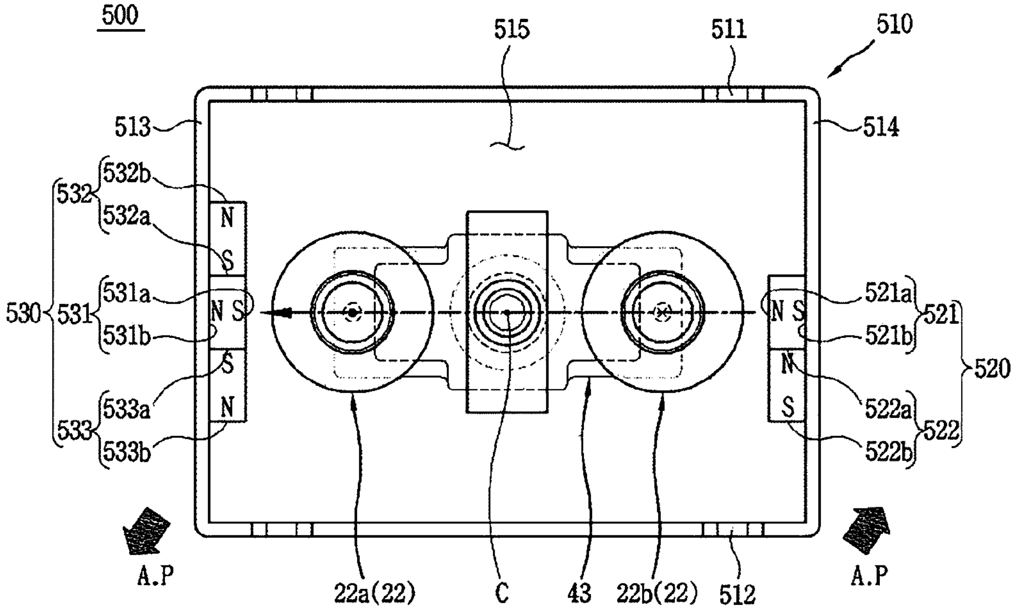
Figure 51:
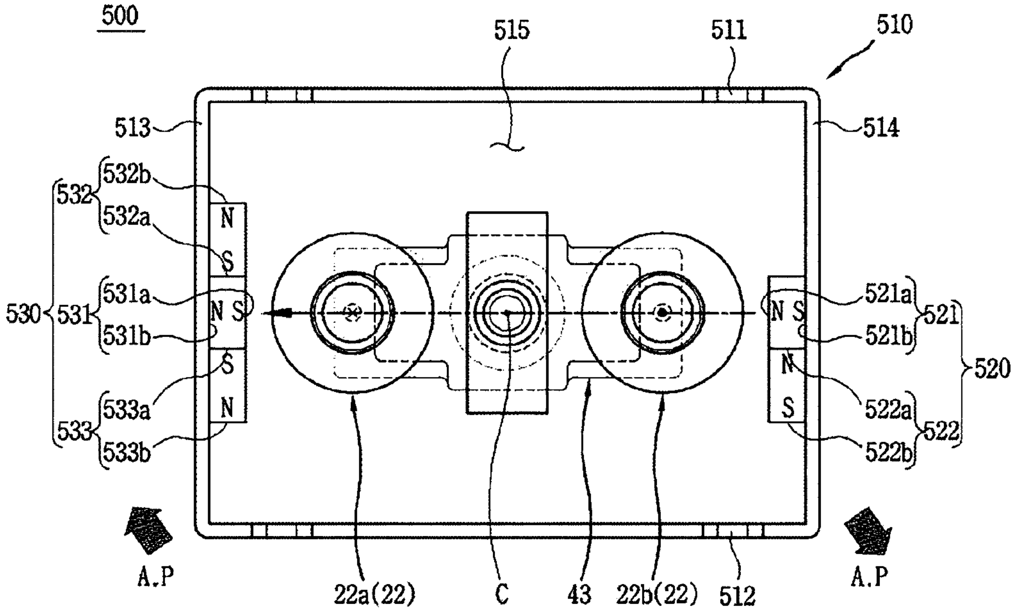
Figure 52:
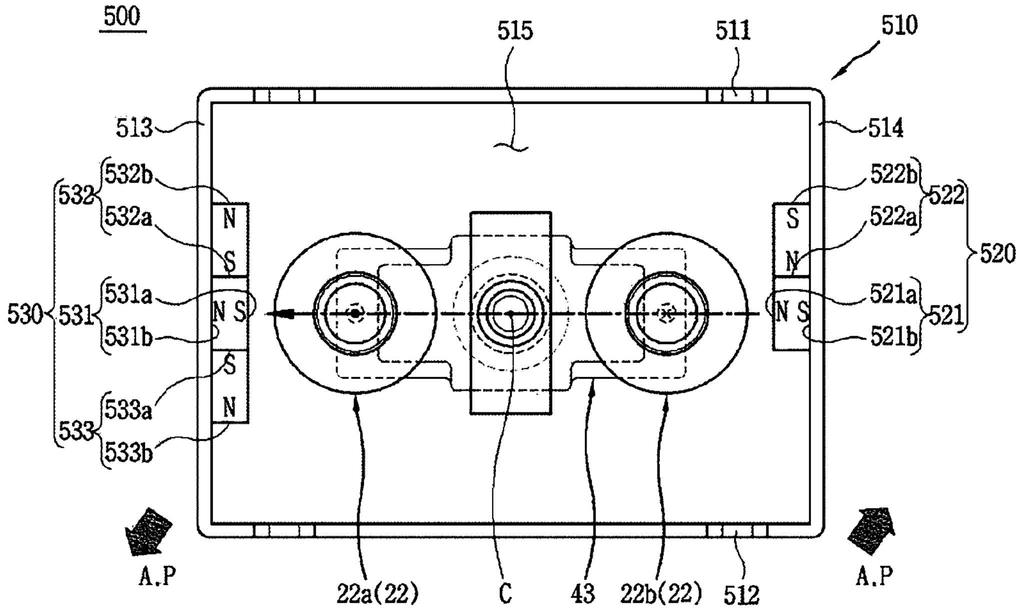
Figure 52:
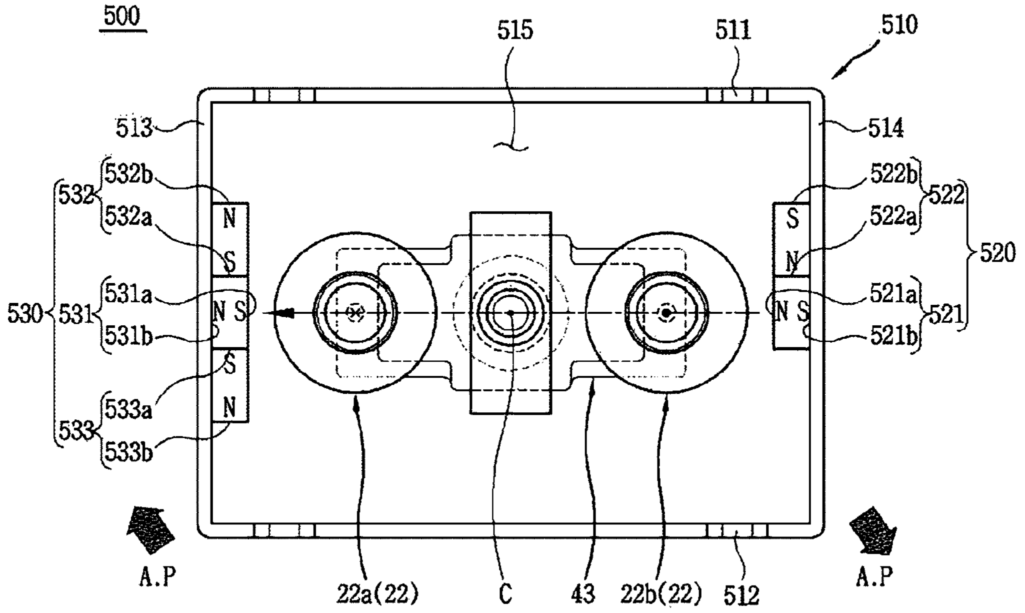
Figure 53:
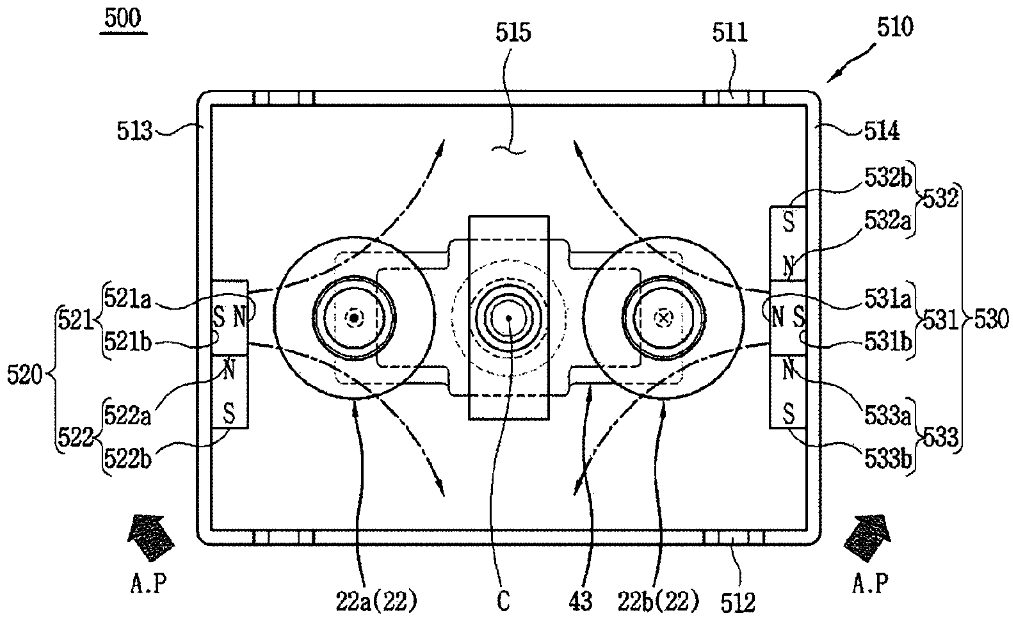
Figure 53:
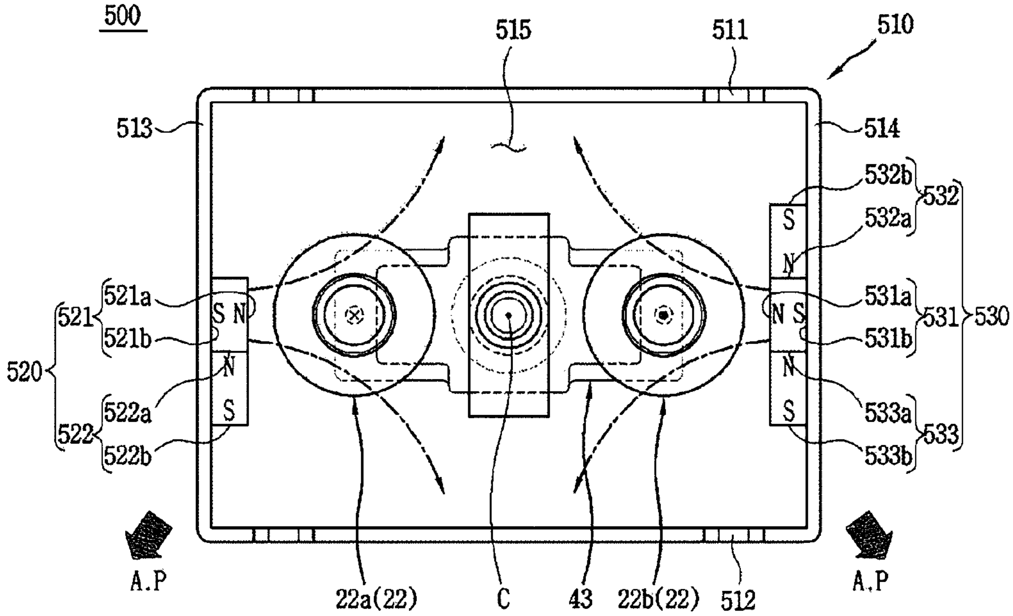
Figure 54:
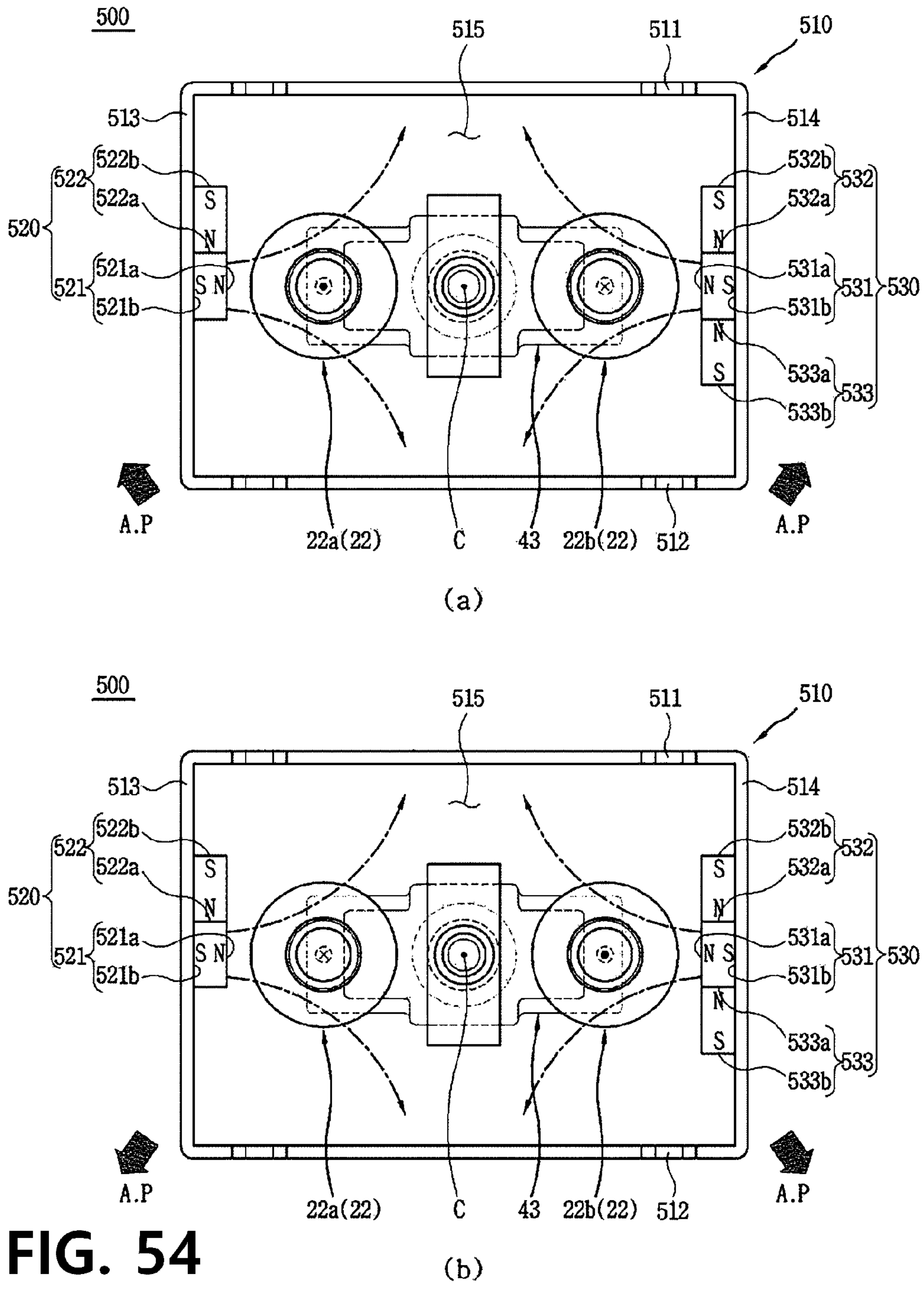
Figure 55:
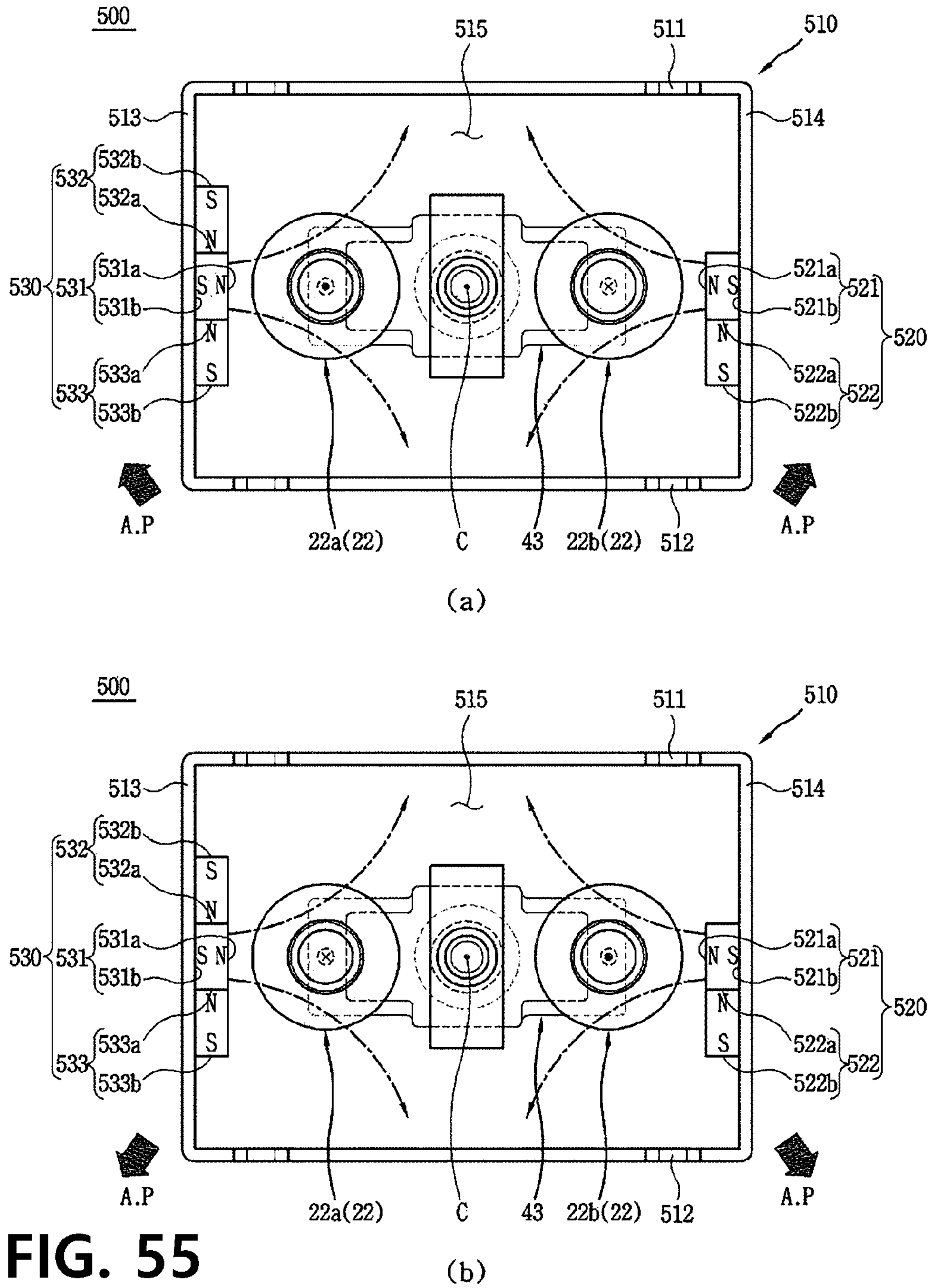

Referring to FIGS. 23 and 24, the first and second inner surfaces 321*a* and 322*a* of the first Halbach array 320 and the first and second inner surfaces 331*a* and 332*a* of the second Halbach array 330 are all magnetized to N poles.

Accordingly, magnetic fields that repel each other are formed between the first Halbach array 320 and the second Halbach array 330.

At this point, the strength of the magnetic field formed between the first Halbach array 320 and the second Halbach array 330 may be enhanced by the magnetic fields formed by the second blocks 322 and 322.

In the embodiment illustrated in FIGS. 21A, 22A, 23A, and 24A, a direction of current is a direction from the second fixed contactor 22*b* to the first fixed contactor 22*a* via the movable contactor 43.

In the embodiment illustrated in FIGS. 21A and 22A, when the Fleming's left-hand rule is applied to the first fixed contactor 22*a*, an electromagnetic force generated in the vicinity of the first fixed contactor 22*a* is formed toward the rear left side. Accordingly, an arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side. Accordingly, an arc path A.P in the vicinity of the second fixed contactor 22*b* is also formed toward the front right side.

In the embodiment illustrated in FIGS. 23A and 24A, when the Fleming's left-hand rule is applied to the first fixed contactor 22*a*, an electromagnetic force generated in the vicinity of the first fixed contactor 22*a* is formed toward the rear left side. Accordingly, the arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIGS. 21B, 22B, 23B, and 24B, a direction of current is a direction from the first fixed contactor 22*a* to the second fixed contactor 22*b* via the movable contactor 43.

In the embodiment illustrated in FIGS. 21B and 22B, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIGS. 23B and 24B, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the front right side. Accordingly, the arc path A.P in the vicinity of the second fixed contactor 22*b* is also formed toward the front right side.

Although not illustrated in the drawing, when the polarity of each surface of the first Halbach array 320 and the second Halbach array 330 is changed, the direction of the magnetic field formed in the first Halbach array 320 and the second Halbach array 330 is reversed. Accordingly, the generated electromagnetic force and the arc path A.P are also formed so that the front-rear direction thereof is reversed.

That is, in the electric connection situation shown in FIGS. 21A and 22A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the rear right side.

In the electric connection situation shown in FIGS. 23A and 24A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the front right side.

Similarly, in the electric connection situation shown in FIGS. 21B and 22B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the front right side.

In the electric connection situation shown in FIGS. 23B and 24B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the rear right side.

Accordingly, in the arc path-forming part 300 according to the present embodiment, the electromagnetic force and the arc path A.P may be formed in a direction away from the central part C regardless of the polarity of each of the first Halbach array 320 and the second Halbach array 330 or the direction of the current flowing through the DC relay 1.

Accordingly, damage to each component of the DC relay 1 disposed adjacent to the central part C can be prevented. Furthermore, since the generated arc can be quickly discharged to the outside, operational reliability of the DC relay 1 can be improved.

(4) Description of Arc Path-Forming Part 400 According to Yet Another Embodiment of Present Disclosure Hereinafter, an arc path-forming part 400 according to yet another embodiment of the present disclosure will be described in detail with reference to FIGS. 25 to 40.

Referring to FIGS. 25 to 32, the arc path-forming part 400 according to the illustrated embodiment includes a magnet frame 410, a Halbach array 420, and a magnet part 430.

The magnet frame 410 according to the present embodiment has the same structure and function as the magnet frame 110 according to the above-described embodiment. However, there is a difference in the arrangement method of the Halbach array 420 and the magnet part 430 disposed in the magnet frame 410 according to the present embodiment.

Accordingly, a description of the magnet frame 410 will be replaced with the description of the magnet frame 110 according to the above-described embodiment.

In the illustrated embodiment, a plurality of magnetic materials constituting the Halbach array 420 are continuously arranged side by side from the rear side to the front side. That is, the Halbach array 420 is formed to extend in the front-rear direction.

The Halbach array 420 may form a magnetic field together with another magnetic material. In the illustrated embodiment, the Halbach array 420 may form a magnetic field together with the magnet part 430.

The Halbach array 420 may be located adjacent to any one surface of third and fourth surfaces 413 and 414. The Halbach array 420 may be coupled to an inner side (i.e., the side in a direction toward a space part 415) of the any one surface.

In the embodiment illustrated in FIGS. 25, 26, 29, and 30, the Halbach array 420 is disposed on an inner side of the third surface 413, and disposed adjacent to the third surface 413. In addition, in the embodiment illustrated in FIGS. 27, 28, 31, and 32, the Halbach array 420 is disposed on an inner side of the fourth surface 414, and disposed adjacent to the fourth surface 414.

The Halbach array 420 is disposed to face the magnet part 430. In the embodiment illustrated in FIGS. 25, 26, 29, and 30, the Halbach array 420 is disposed to face the magnet part 430 located on the inner side of the fourth surface 414. In addition, in the embodiment illustrated in FIGS. 27, 28, 31, and 32, the Halbach array 420 is disposed to face the magnet part 430 located on the inner side of the third surface 413.

The Halbach array 420 is located to be biased to any one surface of a first surface 411 and a second surface 412. In the embodiment illustrated in FIGS. 25, 27, 29, and 31, the Halbach array 420 is located to be biased to the first surface 411. In the embodiment illustrated in FIGS. 26, 28, 30, and 32, the Halbach array 420 is located to be biased to the second surface 412.

The space part 415, and the fixed contactor 22 and the movable contactor 43 accommodated in the space part 415 are located between the Halbach array 420 and the magnet part 430.

The Halbach array 420 may enhance the strength of the magnetic field formed by itself and the magnetic field formed together with the magnet part 430. Since the process of enhancing the direction and magnetic field of the magnetic field formed by the Halbach array 420 is well known in the art, a detailed description thereof will be omitted.

In the illustrated embodiment, the Halbach array 420 includes a first block 421 and a second block 422. It will be understood that the plurality of magnetic materials constituting the Halbach array 420 are named as the blocks 421 and 422, respectively.

The first and second blocks 421 and 422 may each be formed of a magnetic material. In one embodiment, the first and second blocks 421 and 422 may each be provided as a permanent magnet, an electromagnet, or the like.

The first and second blocks 421 and 422 may be disposed side by side in one direction. In the illustrated embodiment, the first and second blocks 421 and 422 are disposed side by side in a direction in which the third surface 413 extends, that is, in the front-rear direction.

In the embodiment illustrated in FIGS. 25, 27, 29, and 31, of the first and second blocks 421 and 422, the first block 421 is disposed at the rear side, and the second block 422 is disposed at the front side.

In addition, in the embodiment illustrated in FIGS. 26, 28, 30, and 32, of the first and second blocks 421 and 422, the first block 421 is disposed at the front side, and the second block 422 is disposed at the rear side.

The first block 421 may be disposed to overlap each of the fixed contactors 22*a* and 22*b* in a direction toward the magnet part 430, i.e., in the left-right direction in the illustrated embodiment. In addition, the first block 421 may be disposed to overlap the magnet part 430 in the left-right direction.

In one embodiment, the first and second blocks 421 and 422 may be in contact with each other.

Each of the blocks 421 and 422 includes a plurality of surfaces.

Specifically, the first block 421 includes a first inner surface 421*a* facing the space part 415 or the magnet part 430 and a first outer surface 421*b* opposite to the space part 415 or the magnet part 430.

The second block 422 includes a second inner surface 422*a* facing the first block 421 and a second outer surface 422*b* opposite to the first block 421.

The plurality of surfaces of each of the blocks 421 and 422 may be magnetized according to a predetermined rule to configure a Halbach array.

In the embodiment illustrated in FIGS. 25 to 28, the first and second inner surfaces 421*a* and 422*a* are magnetized to the same polarity. At this point, the first and second inner surfaces 421*a* and 422*a* may be magnetized to the same polarity as an opposing surface 432 of the magnet part 430.

In addition, the first and second outer surfaces 421*b* and 422*b* are magnetized to the same polarity. At this point, the first and second outer surfaces 421*b* and 422*b* may be magnetized to the same polarity as a facing surface 431 of the magnet part 430.

In the embodiment illustrated in FIGS. 29 to 32, the first and second inner surfaces 421*a* and 422*a* are magnetized to the same polarity. At this point, the first and second inner surfaces 421*a* and 422*a* may be magnetized to the same polarity as the facing surface 431 of the magnet part 430.

In addition, the first and second outer surfaces 421*b* and 422*b* are magnetized to the same polarity. At this point, the first and second outer surfaces 421*b* and 422*b* may be magnetized to the same polarity as the opposing surface 432 of the magnet part 430.

The magnet part 430 forms a magnetic field by itself or together with the Halbach array 420. An arc path A.P may be formed inside the arc chamber 21 by the magnetic field formed by the magnet part 430.

The magnet part 430 may be located adjacent to the other surface of the third surface 413 and the fourth surface 414.

In the embodiment illustrated in FIGS. 25, 26, 29, and 30, the magnet part 430 is disposed on the inner side of the fourth surface 414, and disposed adjacent to the fourth surface 414. In addition, in the embodiment illustrated in FIGS. 27, 28, 31, and 32, the magnet part 430 is disposed on the inner side of the third surface 413, and disposed adjacent to the third surface 413.

The magnet part 430 is disposed to face the Halbach array 420.

In the embodiment illustrated in FIGS. 25, 26, 29, and 30, the magnet part 430 is disposed to face the Halbach array 420 located on the inner side of the third surface 413. In addition, in the embodiment illustrated in FIGS. 27, 28, 31, and 32, the magnet part 430 is disposed to face the Halbach array 420 located on the inner side of the fourth surface 414.

The magnet part 430 may be located in the vicinity of a center of the other surface of the third surface 413 and the fourth surface 414. In other words, the shortest distance between the magnet part 430 and the first surface 411 and the shortest distance between the magnet part 430 and the second surface 412 may be the same.

The space part 415, and the fixed contactor 22 and the movable contactor 43 accommodated in the space part 415 are located between the magnet part 430 and the Halbach array 420.

The magnet part 430 is formed to extend in one direction. In the illustrated embodiment, the magnet part 430 is formed to extend in the front-rear direction.

The magnet part 430 includes a plurality of surfaces.

Specifically, the magnet part 430 includes the facing surface 431 facing the space part 415 or the Halbach array 420 and the opposing surface 432 opposite to the space part 415 or the Halbach array 420.

Each surface of the magnet part 430 may be magnetized according to a predetermined rule.

In the embodiment illustrated in FIGS. 25 to 28, the facing surface 431 of the magnet part 430 is magnetized to a polarity different from that of the first and second inner surfaces 421*a* and 422*a* of the Halbach array 420. That is, the facing surface 431 of the magnet part 430 is magnetized to the same polarity as the first and second outer surfaces 421*b* and 422*b* of the Halbach array 420.

In the embodiment illustrated in FIGS. 29 to 32, the facing surface 431 of the magnet part 430 is magnetized to a polarity different from that of the first and second outer surfaces 421*b* and 422*b* of the Halbach array 420. That is, the facing surface 431 of the magnet part 430 is magnetized to the same polarity as the first and second inner surfaces 421*a* and 422*a* of the Halbach array 420.

Hereinafter, an arc path A.P formed by the arc path-forming part 400 according to the present embodiment will be described in detail with reference to FIGS. 32 to 40.

Referring to FIGS. 33 to 36, the first and second inner surfaces 421*a* and 422*a* of the Halbach array 420 are magnetized to N poles. In addition, the facing surface 431 of the magnet part 430 is magnetized to an S pole.

Accordingly, a magnetic field in a direction from the first inner surface 421*a* toward the facing surface 431 is formed between the Halbach array 420 and the magnet part 430.

Referring to FIGS. 37 to 40, the first and second inner surfaces 421*a* and 422*a* of the Halbach array 420 and the facing surface 431 of the magnet part 430 are all magnetized to N poles.

Accordingly, magnetic fields that repel each other are formed between the Halbach array 420 and the magnet part 430.

At this point, the strength of the magnetic field formed between the Halbach array 420 and the magnet part 430 may be enhanced by the magnetic field formed by the second block 422.

In the embodiment illustrated in FIGS. 33A, 34A, 35A, 36A, 37A, 38A, 39A, and 40A, a direction of current is a direction from the second fixed contactor 22*b* to the first fixed contactor 22*a* via the movable contactor 43.

In the embodiment illustrated in FIGS. 33A and 34A, when the Fleming's left-hand rule is applied to the first fixed contactor 22*a*, an electromagnetic force generated in the vicinity of the first fixed contactor 22*a* is formed toward the rear left side. Accordingly, an arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side. Accordingly, an arc path A.P in the vicinity of the second fixed contactor 22*b* is also formed toward the front right side.

In the embodiment illustrated in FIGS. 35A and 36A, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIGS. 37A, 38A, 39A, and 40A, when the Fleming's left-hand rule is applied to the first fixed contactor 22*a*, an electromagnetic force generated in the vicinity of the first fixed contactor 22*a* is formed toward the rear left side. Accordingly, the arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIGS. 33B, 34B, 35B, 36B, 37B, 38B, 39B, and 40B, a direction of current is a direction from the first fixed contactor 22*a* to the second fixed contactor 22*b* via the movable contactor 43.

In the embodiment illustrated in FIGS. 33B and 34B, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIGS. 35B and 36B, when the Fleming's left-hand rule is applied to the first fixed contactor 22*a*, an electromagnetic force generated in the vicinity of the first fixed contactor 22*a* is formed toward the rear left side. Accordingly, the arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side. Accordingly, the arc path A.P in the vicinity of the second fixed contactor 22*b* is also formed toward the front right side.

In the embodiment illustrated in FIGS. 37B, 38B, 39B, and 40B, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the front right side. Accordingly, the arc path A.P in the vicinity of the second fixed contactor 22*b* is also formed toward the front right side.

Although not illustrated in the drawing, when the polarity of each surface of the Halbach array 420 and the magnet part 430 is changed, the direction of the magnetic field formed in the Halbach array 420 and the magnet part 430 is reversed. Accordingly, the generated electromagnetic force and the arc path A.P are also formed so that the front-rear direction thereof is reversed.

That is, in the electric connection situation shown in FIGS. 33A and 34A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the rear right side.

In the electric connection situation shown in FIGS. 35A and 36A, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the front right side.

In the electric connection situation shown in FIGS. 37A, 38A, 39A, and 40A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the front right side.

Similarly, in the electric connection situation shown in FIGS. 33B and 34B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the front right side.

In the electric connection situation shown in FIGS. 35B and 36B, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the rear right side.

In the electric connection situation shown in FIGS. 37B, 38B, 39B, and 40B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the rear right side.

Accordingly, in the arc path-forming part 400 according to the present embodiment, the electromagnetic force and the arc path A.P may be formed in a direction away from the central part C regardless of the polarity of each of the Halbach array 420 and the magnet part 430 or the direction of the current flowing through the DC relay 1.

Accordingly, damage to each component of the DC relay 1 disposed adjacent to the central part C can be prevented. Furthermore, since the generated arc can be quickly discharged to the outside, operational reliability of the DC relay 1 can be improved.

(5) Description of Arc Path-Forming Part 500 According to Yet Another Embodiment of Present Disclosure Hereinafter, an arc path-forming part 500 according to yet another embodiment of the present disclosure will be described in detail with reference to FIGS. 41 to 56.

Referring to FIGS. 41 to 48, the arc path-forming part 500 according to the illustrated embodiment includes a magnet frame 510, a first Halbach array 520, and a second Halbach array 530.

The magnet frame 510 according to the present embodiment has the same structure and function as the magnet frame 110 according to the above-described embodiment. However, there is a difference in the arrangement method of the first Halbach array 520 and the second Halbach array 530 disposed in the magnet frame 510 according to the present embodiment.

Accordingly, a description of the magnet frame 510 will be replaced with the description of the magnet frame 110 according to the above-described embodiment.

In the illustrated embodiment, a plurality of magnetic materials constituting the first Halbach array 520 are continuously arranged side by side from the rear side to the front side. That is, the first Halbach array 520 is formed to extend in the front-rear direction.

The first Halbach array 520 may form a magnetic field together with another magnetic material. In the illustrated embodiment, the first Halbach array 520 may form a magnetic field together with the second Halbach array 530.

The first Halbach array 520 may be located adjacent to any one surface third and fourth surfaces 513 and 514. The first Halbach array 520 may be coupled to an inner side (i.e., the side in a direction toward a space part 515) of the any one surface.

In the embodiment illustrated in FIGS. 41, 42, 45, and 46, the first Halbach array 520 is disposed on an inner side of the third surface 513, and disposed adjacent to the third surface 513. In addition, in the embodiment illustrated in FIGS. 43, 44, 47, and 48, the first Halbach array 520 is disposed on an inner side of the fourth surface 514, and disposed adjacent to the fourth surface 514.

The first Halbach array 520 is disposed to face the second Halbach array 530. In the embodiment illustrated in FIGS. 41, 42, 45, and 46, the first Halbach array 520 is disposed to face the second Halbach array 530 located on the inner side of the fourth surface 514. In addition, in the embodiment illustrated in FIGS. 43, 44, 47, and 48, the first Halbach array 520 is disposed to face the second Halbach array 530 located on the inner side of the third surface 513.

The first Halbach array 520 may be located to be biased to any one of a first surface 511 and the second surface 512. In the embodiment illustrated in FIGS. 41, 43, 45, and 47, the first Halbach array 520 is located to be biased to the second surface 512. In the embodiment illustrated in FIGS. 42, 44, 46, and 48, the first Halbach array 520 is located to be biased to the first surface 511.

The space part 515, and the fixed contactor 22 and the movable contactor 43 accommodated in the space part 515 are located between the first Halbach array 520 and the second Halbach array 530.

The first Halbach array 520 may enhance the strength of the magnetic field formed by itself and the magnetic field formed together with the second Halbach array 530. Since the process of enhancing the direction and magnetic field of the magnetic field formed by the first Halbach array 520 is a well-known technique, a detailed description thereof will be omitted.

In the illustrated embodiment, the first Halbach array 520 includes a first block 521 and a second block 522. It will be understood that the plurality of magnetic materials constituting the first Halbach array 520 are named as the blocks 521 and 522, respectively.

The first and second blocks 521 and 522 may each be formed of a magnetic material. In one embodiment, the first and second blocks 521 and 522 may each be provided as a permanent magnet, an electromagnet, or the like.

The first and second blocks 521 and 522 may be disposed side by side in one direction. In the illustrated embodiment, the first and second blocks 521 and 522 are disposed side by side in a direction in which the third surface 513 extends, that is, in the front-rear direction.

In the embodiment illustrated in FIGS. 41, 43, 45, and 47, of the first and second blocks 521 and 522, the first block 521 is disposed at the rear side, and the second block 522 is disposed at the front side.

In addition, in the embodiment illustrated in FIGS. 42, 44, 46, and 48, of the first and second blocks 521 and 522, the first block 521 is disposed at the front side, and the second block 522 is disposed at the rear side.

The first block 521 may be disposed to overlap each of the fixed contactors 22*a* and 22*b* in a direction toward the second Halbach array 530, i.e., in the left-right direction in the illustrated embodiment. In addition, the first block 521 may be disposed to overlap a first block 531 of the second Halbach array 530 in the left-right direction.

In one embodiment, the first and second blocks 521 and 522 may be in contact with each other.

Each of the blocks 521 and 522 includes a plurality of surfaces.

Specifically, the first block 521 includes a first inner surface 521*a* facing the space part 515 or the second Halbach array 530 and a first outer surface 521*b* opposite to the space part 515 or the second Halbach array 530.

The second block 522 includes a second inner surface 522*a* facing the first block 521 and a second outer surface 522*b* opposite to the first block 521.

The plurality of surfaces of each of the blocks 521 and 522 may be magnetized according to a predetermined rule to configure a Halbach array.

In the embodiment illustrated in FIGS. 41 to 44, the first and second inner surfaces 521*a* and 522*a* are magnetized to the same polarity. At this point, the first and second inner surfaces 521*a* and 522*a* may be magnetized to the same polarity as first to third outer surfaces 531*b*, 532*b*, and 533*b* of the second Halbach array 530.

In addition, the first and second outer surfaces 521*b* and 522*b* are magnetized to the same polarity. At this point, the first and second outer surfaces 521*b* and 522*b* may be magnetized to the same polarity as first to third inner surfaces 531*a*, 532*a*, and 533*a* of the second Halbach array 530.

In the embodiment illustrated in FIGS. 45 to 48, the first and second inner surfaces 521*a* and 522*a* are magnetized to the same polarity. At this point, the first and second inner surfaces 521*a* and 522*a* may be magnetized to the same polarity as the first to third inner surfaces 531*a*, 532*a*, and 533*a* of the second Halbach array 530.

In addition, the first and second outer surfaces 521*b* and 522*b* are magnetized to the same polarity. At this point, the first and second outer surfaces 521*b* and 522*b* may be magnetized to the same polarity as the first to third outer surfaces 531*b*, 532*b*, and 533*b* of the second Halbach array 530.

In the illustrated embodiment, a plurality of magnetic materials constituting the second Halbach array 530 are continuously arranged side by side from the rear side to the front side. That is, the second Halbach array 530 is formed to extend in the front-rear direction.

The second Halbach array 530 may form a magnetic field together with another magnetic material. In the illustrated embodiment, the second Halbach array 530 may form a magnetic field together with the first Halbach array 520.

The second Halbach array 530 may be located adjacent to the other surface of the third and fourth surfaces 513 and 514. The second Halbach array 530 may be coupled to an inner side (i.e., the side in a direction toward the space part 515) of the other surface.

In the embodiment illustrated in FIGS. 41, 42, 45, and 46, the second Halbach array 530 is disposed on the inner side of the fourth surface 514, and disposed adjacent to the fourth surface 514. In addition, in the embodiment illustrated in FIGS. 43, 44, 47, and 48, the second Halbach array 530 is disposed on the inner side of the third surface 513, and disposed adjacent to the third surface 513.

The second Halbach array 530 is disposed to face the first Halbach array 520. In the embodiment illustrated in FIGS. 41, 42, 45, and 46, the second Halbach array 530 is disposed to face the first Halbach array 520 located on the inner side of the third surface 513. In addition, in the embodiment illustrated in FIGS. 43, 44, 47, and 48, the second Halbach array 530 is disposed to face the first Halbach array 520 located on the inner side of the fourth surface 514.

The second Halbach array 530 may be located in the vicinity of a center of the any one surface of the third surface 513 and the fourth surface 514. In other words, the shortest distance between the second Halbach array 530 and the first surface 511 and the shortest distance between the second Halbach array 530 and the second surface 512 may be the same.

The space part 515, and the fixed contactor 22 and the movable contactor 43 accommodated in the space part 515 are located between the second Halbach array 530 and the first Halbach array 520.

The second Halbach array 530 may enhance the strength of the magnetic field formed by itself and the strength of the magnetic field formed together with the first Halbach array 520. Since the process of enhancing the direction and magnetic field of the magnetic field formed by the second Halbach array 530 is a well-known technique, a detailed description thereof will be omitted.

In the illustrated embodiment, the second Halbach array 530 includes the first block 531, a second block 532, and a third block 533. It will be understood that the plurality of magnetic materials constituting the second Halbach array 530 are named as the blocks 531, 532, and 533, respectively.

The first to third blocks 531, 532, and 533 may each be formed of a magnetic material. In one embodiment, the first to third blocks 531, 532, and 533 may each be provided as a permanent magnet, an electromagnet, or the like.

The first to third blocks 531, 532, and 533 may be disposed side by side in one direction. In the illustrated embodiment, the first to third blocks 531, 532, and 533 are disposed side by side in a direction in which the third surface 513 or the fourth surface 514 extends, that is, in the front-rear direction.

In the illustrated embodiment, among the first to third blocks 531, 532, and 533, the first block 531 is disposed at the center, the second block 532 is disposed at the rear side of the first block 531, and the third block 533 is disposed at the front side of the first block 531.

The first block 531 may be disposed to overlap each of the fixed contactors 22*a* and 22*b* in a direction toward the first Halbach array 520, i.e., in the left-right direction in the illustrated embodiment. In addition, the first block 531 may be disposed to overlap the first block 521 of the first Halbach array 520 in the left-right direction.

In one embodiment, the first to third blocks 531, 532, and 533 may be in contact with each other.

Each of the blocks 531, 532, and 533 includes a plurality of surfaces.

Specifically, the first block 531 includes a first inner surface 531*a* facing the space part 515 or the first Halbach array 520 and a first outer surface 531*b* opposite to the space part 515 or the first Halbach array 520.

The second block 532 includes a second inner surface 532*a* facing the first block 531 and a second outer surface 532*b* opposite to the first block 531.

The third block 533 includes a third inner surface 533*a* facing the first block 531 and a third outer surface 533*b* opposite to the first block 531.

The plurality of surfaces of each of the blocks 531, 532, and 533 may be magnetized according to a predetermined rule to configure a Halbach array.

In the embodiment illustrated in FIGS. 41 to 44, the first to third inner surfaces 531*a*, 532*a*, and 533*a* are magnetized to the same polarity. At this point, the first to third inner surfaces 531*a*, 532*a*, and 533*a* may be magnetized to the same polarity as the first and second outer surfaces 521*b* and 522*b* of the first Halbach array 520.

In addition, the first to third outer surfaces 531*b*, 532*b*, and 533*b* are magnetized to the same polarity. At this point, the first to third outer surfaces 531*b*, 532*b*, and 533*b* may be magnetized to the same polarity as the first and second inner surfaces 521*a* and 522*a* of the first Halbach array 520.

In the embodiment illustrated in FIGS. 45 to 48, the first to third inner surfaces 531*a*, 532*a*, and 533*a* are magnetized to the same polarity. At this point, the first to third inner surfaces 531*a*, 532*a*, and 533*a* may be magnetized to the same polarity as the first and second inner surfaces 521*a* and 522*a* of the first Halbach array 520.

In addition, the first to third outer surfaces 531*b*, 532*b*, and 533*b* are magnetized to the same polarity. At this point, the first to third outer surfaces 531*b*, 532*b*, and 533*b* may be magnetized to the same polarity as the first and second outer surfaces 521*b* and 522*b* of the first Halbach array 520.

Hereinafter, an arc path A.P formed by the arc path-forming part 500 according to the present embodiment will be described in detail with reference to FIGS. 49 to 56.

Referring to FIGS. 49 to 52, the first and second inner surfaces 521*a* and 522*a* of the first Halbach array 520 are magnetized to N poles. In addition, the first to third inner surfaces 531*a*, 532*a*, and 533*a* of the second Halbach array 530 are magnetized to S poles.

Accordingly, a magnetic field in a direction from the first inner surface 521*a* toward the first inner surface 531*a* is formed between the first Halbach array 520 and the second Halbach array 530.

Referring to FIGS. 53 to 56, the first and second inner surfaces 521*a* and 522*a* of the first Halbach array 520 and the first to third inner surfaces 531*a*, 532*a*, and 533*a* of the second Halbach array 530 are all magnetized to N poles.

Accordingly, magnetic fields that repel each other are formed between the first Halbach array 520 and the second Halbach array 530.

At this point, the strength of the magnetic field formed between the first Halbach array 520 and the second Halbach array 530 may be enhanced by the magnetic fields formed by the second block 522 of the first Halbach array 520 and the second and third blocks 532 and 533 of the second Halbach array 530.

In the embodiment illustrated in FIGS. 49A, 50A, 51A, 52A, 53A, 54A, 55A, and 56A, a direction of current is a direction from the second fixed contactor 22*b* to the first fixed contactor 22*a* via the movable contactor 43.

In the embodiment illustrated in FIGS. 49A and 50A, when the Fleming's left-hand rule is applied to the first fixed contactor 22*a*, an electromagnetic force generated in the vicinity of the first fixed contactor 22*a* is formed toward the rear left side. Accordingly, an arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side. Accordingly, an arc path A.P in the vicinity of the second fixed contactor 22*b* is also formed toward the front right side.

In the embodiment illustrated in FIGS. 51A and 52A, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIGS. 53A, 54A, 55A, and 56A, when the Fleming's left-hand rule is applied to the first fixed contactor 22*a*, an electromagnetic force generated in the vicinity of the first fixed contactor 22*a* is formed toward the rear left side. Accordingly, the arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIGS. 49B, 50B, 51B, 52B, 53B, 54B, 55B, and 56B, a direction of current is a direction from the first fixed contactor 22*a* to the second fixed contactor 22*b* via the movable contactor 43.

In the embodiment illustrated in FIGS. 49B and 50B, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIGS. 51B and 52B, when the Fleming's left-hand rule is applied to the first fixed contactor 22*a*, an electromagnetic force generated in the vicinity of the first fixed contactor 22*a* is formed toward the rear left side. Accordingly, the arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side. Accordingly, the arc path A.P in the vicinity of the second fixed contactor 22*b* is also formed toward the front right side.

In the embodiment illustrated in FIGS. 53B, 54B, 55B, and 56B, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the front right side.

Although not illustrated in the drawing, when the polarity of each surface of the first Halbach array 520 and the second Halbach array 530 is changed, the direction of the magnetic field formed in the first Halbach array 520 and the second Halbach array 530 is reversed. Accordingly, the generated electromagnetic force and the arc path A.P are also formed so that the front-rear direction thereof is reversed.

That is, in the electric connection situation shown in FIGS. 49A and 50A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the rear right side.

In the electric connection situation shown in FIGS. 51A and 52A, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the front right side.

In the electric connection situation shown in FIGS. 53A, 54A, 55A, and 56A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the front right side.

Similarly, in the electric connection situation shown in FIGS. 49B and 50B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the front right side.

In the electric connection situation shown in FIGS. 51B and 52B, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the rear right side.

In the electric connection situation shown in FIGS. 53B, 54B, 55B, and 56B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the rear right side.

Accordingly, in the arc path-forming part 500 according to the present embodiment, the electromagnetic force and the arc path A.P may be formed in a direction away from the central part C regardless of the polarity of each of the first Halbach array 520 and the second Halbach array 530 or the direction of the current flowing through the DC relay 1.

Accordingly, damage to each component of the DC relay 1 disposed adjacent to the central part C can be prevented. Furthermore, since the generated arc can be quickly discharged to the outside, operational reliability of the DC relay 1 can be improved.

4. Description of Arc Path-Forming Part According to Second Embodiment of Present Disclosure Referring to FIGS. 57 to 93, arc path-forming parts 100, 200, 300, 400, and 500 according to various embodiments of the present disclosure are illustrated. Each of the arc path-forming parts 100, 200, 300, 400, and 500 forms magnetic fields inside the arc chamber 21. Due to current flowing through the DC relay 1 and the formed magnetic field, an electromagnetic force is formed in the arc chamber 21.

An arc generated as the fixed contactor 22 and the movable contactor 43 are separated from each other is moved to the outside of the arc chamber 21 by the formed electromagnetic force. Specifically, the generated arc is moved in a direction of the formed electromagnetic force. Accordingly, it can be said that each of the arc path-forming parts 100, 200, 300, 400, and 500 forms an arc path A.P, which is a path through which the generated arc flows.

Each of the arc path-forming parts 100, 200, 300, 400, and 500 is located in a space formed in the upper frame 11. The arc path-forming part 100, 200, 300, 400, or 500 is disposed to surround the arc chamber 21. In other words, the arc chamber 21 is located inside the arc path-forming part 100, 200, 300, 400, or 500.

The fixed contactor 22 and the movable contactor 43 are located inside the arc path-forming part 100, 200, 300, 400, or 500. The arc generated as the fixed contactor 22 and the movable contactor 43 are separated from each other may be induced by the electromagnetic force formed by the arc path-forming part 100, 200, 300, 400, or 500.

Each of the arc path-forming parts 100, 200, 300, 400, and 500 according to various embodiments of the present disclosure includes Halbach arrays or magnet parts. The Halbach arrays or the magnet parts form magnetic fields inside the arc path-forming part 100 in which the fixed contactor 22 and the movable contactor 43 are accommodated. At this point, the magnetic field may be formed by the magnet part or the Halbach array itself, or the magnetic fields may also be formed by between the Halbach arrays or magnet parts.

The magnetic field formed by the Halbach array and the magnet part forms an electromagnetic force together with the current flowing through the fixed contactor 22 and the movable contactor 43. The formed electromagnetic force induces the arc that is generated when the fixed contactor 22 and the movable contactor 43 are separated from each other.

At this point, each of the arc path-forming part 100, 200, 300, 400, or 500 forms the electromagnetic force in a direction away from a central part C of each of space parts 115, 215, 315, 415, and 515. Accordingly, the arc path A.P is also formed in the direction away from the central part C of the space part.

As a result, each component provided in the DC relay 1 is not damaged by the generated arc. Furthermore, the generated arc can be quickly discharged to the outside of the arc chamber 21.

Hereinafter, the configuration of each of the arc path-forming parts 100, 200, 300, 400, and 500 and the arc path A.P formed by each of the arc path-forming parts 100, 200, 300, 400, and 500 will be described in detail with reference to the accompanying drawings.

Each of the arc path-forming parts 100, 200, 300, 400, and 500 according to various embodiments described below may include a Halbach array located on one or more of left and right sides of each of the arc path-forming parts 100, 200, 300, 400, and 500.

In addition, the arc path-forming part 100, 200, 300, 400, or 500 may include a magnet part having a polarity in a longitudinal direction, which is located on at least one side of a front side and a rear side of the magnet part.

As will be described below, the rear side may be defined as a direction adjacent to a first surface 111, 211, 311, 411, or 511, and the front side may be defined as a direction adjacent to a second surface 112, 212, 312, 412, or 512.

In addition, a left side may be defined as a direction adjacent to a third surface 113, 213, 313, 413, or 513, and a right side may be defined as a direction adjacent to a fourth surface 114, 214, 314, 414, or 514.

(1) Description of Arc Path-Forming Part 100 According to One Embodiment of Present Disclosure Hereinafter, an arc path-forming part 100 according to one embodiment of the present disclosure will be described in detail with reference to FIGS. 58 to 61.

Figure 58:
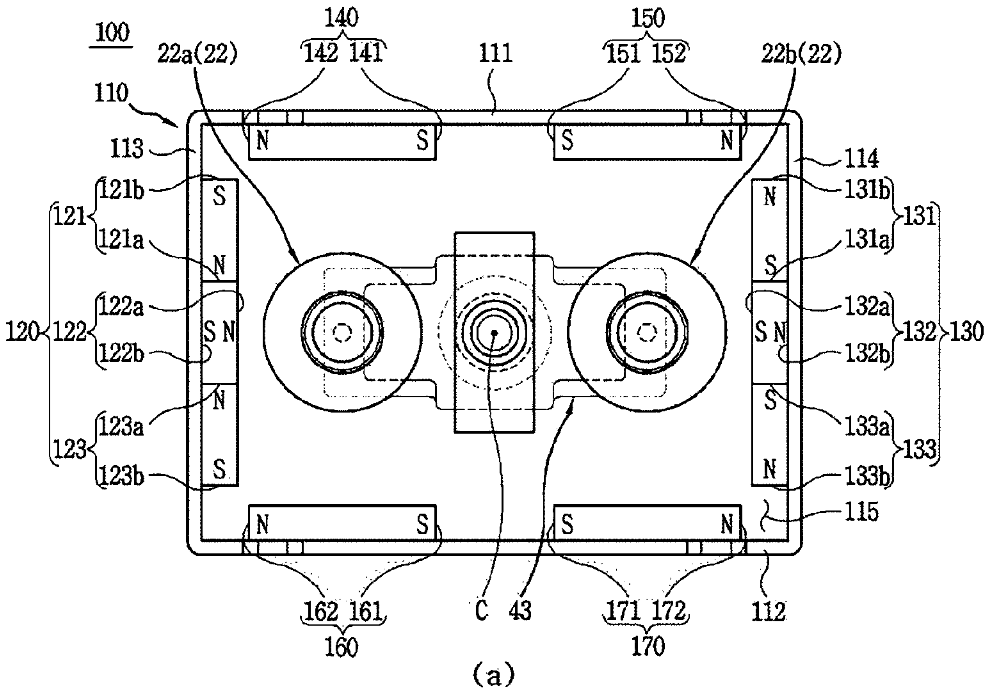
FIGS. 58 and 59 are conceptual views illustrating an arc path-forming part according to one embodiment of the present disclosure.
Figure 58:
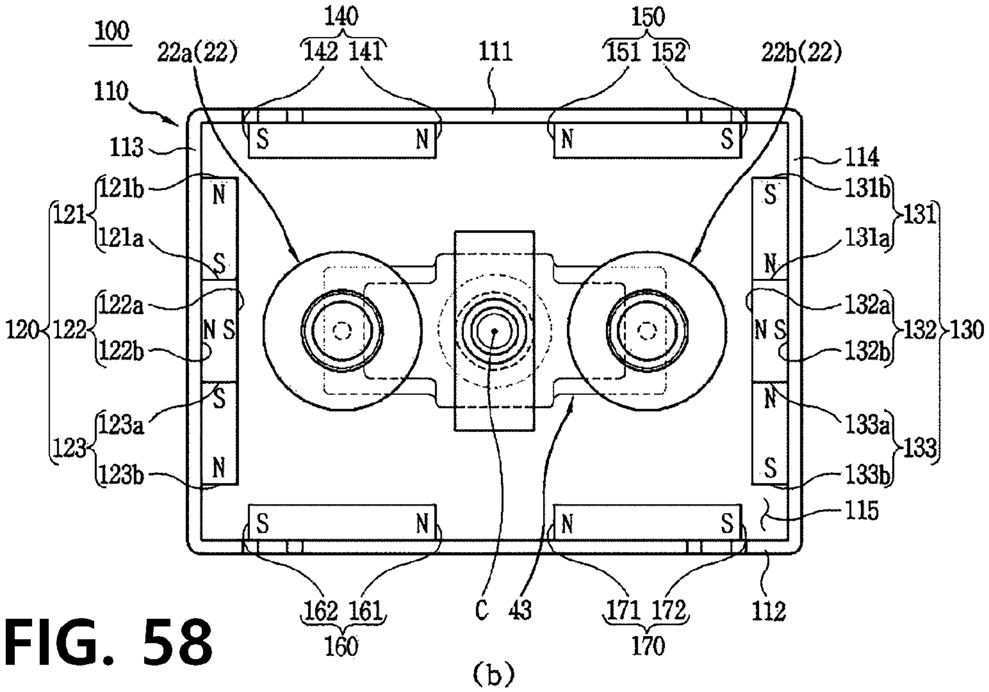
Figure 59:
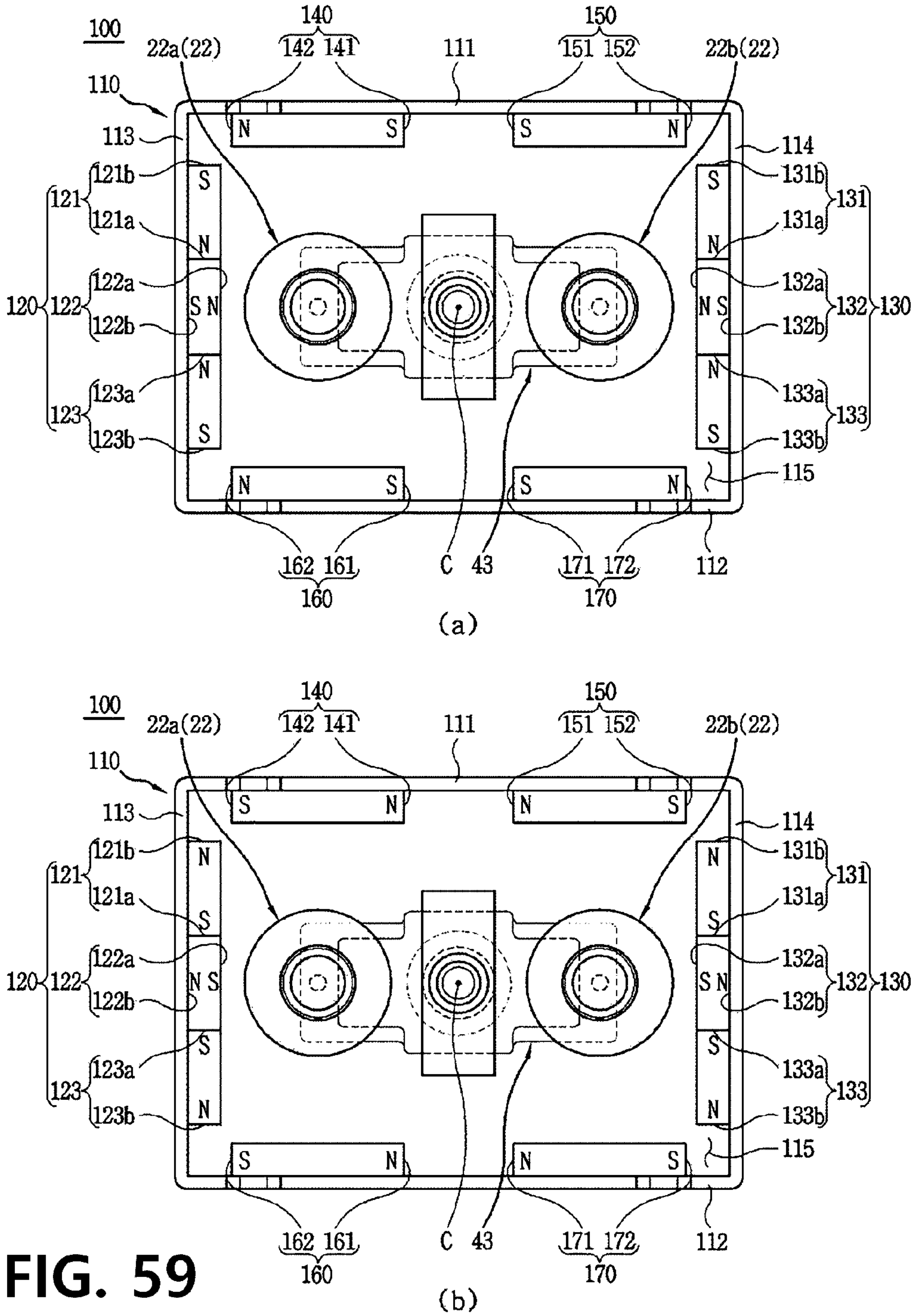

Referring to FIGS. 58 and 59, the arc path-forming part 100 according to the illustrated embodiment includes a magnet frame 110, a first Halbach array 120, a second Halbach array 130, a first magnet part 140, a second magnet part 150, a third magnet part 160, and a fourth magnet part 170.

The magnet frame 110 forms a frame of the arc path-forming part 100. The first and second Halbach arrays 120 and 130 and the first to fourth magnet parts 140, 150, 160, and 170 are disposed in the magnet frame 110. In one embodiment, the first and second Halbach arrays 120 and 130 and the first to fourth magnet parts 140, 150, 160, and 170 may be coupled to the magnet frame 110.

The magnet frame 110 has a rectangular cross-section formed to extend in the longitudinal direction, i.e., in the left-right direction in the illustrated embodiment. The shape of the magnet frame 110 may be changed depending on shapes of the upper frame 11 and the arc chamber 21.

The magnet frame 110 includes a first surface 111, a second surface 112, a third surface 113, a fourth surface 114, and a space part 115.

The first surface 111, the second surface 112, the third surface 113, and the fourth surface 114 form an outer circumferential surface of the magnet frame 110. That is, the first surface 111, the second surface 112, the third surface 113, and the fourth surface 114 may serve as walls of the magnet frame 110.

An outer side of each of the first surface 111, the second surface 112, the third surface 113, and the fourth surface 114 may be in contact with or fixedly coupled to the inner surface of the upper frame 11. In addition, the first and second Halbach arrays 120 and 130 and the first to fourth magnet parts 140, 150, 160, and 170 may be located on inner sides of the first surface 111, the second surface 112, the third surface 113, and the fourth surface 114.

In the illustrated embodiment, the first surface 111 forms a rear side surface. The second surface 112 forms a front side surface and faces the first surface 111. In addition, the third surface 113 forms a left side surface. The fourth surface 114 forms a right side surface and faces the third surface 113.

That is, the first surface 111 and the second surface 112 face each other with the space part 115 therebetween. In addition, the third surface 113 and the fourth surface 114 face each other with the space part 115 therebetween.

The first surface 111 is continuous with the third surface 113 and the fourth surface 114. The first surface 111 may be coupled to the third surface 113 and the fourth surface 114 at predetermined angles. In one embodiment, the predetermined angle may be a right angle.

The second surface 112 is continuous with the third surface 113 and the fourth surface 114. The second surface 112 may be coupled to the third surface 113 and the fourth surface 114 at predetermined angles. In one embodiment, the predetermined angle may be a right angle.

Each of corners at which the first to fourth surfaces 111 to 114 are connected to each other may be chamfered.

Coupling members (not shown) may be provided for coupling the surfaces 111, 112, 113, and 114 to the first and second Halbach arrays 120 and 130 and the first to fourth magnet parts 140, 150, 160, and 170.

Although not illustrated in the drawings, an arc discharge hole (not shown) may be formed through one or more of the first surface 111, the second surface 112, the third surface 113, and the fourth surface 114. The arc discharge hole (not shown) may serve as a path through which an arc generated in the space part 115 is discharged.

A space surrounded by the first to fourth surfaces 111 to 114 may be defined as the space part 115.

The fixed contactor 22 and the movable contactor 43 are accommodated in the space part 115. In addition, the arc chamber 21 is accommodated in the space part 115.

In the space part 115, the movable contactor 43 may be moved in a direction toward the fixed contactor 22 (i.e., the downward direction) or a direction away from the fixed contactor 22 (i.e., the upward direction).

In addition, an arc path A.P of an arc generated in the arc chamber 21 is formed in the space part 115. This is achieved by magnetic fields formed by the first and second Halbach arrays 120 and 130 and the first to fourth magnet parts 140, 150, 160, and 170.

A central portion of the space part 115 may be defined as a central part C. A straight line distance from each of corners at which the first to fourth surfaces 111 to 114 are connected to each other to the central part C may be formed to be equal to each other.

The central part C may be located between the first fixed contactor 22*a* and the second fixed contactor 22*b*. In addition, a central portion of the movable contactor part 40 is located vertically below the central part C. That is, a central portion of each of the housing 41, the cover 42, the movable contactor 43, the shaft 44, the elastic part 45, and the like is located vertically below the central part C.

Accordingly, when the generated arc is moved toward the central part C, the above components may be damaged. In order to prevent this, the arc path-forming part 100 according to the present embodiment includes the first and second Halbach arrays 120 and 130 and the first to fourth magnet parts 140, 150, 160, and 170.

In the illustrated embodiment, a plurality of magnetic materials constituting the first Halbach array 120 are continuously arranged side by side from the front side to the rear side. That is, the first Halbach array 120 is formed to extend in the front-rear direction.

The first Halbach array 120 may form a magnetic field together with another magnetic material. In the illustrated embodiment, the first Halbach array 120 may form magnetic fields together with the second Halbach array 130 and the first to fourth magnet parts 140, 150, 160, and 170.

The first Halbach array 120 may be located adjacent to any one surface of the third and fourth surfaces 113 and 114. In one embodiment, the first Halbach array 120 may be coupled to an inner side (i.e., the side in a direction toward the space part 115) of the any one surface.

In the illustrated embodiment, the first Halbach array 120 is disposed on an inner side of the third surface 113, and disposed adjacent to the third surface 113. Although not illustrated in the drawing, the first Halbach array 120 may be disposed on an inner side of the fourth surface 114, and disposed adjacent to the fourth surface 114.

The first Halbach array 120 is disposed to face the second Halbach array 130. In the illustrated embodiment, the first Halbach array 120 is disposed to face the second Halbach array 130 located on the inner side of the fourth surface 114.

The space part 115, and the fixed contactor 22 and the movable contactor 43 accommodated in the space part 115 are located between the first Halbach array 120 and the second Halbach array 130.

The first Halbach array 120 may enhance the strength of the magnetic field formed by itself and the magnetic fields formed by the second Halbach array 130 and the first to fourth magnet parts 140, 150, 160, and 170. Since the process of enhancing the direction and magnetic field of the magnetic field formed by the first Halbach array 120 is a well-known technique, a detailed description thereof will be omitted.

In the illustrated embodiment, the first Halbach array 120 includes a first block 121, a second block 122, and a third block 123. It will be understood that the plurality of magnetic materials constituting the first Halbach array 120 are named as the blocks 121, 122, and 123, respectively.

The first to third blocks 121, 122, and 123 may each be formed of a magnetic material. In one embodiment, the first to third blocks 121, 122, and 123 may each be provided as a permanent magnet, an electromagnet, or the like.

The first to third blocks 121, 122, and 123 may be disposed side by side in one direction. In the illustrated embodiment, the first to third blocks 121, 122, and 123 are disposed side by side in a direction in which the third surface 113 extends, that is, in the front-rear direction.

Among the first to third blocks 121, 122, and 123, the first block 121 is disposed at the most rear side, and the third block 123 is disposed at the most front side. In addition, the second block 122 is located between the first block 121 and the third block 123.

In one embodiment, the second block 122 may be in contact with each of the first and third blocks 121 and 123.

The second block 122 may be disposed to overlap each of the fixed contactors 22*a* and 22*b* in a direction toward the fourth surface 114, i.e., in the left-right direction in the illustrated embodiment. In addition, the second block 122 may be disposed to overlap a second block 132 of the second Halbach array 130 in the left-right direction.

Each of the blocks 121, 122, and 123 includes a plurality of surfaces.

Specifically, the first block 121 includes a first inner surface 121*a* facing the second block 122 and a first outer surface 121*b* opposite to the second block 122.

The second block 122 includes a second inner surface 122*a* facing the space part 115 or the second Halbach array 130 and a second outer surface 122*b* opposite to the space part 115 or the second Halbach array 130.

In addition, the third block 123 includes a third inner surface 123*a* facing the second block 122 and a third outer surface 123*b* opposite to the second block 122.

The plurality of surfaces of each of the blocks 121, 122, and 123 may be magnetized according to a predetermined rule to configure a Halbach array.

In the embodiment illustrated in FIG. 58, the first to third inner surfaces 121*a*, 122*a*, and 123*a* are magnetized to the same polarity. At this point, the first to third inner surfaces 121*a*, 122*a*, and 123*a* may be magnetized to the same polarity as each of the outer surfaces 131*b*, 132*b*, and 133*b* of the second Halbach array 130.

Furthermore, the first to third inner surfaces 121*a*, 122*a*, and 123*a* may be magnetized to the same polarity as each of opposing surfaces 142, 152, 162, and 172 respectively of the magnet parts 140, 150, 160, and 170.

In addition, the first to third outer surfaces 121*b*, 122*b*, and 123*b* are magnetized to a polarity different from the polarity of the first to third inner surfaces 121*a*, 122*a*, and 123*a*. At this point, the first to third outer surfaces 121*b*, 122*b*, and 123*b* may be magnetized to the same polarity as each of the inner surfaces 131*a*, 132*a*, and 133*a* of the second Halbach array 130.

Furthermore, the first to third outer surfaces 121*b*, 122*b*, and 123*b* may be magnetized to the same polarity as each of facing surfaces 141, 151, 161, and 171 respectively of the magnet parts 140, 150, 160, and 170.

In the embodiment illustrated in FIG. 59, the first to third inner surfaces 121*a*, 122*a*, and 123*a* are magnetized to the same polarity. At this point, the first to third inner surfaces 121*a*, 122*a*, and 123*a* may be magnetized to the same polarity as each of the inner surfaces 131*a*, 132*a*, and 133*a* of the second Halbach array 130.

Furthermore, the first to third inner surfaces 121*a*, 122*a*, and 123*a* may be magnetized to the same polarity as each of the opposing surfaces 142, 152, 162, and 172 respectively of the magnet parts 140, 150, 160, and 170.

In addition, the first to third outer surfaces 121*b*, 122*b*, and 123*b* are magnetized to a polarity different from the polarity of the first to third inner surfaces 121*a*, 122*a*, and 123*a*. At this point, the first to third outer surfaces 121*b*, 122*b*, and 123*b* may be magnetized to the same polarity as each of the outer surfaces 131*b*, 132*b*, and 133*b* of the second Halbach array 130.

Furthermore, the first to third outer surfaces 121*b*, 122*b*, and 123*b* may be magnetized to the same polarity as each of the facing surfaces 141, 151, 161, and 171 respectively of the magnet parts 140, 150, 160, and 170.

In the illustrated embodiment, a plurality of magnetic materials constituting the second Halbach array 130 are continuously arranged side by side from the front side to the rear side. That is, the second Halbach array 130 is formed to extend in the front-rear direction.

The second Halbach array 130 may form a magnetic field together with another magnetic material. In the illustrated embodiment, the second Halbach array 130 may form magnetic fields together with the first Halbach array 120 and the first to fourth magnet parts 140, 150, 160, and 170.

The second Halbach array 130 may be located adjacent to the other surface of the third and fourth surfaces 113 and 114. In one embodiment, the second Halbach array 130 may be coupled to an inner side (i.e., the side in a direction toward the space part 115) of the other surface.

In the illustrated embodiment, the second Halbach array 130 is disposed on the inner side of the fourth surface 114, and disposed adjacent to the fourth surface 114. Although not illustrated in the drawing, the second Halbach array 130 may be disposed on the inner side of the third surface 113, and disposed adjacent to the third surface 113.

The second Halbach array 130 is disposed to face the first Halbach array 120. In the illustrated embodiment, the second Halbach array 130 is disposed to face the first Halbach array 120 located on the inner side of the third surface 113.

The space part 115, and the fixed contactor 22 and the movable contactor 43 accommodated in the space part 115 are located between the second Halbach array 130 and the first Halbach array 120.

The first Halbach array 120 may enhance the strength of the magnetic field formed by itself and the magnetic fields formed by the second Halbach array 130 and each of the magnet parts 140, 150, 160, and 170. Since the process of enhancing the direction and magnetic field of the magnetic field formed by the second Halbach array 130 is a well-known technique, a detailed description thereof will be omitted.

In the illustrated embodiment, the second Halbach array 130 includes a first block 131, the second block 132, and a third block 133. It will be understood that the plurality of magnetic materials constituting the second Halbach array 130 are named as the blocks 131, 132, and 133, respectively.

The first to third blocks 131, 132, and 133 may each be formed of a magnetic material. In one embodiment, the first to third blocks 131, 132, and 133 may each be provided as a permanent magnet, an electromagnet, or the like.

The first to third blocks 131, 132, and 133 may be disposed side by side in one direction. In the illustrated embodiment, the first to third blocks 131, 132, and 133 are disposed side by side in a direction in which the fourth surface 114 extends, that is, in the front-rear direction.

Among the first to third blocks 131, 132, and 133, the first block 131 is disposed at the most rear side, and the third block 133 is disposed at the most front side. In addition, the second block 132 is located between the first block 131 and the third block 133.

In one embodiment, the second block 132 may be in contact with each of the first and third blocks 131 and 133.

The second block 132 may be disposed to overlap each of the fixed contactors 22*a* and 22*b* in a direction toward the third surface 113, i.e., in the left-right direction in the illustrated embodiment. In addition, the second block 132 may be disposed to overlap the second block 122 of the first Halbach array 120 in the left-right direction.

Each of the blocks 131, 132, and 133 includes a plurality of surfaces.

Specifically, the first block 131 includes a first inner surface 131*a* facing the second block 132 and a first outer surface 131*b* opposite to the second block 132.

The second block 132 includes a second inner surface 132*a* facing the space part 115 or the first Halbach array 120, and a second outer surface 132*b* opposite to the space part 115 or the first Halbach array 120.

In addition, the third block 133 includes a third inner surface 133*a* facing the second block 132 and a third outer surface 133*b* opposite to the second block 132.

The plurality of surfaces of each of the blocks 131, 132, and 133 may be magnetized according to a predetermined rule to configure a Halbach array.

In the embodiment illustrated in FIG. 58, the first to third inner surfaces 131*a*, 132*a*, and 133*a* are magnetized to the same polarity. At this point, the first to third inner surfaces 131*a*, 132*a*, and 133*a* may be magnetized to the same polarity as each of the outer surfaces 121*b*, 122*b*, and 123*b* of the first Halbach array 120.

Furthermore, the first to third inner surfaces 131*a*, 132*a*, and 133*a* may be magnetized to the same polarity as each of the facing surfaces 141, 151, 161, and 171 respectively of the magnet parts 140, 150, 160, and 170.

In addition, the first to third outer surfaces 131*b*, 132*b*, and 133*b* are magnetized to a polarity different from the polarity of the first to third inner surfaces 131*a*, 132*a*, and 133*a*. At this point, the first to third outer surfaces 131*b*, 132*b*, and 133*b* may be magnetized to the same polarity as each of the inner surfaces 121*a*, 122*a*, and 123*a* of the first Halbach array 120.

Furthermore, the first to third outer surfaces 131*b*, 132*b*, and 133*b* may be magnetized to the same polarity as each of the opposing surfaces 142, 152, 162, and 172 of each of the magnet parts 140, 150, 160, and 170.

In the embodiment illustrated in FIG. 59, the first to third inner surfaces 131*a*, 132*a*, and 133*a* are magnetized to the same polarity. At this point, the first to third inner surfaces 131*a*, 132*a*, and 133*a* may be magnetized to the same polarity as each of the inner surfaces 121*a*, 122*a*, and 123*a* of the first Halbach array 120.

Furthermore, the first to third inner surfaces 131*a*, 132*a*, and 133*a* may be magnetized to the same polarity as each of the opposing surfaces 142, 152, 162, and 172 respectively of the magnet parts 140, 150, 160, and 170.

In addition, the first to third outer surfaces 131*b*, 132*b*, and 133*b* are magnetized to a polarity different from the polarity of the first to third inner surfaces 131*a*, 132*a*, and 133*a*. At this point, the first to third outer surfaces 131*b*, 132*b*, and 133*b* may be magnetized to the same polarity as each of the outer surfaces 121*b*, 122*b*, and 123*b* of the first Halbach array 120.

Furthermore, the first to third outer surfaces 131*b*, 132*b*, and 133*b* may be magnetized to the same polarity as each of facing surfaces 141, 151, 161, and 171 respectively of the magnet parts 140, 150, 160, and 170.

Each of the first to fourth magnet parts 140, 150, 160, and 170 forms a magnetic field by itself and forms magnetic fields together with the first and second Halbach arrays 120 and 130 and each of the magnet parts 140, 150, 160, and 170 except for itself. An arc path A.P may be formed inside the arc chamber 21 by the magnetic fields formed by the first to fourth magnet parts 140, 150, 160, and 170.

The first to fourth magnet parts 140, 150, 160, and 170 may each be provided in any form capable of forming a magnetic field by being magnetized. In one embodiment, the first to fourth magnet parts 140, 150, 160, and 170 may each be provided as a permanent magnet, an electromagnet, or the like.

The first to fourth magnet parts 140, 150, 160, and 170 may be located adjacent to the respective first to fourth surfaces 111 to 114.

In the illustrated embodiment, the first magnet part 140 and the second magnet part 150 are located adjacent to the first surface 111. The first magnet part 140 is located to be biased to the third surface 113. The second magnet part 150 is located to be biased to the fourth surface 114.

The first magnet part 140 and the second magnet part 150 are disposed to face the third magnet part 160 and the fourth magnet part 170, respectively, with the space part 115 therebetween.

In one embodiment, the first magnet part 140 may overlap the first fixed contactor 22*a* and the third magnet part 160 in the front-rear direction. In addition, the second magnet part 150 may overlap the second fixed contactor 22*b* and the fourth magnet part 170 in the front-rear direction.

The first magnet part 140 and the second magnet part 150 are disposed side by side in an extending direction thereof. In one embodiment, the first magnet part 140 and the second magnet part 150 may be in contact with each other.

In the illustrated embodiment, the third magnet part 160 and the fourth magnet part 170 are located adjacent to the second surface 112. The third magnet part 160 is located to be biased to the third surface 113. The fourth magnet part 170 is located to be biased to the fourth surface 114.

The third magnet part 160 and the fourth magnet part 170 are disposed to face the first magnet part 140 and the second magnet part 150, respectively, with the space part 115 therebetween.

In one embodiment, the third magnet part 160 may overlap the first fixed contactor 22*a* and the first magnet part 140 in the front-rear direction. In addition, the fourth magnet part 170 may overlap the second fixed contactor 22*b* and the second magnet part 150 in the front-rear direction.

The third magnet part 160 and the fourth magnet part 170 are disposed side by side in an extending direction thereof. In one embodiment, the third magnet part 160 and the fourth magnet part 170 may be in contact with each other.

The first to fourth magnet parts 140, 150, 160, and 170 are formed to extend in one direction. In the illustrated embodiment, the first to fourth magnet parts 140, 150, 160, and 170 are formed to extend in the left-right direction.

Each of the first to fourth magnet parts 140, 150, 160, and 170 includes a plurality of surfaces.

Specifically, the first magnet part 140 includes a first facing surface 141 facing the second magnet part 150 and a first opposing surface 142 opposite to the second magnet part 150.

The second magnet part 150 includes a second facing surface 151 facing the first magnet part 140 and a second opposing surface 152 opposite to the first magnet part 140.

The third magnet part 160 includes a third facing surface 161 facing the fourth magnet part 170 and a third opposing surface 162 opposite to the fourth magnet part 170.

The fourth magnet part 170 includes a fourth facing surface 171 facing the third magnet part 160 and a fourth opposing surface 172 opposite to the third magnet part 160.

Each surface of the first to fourth magnet parts 140, 150, 160, and 170 may be magnetized according to a predetermined rule.

In the embodiment illustrated in FIG. 58, the first to fourth facing surfaces 141, 151, 161, and 171 are magnetized to the same polarity. At this point, the first to fourth facing surfaces 141, 151, 161, and 171 are magnetized to the same polarity as each of the first to third outer surfaces 121*b*, 122*b*, and 123*b* of the first Halbach array 120 and the first to third inner surfaces 131*a*, 132*a*, and 133*a* of the second Halbach array 130.

Similarly, the first to fourth opposing surfaces 142, 152, 162, and 172 are magnetized to a polarity different from the polarity of the first to fourth facing surfaces 141, 151, 161, and 171. At this point, the first to fourth opposing surfaces 142, 152, 162, and 172 are magnetized to the same polarity as each of the first to third inner surfaces 121*a*, 122*a*, and 123*a* of the first Halbach array 120 and the first to third outer surfaces 131*b*, 132*b*, and 133*b* of the second Halbach array 130.

In the embodiment illustrated in FIG. 59, the first to fourth facing surfaces 141, 151, 161, and 171 are magnetized to the same polarity. At this point, the first to fourth facing surfaces 141, 151, 161, and 171 are magnetized to the same polarity as each of the first to third outer surfaces 121*b*, 122*b*, and 123*b* of the first Halbach array 120 and the first to third outer surfaces 131*b*, 132*b*, and 133*b* of the second Halbach array 130.

Similarly, the first to fourth opposing surfaces 142, 152, 162, and 172 are magnetized to a polarity different from the polarity of the first to fourth facing surfaces 141, 151, 161, and 171. At this point, the first to fourth opposing surfaces 142, 152, 162, and 172 are magnetized to the same polarity as each of the first to third inner surfaces 121*a*, 122*a*, and 123*a* of the first Halbach array 120 and the first to third inner surfaces 131*a*, 132*a*, and 133*a* of the second Halbach array 130.

Hereinafter, the arc path A.P formed by the arc path-forming part 100 according to the present embodiment will be described in detail with reference to FIGS. 60 and 61.

Figure 60:
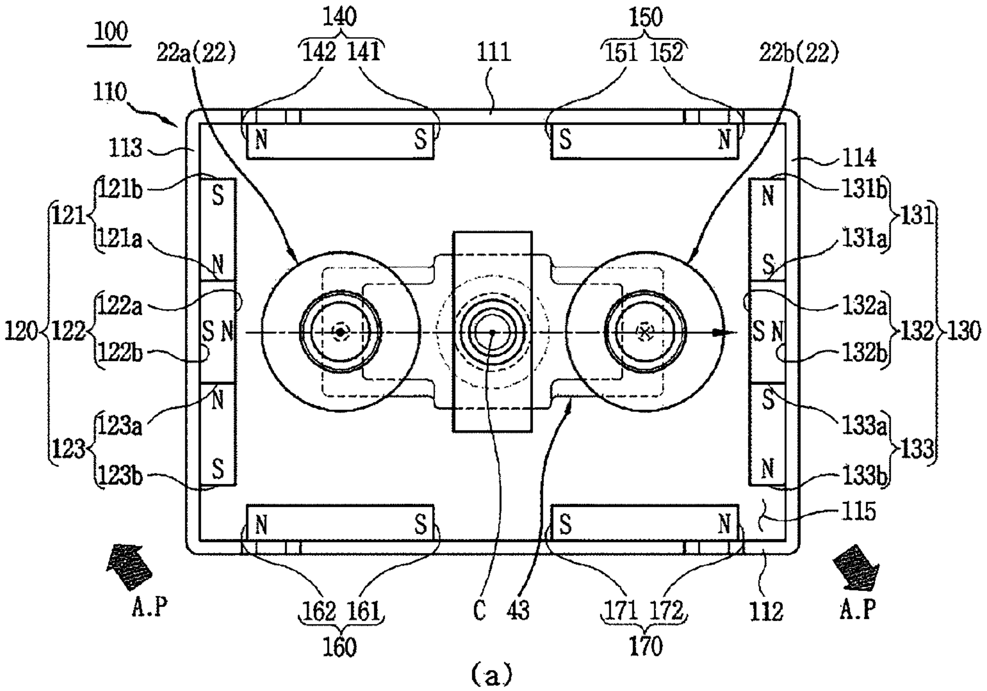
FIGS. 60 and 61 are conceptual views illustrating magnetic fields and arc paths formed by the arc path-forming part according to the embodiment of FIGS. 58 and 59.
Figure 60:
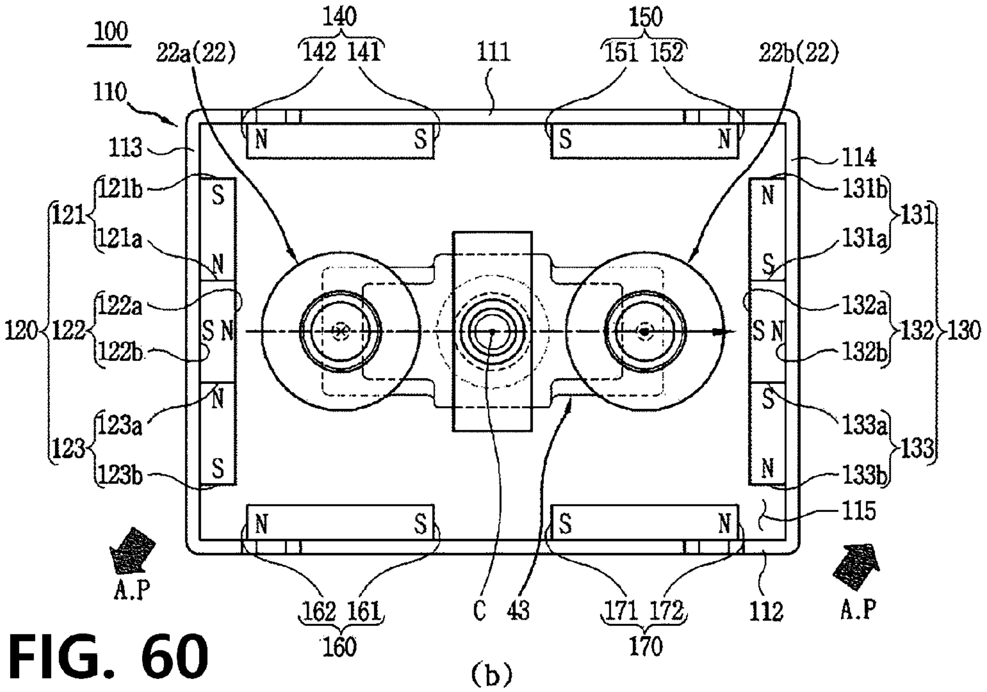

Referring to FIG. 60, the inner surfaces 121*a*, 122*a*, and 123*a* of the first Halbach array 120 and the inner surfaces

131*a*, 132*a*, and 133*a* of the second Halbach array 130 are magnetized to different polarities.

That is, the inner surfaces 121*a*, 122*a*, and 123*a* of the first Halbach array 120 are magnetized to N poles, and the inner surfaces 131*a*, 132*a*, and 133*a* of the second Halbach array 130 are magnetized to S poles.

At this point, each of the facing surfaces 141, 151, 161, and 171 respectively of the magnet parts 140, 150, 160, and 170 is magnetized to a polarity different from that of each of the inner surfaces 121*a*, 122*a*, and 123*a* of the first Halbach array 120, that is, magnetized to an S pole.

Accordingly, a magnetic field in a direction from the second inner surface 122*a* toward the second inner surface 132*a* is formed between the second block 122 of the first Halbach array 120 and the second block 132 of the second Halbach array 130.

Figure 61:
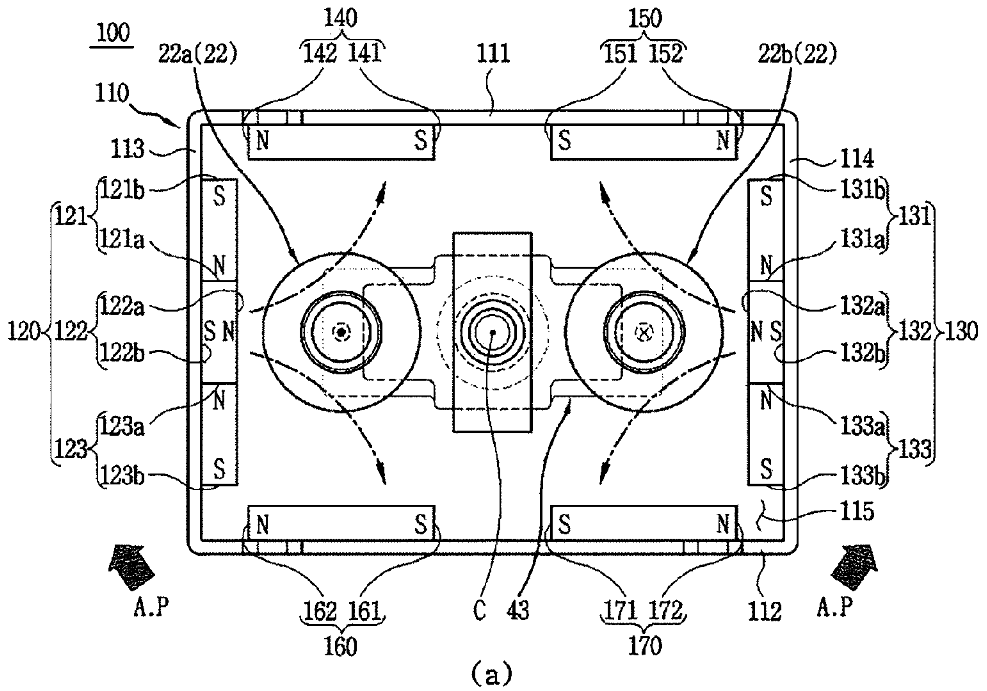
Figure 61:
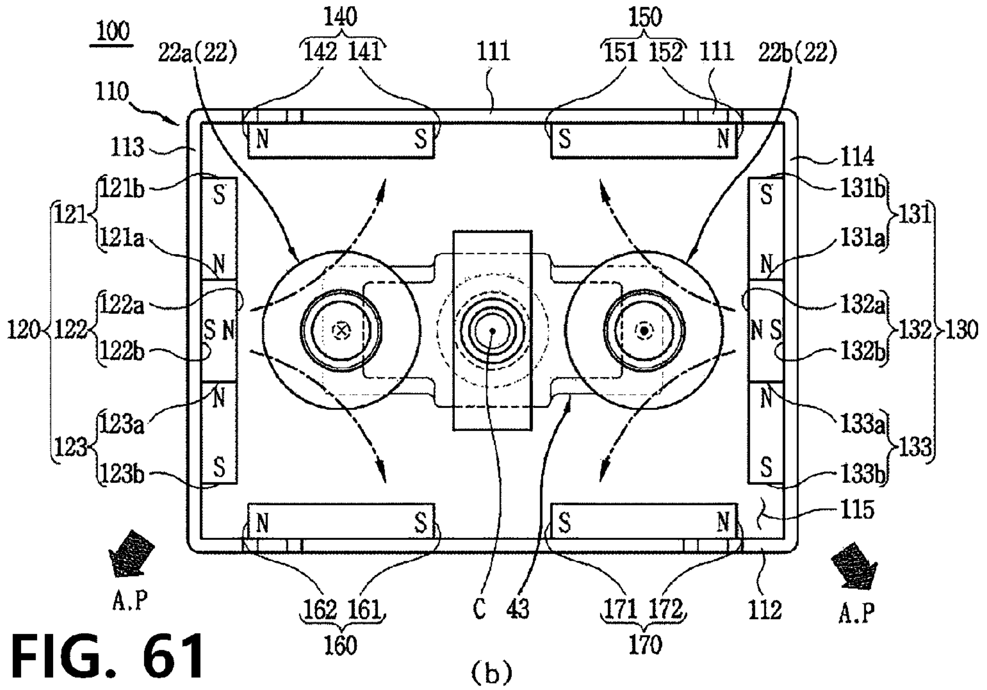

Referring to FIG. 61, the inner surfaces 121*a*, 122*a*, and 123*a* of the first Halbach array 120 and the inner surfaces 131*a*, 132*a*, and 133*a* of the second Halbach array 130 are magnetized to the same polarity.

That is, the inner surfaces 121*a*, 122*a*, and 123*a* of the first Halbach array 120 and the inner surfaces 131*a*, 132*a*, and 133*a* of the second Halbach array 130 are all magnetized to N poles.

At this point, each of the facing surfaces 141, 151, 161, and 171 respectively of the magnet parts 140, 150, 160, and 170 is magnetized to a polarity different from that of each of the inner surfaces 121*a*, 122*a*, and 123*a* of the first Halbach array 120, that is, magnetized to an S pole.

Accordingly, magnetic fields that repel each other are formed between the second block 122 of the first Halbach array 120 and the second block 132 of the second Halbach array 130.

In addition, a magnetic field in a direction from the second inner surface 122*a* to each of the facing surfaces 141, 151, 161, and 171 is formed between the first Halbach array 120 and each of the magnet parts 140, 150, 160, and 170.

Similarly, a magnetic field in a direction from the second inner surface 132*a* toward each of the facing surfaces 141, 151, 161, and 171 is formed between the second Halbach array 130 and each of the magnet parts 140, 150, 160, and 170.

At this point, the strength of the magnetic field formed between the first Halbach array 120 and the second Halbach array 130 may be enhanced by the magnetic fields formed by the first and third blocks 121 and 131 and 123 and 133.

In the embodiment illustrated in FIGS. 60A and 61A, a direction of current is a direction from the second fixed contactor 22*b* to the first fixed contactor 22*a* via the movable contactor 43.

In the embodiment illustrated in FIG. 60A, when the Fleming's left-hand rule is applied to the first fixed contactor 22*a*, an electromagnetic force generated in the vicinity of the first fixed contactor 22*a* is formed toward the rear left side. Accordingly, the arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side. Accordingly, the arc path A.P in the vicinity of the second fixed contactor 22*b* is also formed toward the front right side.

In the embodiment illustrated in FIG. 61A, when the Fleming's left-hand rule is applied to the first fixed contactor 22*a*, an electromagnetic force generated in the vicinity of the first fixed contactor 22*a* is formed toward the rear left side. Accordingly, the arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIGS. 60B and 61B, a direction of current is a direction from the first fixed contactor 22*a* to the second fixed contactor 22*b* via the movable contactor 43.

In the embodiment illustrated in FIG. 60B, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIG. 61B, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the front right side. Accordingly, the arc path A.P in the vicinity of the second fixed contactor 22*b* is also formed toward the front right side.

Although not illustrated in the drawing, when the polarity of each surface of the first and second Halbach arrays 120 and 130 and the first to fourth magnet parts 140, 150, 160, and 170 is changed, the directions of the magnetic fields formed in the first and second Halbach arrays 120 and 130 and the first to fourth magnet parts 140, 150, 160, and 170 are reversed. Accordingly, the generated electromagnetic force and the arc path A.P are also formed so that the front-rear direction thereof is reversed.

That is, in the electric connection situation shown in FIG. 60A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the rear right side.

In the electric connection situation shown in FIG. 61A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the front right side.

Similarly, in the electric connection situation shown in FIG. 60B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the front right side.

In the electric connection situation shown in FIG. 61B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the rear right side.

Accordingly, in the arc path-forming part 100 according to the present embodiment, the electromagnetic force and the arc path A.P may be formed in a direction away from the central part C regardless of the polarity of each of the first and second Halbach arrays 120 and 130 and the first to fourth magnet parts 140, 150, 160, and 170 or the direction of the current flowing through the DC relay 1.

Accordingly, damage to each component of the DC relay 1 disposed adjacent to the central part C can be prevented. Furthermore, since the generated arc can be quickly discharged to the outside, operational reliability of the DC relay 1 can be improved.

(2) Description of Arc Path-Forming Part 200 According to Another Embodiment of Present Disclosure Hereinafter, an arc path-forming part 200 according to another embodiment of the present disclosure will be described in detail with reference to FIGS. 62 to 67.

Referring to FIGS. 62 to 65, the arc path-forming part 200 according to the illustrated embodiment includes a magnet frame 210, a Halbach array 220, and first to fifth magnet parts 230, 240, 250, 260, and 270.

The magnet frame 210 according to the present embodiment has the same structure and function as the magnet frame 110 according to the above-described embodiment. However, there is a difference in the arrangement method of the Halbach array 220 and the first to fifth magnet parts 230, 240, 250, 260, and 270 disposed in the magnet frame 210 according to the present embodiment.

Accordingly, a description of the magnet frame 210 will be replaced with the description of the magnet frame 110 according to the above-described embodiment.

In the illustrated embodiment, a plurality of magnetic materials constituting the Halbach array 220 are continuously arranged side by side from the front side to the rear side. That is, the Halbach array 220 is formed to extend in the front-rear direction.

In addition, the Halbach array 220 may form a magnetic field together with another magnetic material. In the illustrated embodiment, the Halbach array 220 may form a magnetic field together with each of the first to fifth magnet parts 230, 240, 250, 260, and 270.

The Halbach array 220 may be located adjacent to any one surface of the third and fourth surfaces 213 and 214. In one embodiment, the Halbach array 220 may be coupled to an inner side (i.e., the side in a direction toward a space part 215) of the any one surface.

Figure 62:
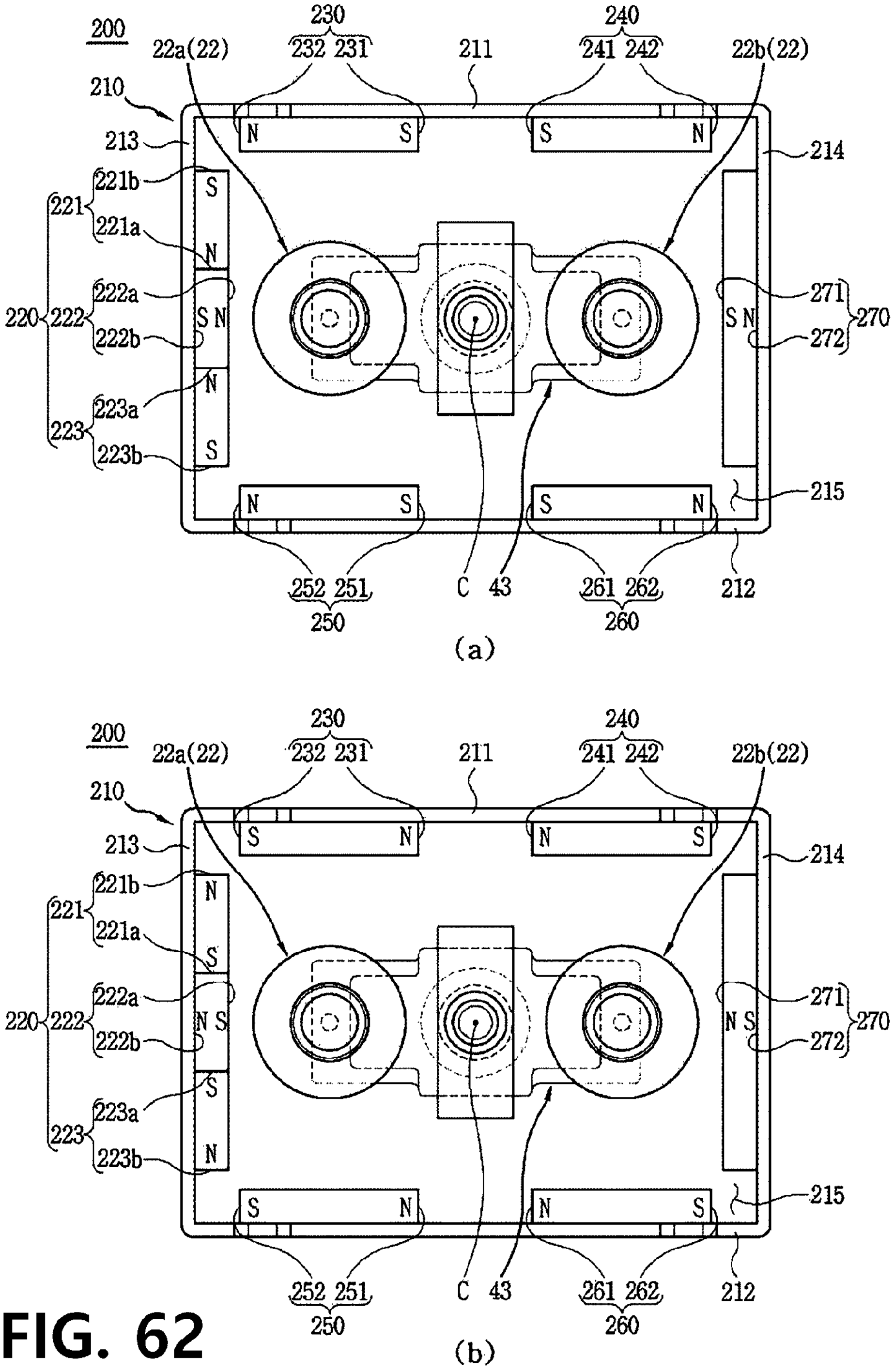
FIGS. 62 to 65 are conceptual views illustrating an arc path-forming part according to another embodiment of the present disclosure.
Figure 63:
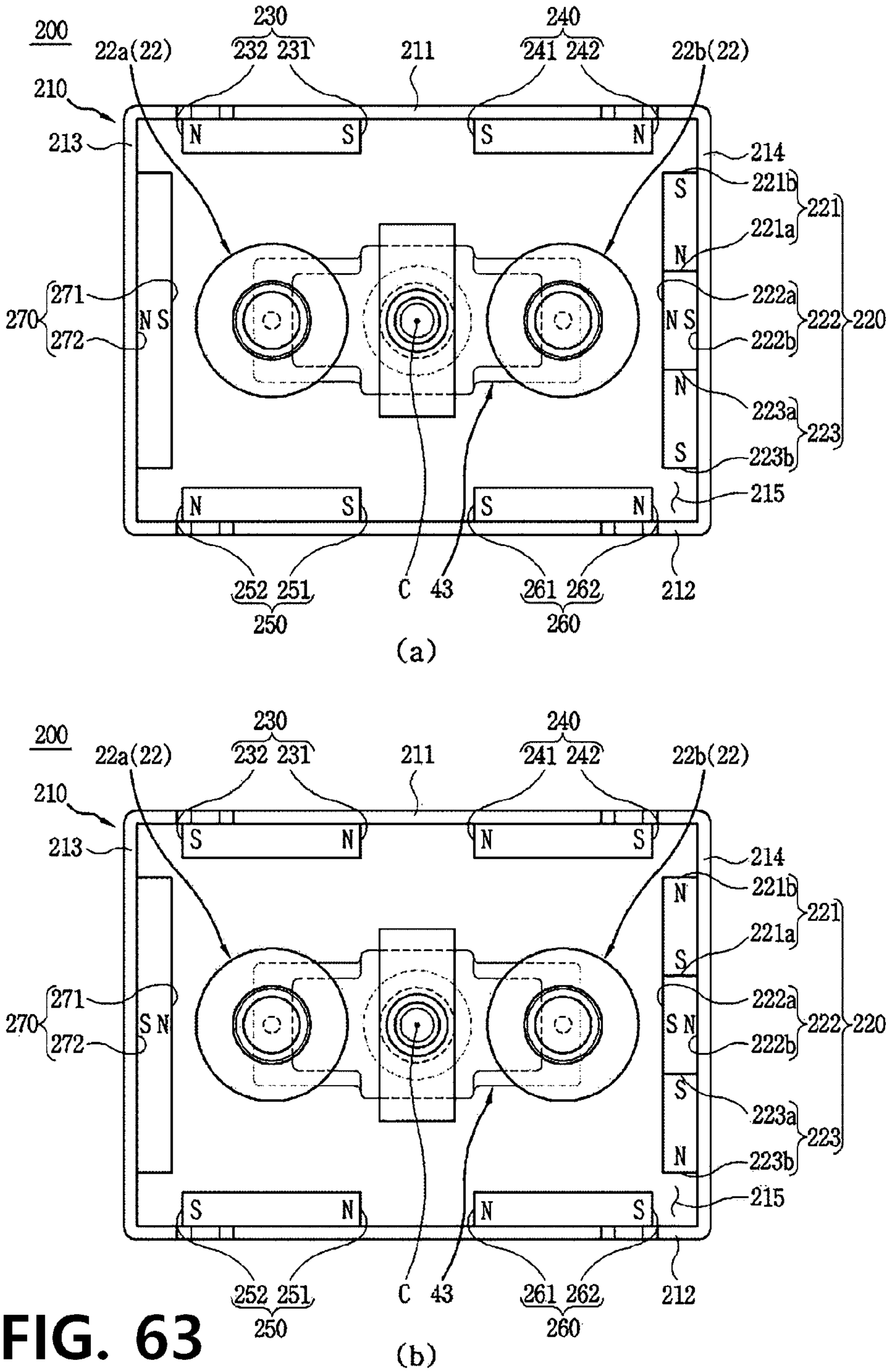
Figure 64:
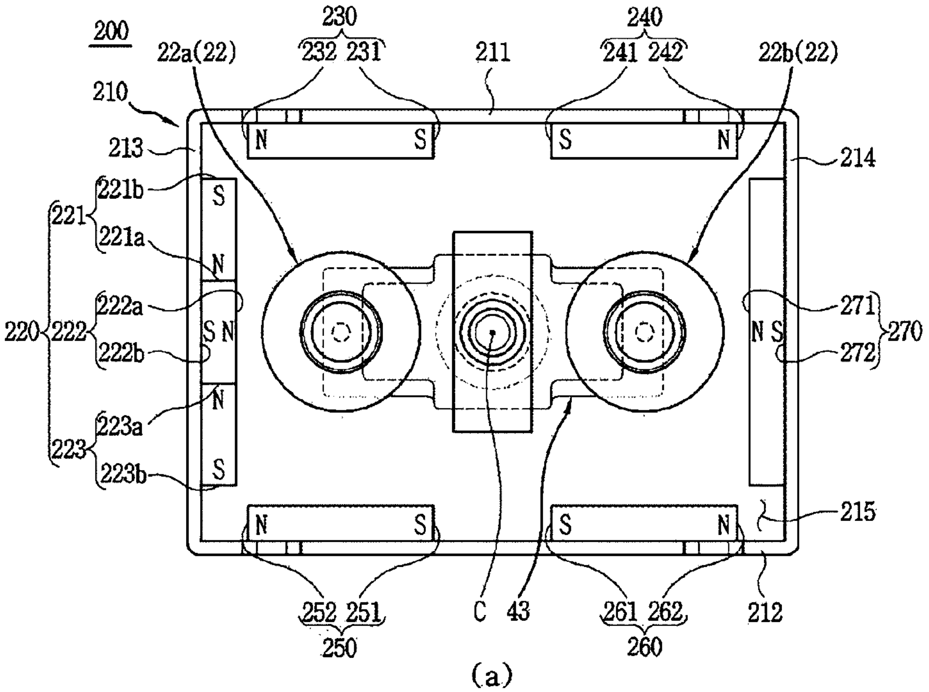
Figure 64:
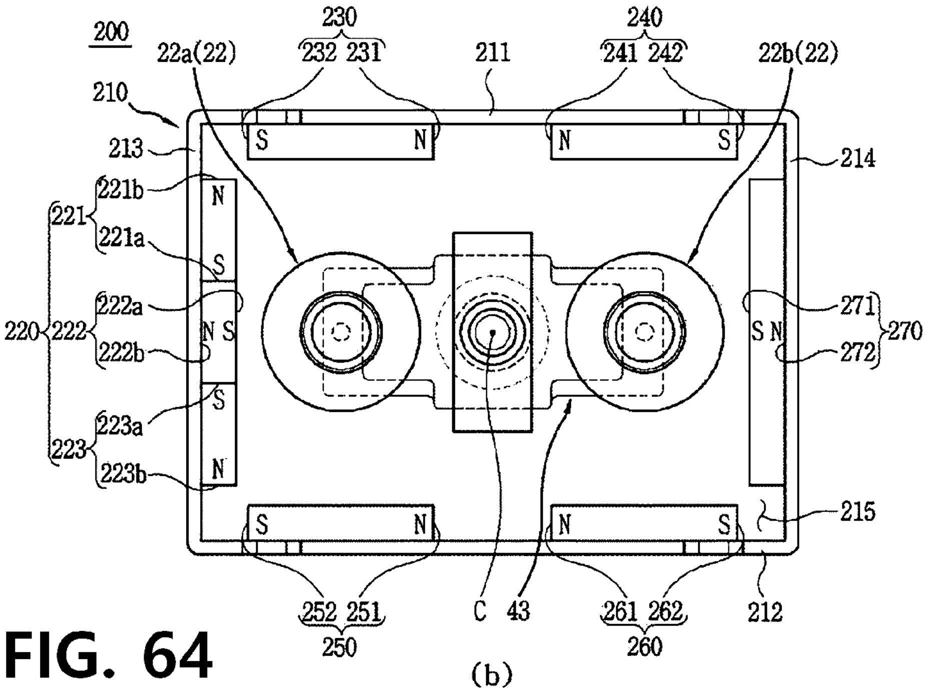

In the embodiment illustrated in FIGS. 62 and 64, the Halbach array 220 is disposed on an inner side of the third surface 213, and disposed adjacent to the third surface 213. In the embodiment illustrated in FIGS. 63 and 65, the Halbach array 220 may be disposed on an inner side of the fourth surface 214, and disposed adjacent to the fourth surface 214.

The Halbach array 220 is disposed to face the fifth magnet part 270. In the embodiment illustrated in FIGS. 62 and 64, the Halbach array 220 is disposed to face the fifth magnet part 270 located on the inner side of the fourth surface 214. In the embodiment illustrated in FIGS. 63 and 65, the Halbach array 220 is disposed to face the fifth magnet part 270 located on the inner side of the third surface 213.

The space part 215, and the fixed contactor 22 and the movable contactor 43 accommodated in the space part 215 are located between the Halbach array 220 and the fifth magnet part 270.

The Halbach array 220 may enhance the strength of the magnetic field formed by itself and the magnetic field formed together with each of the first to fifth magnet parts 230, 240, 250, 260, and 270. Since the process of enhancing the direction and magnetic field of the magnetic field formed by the Halbach array 220 is well known in the art, a detailed description thereof will be omitted.

In the illustrated embodiment, the Halbach array 220 includes a first block 221, a second block 222, and a third block 223. It will be understood that the plurality of magnetic materials constituting the Halbach array 220 are named as the blocks 221, 222, and 223, respectively.

The first to third blocks 221, 222, and 223 may each be formed of a magnetic material. In one embodiment, the first to third blocks 221, 222, and 223 may each be provided as a permanent magnet, an electromagnet, or the like.

The first to third blocks 221, 222, and 223 may be disposed side by side in one direction. In the illustrated embodiment, the first to third blocks 221, 222, and 223 are disposed side by side in a direction in which the third surface 213 or the fourth surface 214 extends, that is, in the front-rear direction.

Among the first to third blocks 221, 222, and 223, the first block 221 is disposed at the most rear side, and the third block 223 is disposed at the most front side. In addition, the second block 222 is located between the first block 221 and the third block 223.

In one embodiment, the second block 222 may be in contact with each of the first and third blocks 221 and 223.

The second block 222 may be disposed to overlap each of the fixed contactors 22*a* and 22*b* in a direction toward the fifth magnet part 270, i.e., in the left-right direction in the illustrated embodiment. In addition, the second block 222 may be disposed to overlap the fifth magnet part 270 in the left-right direction.

Each of the blocks 221, 222, and 223 includes a plurality of surfaces.

Specifically, the first block 221 includes a first inner surface 221*a* facing the second block 222 and a first outer surface 221*b* opposite to the second block 222.

The second block 222 includes a second inner surface 222*a* facing the space part 215 or the fifth magnet part 270 and a second outer surface 222*b* opposite to the space part 215 or the fifth magnet part 270.

In addition, the third block 223 includes a third inner surface 223*a* facing the second block 222 and a third outer surface 223*b* opposite to the second block 222.

The plurality of surfaces of each of the blocks 221, 222, and 223 may be magnetized according to a predetermined rule to configure a Halbach array.

In the embodiment illustrated in FIGS. 62 and 63, the first to third inner surfaces 221*a*, 222*a*, and 223*a* are magnetized to the same polarity. At this point, the first to third inner surfaces 221*a*, 222*a*, and 223*a* may be magnetized to the same polarity as each of opposing surfaces 232, 242, 252, 262, and 272 respectively of the first to fifth magnet parts 230, 240, 250, 260, and 270.

In addition, the first to third outer surfaces 221*b*, 222*b*, and 223*b* are magnetized to a polarity different from the polarity of the first to third inner surfaces 221*a*, 222*a*, and 223*a*. At this point, the first to third outer surfaces 221*b*, 222*b*, and 223*b* may be magnetized to the same polarity as each of facing surfaces 231, 241, 251, 261, and 271 respectively of the first to fifth magnet parts 230, 240, 250, 260, and 270.

Figure 65:
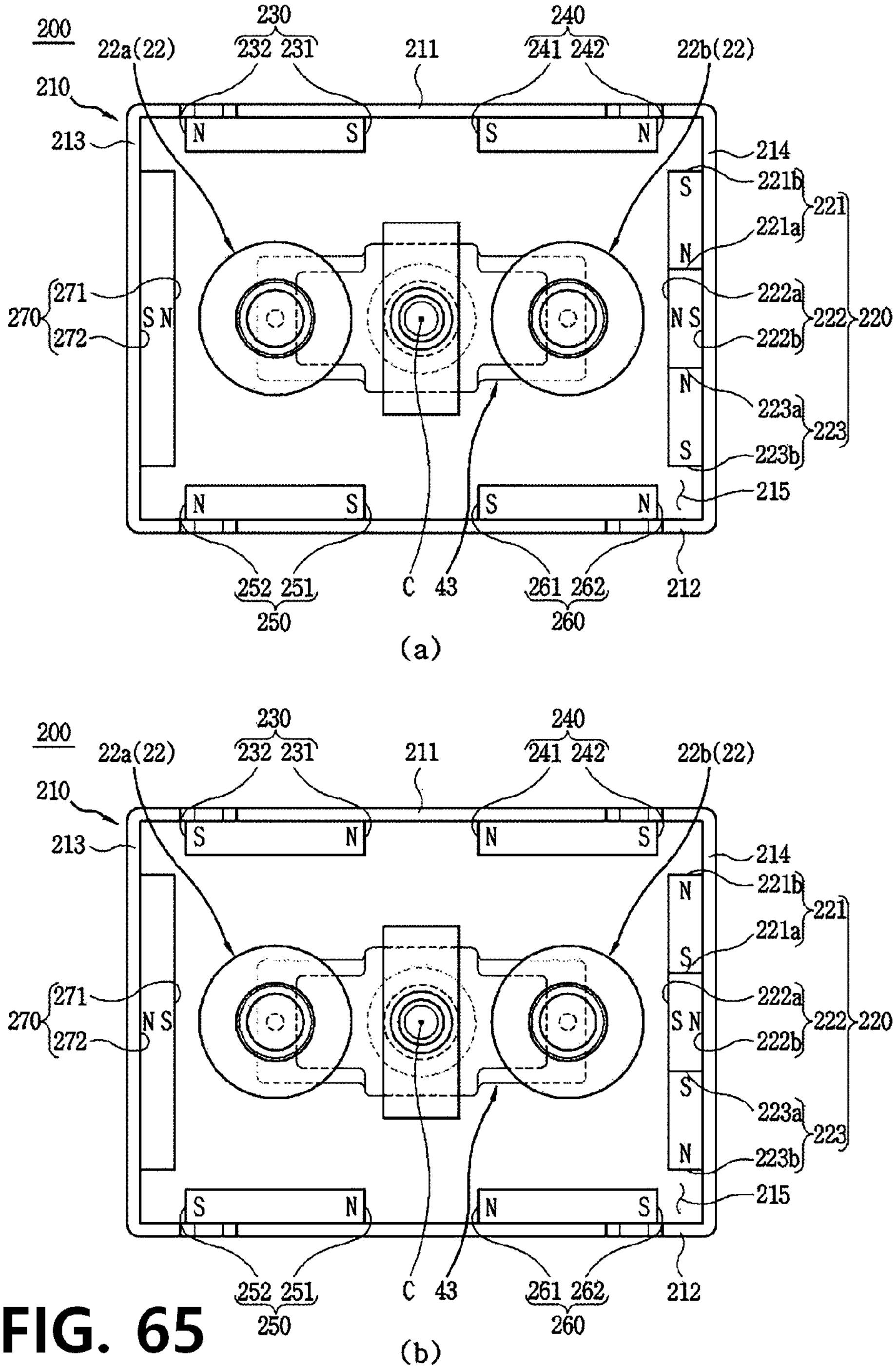

In the embodiment illustrated in FIGS. 64 and 65, the first to third inner surfaces 221*a*, 222*a*, and 223*a* are magnetized to the same polarity. At this point, the first to third inner surfaces 221*a*, 222*a*, and 223*a* may be magnetized to the same polarity as the fifth facing surface 271 of the fifth magnet part 270.

Furthermore, the first to third inner surfaces 221*a*, 222*a*, and 223*a* may be magnetized to the same polarity as each of the opposing surfaces 232, 242, 252, and 262 respectively of the first to fourth magnet parts 230, 240, 250, and 260.

In addition, the first to third outer surfaces 221*b*, 222*b*, and 223*b* are magnetized to a polarity different from the polarity of the first to third inner surfaces 221*a*, 222*a*, and 223*a*. At this point, the first to third outer surfaces 221*b*, 222*b*, and 223*b* may be magnetized to the same polarity as the fifth opposing surface 272 of the fifth magnet part 270.

Furthermore, the first to third outer surfaces 221*b*, 222*b*, and 223*b* may be magnetized to the same polarity as each of the facing surfaces 231, 241, 251, and 261 respectively of the first to fourth magnet parts 230, 240, 250, and 260.

Each of the first to fifth magnet parts 230, 240, 250, 260, and 270 forms a magnetic field by itself and forms magnetic fields together with the Halbach array 220 and each of the magnet parts 230, 240, 250, 260, and 270 except for itself. An arc path A.P may be formed inside the arc chamber 21 by the magnetic fields formed by the first to fifth magnet parts 230, 240, 250, 260, and 270.

The first to fifth magnet parts 230, 240, 250, 260, and 270 may each be provided in any form capable of forming a magnetic field by being magnetized. In one embodiment, the first to fifth magnet parts 230, 240, 250, 260, and 270 may each be provided as a permanent magnet, an electromagnet, or the like.

The first to fifth magnet parts 230, 240, 250, 260, and 270 may be located adjacent to respective first to fourth surfaces 211, 212, 213, and 214.

In the illustrated embodiment, the first magnet part 230 and the second magnet part 240 are located adjacent to the first surface 211. The first magnet part 230 is located to be biased to the third surface 213. The second magnet part 240 is located to be biased to the fourth surface 214.

The first magnet part 230 and the second magnet part 240 are disposed to face the third magnet part 250 and the fourth magnet part 260, respectively, with the space part 215 therebetween.

In one embodiment, the first magnet part 230 may overlap the first fixed contactor 22*a* and the third magnet part 250 in the front-rear direction. In addition, the second magnet part 240 may overlap the second fixed contactor 22*b* and the fourth magnet part 260 in the front-rear direction.

The first magnet part 230 and the second magnet part 240 are disposed side by side in an extending direction thereof. In one embodiment, the first magnet part 230 and the second magnet part 240 may be in contact with each other.

In the illustrated embodiment, the third magnet part 250 and the fourth magnet part 260 are located adjacent to the second surface 212. The third magnet part 250 is located to be biased to the third surface 213. The fourth magnet part 260 is located to be biased to the fourth surface 214.

The third magnet part 250 and the fourth magnet part 260 are disposed to face the first magnet part 230 and the second magnet part 240, respectively, with the space part 215 therebetween.

In one embodiment, the third magnet part 250 may overlap the first fixed contactor 22*a* and the first magnet part 230 in the front-rear direction. In addition, the fourth magnet part 260 may overlap the second fixed contactor 22*b* and the second magnet part 240 in the front-rear direction.

The third magnet part 250 and the fourth magnet part 260 are disposed side by side in an extending direction thereof. In one embodiment, the third magnet part 250 and the fourth magnet part 260 may be in contact with each other.

The fifth magnet part 270 is disposed to face the Halbach array 220. In the embodiment illustrated in FIGS. 62 and 64, the fifth magnet part 270 is located on the inner side of the fourth surface 214, i.e., located adjacent to the fourth surface 214 and disposed to face the Halbach array 220 located on the inner side of the third surface 213.

In the embodiment illustrated in FIGS. 63 and 65, the fifth magnet part 270 is located on the inner side of the third surface 213, i.e., located adjacent to the third surface 213 and disposed to face the Halbach array 220 located on the inner side of the fourth surface 214.

The space part 215, and the fixed contactor 22 and the movable contactor 43 accommodated in the space part 215 are located between the fifth magnet part 270 and the Halbach array 220.

The first to fourth magnet parts 230, 240, 250, and 260 are formed to extend in one direction. In the illustrated embodiment, the first to fourth magnet parts 230, 240, 250, and 260 are formed to extend in the left-right direction.

The fifth magnet part 270 is formed to extend in another direction. In the illustrated embodiment, the fifth magnet part 270 is formed to extend in the front-rear direction.

Each of the first to fifth magnet parts 230, 240, 250, 260, and 270 includes a plurality of surfaces.

Specifically, the first magnet part 230 includes a first facing surface 231 facing the second magnet part 240 and a first opposing surface 232 opposite to the second magnet part 240.

The second magnet part 240 includes a second facing surface 241 facing the first magnet part 230 and a second opposing surface 242 opposite to the first magnet part 230.

The third magnet part 250 includes a third facing surface 251 facing the fourth magnet part 260 and a third opposing surface 252 opposite to the fourth magnet part 260.

The fourth magnet part 260 includes a fourth facing surface 261 facing the third magnet part 250 and a fourth opposing surface 262 opposite to the third magnet part 250.

The fifth magnet part 270 includes the fifth facing surface 271 facing the Halbach array 220 or the space part 215, and the fifth opposing surface 272 opposite to the Halbach array 220 or the space part 215.

Each surface of the first to fifth magnet parts 230, 240, 250, 260, and 270 may be magnetized according to a predetermined rule.

In the embodiment illustrated in FIGS. 62 and 63, the first to fifth facing surfaces 231, 241, 251, 261, and 271 are magnetized to the same polarity. At this point, the first to fifth facing surfaces 231, 241, 251, 261, and 271 are magnetized to the same polarity as the first to third outer surfaces 221*b*, 222*b*, and 223*b* of the Halbach array 220.

Similarly, the first to fifth opposing surfaces 232, 242, 252, 262, and 272 are magnetized to a polarity different from the polarity of the first to fifth facing surfaces 231, 241, 251, 261, and 271. At this point, the first to fifth opposing surfaces 232, 242, 252, 262, and 272 are magnetized to the same polarity as the first to third inner surfaces 221*a*, 222*a*, and 223*a* of the Halbach array 220.

In the embodiment illustrated in FIGS. 64 and 65, the first to fourth facing surfaces 231, 241, 251, and 261 are magnetized to the same polarity. In addition, the first to fourth facing surfaces 231, 241, 251, and 261 are magnetized to a polarity different from that of the fifth facing surface 271.

At this point, the first to fourth facing surfaces 231, 241, 251, and 261 are magnetized to the same polarity as the first to third outer surfaces 221*b*, 222*b*, and 223*b* of the Halbach array 220.

Similarly, the first to fourth opposing surfaces 232, 242, 252, and 262 are magnetized to a polarity different from the polarity of the first to fourth facing surfaces 231, 241, 251, and 261. At this point, the first to fourth opposing surfaces 232, 242, 252, and 262 are magnetized to the same polarity as the first to third inner surfaces 221*a*, 222*a*, and 223*a* of the Halbach array 220 and the fifth facing surface 271.

Hereinafter, an arc path A.P formed by the arc path-forming part 200 according to the present embodiment will be described in detail with reference to FIGS. 66 and 67.

Figure 66:
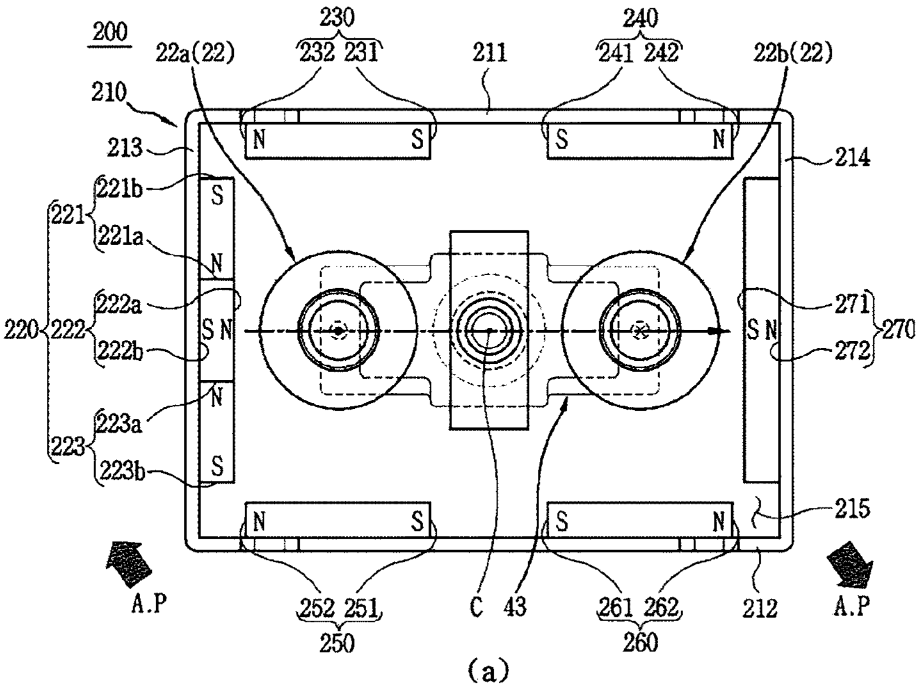
FIGS. 66 and 67 are conceptual views illustrating magnetic fields and arc paths formed by the arc path-forming part according to the embodiment of FIGS. 62 to 65.
Figure 66:
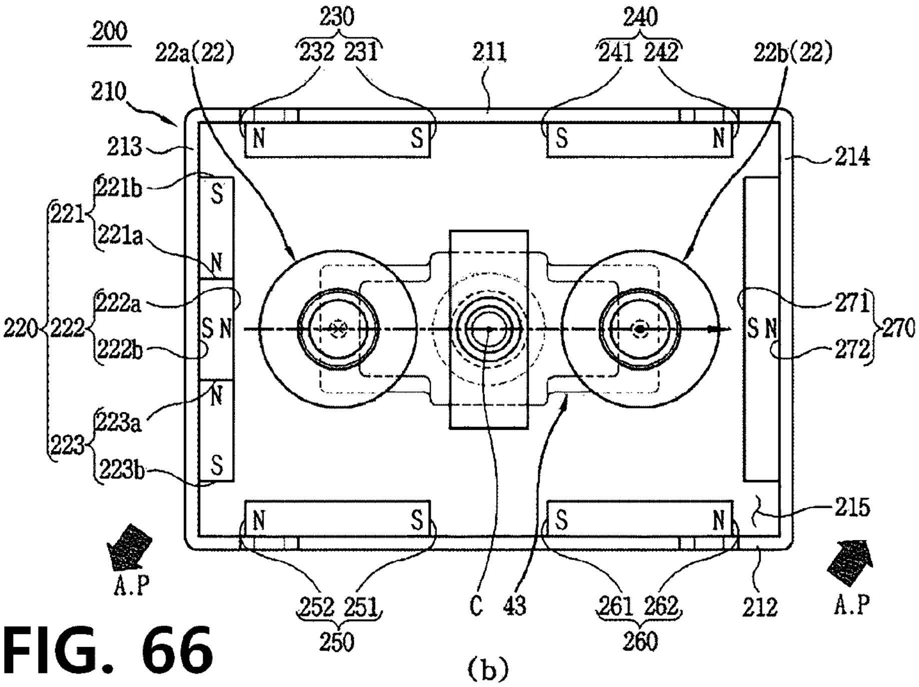

Referring to FIG. 66, each of the inner surfaces 221*a*, 222*a*, and 223*a* of the Halbach array 220 and each of the facing surfaces 231, 241, 251, 261, and 271 respectively of the first to fifth magnet parts 230, 240, 250, 260, and 270 are magnetized to different polarities.

That is, each of the inner surfaces 221*a*, 222*a*, and 223*a* of the Halbach array 220 are magnetized to an N pole, and each of the facing surfaces 231, 241, 251, 261, and 271 respectively of the first to fifth magnet parts 230, 240, 250, 260, and 270 are magnetized to an S pole.

Accordingly, a magnetic field in a direction from the second inner surface 222*a* to each of the facing surfaces 231, 241, 251, 261, and 271 is formed between the Halbach array 220 and the first to fifth magnet parts 230, 240, 250, 260, and 270. In particular, the magnetic field in the direction from the second inner surface 222*a* toward the fifth facing surface 271 is dominant.

Figure 67:
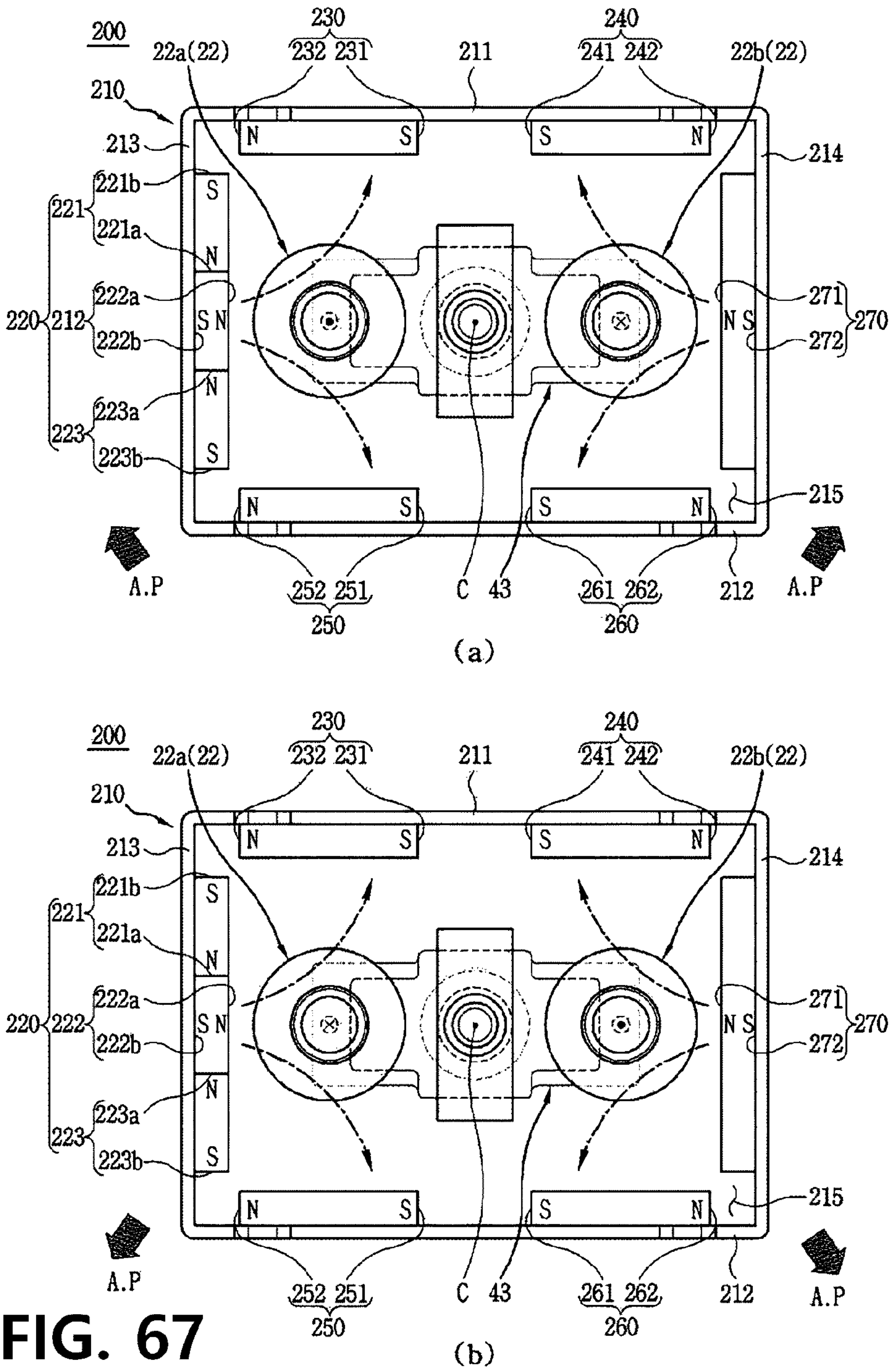

Referring to FIG. 67, each of the inner surfaces 221*a*, 222*a*, and 223*a* of the Halbach array 220 and the fifth facing surface 271 of the fifth magnet part 270 are magnetized to the same polarity. In addition, the first to fourth facing surfaces 231, 241, 251, and 261 of the first to fourth magnet parts 230, 240, 250, and 260 are magnetized to a polarity different from the polarity of the inner surfaces 221*a*, 222*a*, and 223*a* of the Halbach array 220 and the fifth facing surface 271 of the fifth magnet part 270.

That is, each of the inner surfaces 221*a*, 222*a*, and 223*a* of the Halbach array 220 and the fifth facing surface 271 are magnetized to N poles, and the first to fourth facing surfaces 231, 241, 251, and 261 are magnetized to S poles.

Accordingly, magnetic fields that repel each other are formed between the Halbach array 220 and the fifth magnet part 270. In addition, a magnetic field in a direction from the second inner surface 222*a* to each of the first to fourth facing surfaces 231, 241, 251, and 261 is formed between the Halbach array 220 and the first to fourth magnet parts 230, 240, 250, and 260.

Furthermore, a magnetic field in a direction from the fifth facing surface 271 toward each of the first to fourth facing surfaces 231, 241, 251, and 261 is formed between the fifth magnet part 270 and the first to fourth magnet parts 230, 240, 250, and 260.

At this point, the strength of the magnetic fields formed between the Halbach array 220 and the first to fifth magnet parts 230, 240, 250, 260, and 270 may be enhanced by the magnetic fields formed by the first and third blocks 221 and 223.

In the embodiment illustrated in FIGS. 66A and 67A, a direction of current is a direction from the second fixed contactor 22*b* to the first fixed contactor 22*a* via the movable contactor 43.

In the embodiment illustrated in FIG. 66A, when the Fleming's left-hand rule is applied to the first fixed contactor 22*a*, an electromagnetic force generated in the vicinity of the first fixed contactor 22*a* is formed toward the rear left side. Accordingly, the arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side. Accordingly, the arc path A.P in the vicinity of the second fixed contactor 22*b* is also formed toward the front right side.

In the embodiment illustrated in FIG. 67A, when the Fleming's left-hand rule is applied to the first fixed contactor 22*a*, an electromagnetic force generated in the vicinity of the first fixed contactor 22*a* is formed toward the rear left side. Accordingly, the arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIGS. 66B and 67B, a direction of current is a direction from the first fixed contactor 22*a* to the second fixed contactor 22*b* via the movable contactor 43.

In the embodiment illustrated in FIG. 66B, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIG. 67B, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the front right side. Accordingly, the arc path A.P in the vicinity of the second fixed contactor 22*b* is also formed toward the front right side.

Although not illustrated in the drawing, when the polarity of each surface of the Halbach array 220 and the first to fifth magnet parts 230, 240, 250, 260, and 270 is changed, the directions of the magnetic fields formed in the Halbach array 220 and the first to fifth magnet parts 230, 240, 250, 260, and 270 are reversed. Accordingly, the generated electromagnetic force and the arc path A.P are also formed so that the front-rear direction thereof is reversed.

That is, in the electric connection situation shown in FIG. 66A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the rear right side.

In the electric connection situation shown in FIG. 67A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the front right side.

Similarly, in the electric connection situation shown in FIG. 66B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the front right side.

In the electric connection situation shown in FIG. 67B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the rear right side.

Accordingly, in the arc path-forming part 200 according to the present embodiment, the electromagnetic force and the arc path A.P may be formed in a direction away from the central part C regardless of the polarity of each of the Halbach array 220 and the first to fifth magnet parts 230, 240, 250, 260, and 270 or the direction of the current flowing through the DC relay 1.

Accordingly, damage to each component of the DC relay 1 disposed adjacent to the central part C can be prevented. Furthermore, since the generated arc can be quickly discharged to the outside, operational reliability of the DC relay 1 can be improved.

(3) Description of Arc Path-Forming Part 300 According Still Another Embodiment of Present Disclosure Hereinafter, an arc path-forming part 300 according to still another embodiment of the present disclosure will be described in detail with reference to FIGS. 68 to 73.

Referring to FIGS. 68 to 71, the arc path-forming part 300 according to the illustrated embodiment includes a magnet frame 310, a first Halbach array 320, a second Halbach array 330, and first to fourth magnet parts 340, 350, 360, and 370.

The magnet frame 310 according to the present embodiment has the same structure and function as the magnet frame 110 according to the above-described embodiment. However, there is a difference in the arrangement method of the first and second Halbach arrays 320 and 330 and the first to fourth magnet parts 340, 350, 360, and 370 disposed in the magnet frame 310 according to the present embodiment.

Accordingly, a description of the magnet frame 310 will be replaced with the description of the magnet frame 110 according to the above-described embodiment.

In the illustrated embodiment, a plurality of magnetic materials constituting the first Halbach array 320 are continuously arranged side by side from the front side to the rear side. That is, the first Halbach array 320 is formed to extend in the front-rear direction.

The first Halbach array 320 may form a magnetic field together with another magnetic material. In the illustrated embodiment, the first Halbach array 320 may form magnetic fields together with the second Halbach array 330 and the first to fourth magnet parts 340, 350, 360, and 370.

The first Halbach array 320 may be located adjacent to any one surface of the third and fourth surfaces 313 and 314. In one embodiment, the first Halbach array 320 may be coupled to an inner side (i.e., the side in a direction toward a space part 315) of the any one surface.

In the illustrated embodiment, the first Halbach array 320 is disposed on an inner side of the third surface 313, and disposed adjacent to the third surface 313. Although not illustrated in the drawing, the first Halbach array 320 may be disposed on an inner side of the fourth surface 314, and disposed adjacent to the fourth surface 314.

The first Halbach array 320 is disposed to face the second Halbach array 330. In the illustrated embodiment, the first Halbach array 320 is disposed to face the second Halbach array 330 located on the inner side of the fourth surface 314.

The first Halbach array 320 is located to be biased to any one surface of the first surface 311 and the second surface 312. In the embodiment illustrated in FIGS. 68 and 70, the first Halbach array 320 is located to be biased to the second surface 312. In the embodiment illustrated in FIGS. 69 and 71, the first Halbach array 320 is located to be biased to the first surface 311.

The space part 315, and the fixed contactor 22 and the movable contactor 43 accommodated in the space part 315 are located between the first Halbach array 320 and the second Halbach array 330.

The first Halbach array 320 may enhance the strength of the magnetic field formed by itself and the magnetic fields formed by the second Halbach array 330 and the first to fourth magnet parts 340, 350, 360, and 370. Since the process of enhancing the direction and magnetic field of the magnetic field formed by the first Halbach array 320 is a well-known technique, a detailed description thereof will be omitted.

In the illustrated embodiment, the first Halbach array 320 includes a first block 321 and a second block 322. It will be understood that the plurality of magnetic materials constituting the first Halbach array 320 are named as the blocks 321 and 322, respectively.

The first and second blocks 321 and 322 may each be formed of a magnetic material. In one embodiment, the first and second blocks 321 and 322 may each be provided as a permanent magnet, an electromagnet, or the like.

The first and second blocks 321 and 322 may be disposed side by side in one direction. In the illustrated embodiment, the first and second blocks 321 and 322 are disposed side by side in a direction in which the third surface 313 extends, that is, in the front-rear direction.

Figure 68:
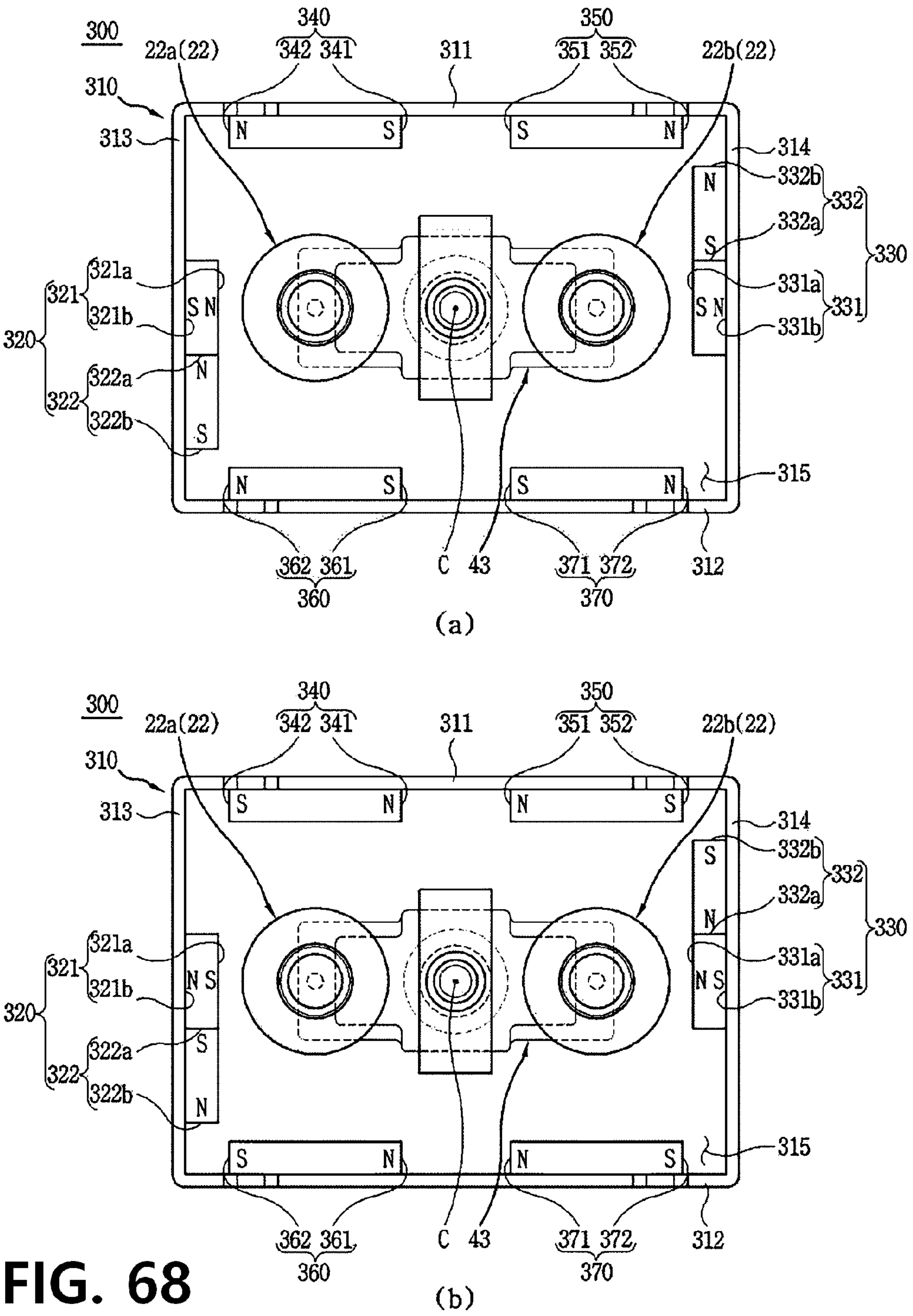
FIGS. 68 to 71 are conceptual views illustrating an arc path-forming part according to still another embodiment of the present disclosure.
Figure 70:
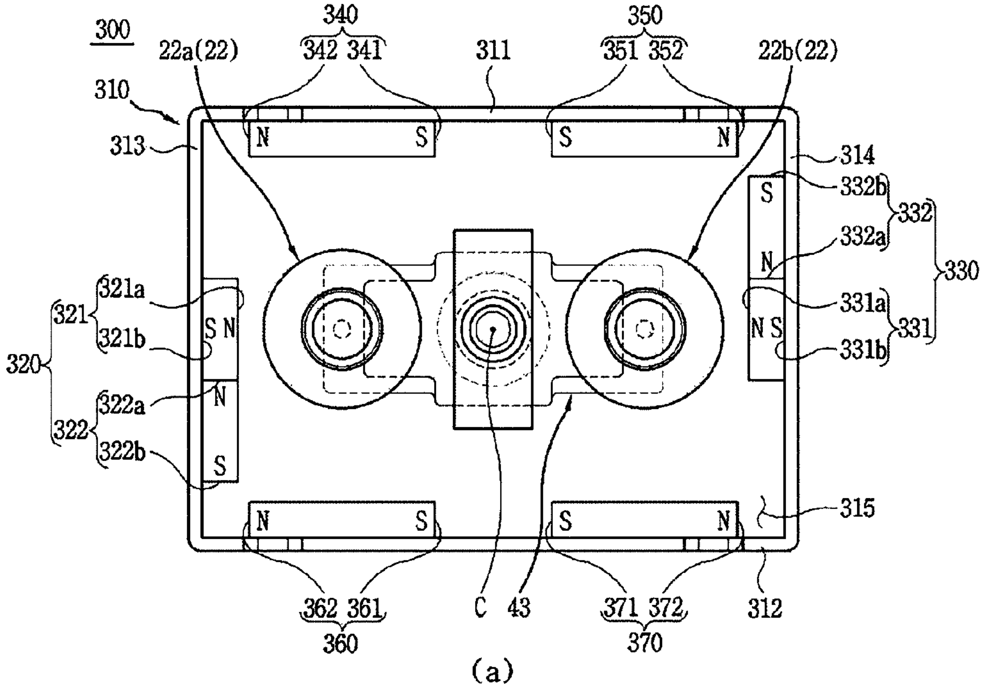
Figure 70:
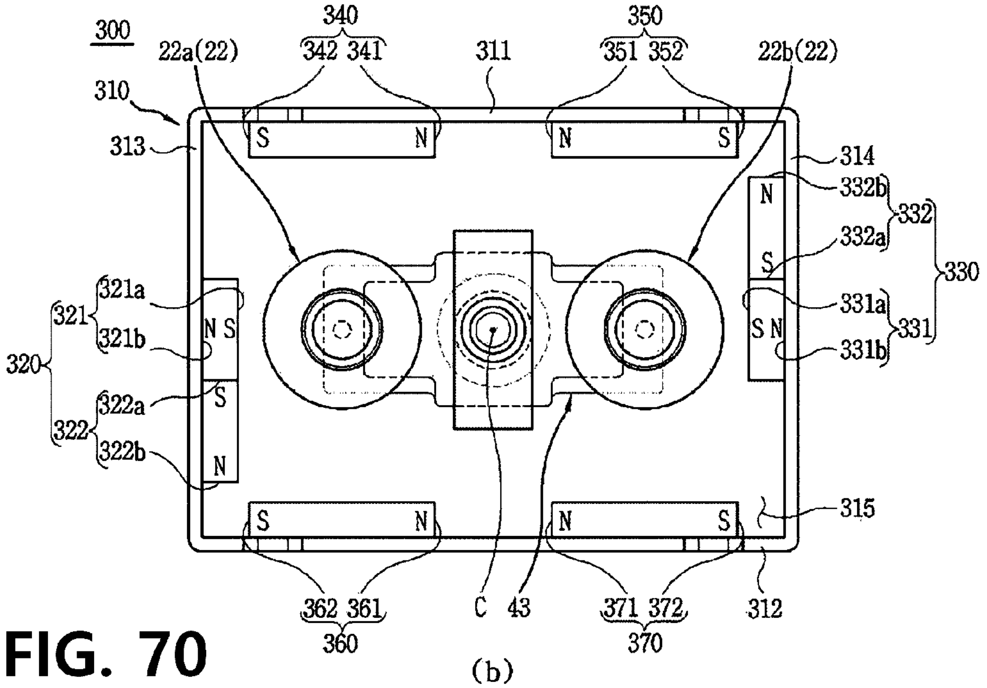

In the embodiment illustrated in FIGS. 68 and 70, the first block 321 is disposed in a central portion, and the second block 322 is located at a front side of the first block 321.

Figure 69:
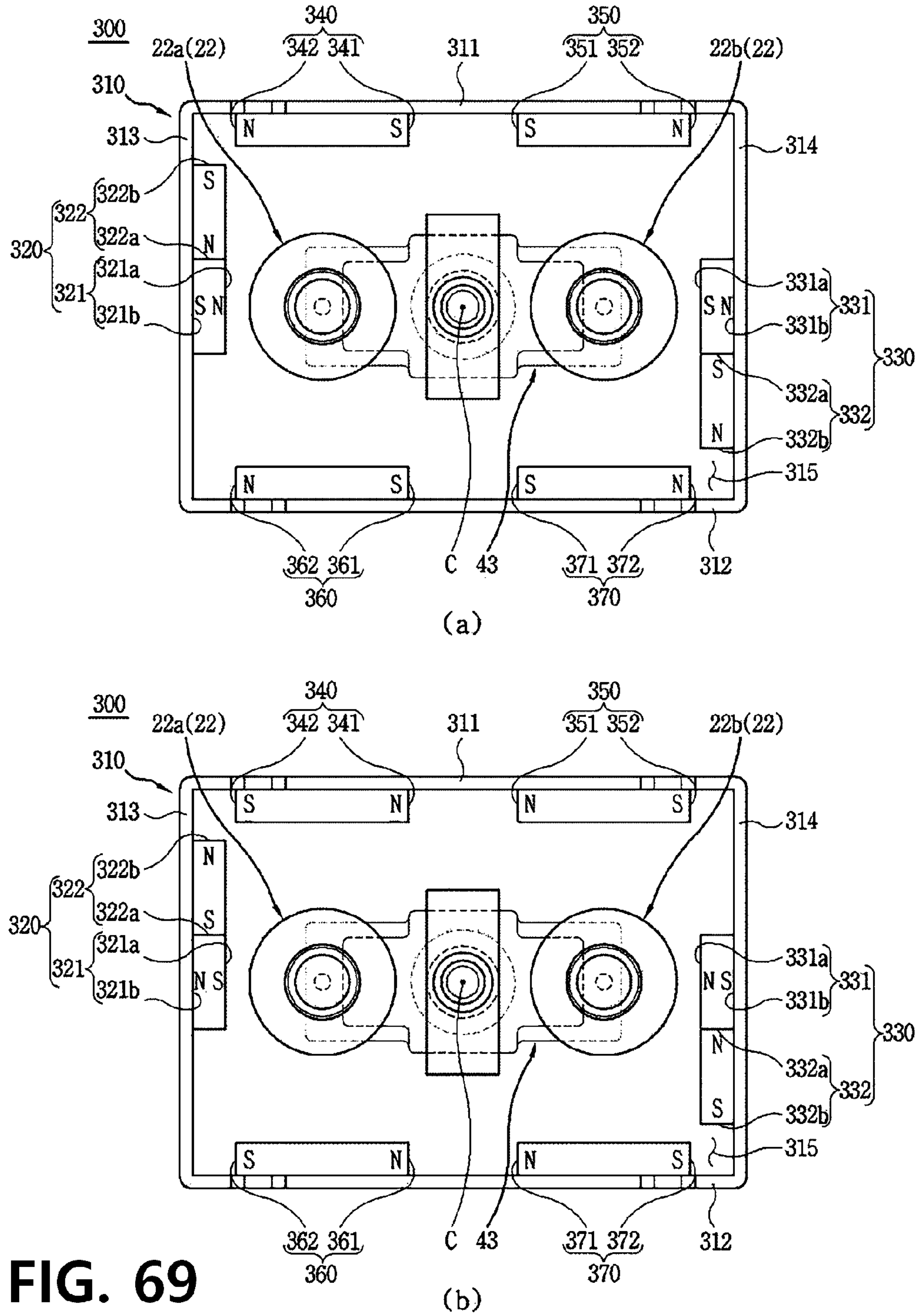
Figure 71:
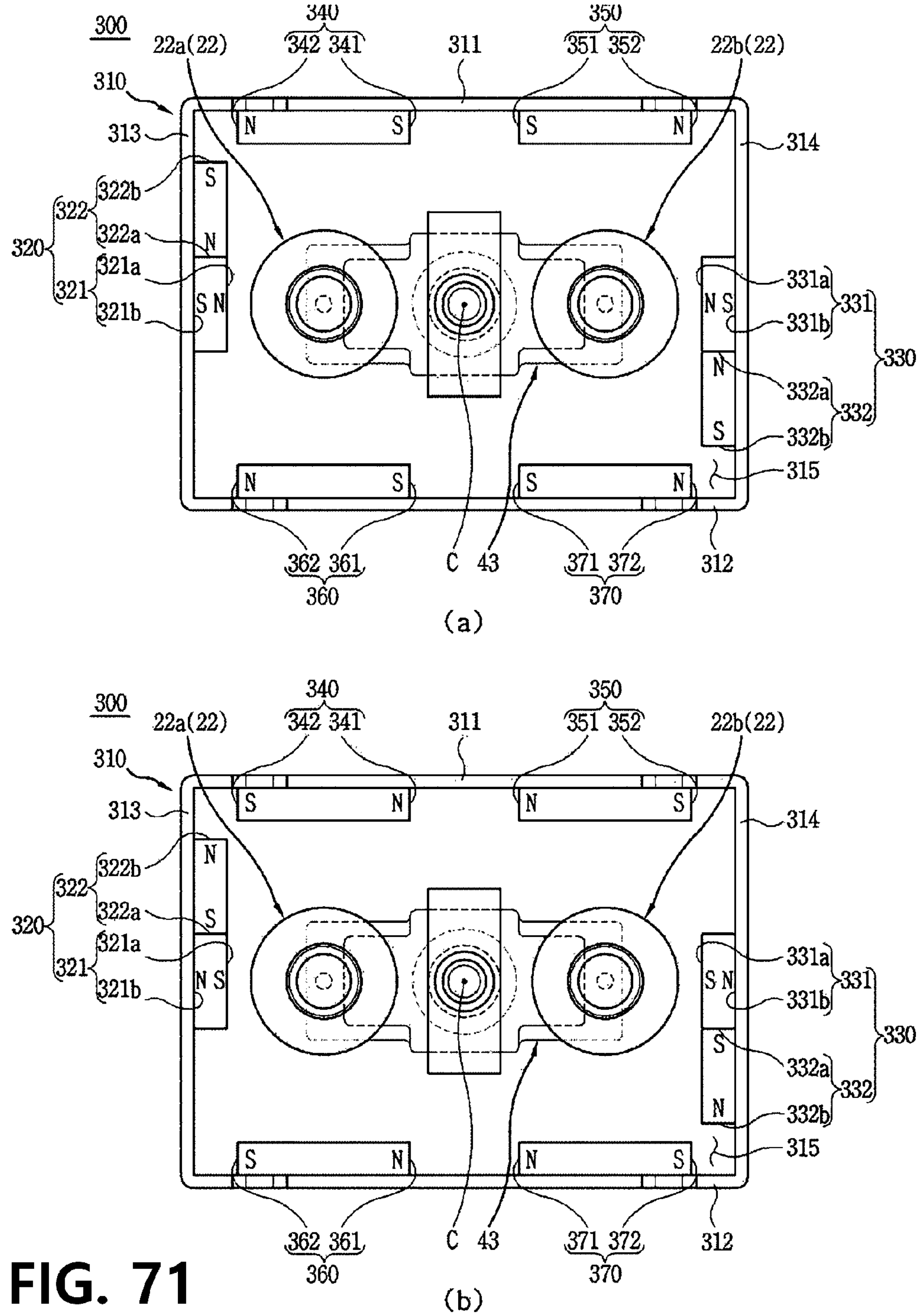

In the embodiment illustrated in FIGS. 69 and 71, the first block 321 is disposed in the central portion, and the second block 322 is located at a rear side of the first block 321.

In one embodiment, the first block 321 and the second block 322 may be in contact with each other.

The first block 321 may be disposed to overlap each of the fixed contactors 22*a* and 22*b* in a direction toward the fourth surface 314, i.e., in the left-right direction in the illustrated embodiment. In addition, the first block 321 may be disposed to overlap a first block 331 of the second Halbach array 330 in the left-right direction.

Each of the blocks 321 and 322 includes a plurality of surfaces.

Specifically, the first block 321 includes a first inner surface 321*a* facing the space part 315 or the second Halbach array 330 and a first outer surface 321*b* opposite to the space part 315 or the second Halbach array 330.

The second block 322 includes a second inner surface 322*a* facing the first block 321 and a second outer surface 322*b* opposite to the first block 321.

The plurality of surfaces of each of the blocks 321 and 322 may be magnetized according to a predetermined rule to configure a Halbach array.

In the embodiment illustrated in FIGS. 68 and 69, the first and second inner surfaces 321*a* and 322*a* are magnetized to the same polarity. At this point, the first and second inner surfaces 321*a* and 322*a* may be magnetized to the same polarity as each of outer surfaces 331*b* and 332*b* of the second Halbach array 330.

Furthermore, the first and second inner surfaces 321*a* and 322*a* may be magnetized to the same polarity as each of opposing surfaces 342, 352, 362, and 372 respectively of the magnet parts 340, 350, 360, and 370.

In addition, the first and second outer surfaces 321*b* and 322*b* are magnetized to a polarity different from the polarity of the first and second inner surfaces 321*a* and 322*a*. At this point, the first and second outer surfaces 321*b* and 322*b* may be magnetized to the same polarity as each of inner surfaces 331*a* and 332*a* of the second Halbach array 330.

Furthermore, the first and second outer surfaces 321*b* and 322*b* may be magnetized to the same polarity as each of facing surfaces 341, 351, 361, and 371 respectively of the magnet parts 340, 350, 360, and 370.

In the embodiment illustrated in FIGS. 70 and 71, the first and second inner surfaces 321*a* and 322*a* are magnetized to the same polarity. At this point, the first and second inner surfaces 321*a* and 322*a* may be magnetized to the same polarity as each of the inner surfaces 331*a* and 332*a* of the second Halbach array 330.

Furthermore, the first and second inner surfaces 321*a* and 322*a* may be magnetized to the same polarity as each of opposing surfaces 342, 352, 362, and 372 respectively of the magnet parts 340, 350, 360, and 370.

In addition, the first and second outer surfaces 321*b* and 322*b* are magnetized to a polarity different from the polarity of the first and second inner surfaces 321*a* and 322*a*. At this point, the first and second outer surfaces 321*b* and 322*b* may be magnetized to the same polarity as each of the outer surfaces 331*b* and 332*b* of the second Halbach array 330.

Furthermore, the first and second outer surfaces 321*b* and 322*b* may be magnetized to the same polarity as each of facing surfaces 341, 351, 361, and 371 respectively of the magnet parts 340, 350, 360, and 370.

In the illustrated embodiment, a plurality of magnetic materials constituting the second Halbach array 330 are continuously arranged side by side from the front side to the rear side. That is, the second Halbach array 330 is formed to extend in the front-rear direction.

The second Halbach array 330 may form a magnetic field together with another magnetic material. In the illustrated embodiment, the second Halbach array 330 may form magnetic fields together with the first Halbach array 320 and the first to fourth magnet parts 340, 350, 360, and 370.

The second Halbach array 330 may be located adjacent to the other surface of the third and fourth surfaces 313 and 314. In one embodiment, the second Halbach array 330 may be coupled to an inner side (i.e., the side in a direction toward the space part 315) of the other surface In the illustrated embodiment, the second Halbach array 330 is disposed on the inner side of the fourth surface 314, and disposed adjacent to the fourth surface 314. Although not illustrated in the drawing, the second Halbach array 330 may be disposed on the inner side of the third surface 313, and disposed adjacent to the third surface 313.

The second Halbach array 330 is disposed to face the first Halbach array 320. In the illustrated embodiment, the second Halbach array 330 is disposed to face the first Halbach array 320 located on the inner side of the third surface 313.

The second Halbach array 330 is located to be biased to the other surface of the first surface 311 and the second surface 312. In the embodiment illustrated in FIGS. 68 and 70, the second Halbach array 330 is located to be biased to the first surface 311. In the embodiment illustrated in FIGS.

69 and 71, the second Halbach array 330 is located to be biased to the second surface 312.

The space part 315, and the fixed contactor 22 and the movable contactor 43 accommodated in the space part 315 are located between the second Halbach array 330 and the first Halbach array 320.

The second Halbach array 330 may enhance the strength of the magnetic field formed by itself and the magnetic fields formed by the first Halbach array 320 and each of the magnet parts 340, 350, 360, and 370. Since the process of enhancing the direction and magnetic field of the magnetic field formed by the second Halbach array 330 is a well-known technique, a detailed description thereof will be omitted.

In the illustrated embodiment, the second Halbach array 330 includes the first block 331 and a second block 332. It will be understood that the plurality of magnetic materials constituting the second Halbach array 330 are named as the blocks 331 and 332, respectively.

The first and second blocks 331 and 332 may each be formed of a magnetic material. In one embodiment, the first and second blocks 331 and 332 may each be provided as a permanent magnet, an electromagnet, or the like.

The first and second blocks 331 and 332 may be disposed side by side in one direction. In the illustrated embodiment, the first and second blocks 331 and 332 are disposed side by side in a direction in which the fourth surface 314 extends, that is, in the front-rear direction.

In the embodiment illustrated in FIGS. 68 and 70, the first block 331 is disposed in a central portion, and the second block 332 is located at a rear side of the first block 321.

In the embodiment illustrated in FIGS. 69 and 71, the first block 331 is disposed in the central portion, and the second block 332 is located at a front side of the first block 331.

In one embodiment, the first block 331 and the second block 332 may be in contact with each other.

The second block 332 may be disposed to overlap each of the fixed contactors 22*a* and 22*b* in a direction toward the third surface 313, i.e., in the left-right direction in the illustrated embodiment. In addition, the second block 332 may be disposed to overlap the first block 321 of the first Halbach array 320 in the left-right direction.

Each of the blocks 331 and 332 includes a plurality of surfaces.

Specifically, the first block 331 includes a first inner surface 331*a* facing the space part 315 or the first Halbach array 320 and a first outer surface 331*b* opposite to the space part 315 or the first Halbach array 320.

The second block 332 includes a second inner surface 332*a* facing the first block 331 and a second outer surface 332*b* opposite to the first block 331.

The plurality of surfaces of each of the blocks 331 and 332 may be magnetized according to a predetermined rule to configure a Halbach array.

In the embodiment illustrated in FIGS. 68 and 69, the first and second inner surfaces 331*a* and 332*a* are magnetized to the same polarity. At this point, the first and second inner surfaces 331*a* and 332*a* may be magnetized to the same polarity as each of the outer surfaces 321*b* and 322*b* of the first Halbach array 320.

Furthermore, the first and second inner surfaces 331*a* and 332*a* may be magnetized to the same polarity as each of facing surfaces 341, 351, 361, and 371 respectively of the magnet parts 340, 350, 360, and 370.

In addition, the first to second outer surfaces 331*b* and 332*b* are magnetized to a polarity different from the polarity of the first and second inner surfaces 331*a* and 332*a*. At this point, the first to second outer surfaces 331*b* and 332*b* may be magnetized to the same polarity as each of the inner surfaces 321*a* and 322*a* of the first Halbach array 320.

Furthermore, the first and second outer surfaces 331*b* and 332*b* may be magnetized to the same polarity as each of the opposing surfaces 342, 352, 362, and 372 respectively of the magnet parts 340, 350, 360, and 370.

In the embodiment illustrated in FIGS. 70 and 71, the first and second inner surfaces 331*a* and 332*a* are magnetized to the same polarity. At this point, the first and second inner surfaces 331*a* and 332*a* may be magnetized to the same polarity as each of the inner surfaces 321*a* and 322*a* of the first Halbach array 320.

Furthermore, the first and second inner surfaces 331*a* and 332*a* may be magnetized to the same polarity as each of opposing surfaces 342, 352, 362, and 372 respectively of the magnet parts 340, 350, 360, and 370.

In addition, the first to second outer surfaces 331*b* and 332*b* are magnetized to a polarity different from the polarity of the first and second inner surfaces 331*a* and 332*a*. At this point, the first to second outer surfaces 331*b* and 332*b* may be magnetized to the same polarity as each of the outer surfaces 321*b* and 322*b* of the first Halbach array 320.

Furthermore, the first to second outer surfaces 331*b* and 332*b* may be magnetized to the same polarity as each of facing surfaces 341, 351, 361, and 371 respectively of the magnet parts 340, 350, 360, and 370.

Each of the first to fourth magnet parts 340, 350, 360, and 370 forms a magnetic field by itself and forms magnetic fields together with the first and second Halbach arrays 320 and 330 and each of the magnet parts 340, 350, 360, and 370 except for itself. An arc path A.P may be formed inside the arc chamber 21 by the magnetic fields formed by the first to fourth magnet parts 340, 350, 360, and 370.

The first to fourth magnet parts 340, 350, 360, and 370 may each be provided in any form capable of forming a magnetic field by being magnetized. In one embodiment, the first to fourth magnet parts 340, 350, 360, and 370 may each be provided as a permanent magnet, an electromagnet, or the like.

The first to fourth magnet parts 340, 350, 360, and 370 may be located adjacent to the respective first to fourth surfaces 311, 312, 313, and 314.

In the illustrated embodiment, the first magnet part 340 and the second magnet part 350 are located adjacent to the first surface 311. The first magnet part 340 is located to be biased to the third surface 313. The second magnet part 350 is located to be biased to the fourth surface 314.

The first magnet part 340 and the second magnet part 350 are disposed to face the third magnet part 360 and the fourth magnet part 370, respectively, with the space part 315 therebetween.

In one embodiment, the first magnet part 340 may overlap the first fixed contactor 22*a* and the third magnet part 360 in the front-rear direction. In addition, the second magnet part 350 may overlap the second fixed contactor 22*b* and the fourth magnet part 370 in the front-rear direction.

The first magnet part 340 and the second magnet part 350 are disposed side by side in an extending direction thereof. In one embodiment, the first magnet part 340 and the second magnet part 350 may be in contact with each other.

In the illustrated embodiment, the third magnet part 360 and the fourth magnet part 370 are located adjacent to the second surface 312. The third magnet part 360 is located to be biased to the third surface 313. The fourth magnet part 370 is located to be biased to the fourth surface 314.

The third magnet part 360 and the fourth magnet part 370 are disposed to face the first magnet part 340 and the second magnet part 350, respectively, with the space part 315 therebetween.

In one embodiment, the third magnet part 360 may overlap the first fixed contactor 22*a* and the first magnet part 340 in the front-rear direction. In addition, the fourth magnet part 370 may overlap the second fixed contactor 22*b* and the second magnet part 350 in the front-rear direction.

The third magnet part 360 and the fourth magnet part 370 are disposed side by side in an extending direction thereof. In one embodiment, the third magnet part 360 and the fourth magnet part 370 may be in contact with each other.

The first to fourth magnet parts 340, 350, 360, and 370 are formed to extend in one direction. In the illustrated embodiment, the first to fourth magnet parts 340, 350, 360, and 370 are formed to extend in the left-right direction.

Each of the first to fourth magnet parts 340, 350, 360, and 370 includes a plurality of surfaces.

Specifically, the first magnet part 340 includes a first facing surface 341 facing the second magnet part 350 and a first opposing surface 342 opposite to the second magnet part 350.

The second magnet part 350 includes a second facing surface 351 facing the first magnet part 340 and a second opposing surface 352 opposite to the first magnet part 340.

The third magnet part 360 includes a third facing surface 361 facing the fourth magnet part 370 and a third opposing surface 362 opposite to the fourth magnet part 370.

The fourth magnet part 370 includes a fourth facing surface 371 facing the third magnet part 360 and a fourth opposing surface 372 opposite to the third magnet part 360.

Each surface of the first to fourth magnet parts 340, 350, 360, and 370 may be magnetized according to a predetermined rule.

In the embodiment illustrated in FIGS. 68 and 69, the first to fourth facing surfaces 341, 351, 361, and 371 are magnetized to the same polarity. At this point, the first to fourth facing surfaces 341, 351, 361, and 371 are magnetized to the same polarity as the first and second outer surfaces 321*b* and 322*b* of the first Halbach array 320 and the first and second inner surfaces 331*a* and 332*a* of the second Halbach array 330.

Likewise, the first to fourth opposing surfaces 342, 352, 362, and 372 are magnetized to a polarity different from the polarity of the first to fourth facing surfaces 341, 351, 361, and 371. At this point, the first to fourth opposing surfaces 342, 352, 362, and 372 are magnetized to the same polarity as the first and second inner surfaces 321*a* and 322*a* of the first Halbach array 320 and the first and second outer surfaces 331*b* and 332*b* of the second Halbach array 330.

In the embodiment illustrated in FIGS. 70 and 71, the first to fourth facing surfaces 341, 351, 361, and 371 are magnetized to the same polarity. At this point, the first to fourth facing surfaces 341, 351, 361, and 371 are magnetized to the same polarity as the first and second outer surfaces 321*b* and 322*b* of the first Halbach array 320 and the first and second outer surfaces 331*b* and 332*b* of the second Halbach array 330.

Similarly, the first to fourth opposing surfaces 342, 352, 362, and 372 are magnetized to a polarity different from the polarity of the first to fourth facing surfaces 341, 351, 361, and 371. At this point, the first to fourth opposing surfaces 342, 352, 362, and 372 are magnetized to the same polarity as the first and second inner surfaces 321*a* and 322*a* of the first Halbach array 320 and the first and second outer surfaces 331*a* and 332*a* of the second Halbach array 330.

Hereinafter, an arc path A.P formed by the arc path-forming part 300 according to the present embodiment will be described in detail with reference to FIGS. 72 and 73.

Figure 72:
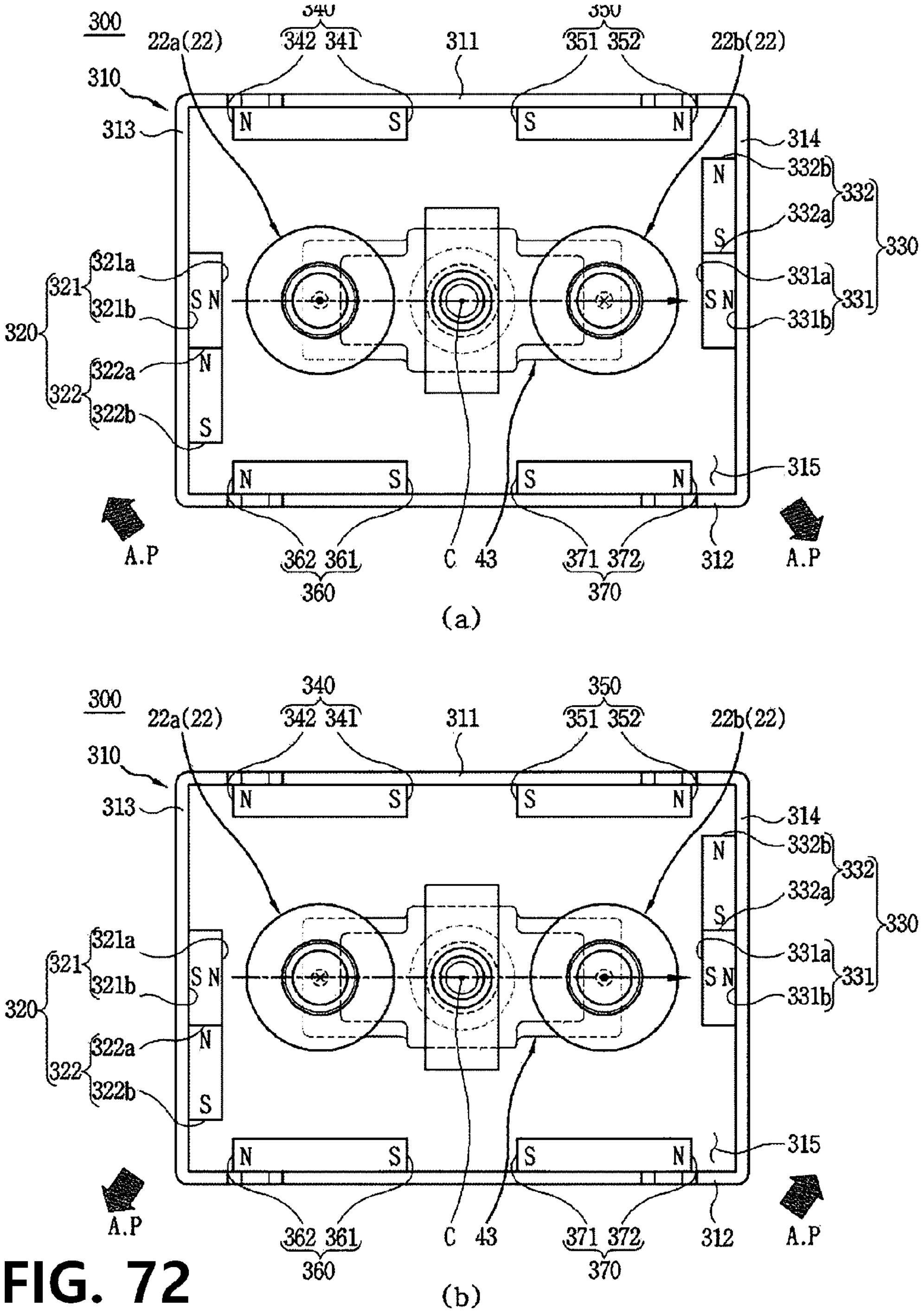
FIGS. 72 and 73 are conceptual views illustrating magnetic field and arc paths formed by the arc path-forming part according to the embodiment of FIGS. 68 to 71.

Referring to FIG. 72, each of the inner surfaces 321*a* and 322*a* of the first Halbach array 320 and each of the inner surfaces 331*a* and 332*a* of the second Halbach array 330 are magnetized to different polarities.

That is, each of the inner surfaces 321*a* and 322*a* of the first Halbach array 320 is magnetized an N pole, and each of the inner surfaces 331*a* and 332*a* of the second Halbach array 330 is magnetized to an S pole.

At this point, each of the facing surfaces 341, 351, 361, and 371 respectively of the magnet parts 340, 350, 360, and 370 is magnetized to a polarity different from that of each of the inner surfaces 321*a* and 322*a* of the first Halbach array 320, that is, magnetized to an S pole.

Accordingly, a magnetic field in a direction from the first inner surface 321*a* toward the first inner surface 331*a* is formed between the first block 321 of the first Halbach array 320 and the first block 331 of the second Halbach array 330.

Figure 73:
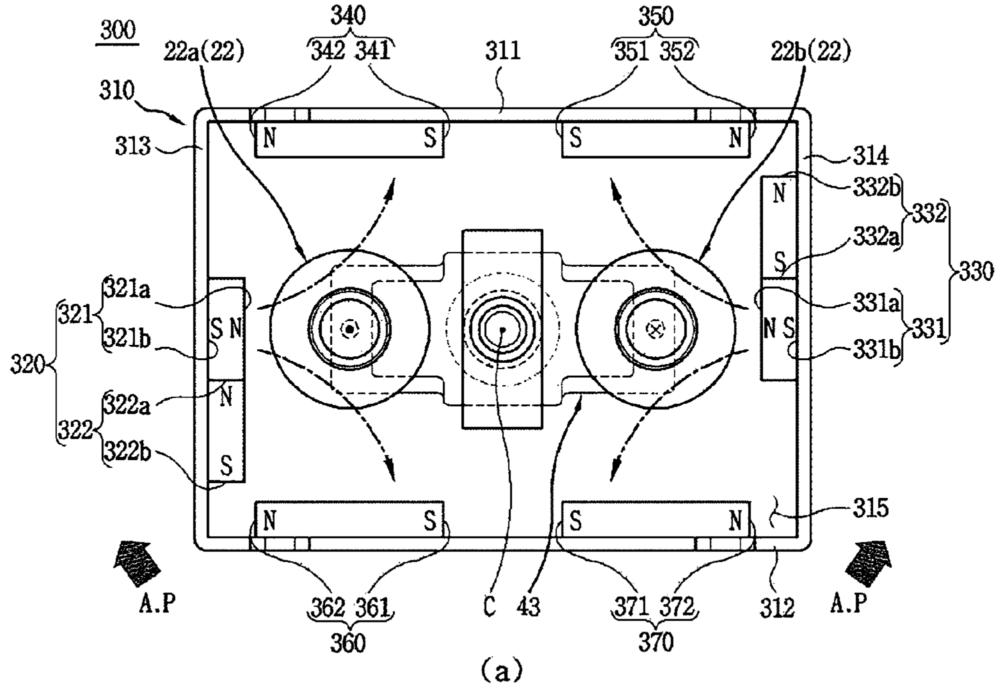
Figure 73:
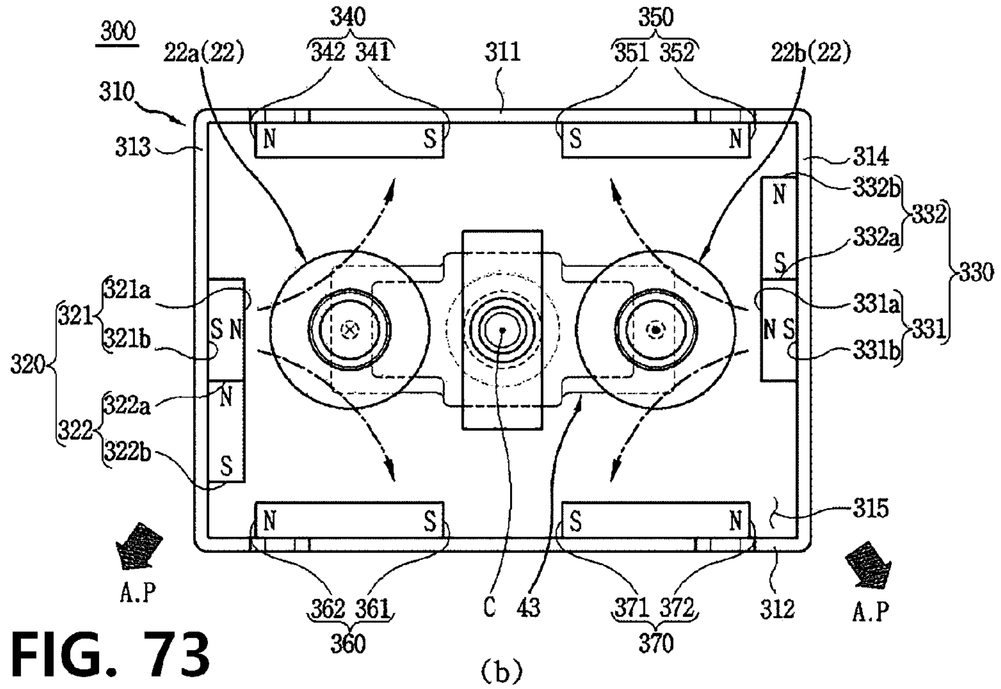
Figure 74:
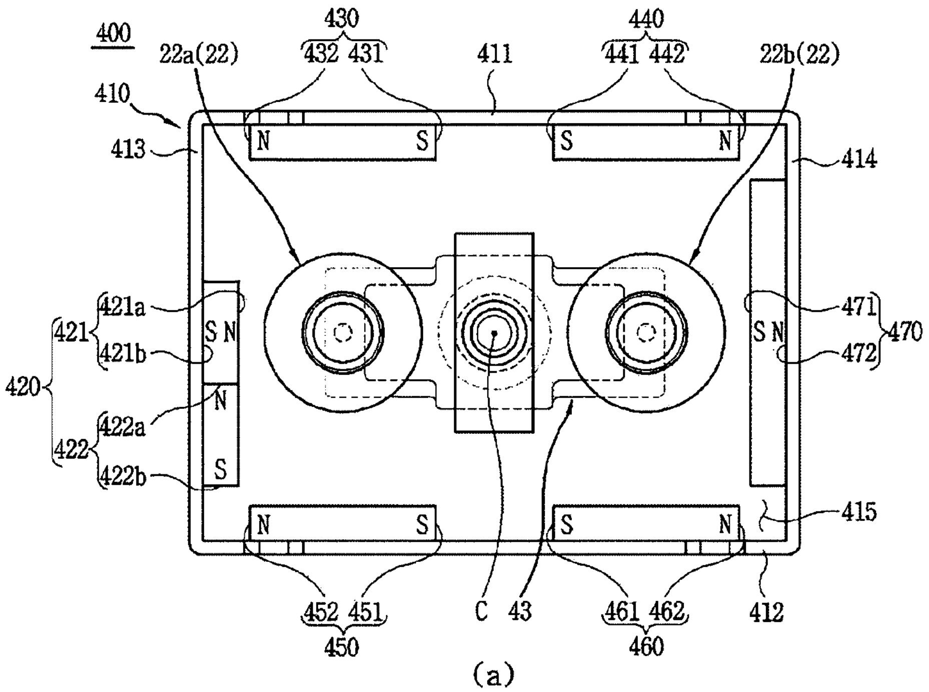
FIGS. 74 to 81 are conceptual views illustrating an arc path-forming part according to yet another embodiment of the present disclosure.
Figure 74:
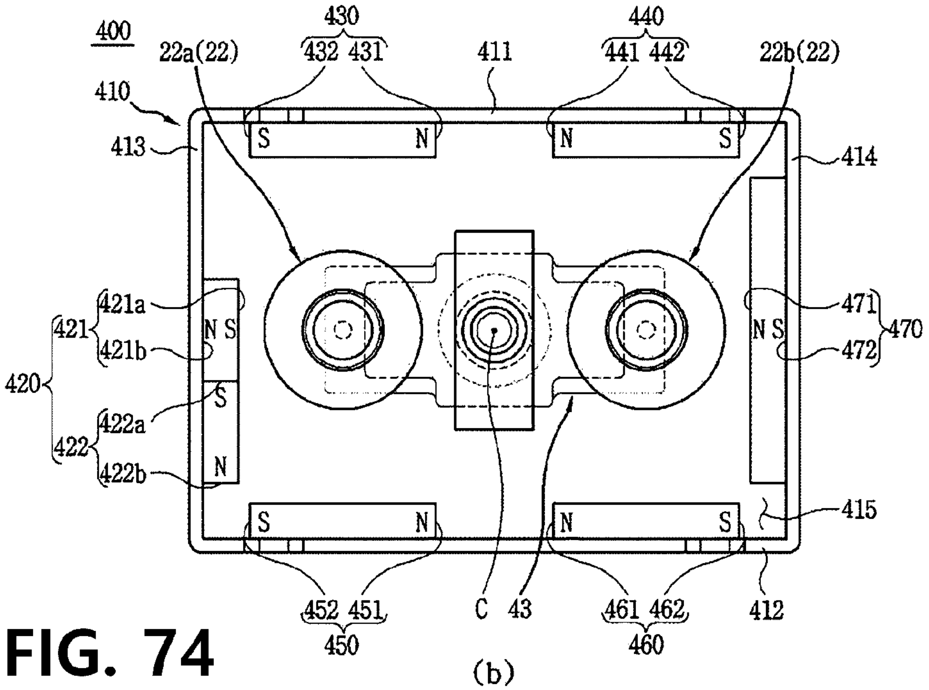
Figure 75:
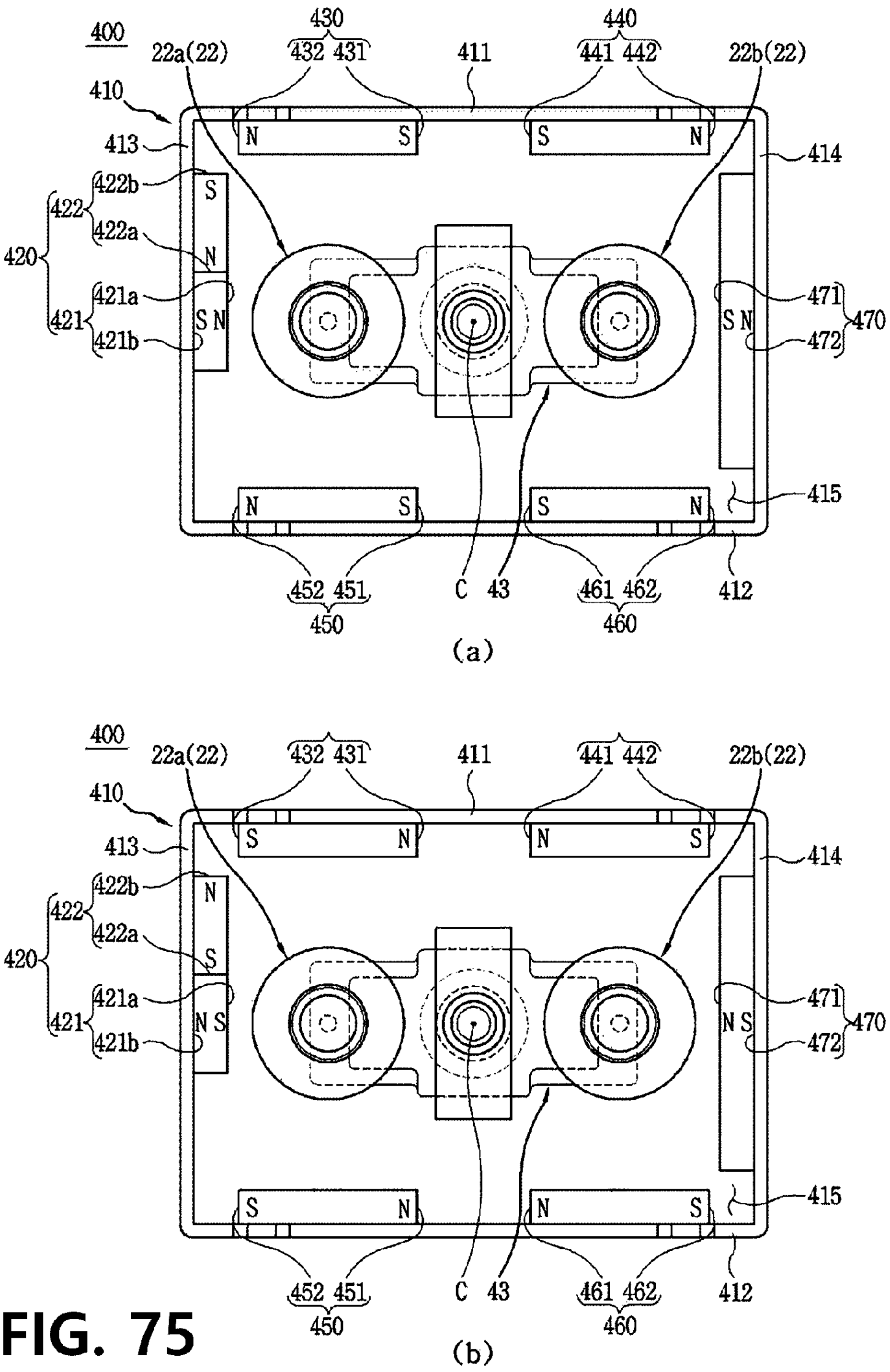
Figure 76:
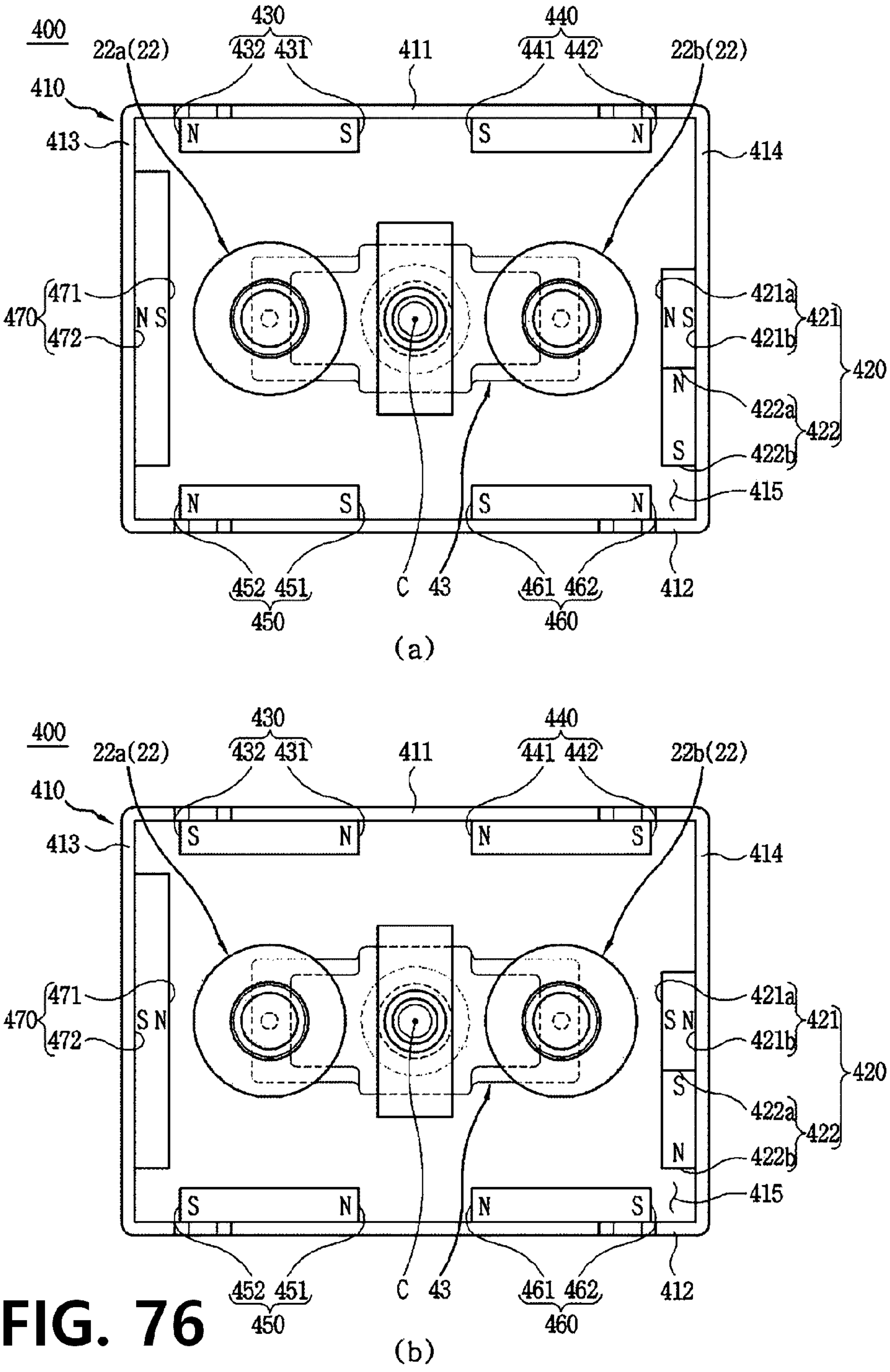
Figure 77:
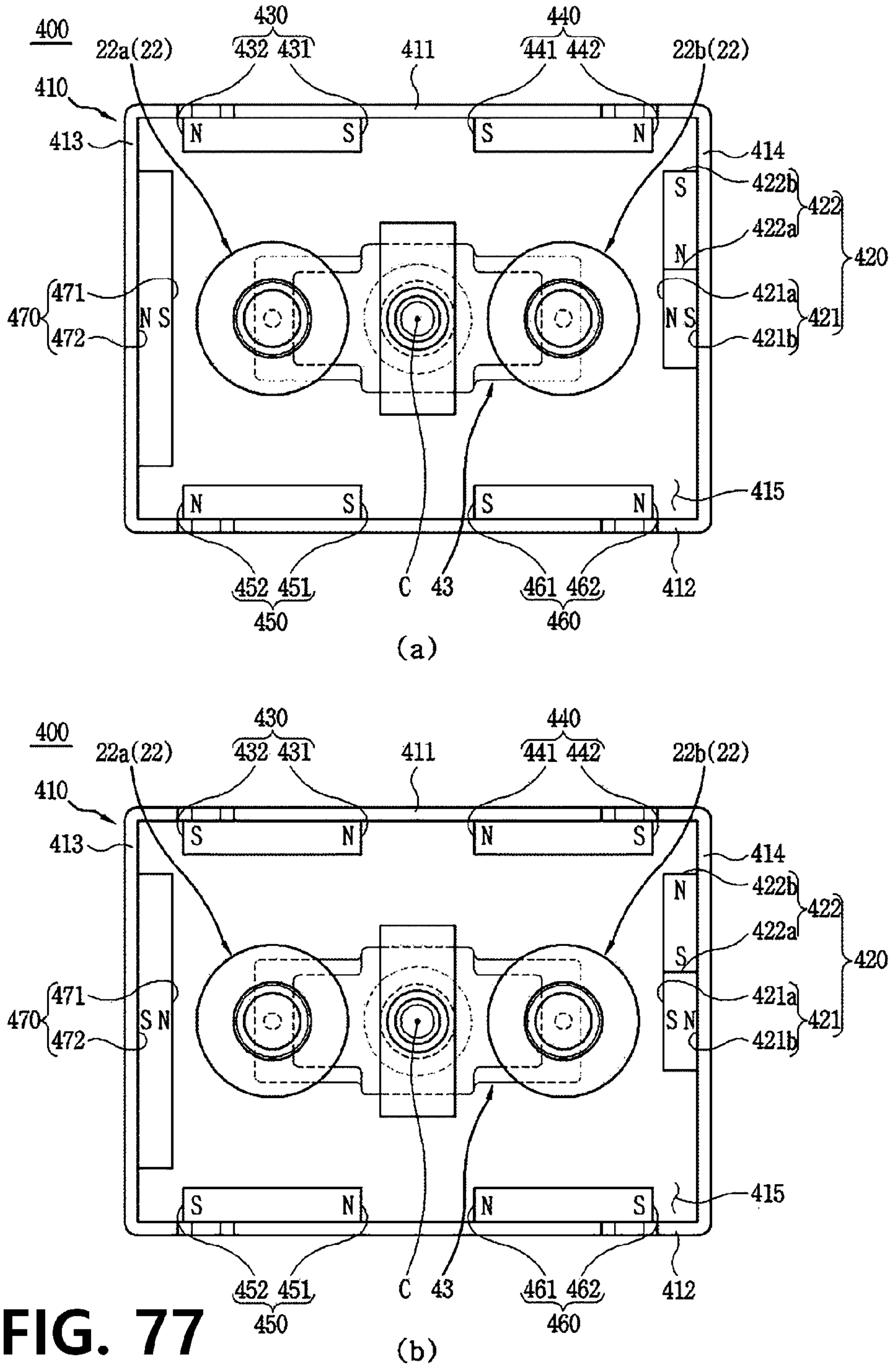
Figure 78:
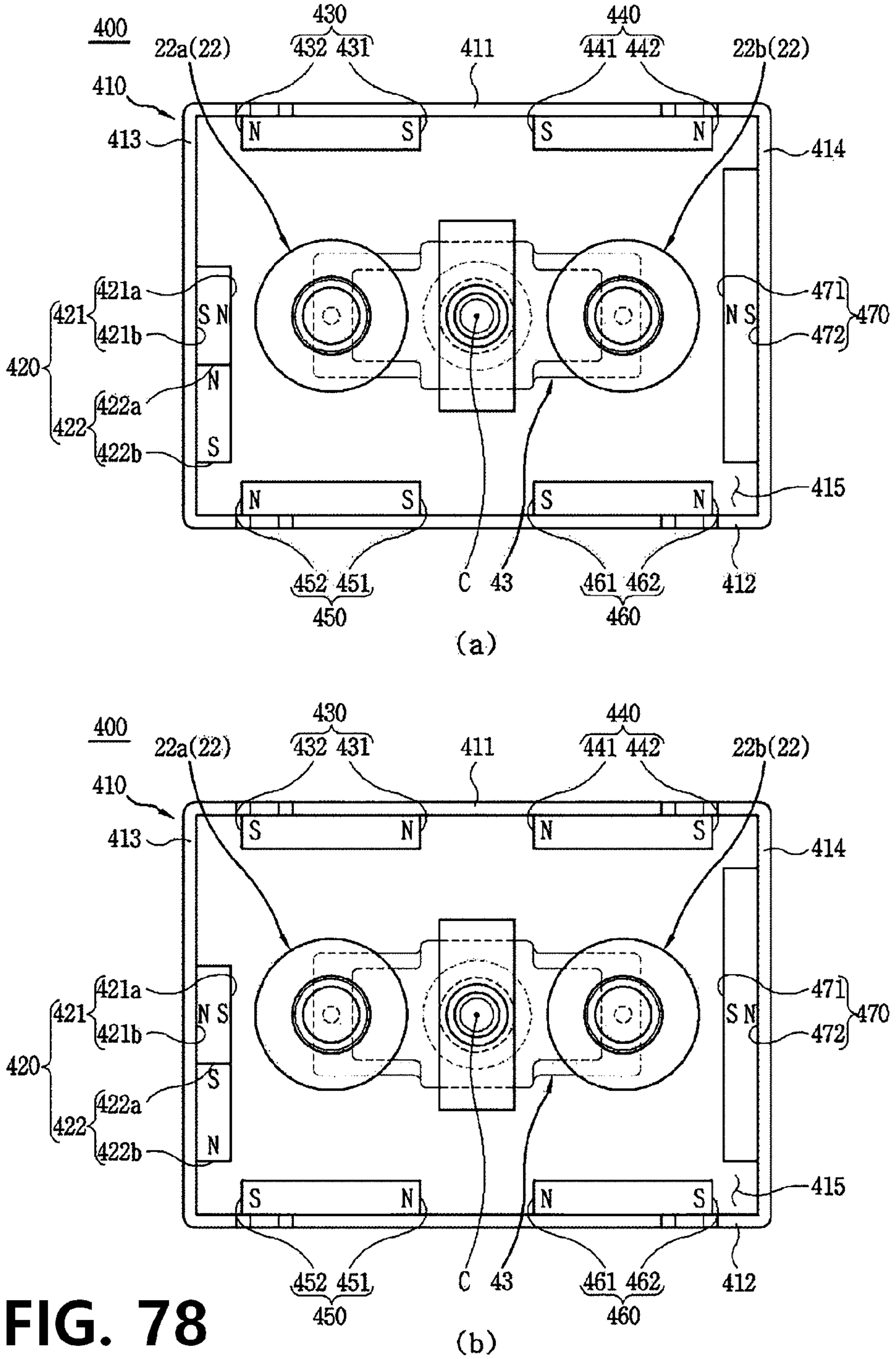
Figure 79:
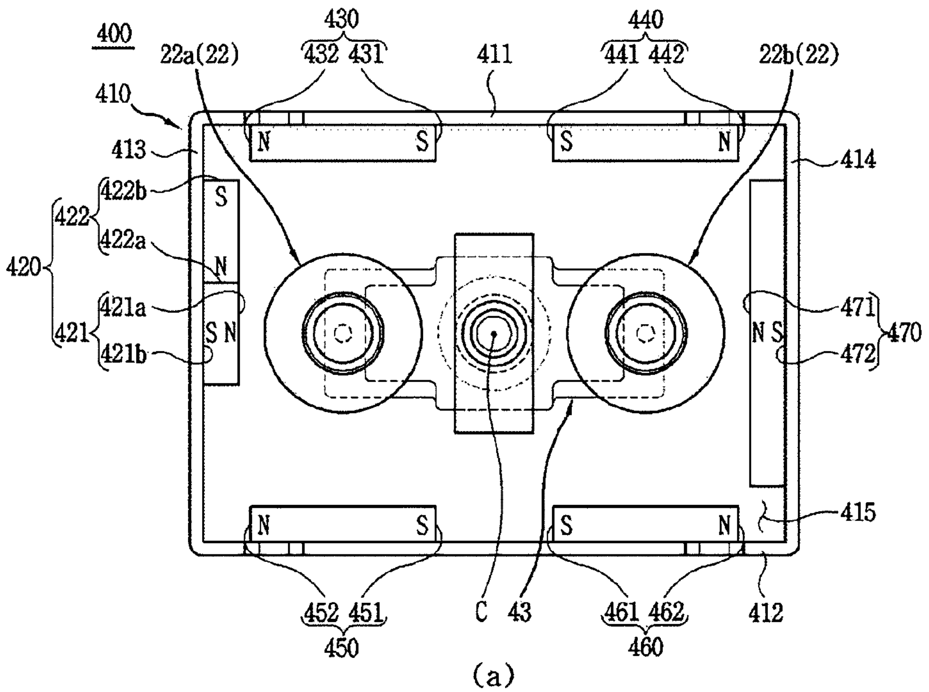
Figure 79:
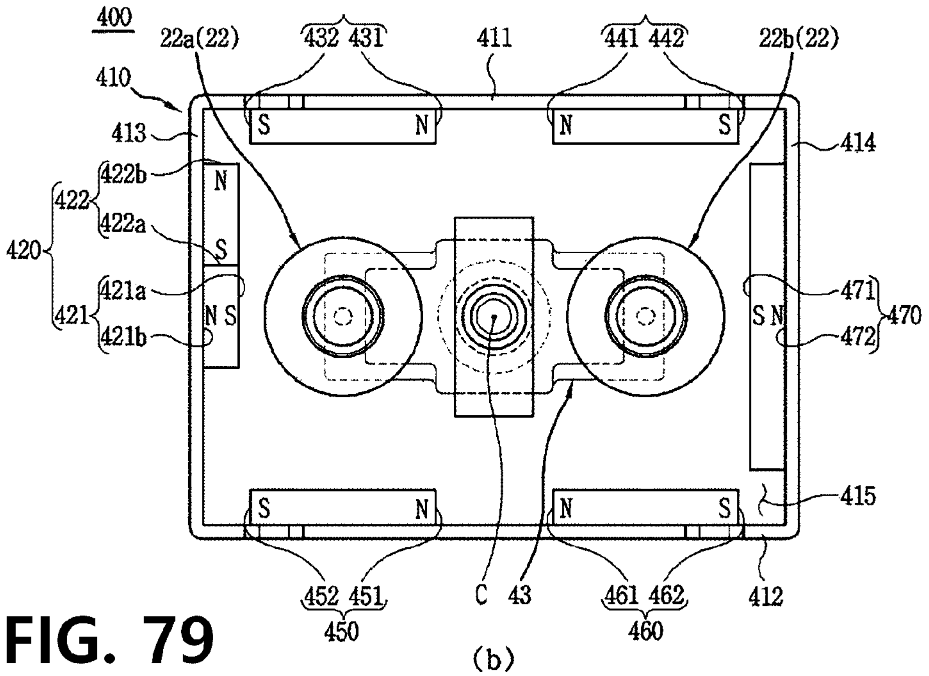
Figure 80:
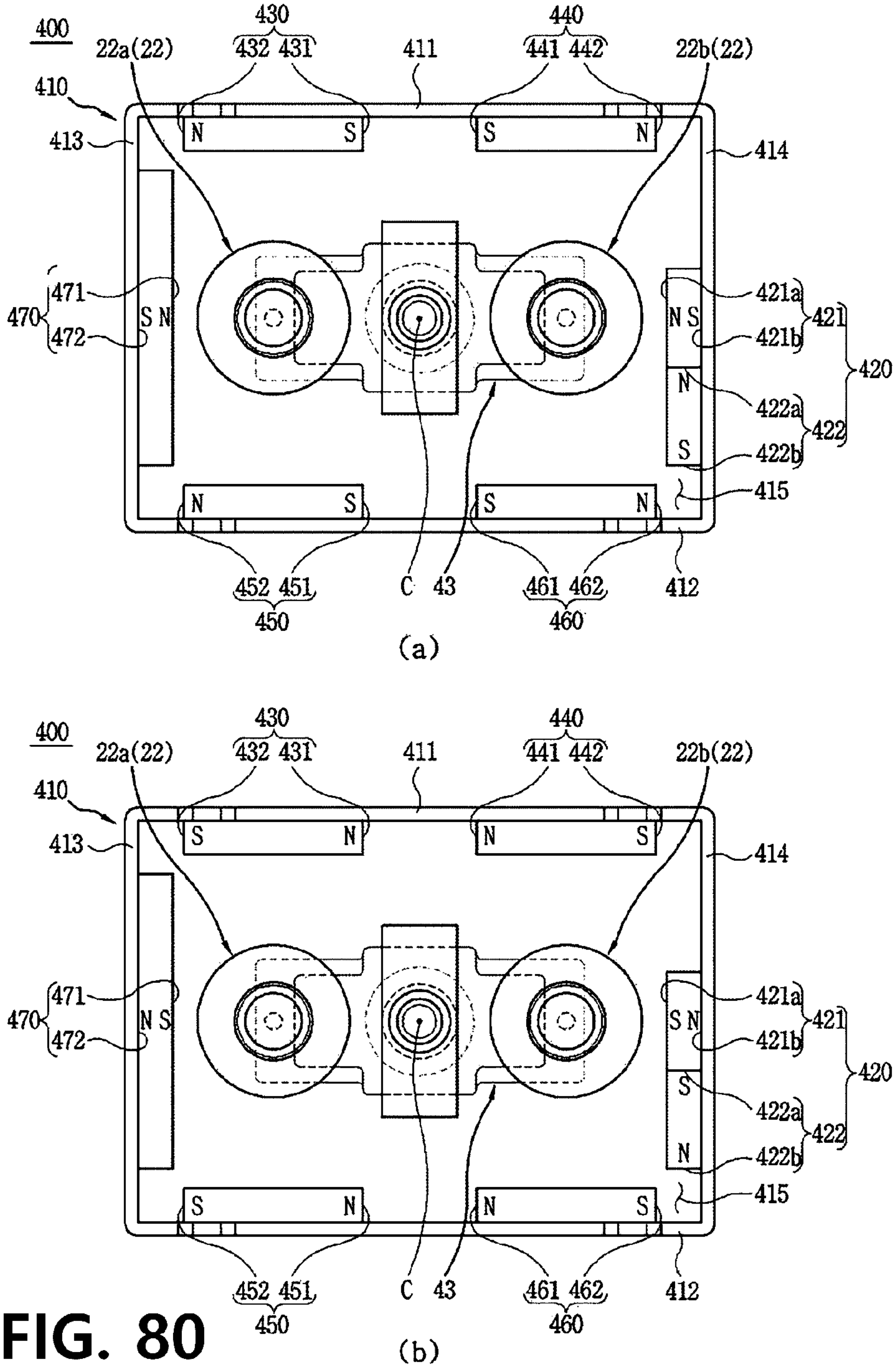
Figure 81:
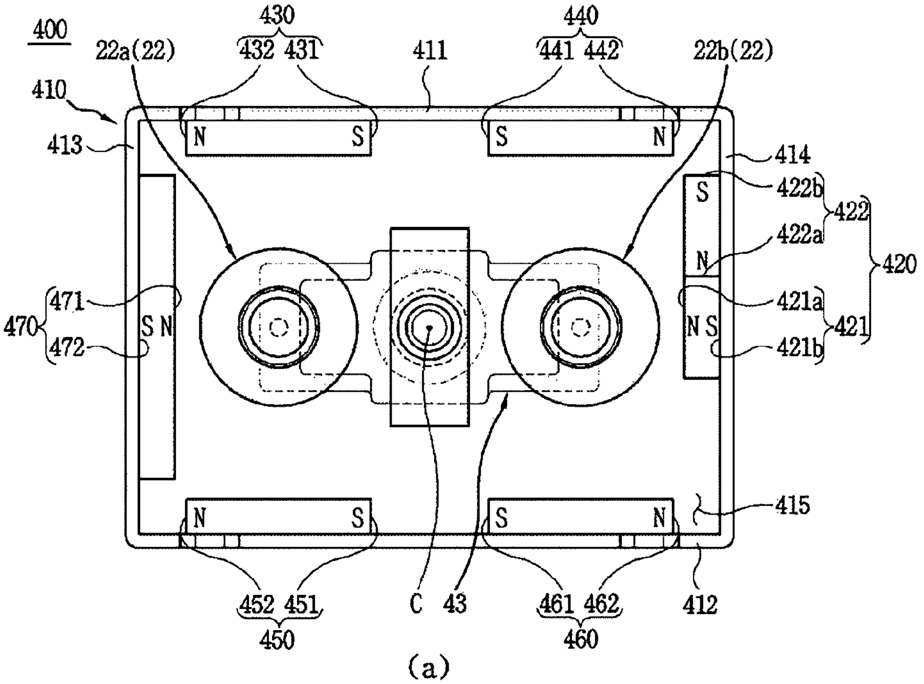
Figure 81:
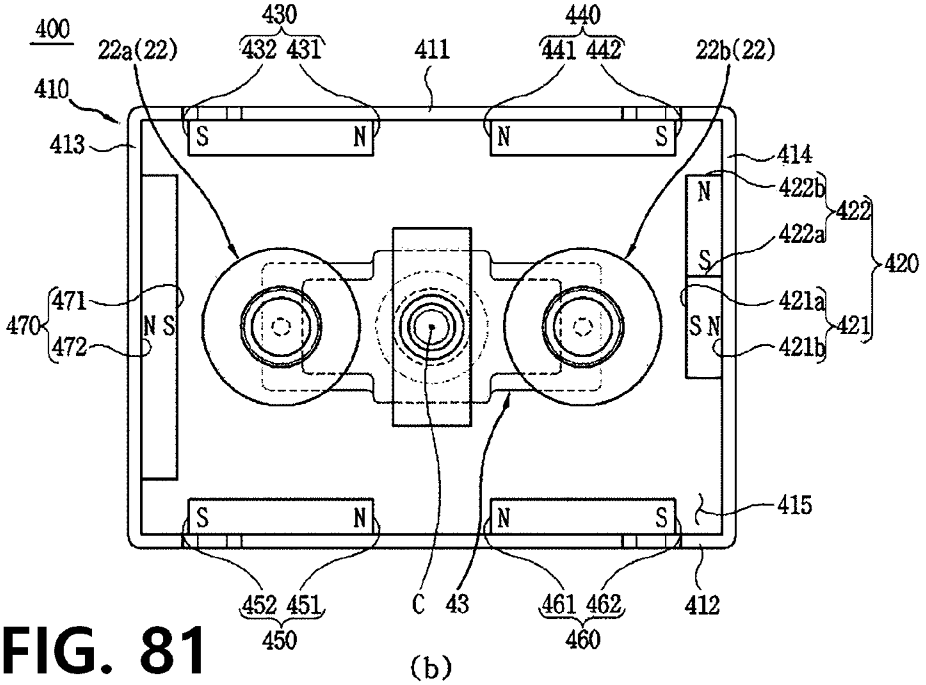

Referring to FIG. 73, the inner surfaces 321*a* and 322*a* of the first Halbach array 320 and the inner surfaces 331*a* and 332*a* of the second Halbach array 330 are magnetized to the same polarity.

That is, each of the inner surfaces 321*a* and 322*a* of the first Halbach array 320 and each of the inner surfaces 331*a* and 332*a* of the second Halbach array 330 are all magnetized to N poles.

At this point, each of the facing surfaces 341, 351, 361, and 371 respectively of the magnet parts 340, 350, 360, and 370 is magnetized to a polarity different from that of each of the inner surfaces 321*a* and 322*a* of the first Halbach array 320, that is, magnetized to an S pole.

Accordingly, magnetic fields that repel each other are formed between the first block 321 of the first Halbach array 320 and the first block 331 of the second Halbach array 330.

In addition, a magnetic field in a direction from the first inner surface 321*a* to each of the facing surfaces 341, 351, 361, and 371 is formed between the first Halbach array 320 and each of the magnet parts 340, 350, 360, and 370.

Similarly, a magnetic field in a direction from the first inner surface 331*a* to each of the facing surfaces 341, 351, 361, and 371 is formed between the second Halbach array 330 and each of the magnet parts 340, 350, 360, and 370.

At this point, the strength of the magnetic field formed between the first Halbach array 320 and the second Halbach array 330 may be enhanced by the magnetic field formed by the second block 322.

In the embodiment illustrated in FIGS. 72A and 73A, a direction of current is a direction from the second fixed contactor 22*b* to the first fixed contactor 22*a* via the movable contactor 43.

In the embodiment illustrated in FIG. 72A, when the Fleming's left-hand rule is applied to the first fixed contactor 22*a*, an electromagnetic force generated in the vicinity of the first fixed contactor 22*a* is formed toward the rear left side. Accordingly, the arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side. Accordingly, the arc path A.P in the vicinity of the second fixed contactor 22*b* is also formed toward the front right side.

In the embodiment illustrated in FIG. 73A, when the Fleming's left-hand rule is applied to the first fixed contactor 22*a*, an electromagnetic force generated in the vicinity of the first fixed contactor 22*a* is formed toward the rear left side. Accordingly, the arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIGS. 72B and 73B, a direction of current is a direction from the first fixed contactor 22*a* to the second fixed contactor 22*b* via the movable contactor 43.

In the embodiment illustrated in FIG. 72B, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIG. 73B, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the front right side. Accordingly, the arc path A.P in the vicinity of the second fixed contactor 22*b* is also formed toward the front right side.

Although not illustrated in the drawing, when the polarity of each surface of the first and second Halbach arrays 320 and 330 and the first to fourth magnet parts 340, 350, 360, and 370 is changed, the directions of the magnetic fields formed in the first and second Halbach arrays 320 and 330 and the first to fourth magnet parts 340, 350, 360, and 370 are reversed. Accordingly, the generated electromagnetic force and the arc path A.P are also formed so that the front-rear direction thereof is reversed.

That is, in the electric connection situation shown in FIG. 72A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the rear right side.

In the electric connection situation shown in FIG. 73A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the front right side.

Similarly, in the electric connection situation shown in FIG. 72B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the front right side.

In the electric connection situation shown in FIG. 73B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the rear right side.

Accordingly, in the arc path-forming part 300 according to the present embodiment, the electromagnetic force and the arc path A.P may be formed in a direction away from the central part C regardless of the polarity of each of the first and second Halbach arrays 320 and 330 and the first to fourth magnet parts 340, 350, 360, and 370 or the direction of the current flowing through the DC relay 1.

Accordingly, damage to each component of the DC relay 1 disposed adjacent to the central part C can be prevented. Furthermore, since the generated arc can be quickly discharged to the outside, operational reliability of the DC relay 1 can be improved.

(4) Description of Arc Path-Forming Part 400 According to Yet Another Embodiment of Present Disclosure Hereinafter, an arc path-forming part 400 according to yet another embodiment of the present disclosure will be described in detail with reference to FIGS. 74 to 83.

Referring to FIGS. 74 to 81, the arc path-forming part 400 according to the illustrated embodiment includes a magnet frame 410, a Halbach array 420, and first to fifth magnet parts 430, 440, 450, 460, and 470.

The magnet frame 410 according to the present embodiment has the same structure and function as the magnet frame 110 according to the above-described embodiment. However, there is a difference in the arrangement method of the Halbach array 420 and the first to fifth magnet parts 430, 440, 450, 460, and 470 disposed in the magnet frame 410 according to the present embodiment.

Accordingly, a description of the magnet frame 410 will be replaced with the description of the magnet frame 110 according to the above-described embodiment.

In the illustrated embodiment, a plurality of magnetic materials constituting the Halbach array 420 are continuously arranged side by side from the front side to the rear side. That is, the Halbach array 420 is formed to extend in the front-rear direction.

The Halbach array 420 may form a magnetic field together with another magnetic material. In the illustrated embodiment, the Halbach array 420 may form a magnetic field together with each of the first to fifth magnet parts 430, 440, 450, 460, and 470.

The Halbach array 420 may be located adjacent to any one surface of third and fourth surfaces 413 and 414. In one embodiment, the Halbach array 420 may be coupled to an inner side (i.e., the side in a direction toward a space part 415) of the any one surface.

In the embodiment illustrated in FIGS. 74, 75, 78, and 79, the Halbach array 420 is disposed on an inner side of the third surface 413, and disposed adjacent to the third surface 413. In the embodiment illustrated in FIGS. 76, 77, 80, and 81, the Halbach array 420 may be disposed on an inner side of the fourth surface 414, and disposed adjacent to the fourth surface 414.

The Halbach array 420 is disposed to face the fifth magnet part 470. In the embodiment illustrated in FIGS. 74, 75, 78, and 79, the Halbach array 420 is disposed to face the fifth magnet part 470 located on the inner side of the fourth surface 414. In the embodiment illustrated in FIGS. 76, 77, 80, and 81, the Halbach array 420 is disposed to face the fifth magnet part 470 located on the inner side of the third surface 413.

The first Halbach array 420 is located to be biased to any one surface of a first surface 411 and a second surface 412. In the embodiment illustrated in FIGS. 74, 75, 78, and 79, the first Halbach array 420 is located to be biased to the first surface 411. In the embodiment illustrated in FIGS. 76, 77, 80, and 81, the first Halbach array 420 is located to be biased to the second surface 412.

The space part 415, and the fixed contactor 22 and the movable contactor 43 accommodated in the space part 415 are located between the Halbach array 420 and the fifth magnet part 470.

The Halbach array 420 may enhance the strength of the magnetic field formed by itself and the magnetic field formed together with each of the first to fifth magnet parts 430, 440, 450, 460, and 470. Since the process of enhancing the direction and magnetic field of the magnetic field formed by the Halbach array 420 is well known in the art, a detailed description thereof will be omitted.

In the illustrated embodiment, the Halbach array 420 includes a first block 421 and a second block 422. It will be understood that the plurality of magnetic materials constituting the Halbach array 420 are named as the blocks 421 and 422, respectively.

The first and second blocks 421 and 422 may each be formed of a magnetic material. In one embodiment, the first and second blocks 421 and 422 may each be provided as a permanent magnet, an electromagnet, or the like.

The first and second blocks 421 and 422 may be disposed side by side in one direction. In the illustrated embodiment, the first and second blocks 421 and 422 are disposed side by side in a direction in which the third surface 413 or the fourth surface 414 extends, that is, in the front-rear direction.

In the embodiment illustrated in FIGS. 74, 76, 78, and 80, the first block 421 is disposed in a central portion, and the second block 422 is disposed at a front side of the first block 421.

In the embodiment illustrated in FIGS. 75, 77, 79, and 81, the first block 421 is disposed in the central portion, and the second block 422 is disposed at a rear side of the first block 421.

In one embodiment, the first block 421 and the second block 422 may be in contact with each other.

The first block 421 may be disposed to overlap each of the fixed contactors 22*a* and 22*b* in a direction toward the fifth magnet part 470, i.e., in the left-right direction in the illustrated embodiment. In addition, the first block 421 may be disposed to overlap the fifth magnet part 470 in the left-right direction.

Each of the blocks 421 and 422 includes a plurality of surfaces.

Specifically, the first block 421 includes a first inner surface 421*a* facing the space part 415 or the fifth magnet part 470 and a first outer surface 421*b* opposite to the space part 415 or the fifth magnet part 470.

The second block 422 includes a second inner surface 422*a* facing the first block 421 and a second outer surface 422*b* opposite to the first block 421.

The plurality of surfaces of each of the blocks 421 and 422 may be magnetized according to a predetermined rule to configure a Halbach array.

In the embodiment illustrated in FIGS. 74 to 77, the first and second inner surfaces 421*a* and 422*a* are magnetized to the same polarity. At this point, the first and second inner surfaces 421*a* and 422*a* may be magnetized to the same polarity as each of opposing surfaces 432, 442, 452, 462, and 472 respectively of the first to fifth magnet parts 430, 440, 450, 460, and 470.

In addition, the first and second outer surfaces 421*b* and 422*b* are magnetized to a polarity different from the polarity of the first and second inner surfaces 421*a* and 422*a*. At this point, the first and second outer surfaces 421*b* and 422*b* may be magnetized to the same polarity as each of facing surfaces 431, 441, 451, 461, and 471 respectively of the first to fifth magnet parts 430, 440, 450, 460, and 470.

In the embodiment illustrated in FIGS. 78 to 81, the first and second inner surfaces 421*a* and 422*a* are magnetized to the same polarity. At this point, the first and second inner surfaces 421*a* and 422*a* may be magnetized to the same polarity as the fifth facing surface 471 of the fifth magnet part 470.

Furthermore, the first and second inner surfaces 421*a* and 422*a* may be magnetized to the same polarity as each of the opposing surfaces 432, 442, 452, and 462 respectively of the first to fourth magnet parts 430, 440, 450, and 460.

In addition, the first and second outer surfaces 421*b* and 422*b* are magnetized to a polarity different from the polarity of the first and second inner surfaces 421*a* and 422*a*. At this point, the first and second outer surfaces 421*b* and 422*b* may be magnetized to the same polarity as the fifth opposing surface 472 of the fifth magnet part 470.

Furthermore, the first and second outer surfaces 421*b* and 422*b* may be magnetized to the same polarity as each of the facing surfaces 431, 441, 451, and 461 respectively of the first to fourth magnet parts 430, 440, 450, and 460.

Each of the first to fifth magnet parts 430, 440, 450, 460, and 470 forms a magnetic field by itself and forms magnetic fields together with the Halbach array 420 and each of the magnet parts 430, 440, 450, 460, and 470 except for itself. An arc path A.P may be formed inside the arc chamber 21 by the magnetic fields formed by the first to fifth magnet parts 430, 440, 450, 460, and 470.

The first to fifth magnet parts 430, 440, 450, 460, and 470 may each be provided in any form capable of forming a magnetic field by being magnetized. In one embodiment, the first to fifth magnet parts 430, 440, 450, 460, and 470 may each be provided as a permanent magnet, an electromagnet, or the like.

The first to fifth magnet parts 430, 440, 450, 460, and 470 may be located adjacent to respective first to fourth surfaces 411, 412, 413, and 414.

In the illustrated embodiment, the first magnet part 430 and the second magnet part 440 are located adjacent to the first surface 411. The first magnet part 430 is located to be biased to the third surface 413. The second magnet part 440 is located to be biased to the fourth surface 414.

The first magnet part 430 and the second magnet part 440 are disposed to face the third magnet part 450 and the fourth magnet part 460, respectively, with the space part 415 therebetween.

In one embodiment, the first magnet part 430 may overlap the first fixed contactor 22*a* and the third magnet part 450 in the front-rear direction. In addition, the second magnet part 440 may overlap the second fixed contactor 22*b* and the fourth magnet part 460 in the front-rear direction.

The first magnet part 430 and the second magnet part 440 are disposed side by side in an extending direction thereof. In one embodiment, the first magnet part 430 and the second magnet part 440 may be in contact with each other.

In the illustrated embodiment, the third magnet part 450 and the fourth magnet part 460 are located adjacent to the second surface 412. The third magnet part 450 is located to be biased to the third surface 413. The fourth magnet part 460 is located to be biased to the fourth surface 414.

The third magnet part 450 and the fourth magnet part 460 are disposed to face the first magnet part 430 and the second magnet part 440, respectively, with the space part 415 therebetween.

In one embodiment, the third magnet part 450 may overlap the first fixed contactor 22*a* and the first magnet part 430 in the front-rear direction. In addition, the fourth magnet part 460 may overlap the second fixed contactor 22*b* and the second magnet part 440 in the front-rear direction.

The third magnet part 450 and the fourth magnet part 460 are disposed side by side in an extending direction thereof. In one embodiment, the third magnet part 450 and the fourth magnet part 460 may be in contact with each other.

The fifth magnet part 470 is disposed to face the Halbach array 420. In the embodiment illustrated in FIGS. 74, 75, 78, and 79, the fifth magnet part 470 is disposed on the inner side of the fourth surface 414 to face the Halbach array 420 located on the inner side of the third surface 413.

In the embodiment illustrated in FIGS. 76, 77, 80, and 81, the fifth magnet part 470 is disposed on the inner side of the third surface 413 to face the Halbach array 420 located on the inner side of the fourth surface 414.

The space part 415, and the fixed contactor 22 and the movable contactor 43 accommodated in the space part 415 are located between the fifth magnet part 470 and the Halbach array 420.

The first to fourth magnet parts 430, 440, 450, and 460 are formed to extend in one direction. In the illustrated embodiment, the first to fourth magnet parts 430, 440, 450, and 460 are formed to extend in the left-right direction.

The fifth magnet part 470 is formed to extend in another direction. In the illustrated embodiment, the fifth magnet part 470 is formed to extend in the front-rear direction.

Each of the first to fifth magnet parts 430, 440, 450, 460, and 470 includes a plurality of surfaces.

Specifically, the first magnet part 430 includes a first facing surface 431 facing the second magnet part 440 and a first opposing surface 432 opposite to the second magnet part 440.

The second magnet part 440 includes a second facing surface 441 facing the first magnet part 430 and a second opposing surface 442 opposite to the first magnet part 430.

The third magnet part 450 includes the third facing surface 451 facing the fourth magnet part 460 and the third opposing surface 452 opposite to the fourth magnet part 460.

The fourth magnet part 460 includes the fourth facing surface 461 facing the third magnet part 450 and the fourth opposing surface 462 opposite to the third magnet part 450.

The fifth magnet part 470 includes the fifth facing surface 471 facing the Halbach array 420 or the space part 415 and the fifth opposing surface 472 opposite to the Halbach array 420 or the space part 415.

Each surface of the first to fifth magnet parts 430, 440, 450, 460, and 470 may be magnetized according to a predetermined rule.

In the embodiment illustrated in FIGS. 74 to 77, the first to fifth facing surfaces 431, 441, 451, 461, and 471 are magnetized to the same polarity. At this point, the first to fifth facing surfaces 431, 441, 451, 461, and 471 are magnetized to the same polarity as the first and second outer surfaces 421*b* and 422*b* of the Halbach array 420.

Likewise, the first to fifth opposing surfaces 432, 442, 452, 462, and 472 are magnetized to a polarity different from the polarity the first to fifth facing surfaces 431, 441, 451, 461, and 471. At this point, the first to fifth opposing surfaces 432, 442, 452, 462, and 472 are magnetized to the same polarity as the first and second inner surfaces 421*a* and 422*a* of the Halbach array 420.

In the embodiment illustrated in FIGS. 78 to 81, the first to fourth facing surfaces 431, 441, 451, and 461 are magnetized to the same polarity. In addition, the fifth facing surface 471 is magnetized to a polarity different from that of the first to fourth facing surfaces 431, 441, 451, and 461.

At this point, the first to fourth facing surfaces 431, 441, 451, and 461 are magnetized to the same polarity as the first and second outer surfaces 421*b* and 422*b* of the Halbach array 420. In addition, the fifth facing surface 471 is magnetized to the same polarity as the first and second inner surfaces 421*a* and 422*a*.

Similarly, the first to fourth opposing surfaces 432, 442, 452, and 462 are magnetized to a polarity different from the polarity of the first to fourth facing surfaces 431, 441, 451, and 461. At this point, the first to fourth opposing surfaces 432, 442, 452, and 462 are magnetized to the same polarity as the fifth facing surface 471 and the first and second inner surfaces 421*a* and 422*a* of the Halbach array 420.

Hereinafter, an arc path A.P formed by the arc path-forming part 400 according to the present embodiment will be described in detail with reference to FIGS. 82 and 83.

Figure 82:
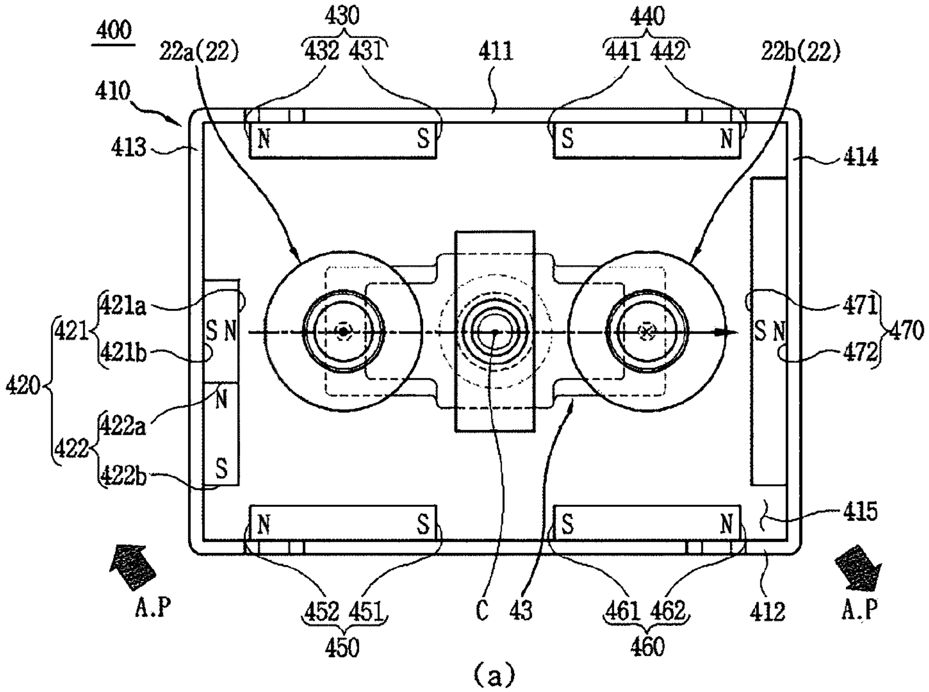
FIGS. 82 and 83 are conceptual views illustrating magnetic field and arc paths formed by the arc path-forming part according to the embodiment of FIGS. 74 to 81.
Figure 82:
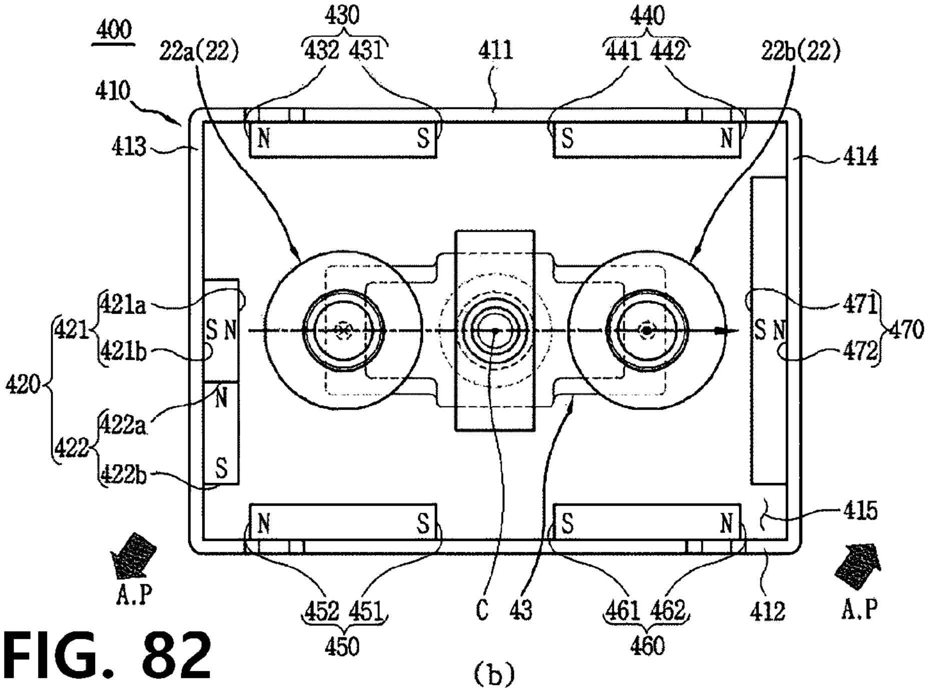

Referring to FIG. 82, each of the inner surfaces 421*a* and 422*a* of the Halbach array 420 and each of the facing surfaces 431, 441, 451, 461, and 471 respectively of the first to fifth magnet parts 430, 440, 450, 460, and 470 are magnetized to different polarities.

That is, each of the inner surfaces 421*a* and 422*a* of the Halbach array 420 is magnetized to an N pole, and each of the facing surfaces 431, 441, 451, 461, and 471 of the first to fifth magnet parts 430, 440, 450, 460, and 470 is magnetized to an S pole.

Accordingly, a magnetic field in a direction from the second inner surface 422*a* toward each of the facing surfaces 431, 441, 451, 461, and 471 is formed between the Halbach array 420 and the first to fifth magnet parts 430, 440, 450, 460, and 470. In particular, a magnetic field in a direction from the second inner surface 422*a* toward the fifth facing surface 471 is dominant.

Figure 83:
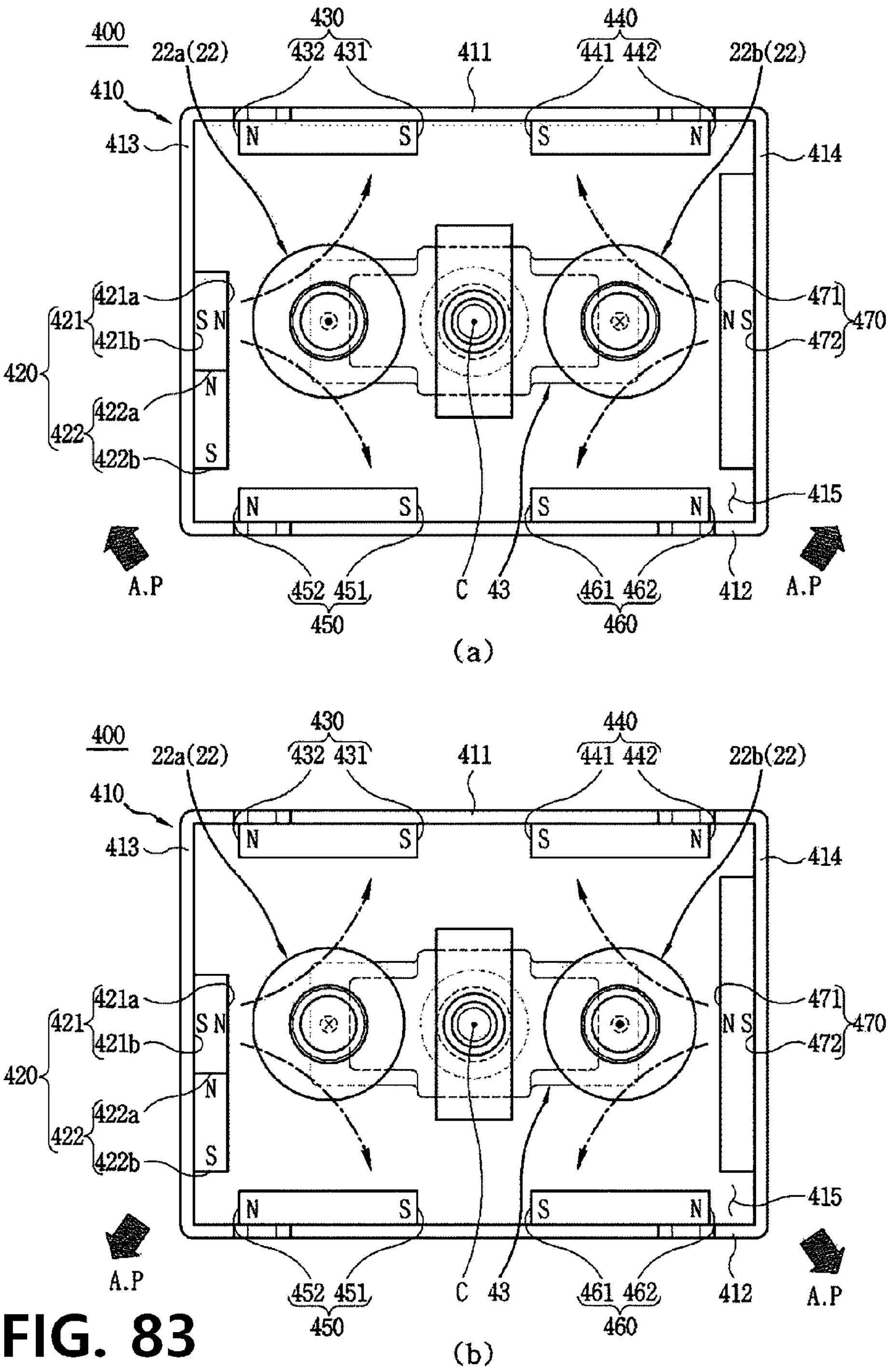
Figure 84:
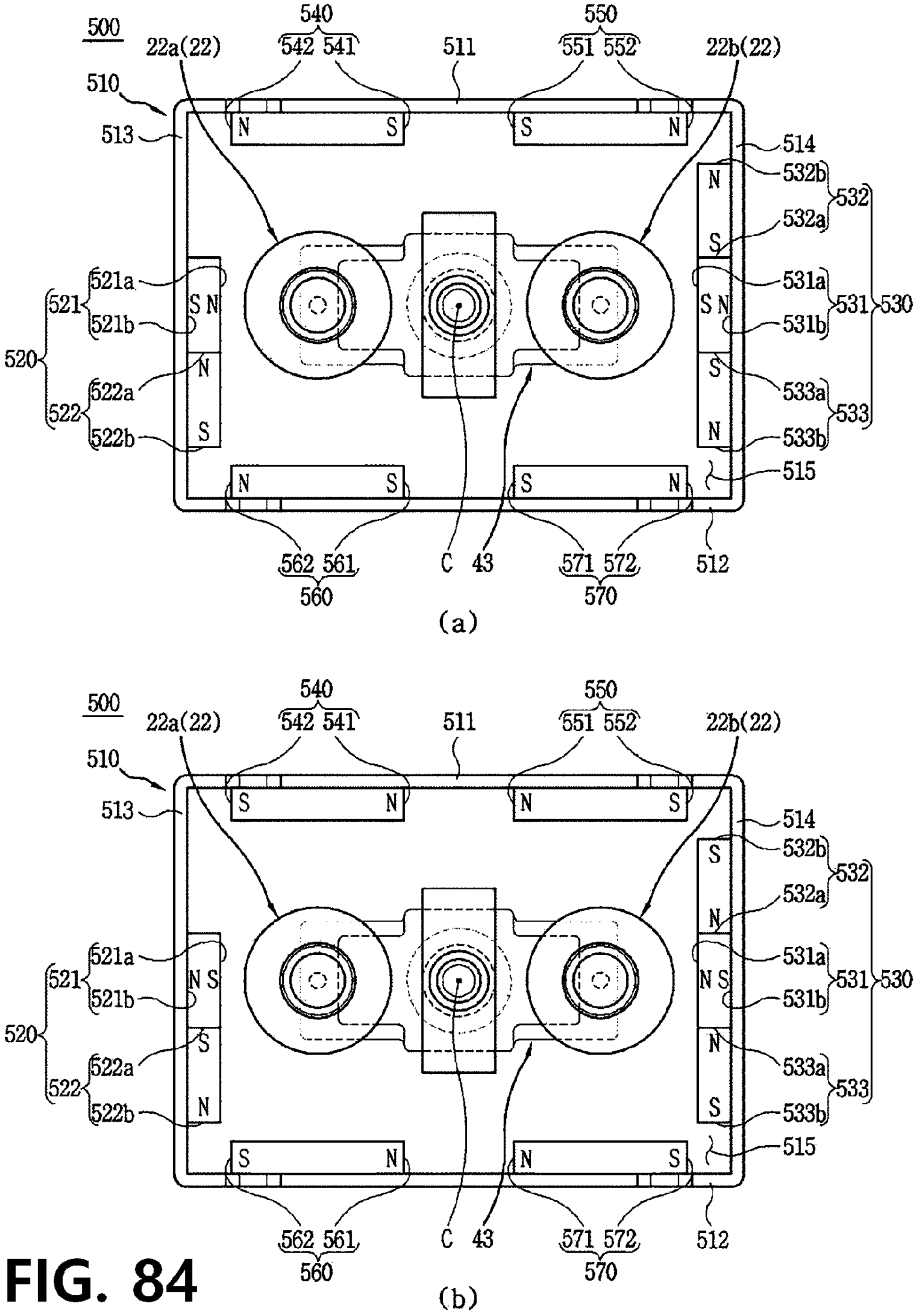
FIGS. 84 to 91 are conceptual views illustrating an arc path-forming part according to yet another embodiment of the present disclosure.
Figure 85:
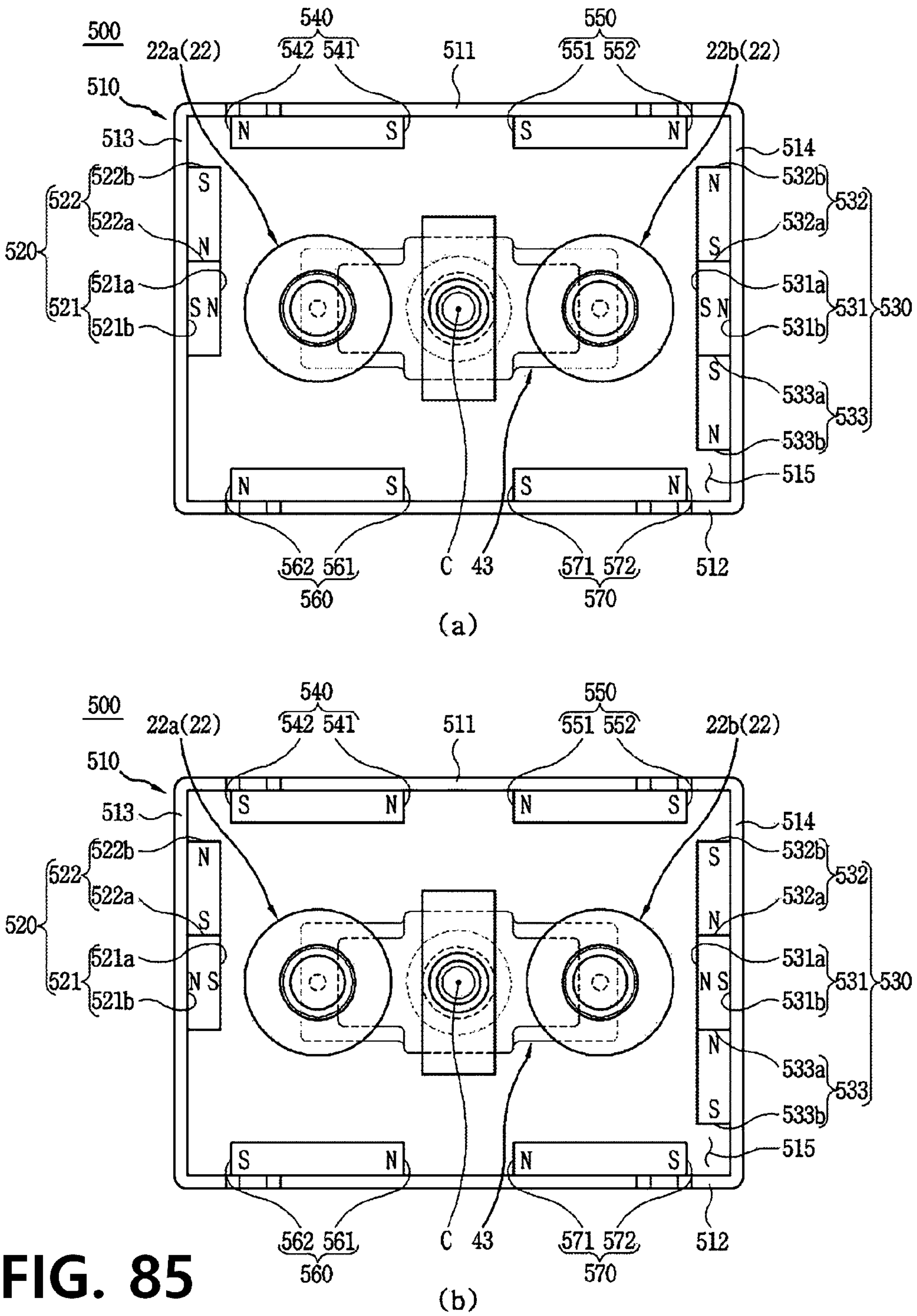
Figure 86:
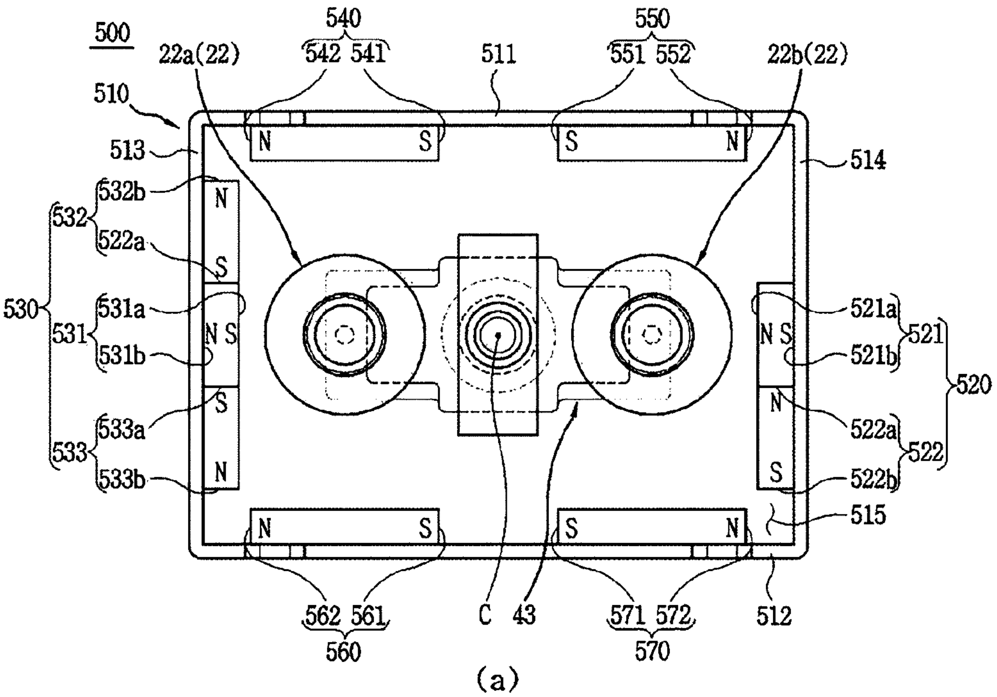
Figure 86:
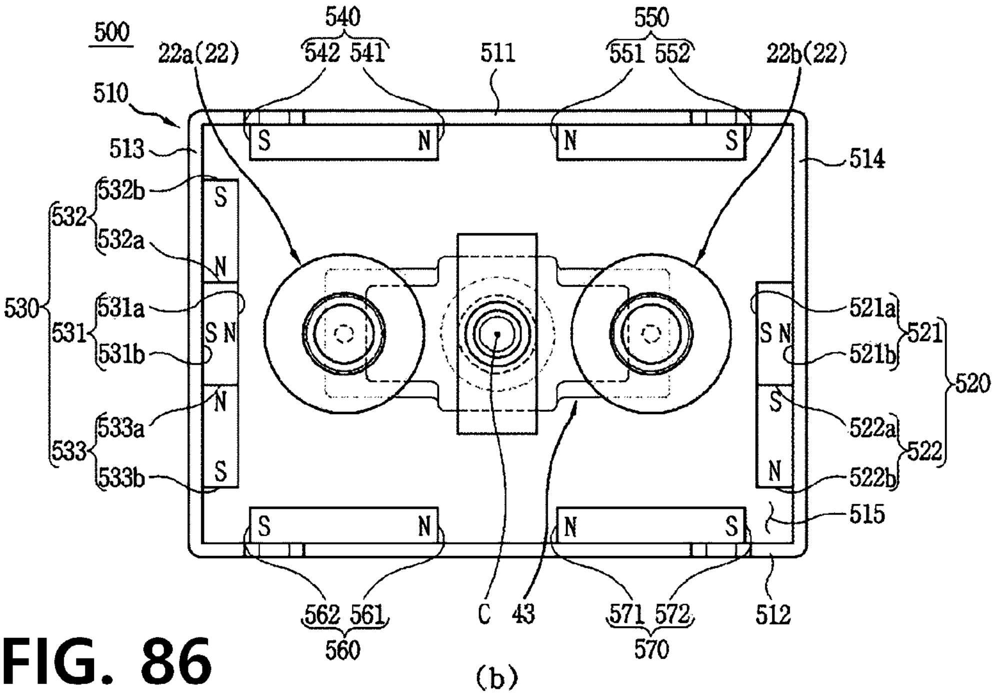
Figure 87:
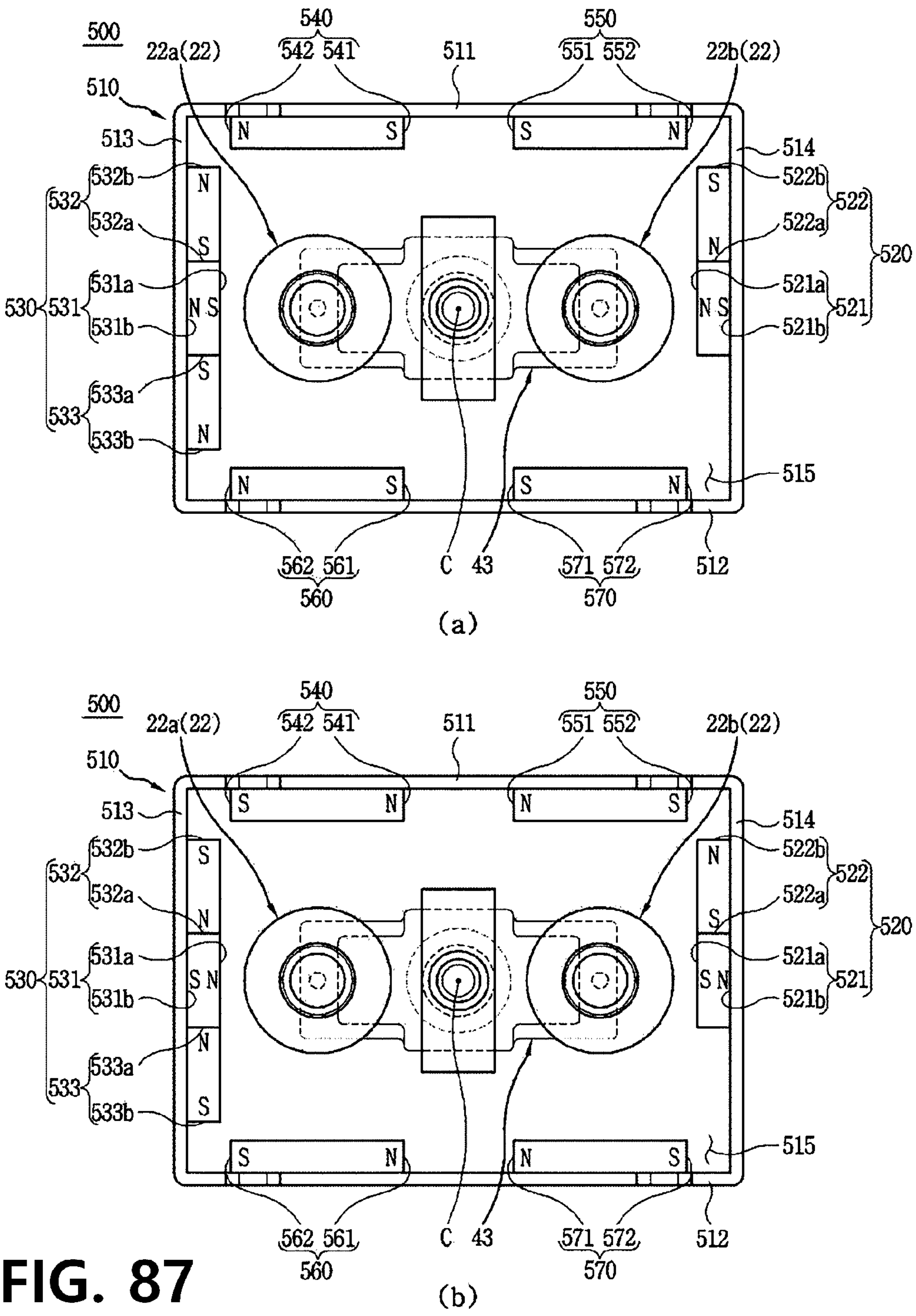
Figure 88:
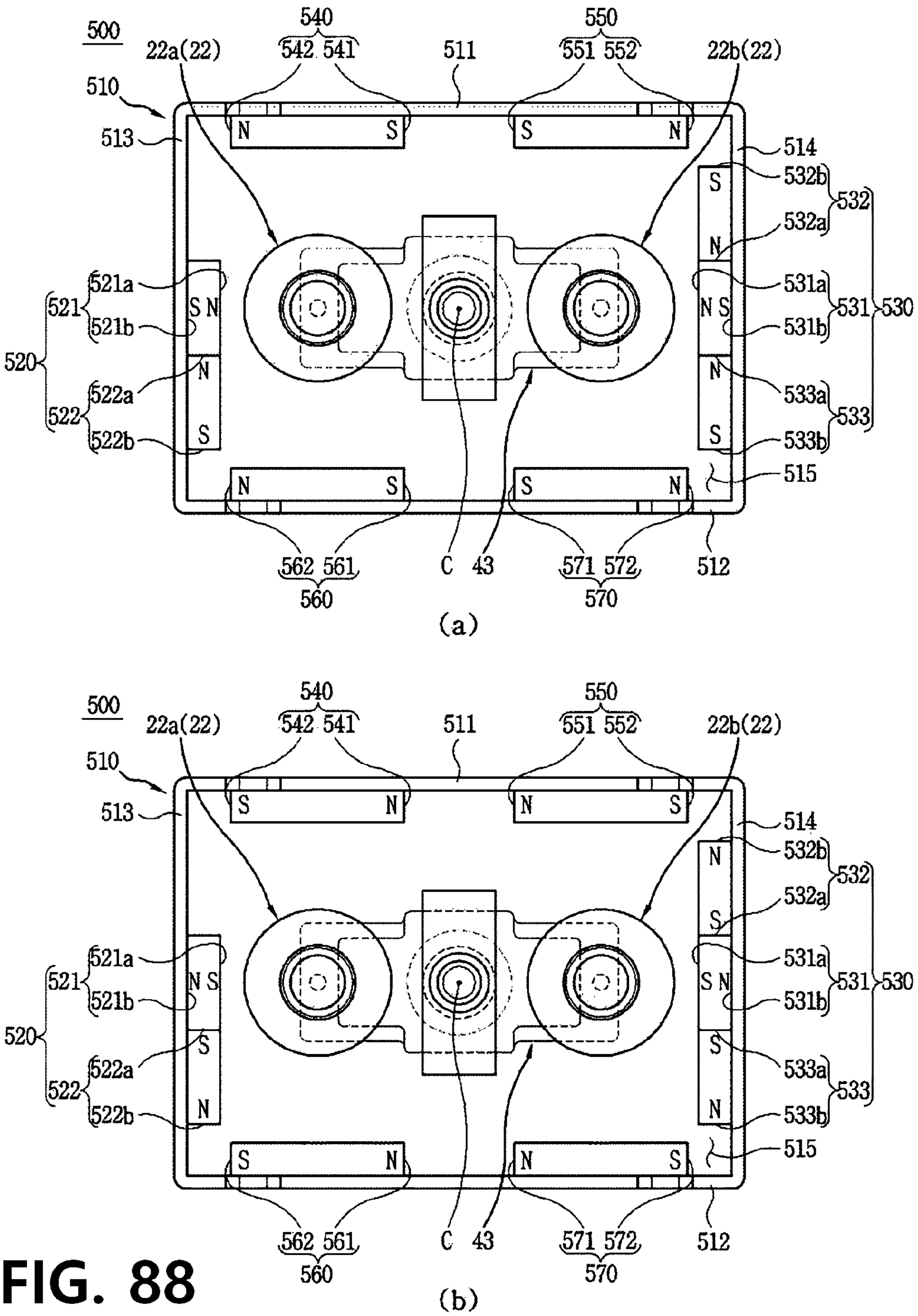
Figure 89:
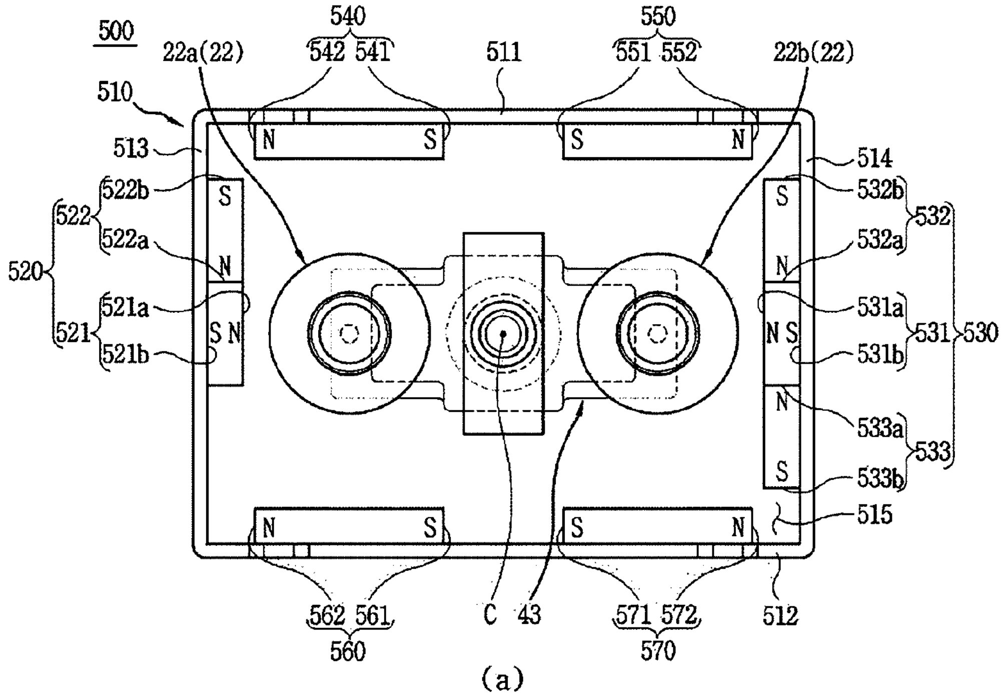
Figure 89:
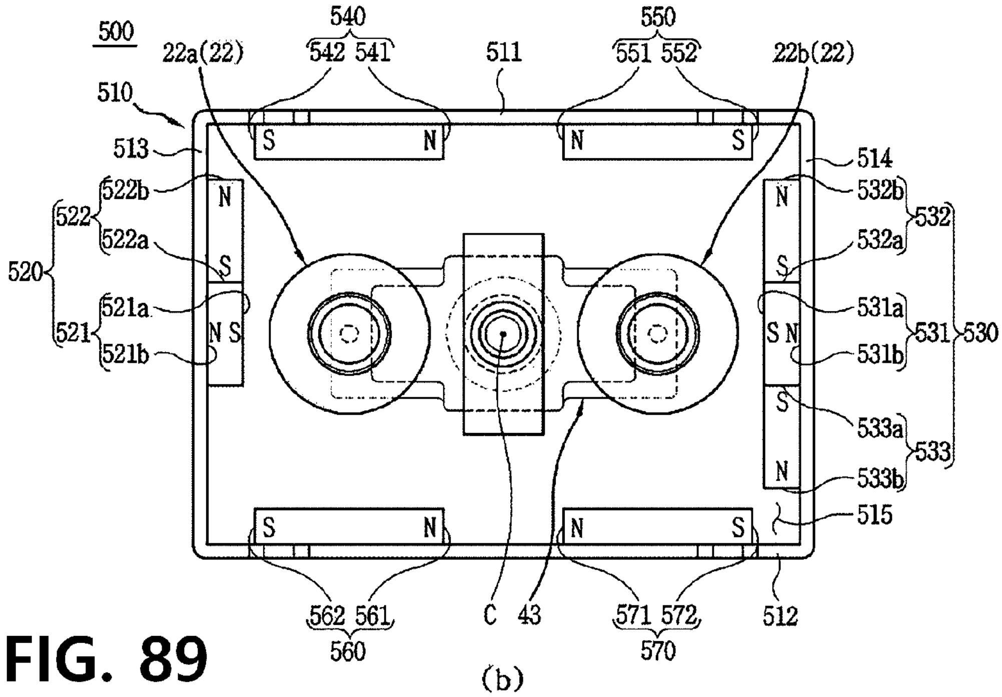
Figure 90:
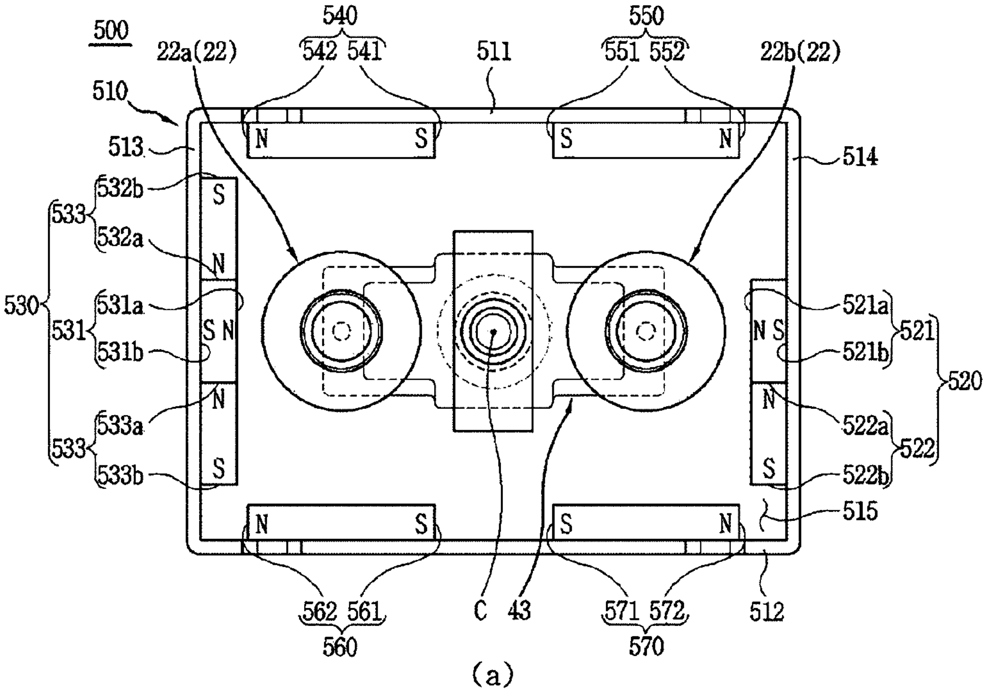
Figure 90:
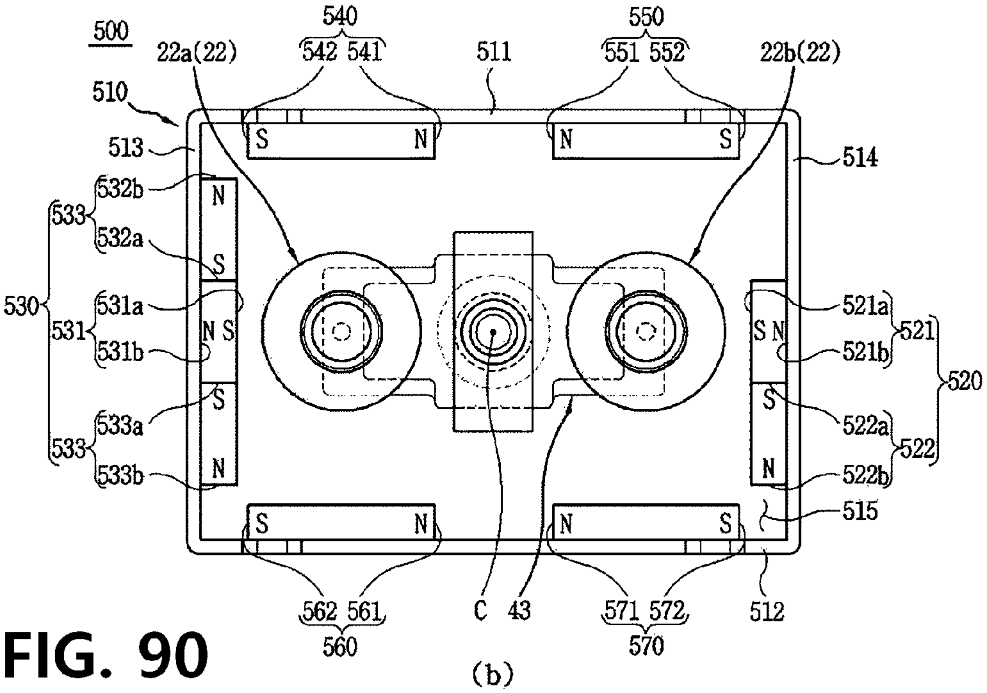
Figure 91:
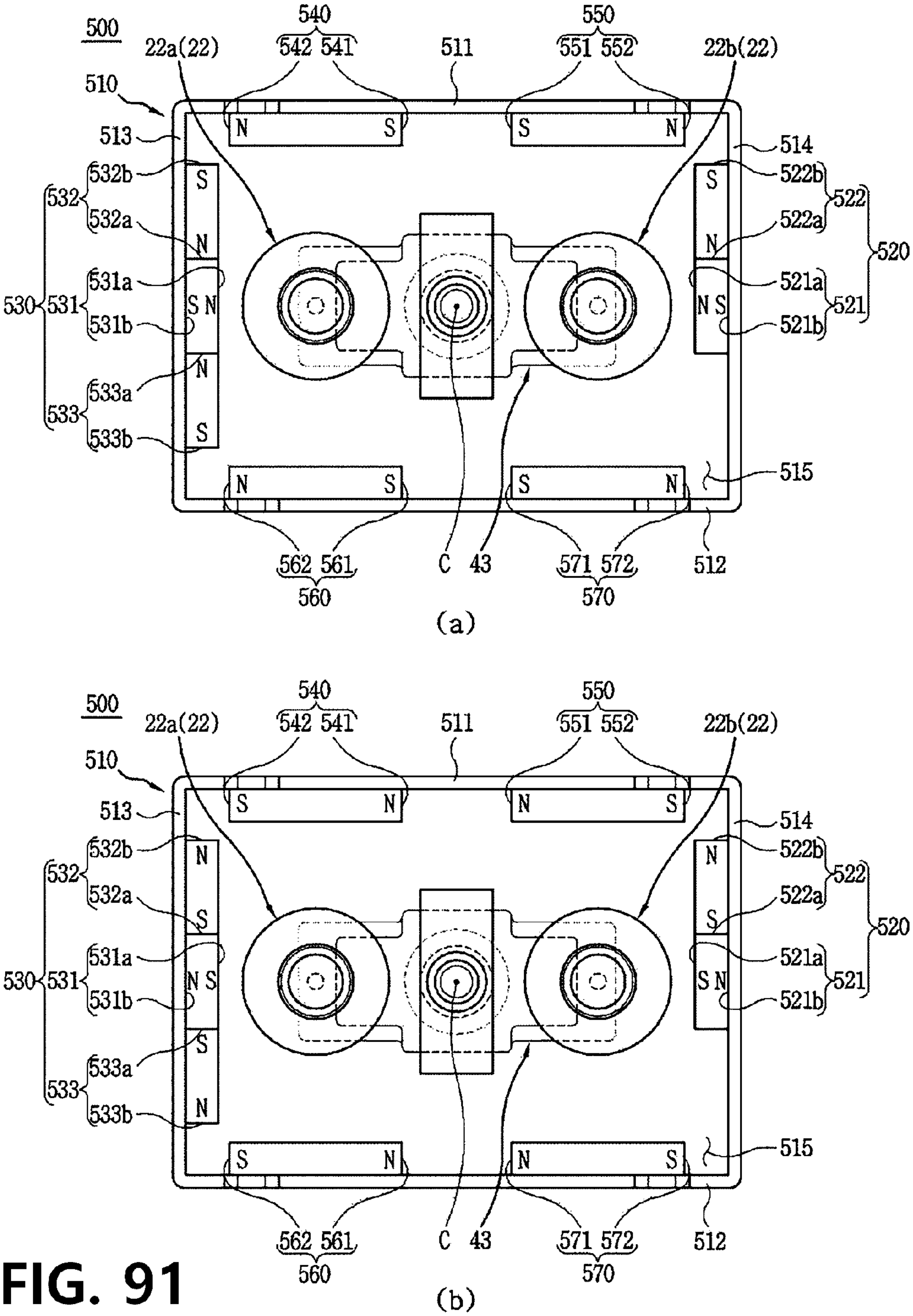

Referring to FIG. 83, each of the inner surfaces 421*a* and 422*a* of the Halbach array 420 and the fifth facing surface 471 of the fifth magnet part 470 are magnetized to the same polarity. In addition, the first to fourth facing surfaces 431, 441, 451, and 461 of the first to fourth magnet parts 430, 440, 450, and 460 are magnetized to a polarity different from the polarity of the inner surfaces 421*a* and 422*a* of the Halbach array 420 and the fifth facing surface 471 of the fifth magnet part 470.

That is, each of the inner surfaces 421*a* and 422*a* of the Halbach array 420 and the fifth facing surface 471 are magnetized to N poles, and the first to fourth facing surfaces 431, 441, 451, and 461 are magnetized to S poles.

Accordingly, magnetic fields that repel each other are formed between the Halbach array 420 and the fifth magnet part 470. In addition, a magnetic field in a direction from the second inner surface 422*a* to the first to fourth facing surfaces 431, 441, 451, and 461 is formed between the Halbach array 420 and the first to fourth magnet parts 430, 440, 450, and 460.

Furthermore, a magnetic field in a direction from the fifth facing surface 471 toward the first to fourth facing surfaces 431, 441, 451, and 461 is formed between the fifth magnet part 470 and the first to fourth magnet parts 430, 440, 450, and 460.

At this point, the strength of the magnetic fields formed between the Halbach array 420 and the first to fifth magnet parts 430, 440, 450, 460, and 470 may be enhanced by the magnetic fields formed by the first and second blocks 421 and 422.

In the embodiment illustrated in FIGS. 82A and 83A, a direction of current is a direction from the second fixed contactor 22*b* to the first fixed contactor 22*a* via the movable contactor 43.

In the embodiment illustrated in FIG. 82A, when the Fleming's left-hand rule is applied to the first fixed contactor 22*a*, an electromagnetic force generated in the vicinity of the first fixed contactor 22*a* is formed toward the rear left side. Accordingly, the arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side. Accordingly, the arc path A.P in the vicinity of the second fixed contactor 22*b* is also formed toward the front right side.

In the embodiment illustrated in FIG. 83A, when the Fleming's left-hand rule is applied to the first fixed contactor 22*a*, an electromagnetic force generated in the vicinity of the first fixed contactor 22*a* is formed toward the rear left side. Accordingly, the arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIGS. 82B and 83B, a direction of current is a direction from the first fixed contactor 22*a* to the second fixed contactor 22*b* via the movable contactor 43.

In the embodiment illustrated in FIG. 82B, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIG. 83B, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the front right side. Accordingly, the arc path A.P in the vicinity of the second fixed contactor 22*b* is also formed toward the front right side.

Although not illustrated in the drawing, when the polarity of each surface of the Halbach array 420 and the first to fifth magnet parts 430, 440, 450, 460, and 470 is changed, the directions of the magnetic fields formed in the Halbach array 420 and the first to fifth magnet parts 430, 440, 450, 460, and 470 are reversed. Accordingly, the generated electromagnetic force and the arc path A.P are also formed so that the front-rear direction thereof is reversed.

That is, in the electric connection situation shown in FIG. 82A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the rear right side.

In the electric connection situation shown in FIG. 83A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the front right side.

Similarly, in the electric connection situation shown in FIG. 82B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the front right side.

In the electric connection situation shown in FIG. 83B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the rear right side.

Accordingly, in the arc path-forming part 400 according to the present embodiment, the electromagnetic force and the arc path A.P may be formed in a direction away from the central part C regardless of the polarity of each of the Halbach array 420 and the first to fifth magnet parts 430, 440, 450, 460, and 470 or the direction of the current flowing through the DC relay 1.

Accordingly, damage to each component of the DC relay 1 disposed adjacent to the central part C can be prevented. Furthermore, since the generated arc can be quickly discharged to the outside, operational reliability of the DC relay 1 can be improved.

(5) Description of Arc Path-Forming Part 500 According to Yet Another Embodiment of Present Disclosure Hereinafter, an arc path-forming part 500 according to still another embodiment of the present disclosure will be described in detail with reference to FIGS. 84 to 93.

Referring to FIGS. 84 to 91, the arc path-forming part 500 according to the illustrated embodiment includes a magnet frame 510, first and second Halbach arrays 520 and 530, and first to fourth magnet parts 540, 550, 560, and 570.

The magnet frame 510 according to the present embodiment has the same structure and function as the magnet frame 110 according to the above-described embodiment. However, there is a difference in the arrangement method of the first and second Halbach arrays 520 and 530 and the first to fourth magnet parts 540, 550, 560, and 570 disposed in the magnet frame 510 according to the present embodiment.

Accordingly, a description of the magnet frame 510 will be replaced with the description of the magnet frame 110 according to the above-described embodiment.

In the illustrated embodiment, a plurality of magnetic materials constituting the first Halbach array 520 are continuously arranged side by side from the front side to the rear side. That is, the first Halbach array 520 is formed to extend in the front-rear direction.

The first Halbach array 520 may form a magnetic field together with another magnetic material. In the illustrated embodiment, the first Halbach array 520 may form magnetic fields together with the second Halbach array 530 and the first to fourth magnet parts 540, 550, 560, and 570.

The first Halbach array 520 may be located adjacent to any one surface of the third and fourth surfaces 513 and 514. In one embodiment, the first Halbach array 520 may be coupled to an inner side (i.e., the side in a direction toward a space part 515) of the any one surface.

In the embodiment illustrated in FIGS. 84, 85, 88, and 89, the first Halbach array 520 is disposed on an inner side of the third surface 513 and adjacent to the third surface 513. In the embodiment illustrated in FIGS. 86, 87, 90, and 91, the first Halbach array 520 may be disposed on an inner side of the fourth surface 514 and adjacent to the fourth surface 514.

The first Halbach array 520 is disposed to face the second Halbach array 530. In the embodiment illustrated in FIGS. 84, 85, 88, and 89, the first Halbach array 520 is disposed to face the second Halbach array 530 located on the inner side of the fourth surface 514. In the embodiment illustrated in FIGS. 86, 87, 90, and 91, the first Halbach array 520 is disposed to face the second Halbach array 530 located on the inner side of the third surface 513.

The first Halbach array 520 is located to be biased to any one surface of a first surface 511 and a second surface 512. In the embodiment illustrated in FIGS. 84, 85, 88, and 89, the first Halbach array 520 is located to be biased to the second surface 512. In the embodiment illustrated in FIGS. 86, 87, 90, and 91, the first Halbach array 520 is located to be biased to the first surface 511.

The space part 515, and the fixed contactor 22 and the movable contactor 43 accommodated in the space part 515 are located between the first Halbach array 520 and the second Halbach array 530.

The first Halbach array 520 may enhance the strength of the magnetic field formed by itself and the magnetic fields formed by the second Halbach array 530 and the first to fourth magnet parts 540, 550, 560, and 570. Since the process of enhancing the direction and magnetic field of the magnetic field formed by the first Halbach array 520 is a well-known technique, a detailed description thereof will be omitted.

In the illustrated embodiment, the first Halbach array 520 includes a first block 521 and a second block 522. It will be understood that the plurality of magnetic materials constituting the first Halbach array 520 are named as the blocks 521 and 522, respectively.

The first and second blocks 521 and 522 may each be formed of a magnetic material. In one embodiment, the first and second blocks 521 and 522 may each be provided as a permanent magnet, an electromagnet, or the like.

The first and second blocks 521 and 522 may be disposed side by side in one direction. In the illustrated embodiment, the first and second blocks 521 and 522 are disposed side by side in a direction in which the third surface 513 or the fourth surface 514 extends, that is, in the front-rear direction.

In the embodiment illustrated in FIGS. 84, 86, 88, and 90, the first block 521 is disposed in a central portion, and the second block 522 is disposed at a front side of the first block 521. In the embodiment illustrated in FIGS. 85, 87, 89, and 91, the first block 521 is disposed in a central portion, and the second block 522 is disposed at a rear side of the first block 521.

In one embodiment, the first block 521 and the second block 522 may be in contact with each other.

The first block 521 may be disposed to overlap each of the fixed contactors 22*a* and 22*b* in a direction toward the second Halbach array 530, i.e., in the left-right direction in the illustrated embodiment. In addition, the first block 521 may be disposed to overlap a second block 532 of the second Halbach array 530 in the left-right direction.

Each of the blocks 521 and 522 includes a plurality of surfaces.

Specifically, the first block 521 includes a first inner surface 521*a* facing the space part 515 or the second Halbach array 530 and a first outer surface 521*b* opposite to the space part 515 or the second Halbach array 530.

The second block 522 includes a second inner surface 522*a* facing the first block 521 and a second outer surface 522*b* opposite to the first block 521.

The plurality of surfaces of each of the blocks 521 and 522 may be magnetized according to a predetermined rule to configure a Halbach array.

In the embodiment illustrated in FIGS. 84 to 87, the first and second inner surfaces 521*a* and 522*a* are magnetized to the same polarity. At this point, the first and second inner surfaces 521*a* and 522*a* may be magnetized to the same polarity as each of outer surfaces 531*b*, 532*b*, and 533*b* of the second Halbach array 530.

Furthermore, the first and second inner surfaces 521*a* and 522*a* may be magnetized to the same polarity as each of opposing surfaces 542, 552, 562, and 572 respectively of the magnet parts 540, 550, 560, and 570.

In addition, the first and second outer surfaces 521*b* and 522*b* are magnetized to a polarity different from the polarity of first and second inner surfaces 521*a* and 522*a*. At this point, the first and second outer surfaces 521*b* and 522*b* may be magnetized to the same polarity as each of inner surfaces 531*a*, 532*a*, and 533*a* of the second Halbach array 530. Furthermore, the first and second outer surfaces 521*b* and 522*b* may be magnetized to the same polarity as each of the facing surfaces 541, 551, 561, and 571 of respectively of the magnet parts 540, 550, 560, and 570.

In the embodiment illustrated in FIGS. 88 to 91, the first and second inner surfaces 521*a* and 522*a* are magnetized to the same polarity. At this point, the first and second inner surfaces 521*a* and 522*a* may be magnetized to the same polarity as each of the inner surfaces 531*a*, 532*a*, and 533*a* of the second Halbach array 530.

Furthermore, the first and second inner surfaces 521*a* and 522*a* may be magnetized to the same polarity as each of opposing surfaces 542, 552, 562, and 572 respectively of the magnet parts 540, 550, 560, and 570.

In addition, the first and second outer surfaces 521*b* and 522*b* are magnetized to a polarity different from the polarity of first and second inner surfaces 521*a* and 522*a*. At this point, the first and second outer surfaces 521*b* and 522*b* may be magnetized to the same polarity as each of outer surfaces 531*b*, 532*b*, and 533*b* of the second Halbach array 530.

Furthermore, the first and second outer surfaces 521*b* and 522*b* may be magnetized to the same polarity as each of the facing surfaces 541, 551, 561, and 571 of respectively of the magnet parts 540, 550, 560, and 570.

In the illustrated embodiment, a plurality of magnetic materials constituting the second Halbach array 530 are continuously arranged side by side from the front side to the rear side. That is, the second Halbach array 530 is formed to extend in the front-rear direction.

The second Halbach array 530 may form a magnetic field together with another magnetic material. In the illustrated embodiment, the second Halbach array 530 may form magnetic fields together with the first Halbach array 520 and the first to fourth magnet parts 540, 550, 560, and 570.

The second Halbach array 530 may be located adjacent to the other surface of the third and fourth surfaces 513 and 514. In one embodiment, the second Halbach array 530 may be coupled to an inner side (i.e., the side in a direction toward the space part 515) of the other surface.

In the embodiment illustrated in FIGS. 84 to 87, the second Halbach array 530 is disposed on the inner side of the fourth surface 514, and disposed adjacent to the fourth surface 514. In the embodiment illustrated in FIGS. 88 to 91, the second Halbach array 530 may be disposed on the inner side of the third surface 513, and disposed adjacent to the third surface 513.

The second Halbach array 530 is disposed to face the first Halbach array 520. In the embodiment illustrated in FIGS. 84 to 87, the second Halbach array 530 is disposed to face the first Halbach array 520 located on the inner side of the third surface 513. In the embodiment illustrated in FIGS. 88 to 91, the second Halbach array 530 is disposed to face the first Halbach array 520 located on the inner side of the fourth surface 514.

The space part 515, and the fixed contactor 22 and the movable contactor 43 accommodated in the space part 515 are located between the second Halbach array 530 and the first Halbach array 520.

The second Halbach array 530 may enhance the strength of the magnetic field formed by itself and the magnetic fields formed by the first Halbach array 520 and each of the magnet parts 540, 550, 560, and 570. Since the process of enhancing the direction and magnetic field of the magnetic field formed by the second Halbach array 530 is a well-known technique, a detailed description thereof will be omitted.

In the illustrated embodiment, the second Halbach array 530 includes a first block 531, the second block 532, and a third block 533. It will be understood that the plurality of magnetic materials constituting the second Halbach array 530 are named as the blocks 531, 532, and 533, respectively.

The first to third blocks 531, 532, and 533 may each be formed of a magnetic material. In one embodiment, the first to third blocks 531, 532, and 533 may each be provided as a permanent magnet, an electromagnet, or the like.

The first to third blocks 531, 532, and 533 may be disposed side by side in one direction. In the illustrated embodiment, the first to third blocks 531, 532, and 533 are disposed side by side in a direction in which the third surface 513 or the fourth surface 514 extends, that is, in the front-rear direction.

In the illustrated embodiment, among the first to third blocks 531, 532, and 533, the second block 532 is disposed at the most rear side, and the third block 533 is disposed at the most front side. In addition, the first block 531 is located between the second block 532 and the third block 533.

In one embodiment, the second block 532 may be in contact with each of the first and third blocks 531 and 533.

The first block 531 may be disposed to overlap each of the fixed contactors 22*a* and 22*b* in a direction toward the third surface 513 or the fourth surface 514, i.e., in the left-right direction in the illustrated embodiment. In addition, the first block 531 may be disposed to overlap the first block 521 of the first Halbach array 520 in the left-right direction.

Each of the blocks 531, 532, and 533 includes a plurality of surfaces.

Specifically, the first block 531 includes a first inner surface 531*a* facing the space part 515 or the first Halbach array 520 and a first outer surface 531*b* opposite to the space part 515 or the first Halbach array 520.

The second block 532 includes a second inner surface 532*a* facing the first block 531 and a second outer surface 532*b* opposite to the first block 531.

In addition, the third block 533 includes a third inner surface 533*a* facing the first block 531 and a third outer surface 533*b* opposite to the first block 531.

The plurality of surfaces of each of the blocks 531, 532, and 533 may be magnetized according to a predetermined rule to configure a Halbach array.

In the embodiment illustrated in FIGS. 84 to 87, the first to third inner surfaces 531*a*, 532*a*, and 533*a* are magnetized to the same polarity. At this point, the first to third inner surfaces 531*a*, 532*a*, and 533*a* may be magnetized to the same polarity as each of the outer surfaces 521*b* and 522*b* of the first Halbach array 520.

Furthermore, the first to third inner surfaces 531*a*, 532*a*, and 533*a* may be magnetized to the same polarity as each of the facing surfaces 541, 551, 561, and 571 respectively of the magnet parts 540, 550, 560, and 570.

In addition, the first to third outer surfaces 531*b*, 532*b*, and 533*b* are magnetized to a polarity different from the polarity of the first to third inner surfaces 531*a*, 532*a*, and 533*a*. At this point, the first to third outer surfaces 531*b*, 532*b*, and 533*b* may be magnetized to the same polarity as each of the inner surfaces 531*a* and 532*a* of the first Halbach array 520.

Furthermore, the first to third outer surfaces 531*b*, 532*b*, and 533*b* may be magnetized to the same polarity as each of the opposing surfaces 542, 552, 562, and 572 respectively of the magnet parts 540, 550, 560, and 570.

In the embodiment illustrated in FIGS. 88 to 91, the first to third inner surfaces 531*a*, 532*a*, and 533*a* are magnetized to the same polarity. At this point, the first to third inner surfaces 531*a*, 532*a*, and 533*a* may be magnetized to the same polarity as each of the inner surfaces 521*a* and 522*a* of the first Halbach array 520.

Furthermore, the first to third inner surfaces 531*a*, 532*a*, and 533*a* may be magnetized to the same polarity as each of the opposing surfaces 542, 552, 562, and 572 respectively of the magnet parts 540, 550, 560, and 570.

In addition, the first to third outer surfaces 531*b*, 532*b*, and 533*b* are magnetized to a polarity different from the polarity of the first to third inner surfaces 531*a*, 532*a*, and 533*a*. At this point, the first to third outer surfaces 531*b*, 532*b*, and 533*b* may be magnetized to the same polarity as each of the outer surfaces 521*b* and 522*b* respectively of the first Halbach array 520.

Furthermore, the first to third outer surfaces 531*b*, 532*b*, and 533*b* may be magnetized to the same polarity as each of the facing surfaces 541, 551, 561, and 571 respectively of the magnet parts 540, 550, 560, and 570.

Each of the first to fourth magnet parts 540, 550, 560, and 570 forms a magnetic field by itself and forms magnetic fields together with the first and second Halbach arrays 520 and 530 and each of the magnet parts 540, 550, 560, and 570 except for itself. An arc path A.P may be formed inside the arc chamber 21 by the magnetic fields formed by the first to fourth magnet parts 540, 550, 560, and 570.

The first to fourth magnet parts 540, 550, 560, and 570 may each be provided in any form capable of forming a magnetic field by being magnetized. In one embodiment, the first to fourth magnet parts 540, 550, 560, and 570 may each be provided as a permanent magnet, an electromagnet, or the like.

The first to fourth magnet parts 540, 550, 560, and 570 may be located adjacent to the respective first to fourth surfaces 511, 512, 513, and 514.

In the illustrated embodiment, the first magnet part 540 and the second magnet part 550 are located adjacent to the first surface 511. The first magnet part 540 is located to be biased to the third surface 513. The second magnet part 550 is located to be biased to the fourth surface 514.

The first magnet part 540 and the second magnet part 550 are disposed to face the third magnet part 560 and the fourth magnet part 570, respectively, with the space part 515 therebetween.

In one embodiment, the first magnet part 540 may overlap the first fixed contactor 22*a* and the third magnet part 560 in the front-rear direction. In addition, the second magnet part 550 may overlap the second fixed contactor 22*b* and the fourth magnet part 570 in the front-rear direction.

The first magnet part 540 and the second magnet part 550 are disposed side by side in an extending direction thereof. In one embodiment, the first magnet part 540 and the second magnet part 550 may be in contact with each other.

In the illustrated embodiment, the third magnet part 560 and the fourth magnet part 570 are located adjacent to the second surface 512. The third magnet part 560 is located to be biased to the third surface 513. The fourth magnet part 570 is located to be biased to the fourth surface 514.

The third magnet part 560 and the fourth magnet part 570 are disposed to face the first magnet part 540 and the second magnet part 550, respectively, with the space part 515 therebetween.

In one embodiment, the third magnet part 560 may overlap the first fixed contactor 22*a* and the first magnet part 540 in the front-rear direction. In addition, the fourth magnet part 570 may overlap the second fixed contactor 22*b* and the second magnet part 550 in the front-rear direction.

The third magnet part 560 and the fourth magnet part 570 are disposed side by side in an extending direction thereof. In one embodiment, the third magnet part 560 and the fourth magnet part 570 may be in contact with each other.

The first to fourth magnet parts 540, 550, 560, and 570 are formed to extend in one direction. In the illustrated embodiment, the first to fourth magnet parts 540, 550, 560, and 570 are formed to extend in the left-right direction.

Each of the first to fourth magnet parts 540, 550, 560, and 570 includes a plurality of surfaces.

Specifically, the first magnet part 540 includes a first facing surface 541 facing the second magnet part 550 and a first opposing surface 542 opposite to the second magnet part 550.

The second magnet part 550 includes a second facing surface 551 facing the first magnet part 540 and a second opposing surface 552 opposite to the first magnet part 540.

The third magnet part 560 includes a third facing surface 561 facing the fourth magnet part 570 and a third opposing surface 562 opposite to the fourth magnet part 570.

The fourth magnet part 570 includes a fourth facing surface 571 facing the third magnet part 560 and a fourth opposing surface 572 opposite to the third magnet part 560.

Each surface of the first to fourth magnet parts 540, 550, 560, and 570 may be magnetized according to a predetermined rule.

In the embodiment illustrated in FIGS. 84 to 87, the first to fourth facing surfaces 541, 551, 561, and 571 are magnetized to the same polarity. At this point, the first to fourth facing surfaces 541, 551, 561, and 571 are magnetized to the same polarity as the first and second outer surfaces 521*b* and 522*b* of the first Halbach array 520 and the first to third inner surfaces 531*a*, 532*a*, and 533*a* of the second Halbach array 530.

The first to fourth opposing surfaces 542, 552, 562, and 572 are magnetized to a polarity different from the polarity of the first to fourth facing surfaces 541, 551, 561, and 571. At this point, the first to fourth opposing surfaces 542, 552, 562, and 572 are magnetized to the same polarity as the first and second inner surfaces 521*a* and 522*a* of the first Halbach array 520 and the first to third outer surfaces 531*b*, 532*b*, and 533*b* of the second Halbach array 530.

In the embodiment illustrated in FIGS. 88 to 91, the first to fourth facing surfaces 541, 551, 561, and 571 are magnetized to the same polarity. At this point, the first to fourth facing surfaces 541, 551, 561, and 571 are magnetized to the same polarity as the first and second outer surfaces 521*b* and 522*b* of the first Halbach array 520 and the first to third outer surfaces 531*b*, 532*b*, and 533*b* of the second Halbach array 530.

Similarly, the first to fourth opposing surfaces 542, 552, 562, and 572 are magnetized to a polarity different from the polarity of the first to fourth facing surfaces 541, 551, 561, and 571. At this point, the first to fourth opposing surfaces 542, 552, 562, and 572 are magnetized to the same polarity as the first and second inner surfaces 521*a* and 522*a* of the first Halbach array 520 and the first to third inner surfaces 531*a*, 532*a*, and 533*a* of the second Halbach array 530.

Hereinafter, an arc path A.P formed by the arc path-forming part 500 according to the present embodiment will be described in detail with reference to FIGS. 92 and 93.

Figure 92:
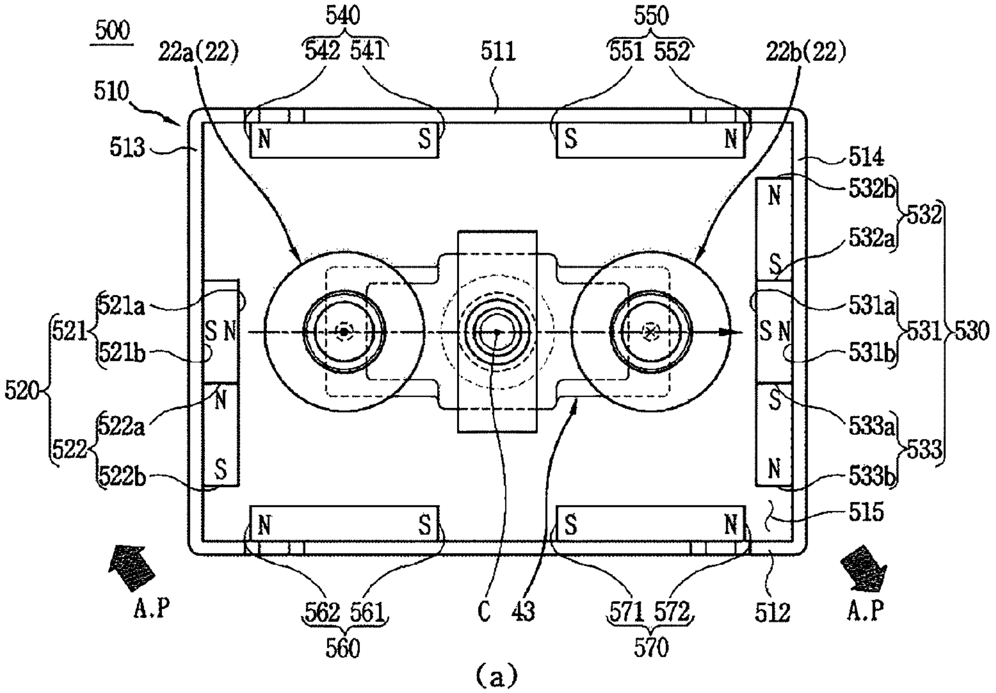
FIGS. 92 and 93 are conceptual views illustrating magnetic field and arc paths formed by the arc path-forming part according to the embodiment of FIGS. 84 to 91.
Figure 92:
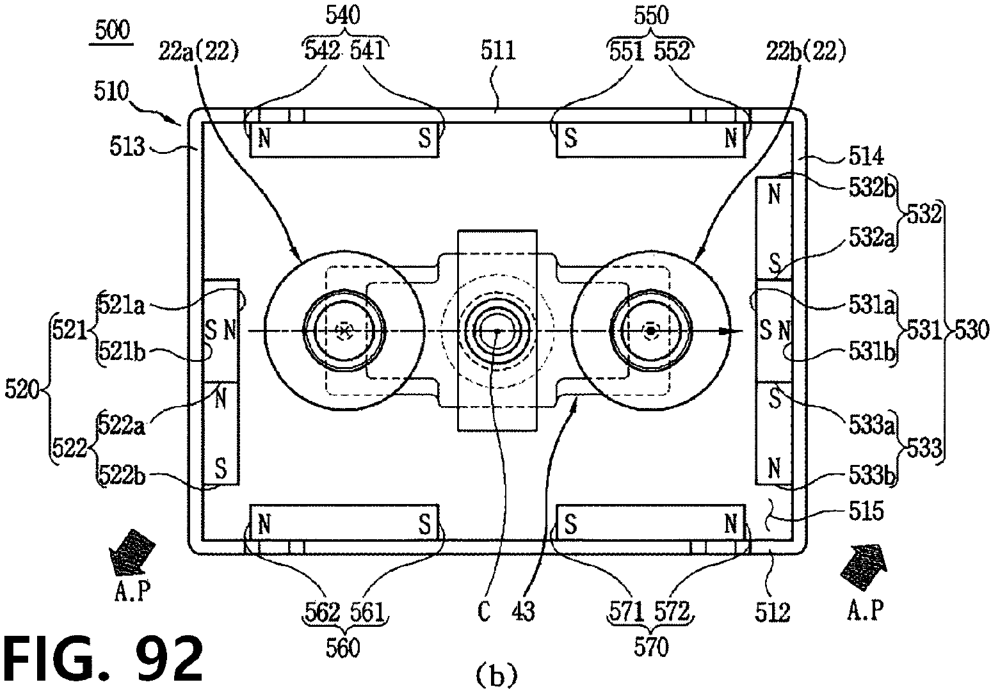

Referring to FIG. 92, each of the inner surfaces 521*a* and 522*a* of the first Halbach array 520 and each of the inner surfaces 531*a*, 532*a*, and 533*a* of the second Halbach array 530 are magnetized to different polarities.

That is, each of the inner surfaces 521*a* and 522*a* of the first Halbach array 520 is magnetized an N pole, and each of the inner surfaces 531*a*, 532*a*, and 533*a* of the second Halbach array 530 is magnetized to an S pole.

At this point, each of the facing surfaces 541, 551, 561, and 571 respectively of the magnet parts 540, 550, 560, and 570 is magnetized to a polarity different from that of each of the inner surfaces 521*a* and 522*a* of the first Halbach array 520, that is, magnetized to an S pole.

Accordingly, a magnetic field in a direction from the second inner surface 522*a* toward the second inner surface 532*a* is formed between the second block 522 of the first Halbach array 520 and the second block 532 of the second Halbach array 530.

Referring to FIG. 93, each of the inner surfaces 521*a* and 522*a* of the first Halbach array 520 and each of the inner surfaces 531*a*, 532*a*, and 533*a* of the second Halbach array 530 are magnetized to the same polarity.

That is, each of the inner surfaces 521*a* and 522*a* of the first Halbach array 520 and each of the inner surfaces 531*a*, 532*a*, and 533*a* of the second Halbach array 530 are all magnetized to N poles.

At this point, each of the facing surfaces 541, 551, 561, and 571 respectively of the magnet parts 540, 550, 560, and 570 is magnetized to a polarity different from that of each of the inner surfaces 521*a*, 522*a*, and 523*a* of the first Halbach array 520, that is, magnetized to an S pole.

Accordingly, magnetic fields that repel each other are formed between the second block 522 of the first Halbach array 520 and the second block 532 of the second Halbach array 530.

In addition, a magnetic field in a direction from the second inner surface 522*a* toward each of the facing surfaces 541, 551, 561, and 571 is formed between the first Halbach array 520 and each of the magnet parts 540, 550, 560, and 570.

Similarly, a magnetic field in a direction from the second inner surface 532*a* toward each of the facing surfaces 541, 551, 561, and 571 is formed between the second Halbach array 530 and each of the magnet parts 540, 550, 560, and 570.

At this point, the strength of the magnetic field formed between the first Halbach array 520 and the second Halbach array 530 may be enhanced by the magnetic fields formed by the first to third blocks 521, 531, 522, and 533.

In the embodiment illustrated in FIGS. 92A and 93A, a direction of current is a direction from the second fixed contactor 22*b* to the first fixed contactor 22*a* via the movable contactor 43.

In the embodiment illustrated in FIG. 92A, when the Fleming's left-hand rule is applied to the first fixed contactor 22*a*, an electromagnetic force generated in the vicinity of the first fixed contactor 22*a* is formed toward the rear left side. Accordingly, the arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side. Accordingly, the arc path A.P in the vicinity of the second fixed contactor 22*b* is also formed toward the front right side.

In the embodiment illustrated in FIG. 93A, when the Fleming's left-hand rule is applied to the first fixed contactor 22*a*, an electromagnetic force generated in the vicinity of the first fixed contactor 22*a* is formed toward the rear left side. Accordingly, the arc path A.P in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIGS. 92B and 93B, a direction of current is a direction from the first fixed contactor 22*a* to the second fixed contactor 22*b* via the movable contactor 43.

In the embodiment illustrated in FIG. 92B, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side. Accordingly, the arc path A.P in the vicinity of the second fixed contactor 22*b* is also formed toward the rear right side.

In the embodiment illustrated in FIG. 93B, when the Fleming's left-hand rule is applied to the first fixed contactor 22*a*, an electromagnetic force generated in the vicinity of the first fixed contactor 22*a* is formed toward the front left side. Accordingly, the arc path A.P in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the front right side. Accordingly, the arc path A.P in the vicinity of the second fixed contactor 22*b* is also formed toward the front right side.

Although not illustrated in the drawing, when the polarity of each surface of the first and second Halbach arrays 520 and 530 and the first to fourth magnet parts 540, 550, 560, and 570 is changed, the directions of the magnetic fields formed in the first and second Halbach arrays 520 and 530 and the first to fourth magnet parts 540, 550, 560, and 570 are reversed. Accordingly, the generated electromagnetic force and the arc path A.P are also formed so that the front-rear direction thereof is reversed.

That is, in the electric connection situation shown in FIG. 92A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the rear right side.

In the electric connection situation shown in FIG. 93A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the front right side.

Similarly, in the electric connection situation shown in FIG. 92B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the front right side.

In the electric connection situation shown in FIG. 93B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the rear right side.

Accordingly, in the arc path-forming part 500 according to the present embodiment, the electromagnetic force and the arc path A.P may be formed in a direction away from the central part C regardless of the polarity of each of the first and second Halbach arrays 520 and 530 and the first to fourth magnet parts 540, 550, 560, and 570 or the direction of the current flowing through the DC relay 1.

Accordingly, damage to each component of the DC relay 1 disposed adjacent to the central part C can be prevented. Furthermore, since the generated arc can be quickly discharged to the outside, operational reliability of the DC relay 1 can be improved.

Although it has been described above with reference to preferred embodiments of the present disclosure, it will be understood that those skilled in the art are able to variously modify and change the present disclosure without departing from the spirit and scope of the disclosure described in the claims below.

The invention claimed is:

1. An arc path-forming part comprising:

a magnet frame having a space part, in which a fixed contactor and a movable contactor are accommodated, formed therein;

a Halbach array located in the space part of the magnet frame and configured to form a magnetic field in the space part, wherein a length of the space part in one direction is formed to be greater than a length thereof in the other direction, the magnet frame includes:

a first surface and a second surface which extend in the one direction, are disposed to face each other, and are configured to surround a portion of the space part; and a third surface and a fourth surface which extend in the other direction, are continuous with the first surface and the second surface, respectively, are disposed to face each other, and are configured to surround a remaining portion of the space part, and the Halbach array includes a plurality of blocks disposed side by side in the other direction and in contact with at least one other block of the plurality of blocks and formed of a magnetic material, and is disposed adjacent to one or more surfaces of the third surface and the fourth surface.

2. The arc path-forming part of claim 1, wherein the Halbach array includes:

a first Halbach array located adjacent to any one surface of the third surface and the fourth surface; and a second Halbach array located adjacent to the other surface of the third surface and the fourth surface, wherein the first and second Halbach arrays are disposed to face each other with the space part therebetween.

3. The arc path-forming part of claim 2, wherein the first Halbach array includes:

a first block located to be biased to any one surface of the first surface and the second surface;

a third block located to be biased to the other surface of the first surface and the second surface; and a second block located between the first block and the third block, the second Halbach array includes:

a first block located to be biased to the any one surface of the first surface and the second surface;

a third block located to be biased to the other surface of the first surface and the second surface; and a second block located between the first block and the third block, and the first to third blocks of the first Halbach array face the first to third blocks of the second Halbach array, respectively, with the space part therebetween.

4. The arc path-forming part of claim 3, wherein in the first Halbach array, a surface of the first block facing the second block, a surface of the third block facing the second block, and a surface of the second block facing the second Halbach array are magnetized to the same polarity, and in the second Halbach array, a surface of the first block facing the second block, a surface of the third block facing the second block, and a surface of the second block facing the first Halbach array are magnetized to a polarity different from the polarity.

5. The arc path-forming part of claim 3, wherein in the first Halbach array, a surface of the first block facing the second block, a surface of the third block facing the second block, and a surface of the second block facing the second Halbach array are magnetized to the same polarity, and in the second Halbach array, a surface of the first block facing the second block, a surface of the third block facing the second block, and a surface of the second block facing the first Halbach array are magnetized to a polarity the same as the polarity.

6. The arc path-forming part of claim 1, wherein the Halbach array is located adjacent to any one surface of the third surface and the fourth surface, a magnet part configured to form a magnetic field in the space part is provided separately from the Halbach array to be adjacent to the other surface of the third surface and the fourth surface, and the Halbach array and the magnet part are disposed to face each other with the space part therebetween.

7. The arc path-forming part of claim 6, wherein the Halbach array includes:

a first block located to be biased to any one surface of the first surface and the second surface;

a third block located to be biased to the other surface of the first surface and the second surface; and a second block located between the first block and the third block, and the magnet part includes:
a facing surface facing the Halbach array; and
an opposing surface opposite to the Halbach array.

8. The arc path-forming part of claim 7, wherein
in the Halbach array,
a surface of the first block facing the second block, a surface of the third block facing the second block, and a surface of the second block facing the magnet part are magnetized to the same polarity, and
in the magnet part,
the facing surface is magnetized to a polarity different from the polarity.

9. The arc path-forming part of claim 7, wherein
in the Halbach array,
a surface of the first block facing the second block, a surface of the third block facing the second block, and a surface of the second block facing the magnet part are magnetized to the same polarity, and
in the magnet part,
the facing surface is magnetized to a polarity the same as the polarity.

10. The arc path-forming part of claim 1, wherein
the Halbach array includes:
a first Halbach array located adjacent to any one surface of the third surface and the fourth surface, and located to be biased to any one surface of the first surface and the second surface; and
a second Halbach array located adjacent to the other surface of the third surface and the fourth surface, and located to be biased to the other surface of the first surface and the second surface,
wherein the first and second Halbach arrays are disposed to face each other with the space part therebetween.

11. The arc path-forming part of claim 10, wherein
the first Halbach array includes:
a first block located to overlap the second Halbach array in the other direction; and
a second block located between the first block and the any one surface of the first surface and the second surface,
the second Halbach array includes:
a first block located to overlap the first Halbach array in the other direction; and
a second block located between the first block and the other surface of the first surface and the second surface, and
the first block of the first Halbach array and the first block of the second Halbach array face each other.

12. The arc path-forming part of claim 11, wherein
in the first Halbach array,
a surface of the first block facing the second Halbach array and a surface of the second block facing the first block are magnetized to the same polarity, and
in the second Halbach array,
a surface of the first block facing the first Halbach array and a surface of the second block facing the first block are magnetized to a polarity different from the polarity.

13. The arc path-forming part of claim 11, wherein
in the first Halbach array,
a surface of the first block facing the second Halbach array and a surface of the second block facing the first block are magnetized to the same polarity, and
in the second Halbach array,
a surface of the first block facing the first Halbach array and a surface of the second block facing the first block are magnetized to a polarity the same as the polarity.

14. The arc path-forming part of claim 1, wherein
the Halbach array is located adjacent to any one surface of the third surface and the fourth surface, and is located to be biased to any one surface of the first surface and the second surface,
a magnet part configured to form a magnetic field in the space part is provided separately from the Halbach array to be adjacent to the other surface of the third surface and the fourth surface, and
the Halbach array and the magnet part are disposed to face each other with the space part therebetween.

15. The arc path-forming part of claim 14, wherein
the Halbach array includes:
a first block located to be biased to the other surface of the first surface and the second surface; and
a second block located to be biased to the any one surface of the first surface and the second surface, and
the magnet part includes:
a facing surface facing the Halbach array; and
an opposing surface opposite to the Halbach array.

16. The arc path-forming part of claim 15, wherein
in the Halbach array,
a surface of the first block facing the magnet part and a surface of the second block facing the first block are magnetized to the same polarity, and
in the magnet part,
the facing surface is magnetized to a polarity different from the polarity.

17. The arc path-forming part of claim 15, wherein
in the Halbach array,
a surface of the first block facing the magnet part and a surface of the second block facing the first block are magnetized to the same polarity, and
in the magnet part,
the facing surface is magnetized to a polarity the same as the polarity.

18. The arc path-forming part of claim 1, wherein
the Halbach array includes:
a first Halbach array located adjacent to any one surface of the third surface and the fourth surface, and located to be biased to any one surface of the first surface and the second surface; and
a second Halbach array located adjacent to the other surface of the third surface and the fourth surface,
wherein the first and second Halbach arrays are disposed to face each other with the space part therebetween.

19. The arc path-forming part of claim 18, wherein
the first Halbach array includes:
a first block disposed to overlap the fixed contactor in the other direction; and
a second block located to be biased to the any one surface of the first surface and the second surface, and
the second Halbach array includes:
a first block disposed to face the first block of the first Halbach array with the space part therebetween;
a second block located to be biased to the any one surface of the first surface and the second surface; and
a third block located to be biased to the other surface of the first surface and the second surface.

20. The arc path-forming part of claim 19, wherein
in the first Halbach array,
a surface of the first block facing the second Halbach array and a surface of the second block facing the first block are magnetized to the same polarity, and
in the second Halbach array,
a surface of the first block facing the first Halbach array, a surface of the second block facing the first block, and a surface of the third block facing the first block are magnetized to a polarity different from the polarity.

21. The arc path-forming part of claim 19, wherein in the first Halbach array, a surface of the first block facing the second Halbach array and a surface of the second block facing the first block are magnetized to the same polarity, and in the second Halbach array, a surface of the first block facing the first Halbach array, a surface of the second block facing the first block, and a surface of the third block facing the first block are magnetized to a polarity the same as the polarity.

22. A direct current (DC) relay comprising:

a plurality of fixed contactors located to be spaced apart from each other in one direction;

a movable contactor configured to be brought into contact with or separated from the fixed contactors;

a magnet frame having a space part, in which the fixed contactors and the movable contactor are accommodated, formed therein; and a Halbach array located in the space part of the magnet frame and configured to form a magnetic field in the space part, wherein a length of the space part in the one direction is formed to be greater than a length thereof in the other direction, the magnet frame includes:

a first surface and a second surface which extend in the one direction, are disposed to face each other, and are configured to surround a portion of the space part; and a third surface and a fourth surface which extend in the other direction, are continuous with the first surface and the second surface, respectively, are disposed to face each other, and are configured to surround a remaining portion of the space part, and the Halbach array includes a plurality of blocks disposed side by side in the other direction and formed of a magnetic material, and is disposed adjacent to one or more surfaces of the third surface and the fourth surface.

23. The DC relay of claim 22, wherein the Halbach array includes:

a first Halbach array located adjacent to any one surface of the third surface and the fourth surface; and a second Halbach array located adjacent to the other surface of the third surface and the fourth surface, wherein the first and second Halbach arrays are disposed to face each other with the space part therebetween.

24. The DC relay of claim 22, wherein the Halbach array is located adjacent to any one surface of the third surface and the fourth surface, a magnet part configured to form a magnetic field in the space part is provided separately from the Halbach array to be adjacent to the other surface of the third surface and the fourth surface, and the Halbach array and the magnet part are disposed to face each other with the space part therebetween.

25. An arc path-forming part comprising:

a magnet frame having a space part, in which a fixed contactor and a movable contactor are accommodated, formed therein; and a Halbach array and a magnet part, which are located in the space part of the magnet frame and configured to form a magnetic field in the space part, the magnet part being provided separately from the Halbach array, wherein a length of the space part in one direction is formed to be greater than a length thereof in the other direction, the magnet frame includes:

a first surface and a second surface which extend in the one direction, are disposed to face each other, and are configured to surround a portion of the space part; and a third surface and a fourth surface which extend in the other direction, are continuous with the first surface and the second surface, respectively, are disposed to face each other, and are configured to surround a remaining portion of the space part, the Halbach array includes a plurality of blocks disposed side by side in the other direction and formed of a magnetic material, and is located adjacent to one or more surfaces of the third surface and the fourth surface, and the magnet part is provided in plural, wherein at least one of the plurality of magnet parts is located adjacent to the first surface, and at least another one of the plurality of magnet parts is located adjacent to the second surface.

26. The arc path-forming part of claim 25, wherein the Halbach array includes:

a first Halbach array located adjacent to any one surface of the third surface and the fourth surface; and a second Halbach array located adjacent to the other surface of the third surface and the fourth surface and disposed to face the first Halbach array with the space part therebetween, and the magnet part includes:

a first magnet part and a second magnet part located adjacent to any one surface of the first surface and the second surface and disposed side by side in the one direction; and a third magnet part and a fourth magnet part, which are located adjacent to the other surface of the first surface and the second surface, disposed side by side in the one direction, and respectively disposed to face the first magnet part and the second magnet part with the space part therebetween.

27. The arc path-forming part of claim 26, wherein surfaces of the first magnet part and the second magnet part facing each other and surfaces of the third magnet part and the fourth magnet part facing each other are magnetized to the same polarity, any one surface of surfaces of the first Halbach array and the second Halbach array facing each other is magnetized to a polarity the same as the polarity, and the other surface of the surfaces of the first Halbach array and the second Halbach array facing each other is magnetized to a polarity different from the polarity.

28. The arc path-forming part of claim 26, wherein surfaces of the first magnet part and the second magnet part facing each other and surfaces of the third magnet part and the fourth magnet part facing each other are magnetized to the same polarity, and surfaces of the first Halbach array and the second Halbach array facing each other are magnetized to a polarity different from the polarity.

29. The arc path-forming part of claim 26, wherein the first Halbach array includes:

a first block located to be biased to any one surface of the first surface and the second surface;

a third block located to be biased to the other surface of the first surface and the second surface; and a second block located between the first block and the third block, and the second Halbach array includes:

a first block located to be biased to any one surface of the first surface and the second surface;

a third block located to be biased to the other surface of the first surface and the second surface; and a second block located between the first block and the third block.

30. The arc path-forming part of claim 29, wherein surfaces of the first magnet part and the second magnet part facing each other and surfaces of the third magnet part and the fourth magnet part facing each other are magnetized to the same polarity, any one surface of a surface of the second block of the first Halbach array and a surface of the second block of the second Halbach array facing each other is magnetized to a polarity the same as the polarity, and the other surface of the surface of the second block of the first Halbach array and the surface of the second block of the second Halbach array facing each other is magnetized to a polarity different from the polarity.

31. The arc path-forming part of claim 29, wherein surfaces of the first magnet part and the second magnet part facing each other and surfaces of the third magnet part and the fourth magnet part facing each other are magnetized to the same polarity, and a surface of the second block of the first Halbach array and a surface of the second block of the second Halbach array facing each other are magnetized to a polarity different from the polarity.

32. The arc path-forming part of claim 26, wherein the first Halbach array includes:

a first block disposed to overlap the fixed contactor in the one direction; and a second block located to be biased to any one surface of the first surface and the second surface, and the second Halbach array includes:

a first block disposed to overlap the fixed contactor in the one direction; and a second block located to be biased to the other surface of the first surface and the second surface.

33. The arc path-forming part of claim 32, wherein surfaces of the first magnet part and the second magnet part facing each other and surfaces of the third magnet part and the fourth magnet part facing each other are magnetized to the same polarity, any one surface of a surface of the first block of the first Halbach array and a surface of the first block of the second Halbach array facing each other is magnetized to a polarity the same as the polarity, and the other surface of the surface of the first block of the first Halbach array and the surface of the first block of the second Halbach array facing each other is magnetized to a polarity different from the polarity.

34. The arc path-forming part of claim 32, wherein surfaces of the first magnet part and the second magnet part facing each other and surfaces of the third magnet part and the fourth magnet part facing each other are magnetized to the same polarity, and a surface of the first block of the first Halbach array and a surface of the first block of the second Halbach array facing each other are magnetized to a polarity different from the polarity.

35. The arc path-forming part of claim 26, wherein the first Halbach array includes:

a first block disposed to overlap the fixed contactor in the one direction; and a second block located to be biased to any one surface of the first surface and the second surface, and the second Halbach array includes:

a first block disposed to overlap the fixed contactor in the one direction;

a second block located to be biased to the other surface of the first surface and the second surface; and a third block located to be biased to the any one surface the first surface and the second surface.

36. The arc path-forming part of claim 35, wherein surfaces of the first magnet part and the second magnet part facing each other and surfaces of the third magnet part and the fourth magnet part facing each other are magnetized to the same polarity, any one surface of a surface of the first block of the first Halbach array and a surface of the first block of the second Halbach array facing each other is magnetized to a polarity the same as the polarity, and the other surface of the surface of the first block of the first Halbach array and the surface of the first block of the second Halbach array facing each other is magnetized to a polarity different from the polarity.

37. The arc path-forming part of claim 35, wherein surfaces of the first magnet part and the second magnet part facing each other and surfaces of the third magnet part and the fourth magnet part facing each other are magnetized to the same polarity, and a surface of the first block of the first Halbach array and a surface of the first block of the second Halbach array facing each other are magnetized to a polarity different from the polarity.

38. The arc path-forming part of claim 25, wherein the Halbach array is located adjacent to any one surface of the third surface and the fourth surface, and the magnet part includes:

a first magnet part and a second magnet part located adjacent to any one surface of the first surface and the second surface and disposed side by side in the one direction;

a third magnet part and a fourth magnet part, which are located adjacent to the other surface of the first surface and the second surface, disposed side by side in the one direction, and respectively disposed to face the first magnet part and the second magnet part with the space part therebetween; and a fifth magnet part located adjacent to the other surface of the third surface and the fourth surface and disposed to face the Halbach array with the space part therebetween.

39. The arc path-forming part of claim 38, wherein surfaces of the first magnet part and the second magnet part facing each other and surfaces of the third magnet part and the fourth magnet part facing each other are magnetized to the same polarity, any one surface of surfaces of the Halbach array and the fifth magnet part facing each other is magnetized to a polarity the same as the polarity, and the other surface of the surfaces of the Halbach array and the fifth magnet part facing each other is magnetized to a polarity different from the polarity.

40. The arc path-forming part of claim 38, wherein surfaces of the first magnet part and the second magnet part facing each other and surfaces of the third magnet part and the fourth magnet part facing each other are magnetized to the same polarity, and surfaces of the Halbach array and the fifth magnet part facing each other are magnetized to a polarity different from the polarity.

41. The arc path-forming part of claim 38, wherein the Halbach array includes:

a first block located to be biased to any one surface of the first surface and the second surface;

a third block located to be biased to the other surface of the first surface and the second surface; and a second block located between the first block and the third block.

42. The arc path-forming part of claim 41, wherein surfaces of the first magnet part and the second magnet part facing each other and surfaces of the third magnet part and the fourth magnet part facing each other are magnetized to the same polarity, any one surface of a surface of the second block of the Halbach array and a surface of the fifth magnet part facing each other is magnetized to a polarity the same as the polarity, and the other surface of the surface of the second block of the Halbach array and the surface of the fifth magnet part facing each other is magnetized to a polarity different from the polarity.

43. The arc path-forming part of claim 41, wherein surfaces of the first magnet part and the second magnet part facing each other and surfaces of the third magnet part and the fourth magnet part facing each other are magnetized to the same polarity, and a surface of the second block of the Halbach array and a surface of the fifth magnet part facing each other are magnetized to a polarity different from the polarity.

44. The arc path-forming part of claim 38, wherein the Halbach array includes:

a first block disposed to overlap the fixed contactor in the one direction; and a second block located to be biased to any one surface of the first surface and the second surface.

45. The arc path-forming part of claim 41, wherein surfaces of the first magnet part and the second magnet part facing each other and surfaces of the third magnet part and the fourth magnet part facing each other are magnetized to the same polarity, any one surface of a surface of the first block of the Halbach array and a surface of the fifth magnet part facing each other is magnetized to a polarity the same as the polarity, and the other surface of the surface of the first block of the Halbach array and the surface of the fifth magnet part facing each other is magnetized to a polarity different from the polarity.

46. The arc path-forming part of claim 41, wherein surfaces of the first magnet part and the second magnet part facing each other and surfaces of the third magnet part and the fourth magnet part facing each other are magnetized to the same polarity, and a surface of the first block of the Halbach array and a surface of the fifth magnet part facing each other are magnetized to a polarity different from the polarity.

47. A direct current (DC) relay comprising:

a plurality of fixed contactors located to be spaced apart from each other in one direction;

a movable contactor configured to be brought into contact with or separated from the fixed contactors;

a magnet frame having a space part, in which the fixed contactors and the movable contactor are accommodated, formed therein; and a Halbach array and a magnet part, which are located in the space part of the magnet frame and configured to form a magnetic field in the space part, the magnet part being provided separately from the Halbach array, wherein a length of the space part in the one direction is formed to be greater than a length thereof in the other direction, the magnet frame includes:

a first surface and a second surface which extend in the one direction, are disposed to face each other, and are configured to surround a portion of the space part; and a third surface and a fourth surface which extend in the other direction, are continuous with the first surface and the second surface, respectively, are disposed to face each other, and are configured to surround a remaining portion of the space part, the Halbach array includes a plurality of blocks disposed side by side in the other direction and in contact with at least one other block of the plurality of blocks and formed of a magnetic material, and is located adjacent to one or more surfaces of the third surface and the fourth surface, and the magnet part is provided in plural, wherein at least one of the plurality of magnet parts is located adjacent to the first surface, and at least another one of the plurality of magnet parts is located adjacent to the second surface.

48. The DC relay of claim 47, wherein the Halbach array includes:

a first Halbach array located adjacent to any one surface of the third surface and the fourth surface; and a second Halbach array located adjacent to the other surface of the third surface and the fourth surface and disposed to face the first Halbach array with the space part therebetween, and the magnet part includes:

a first magnet part and a second magnet part located adjacent to any one surface of the first surface and the second surface and disposed side by side in the one direction; and a third magnet part and a fourth magnet part, which are located adjacent to the other surface of the first surface and the second surface, disposed side by side in the one direction, and respectively disposed to face the first magnet part and the second magnet part with the space part therebetween, wherein surfaces of the first magnet part and the second magnet part facing each other and surfaces of the third magnet part and the fourth magnet part facing each other are magnetized to the same polarity, any one surface of surfaces of the first Halbach array and the second Halbach array facing each other is magnetized to a polarity the same as the polarity, and the other surface of the surfaces of the first Halbach array and the second Halbach array facing each other is magnetized to a polarity different from the polarity.

49. The DC relay of claim 47, wherein the Halbach array includes:

a first Halbach array located adjacent to any one surface of the third surface and the fourth surface; and a second Halbach array located adjacent to the other surface of the third surface and the fourth surface and disposed to face the first Halbach array with the space part therebetween, and the magnet part includes:

a first magnet part and a second magnet part located adjacent to any one surface of the first surface and the second surface and disposed side by side in the one direction; and a third magnet part and a fourth magnet part, which are located adjacent to the other surface of the first surface and the second surface, disposed side by side in the one direction, and respectively disposed to face the first magnet part and the second magnet part with the space part therebetween, wherein surfaces of the first magnet part and the second magnet part facing each other and surfaces of the third magnet part and the fourth magnet part facing each other are magnetized to the same polarity, and surfaces of the first Halbach array and the second Halbach array facing each other are magnetized to a polarity different from the polarity.

50. The DC relay of claim 47, wherein the Halbach array is located adjacent to any one surface of the third surface and the fourth surface, and the magnet part includes:

a first magnet part and a second magnet part located adjacent to any one surface of the first surface and the second surface and disposed side by side in the one direction;

a third magnet part and a fourth magnet part, which are located adjacent to the other surface of the first surface and the second surface, disposed side by side in the one direction, and respectively disposed to face the first magnet part and the second magnet part with the space part therebetween; and a fifth magnet part located adjacent to the other surface of the third surface and the fourth surface and disposed to face the Halbach array with the space part therebetween, wherein surfaces of the first magnet part and the second magnet part facing each other and surfaces of the third magnet part and the fourth magnet part facing each other are magnetized to the same polarity, any one surface of surfaces of the Halbach array and the fifth magnet part facing each other is magnetized to a polarity the same as the polarity, and the other surface of the surfaces of the Halbach array and the fifth magnet part facing each other is magnetized to a polarity different from the polarity.

51. The DC relay of claim 47, wherein the Halbach array is located adjacent to any one surface of the third surface and the fourth surface, and the magnet part includes:

a first magnet part and a second magnet part located adjacent to any one surface of the first surface and the second surface and disposed side by side in the one direction;

a third magnet part and a fourth magnet part, which are located adjacent to the other surface of the first surface and the second surface, disposed side by side in the one direction, and respectively disposed to face the first magnet part and the second magnet part with the space part therebetween; and a fifth magnet part located adjacent to the other surface of the third surface and the fourth surface and disposed to face the Halbach array with the space part therebetween, wherein surfaces of the first magnet part and the second magnet part facing each other and surfaces of the third magnet part and the fourth magnet part facing each other are magnetized to the same polarity, and surfaces of the Halbach array and the fifth magnet part facing each other are magnetized to a polarity different from the polarity.

* * * * *